(12) United States Patent
Yang et al.

(10) Patent No.: US 10,416,882 B2
(45) Date of Patent: Sep. 17, 2019

(54) DISPLAYING OPTIONS, ASSIGNING NOTIFICATION, IGNORING MESSAGES, AND SIMULTANEOUS USER INTERFACE DISPLAYS IN A MESSAGING APPLICATION

(71) Applicant: Apple Inc., Cupertino, CA (US)

(72) Inventors: Lawrence Y. Yang, Bellevue, WA (US); Stephen O. Lemay, Palo Alto, CA (US); Tiffany S. Jon, Sunnyvale, CA (US); Mohammed N. Jisrawi, Santa Clara, CA (US); Cristobal Baray, Sunnyvale, CA (US); Chanaka G. Karunamuni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/977,920

(22) Filed: May 11, 2018

(65) Prior Publication Data
US 2018/0260109 A1    Sep. 13, 2018

Related U.S. Application Data

(63) Continuation of application No. 14/700,039, filed on Apr. 29, 2015, now Pat. No. 9,971,500.
(Continued)

(51) Int. Cl.
*G06F 3/0488* (2013.01)
*H04L 12/58* (2006.01)
(Continued)

(52) U.S. Cl.
CPC ........ *G06F 3/04883* (2013.01); *G06F 3/0416* (2013.01); *G06F 3/0482* (2013.01);
(Continued)

(58) Field of Classification Search
CPC .. G06F 3/0481; G06F 3/04817; G06F 3/0482; G06F 3/0484; G06F 3/04842;
(Continued)

(56) References Cited

U.S. PATENT DOCUMENTS

| 4,734,689 A | 3/1988 | Kurakake |
| 5,347,295 A | 9/1994 | Agulnick et al. |

(Continued)

FOREIGN PATENT DOCUMENTS

| CN | 101910988 A | 12/2010 |
| CN | 101943990 A | 1/2011 |

(Continued)

OTHER PUBLICATIONS

Office Action received for European Patent Application No. 12726302.8 dated Jan. 29, 2019, 6 pages.
(Continued)

*Primary Examiner* — Michael J Eurice
(74) *Attorney, Agent, or Firm* — Dentons US LLP

(57) ABSTRACT

An electronic device with a touch-sensitive surface and display can execute a messaging application. In the messaging application, swipe options can be displayed for messages and threads. Swipe options correspond to actions that can be taken on the messages or threads. Messages and threads can be associated with notification rules as well as be ignored. Composition interfaces and messages can be displayed simultaneously in the messaging application. The messaging application can display a conversation view of a message thread with a common header that can include subject information and names of participants in the threads. The messaging application allows for adding and removing participants to the conversation view. The messaging application allows for grouping search results from a search of
(Continued)

US 10,416,882 B2

Page 2 messages using a search term. The grouping can be based on the location of the search term within the messages.

20 Claims, 108 Drawing Sheets

Related U.S. Application Data

(60) Provisional application No. 62/006,211, filed on Jun. 1, 2014.

(51) Int. Cl.
| | | |
|---|---|---|
| G06F 3/041 | (2006.01) | |
| G06F 3/0484 | (2013.01) | |
| G06F 16/248 | (2019.01) | |
| G06F 16/9535 | (2019.01) | |
| G06F 16/2457 | (2019.01) | |
| G06F 3/0482 | (2013.01) | |
| G06Q 10/10 | (2012.01) | |
| H04M 1/725 | (2006.01) | |
| G06F 3/0481 | (2013.01) | |

(52) U.S. Cl.
CPC ........ *G06F 3/0488* (2013.01); *G06F 3/04842* (2013.01); *G06F 16/248* (2019.01); *G06F 16/24575* (2019.01); *G06F 16/9535* (2019.01); *G06Q 10/107* (2013.01); *H04L 51/046* (2013.01); *H04L 51/16* (2013.01); *H04L 51/22* (2013.01); *H04M 1/72552* (2013.01); *G06F 3/0481* (2013.01); *G06F 3/0484* (2013.01); *G06F 3/04817* (2013.01); *G06F 3/04847* (2013.01); *G06F 3/04886* (2013.01); *H04M 2250/22* (2013.01)

(58) Field of Classification Search
CPC ............... G06F 3/04847; G06F 3/0488; G06F 3/04883; G06F 3/04886
See application file for complete search history.

(56) References Cited

U.S. PATENT DOCUMENTS

| | | | |
|---|---|---|---|
| 5,481,278 A | 1/1996 | Shigematsu et al. | |
| 5,627,567 A | 5/1997 | Davidson | |
| 5,689,550 A | 11/1997 | Garson et al. | |
| 5,943,052 A | 8/1999 | Allen et al. | |
| 5,973,676 A | 10/1999 | Kawakura | |
| 6,037,937 A | 3/2000 | Beaton et al. | |
| 6,154,758 A | 11/2000 | Chiang | |
| 6,185,551 B1 | 2/2001 | Birrell et al. | |
| 6,209,100 B1 | 3/2001 | Robertson et al. | |
| 6,259,436 B1 | 7/2001 | Moon et al. | |
| 6,381,579 B1 | 4/2002 | Gervais et al. | |
| 6,492,979 B1 | 12/2002 | Kent et al. | |
| 6,542,171 B1 | 4/2003 | Satou et al. | |
| 6,922,816 B1 | 7/2005 | Amin et al. | |
| 6,924,822 B2 | 8/2005 | Card et al. | |
| 6,938,220 B1 | 8/2005 | Shigematsu et al. | |
| 6,954,899 B1 | 10/2005 | Anderson | |
| 6,995,746 B2 | 2/2006 | Aymeric | |
| 7,007,226 B1 | 2/2006 | Smith et al. | |
| 7,007,239 B1 | 2/2006 | Hawkins et al. | |
| 7,110,864 B2 | 9/2006 | Restrepo et al. | |
| 7,222,299 B1 | 5/2007 | Lim et al. | |
| 7,437,683 B1 | 10/2008 | Beezer et al. | |
| 7,489,306 B2 | 2/2009 | Kolmykov-Zotov et al. | |
| D611,054 S | 3/2010 | Lin et al. | |
| 7,730,401 B2 | 6/2010 | Gillespie et al. | |
| 8,131,298 B1 | 3/2012 | Beyer, Jr. | |
| 8,289,162 B2 | 10/2012 | Mooring et al. | |
| 8,330,715 B2 | 12/2012 | Yadavalli et al. | |
| 8,332,477 B1 | 12/2012 | Kaiserlian et al. | |
| 8,341,529 B1 | 12/2012 | Li et al. | |
| 8,347,232 B1 | 1/2013 | Prud"Hommeaux et al. | |
| 8,358,321 B1 | 1/2013 | Weidner | |
| 8,365,059 B2 | 1/2013 | Walsh et al. | |
| 8,368,723 B1 | 2/2013 | Gossweiler, III et al. | |
| 8,448,083 B1 | 5/2013 | Migos et al. | |
| 8,520,025 B2 | 8/2013 | Patterson et al. | |
| 8,665,225 B2 | 3/2014 | Matas et al. | |
| 8,756,522 B2 | 6/2014 | Lee et al. | |
| 8,842,082 B2 | 9/2014 | Migos et al. | |
| 8,850,350 B2 | 9/2014 | Bi et al. | |
| 8,863,020 B2 | 10/2014 | Hymel | |
| 9,026,932 B1 | 5/2015 | Dixon | |
| 9,032,338 B2 | 5/2015 | Murrett et al. | |
| 9,047,009 B2 | 6/2015 | Herbst et al. | |
| 9,092,132 B2 | 7/2015 | Miura et al. | |
| 9,104,647 B2 | 8/2015 | Artin | |
| 9,113,193 B1 | 8/2015 | Gardes et al. | |
| 9,117,426 B2 | 8/2015 | Wieder | |
| 9,229,634 B2 | 1/2016 | Matas et al. | |
| 9,250,798 B2 | 2/2016 | Miura et al. | |
| 9,280,263 B2 | 3/2016 | Kim | |
| 9,654,426 B2 | 5/2017 | Underwood, IV et al. | |
| 2002/0015064 A1 | 2/2002 | Robotham et al. | |
| 2002/0051018 A1 | 5/2002 | Yeh | |
| 2002/0180763 A1 | 12/2002 | Kung | |
| 2003/0006967 A1 | 1/2003 | Pihlaja | |
| 2003/0063073 A1 | 4/2003 | Geaghan et al. | |
| 2003/0076306 A1 | 4/2003 | Zadesky et al. | |
| 2003/0135555 A1 | 7/2003 | Birrel et al. | |
| 2003/0142081 A1 | 7/2003 | Iizuka et al. | |
| 2003/0182310 A1 | 9/2003 | Charnock et al. | |
| 2004/0015548 A1 | 1/2004 | Lee | |
| 2004/0017355 A1 | 1/2004 | Shim | |
| 2004/0021643 A1 | 2/2004 | Hoshino et al. | |
| 2004/0068409 A1 | 4/2004 | Tanaka et al. | |
| 2004/0108995 A1 | 6/2004 | Hoshino et al. | |
| 2004/0140984 A1 | 7/2004 | Hinckley et al. | |
| 2004/0178997 A1 | 9/2004 | Gillespie et al. | |
| 2004/0218104 A1 | 11/2004 | Smith et al. | |
| 2004/0263487 A1 | 12/2004 | Mayoraz et al. | |
| 2004/0268265 A1 | 12/2004 | Berger | |
| 2005/0144241 A1* | 6/2005 | Stata ............... G06F 17/30067 | |
| | | | 709/206 |
| 2005/0172001 A1 | 8/2005 | Zaner et al. | |
| 2005/0190970 A1 | 9/2005 | Griffin | |
| 2005/0198143 A1 | 9/2005 | Moody et al. | |
| 2005/0223057 A1 | 10/2005 | Buchheit et al. | |
| 2005/0223058 A1 | 10/2005 | Buchheit et al. | |
| 2005/0223066 A1 | 10/2005 | Buchheit et al. | |
| 2005/0223067 A1 | 10/2005 | Buchheit et al. | |
| 2005/0223326 A1 | 10/2005 | Chang et al. | |
| 2005/0234910 A1 | 10/2005 | Buchheit et al. | |
| 2005/0262203 A1 | 11/2005 | Buchheit et al. | |
| 2005/0275637 A1 | 12/2005 | Hinckley et al. | |
| 2006/0007174 A1 | 1/2006 | Shen | |
| 2006/0007178 A1 | 1/2006 | Davis | |
| 2006/0022955 A1 | 2/2006 | Kennedy | |
| 2006/0033701 A1 | 2/2006 | Wilson | |
| 2006/0038796 A1 | 2/2006 | Hinckley et al. | |
| 2006/0048072 A1 | 3/2006 | Jarrett et al. | |
| 2006/0085757 A1 | 4/2006 | Andre et al. | |
| 2006/0092142 A1 | 5/2006 | Gillespie et al. | |
| 2006/0117273 A1 | 6/2006 | Smith et al. | |
| 2006/0125803 A1 | 6/2006 | Westerman et al. | |
| 2006/0128404 A1* | 6/2006 | Klassen ............... H04L 51/16 | |
| | | | 455/466 |
| 2006/0132456 A1 | 6/2006 | Anson | |
| 2006/0190828 A1 | 8/2006 | Zaner et al. | |
| 2006/0199612 A1 | 9/2006 | Beyer et al. | |
| 2006/0242607 A1 | 10/2006 | Hudson | |
| 2006/0248151 A1 | 11/2006 | Belakovskiy et al. | |
| 2006/0253018 A1 | 11/2006 | Speier et al. | |
| 2006/0253418 A1 | 11/2006 | Charnock et al. | |
| 2006/0277488 A1 | 12/2006 | Cok et al. | |
| 2006/0290679 A1 | 12/2006 | Lii | |
| 2007/0060228 A1 | 3/2007 | Akasaka et al. | |
| 2007/0062852 A1 | 3/2007 | Zachut et al. | |

(56) References Cited

U.S. PATENT DOCUMENTS

| | | |
|---|---|---|
| 2007/0067744 A1 | 3/2007 | Lane et al. |
| 2007/0124503 A1 | 5/2007 | Ramos et al. |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0173267 A1 | 7/2007 | Klassen et al. |
| 2007/0178941 A1 | 8/2007 | Fujimoto et al. |
| 2007/0192738 A1* | 8/2007 | Lee .................... G06F 3/0482 715/810 |
| 2007/0192744 A1 | 8/2007 | Reponen |
| 2007/0195067 A1 | 8/2007 | Zotov et al. |
| 2007/0232360 A1 | 10/2007 | Bocking et al. |
| 2007/0247442 A1 | 10/2007 | Andre et al. |
| 2007/0247446 A1 | 10/2007 | Orsley et al. |
| 2007/0268274 A1 | 11/2007 | Westerman et al. |
| 2007/0277126 A1 | 11/2007 | Park et al. |
| 2007/0300182 A1 | 12/2007 | Bilow |
| 2008/0012835 A1 | 1/2008 | Rimon et al. |
| 2008/0036743 A1 | 2/2008 | Westerman et al. |
| 2008/0094356 A1 | 4/2008 | Ording et al. |
| 2008/0094368 A1 | 4/2008 | Ording et al. |
| 2008/0122796 A1 | 5/2008 | Jobs et al. |
| 2008/0134101 A1 | 6/2008 | Newman |
| 2008/0153459 A1 | 6/2008 | Kansal et al. |
| 2008/0165142 A1 | 7/2008 | Kocienda et al. |
| 2008/0165145 A1 | 7/2008 | Herz et al. |
| 2008/0165160 A1 | 7/2008 | Kocienda et al. |
| 2008/0168349 A1 | 7/2008 | Lamiraux et al. |
| 2008/0168404 A1 | 7/2008 | Ording |
| 2008/0180391 A1 | 7/2008 | Auciello et al. |
| 2008/0180408 A1 | 7/2008 | Forstall et al. |
| 2008/0229254 A1 | 9/2008 | Warner |
| 2008/0259040 A1 | 10/2008 | Ording et al. |
| 2008/0285587 A1 | 11/2008 | Balk et al. |
| 2008/0294730 A1 | 11/2008 | Oral et al. |
| 2008/0295001 A1 | 11/2008 | Moody et al. |
| 2009/0015559 A1 | 1/2009 | Day et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 | 1/2009 | Brezina et al. |
| 2009/0031244 A1 | 1/2009 | Brezina et al. |
| 2009/0031245 A1 | 1/2009 | Brezina et al. |
| 2009/0041052 A1 | 2/2009 | Balk et al. |
| 2009/0047983 A1 | 2/2009 | Klassen et al. |
| 2009/0052778 A1 | 2/2009 | Edgecomb et al. |
| 2009/0064047 A1 | 3/2009 | Shim et al. |
| 2009/0106415 A1 | 4/2009 | Brezina et al. |
| 2009/0106676 A1 | 4/2009 | Brezina et al. |
| 2009/0109182 A1 | 4/2009 | Fyke et al. |
| 2009/0122018 A1 | 5/2009 | Vymenets et al. |
| 2009/0125824 A1 | 5/2009 | Andrews et al. |
| 2009/0140986 A1 | 6/2009 | Karkkainen et al. |
| 2009/0144634 A1 | 6/2009 | Berger |
| 2009/0153288 A1 | 6/2009 | Hope et al. |
| 2009/0153289 A1* | 6/2009 | Hope .................... G06F 3/04883 340/5.1 |
| 2009/0167700 A1 | 7/2009 | Westerman et al. |
| 2009/0176521 A1 | 7/2009 | Klassen et al. |
| 2009/0189858 A1 | 7/2009 | Lev et al. |
| 2009/0228792 A1 | 9/2009 | van Os et al. |
| 2009/0235196 A1 | 9/2009 | MacBeth et al. |
| 2009/0239587 A1 | 9/2009 | Negron et al. |
| 2009/0244020 A1 | 10/2009 | Sjolin |
| 2009/0249257 A1 | 10/2009 | Bove et al. |
| 2009/0249258 A1 | 10/2009 | Tang |
| 2009/0282360 A1 | 11/2009 | Park et al. |
| 2009/0288044 A1* | 11/2009 | Matthews ............ G06F 3/0482 715/863 |
| 2010/0011317 A1 | 1/2010 | Lee |
| 2010/0013780 A1 | 1/2010 | Ikeda et al. |
| 2010/0057879 A1 | 3/2010 | Buchheit et al. |
| 2010/0064017 A1 | 3/2010 | Buchheit et al. |
| 2010/0064261 A1 | 3/2010 | Andrews et al. |
| 2010/0087172 A1 | 4/2010 | Klassen et al. |
| 2010/0103124 A1 | 4/2010 | Kruzeniski et al. |
| 2010/0107050 A1 | 4/2010 | Wang et al. |
| 2010/0127972 A1 | 5/2010 | Yadavalli et al. |
| 2010/0156813 A1 | 6/2010 | Duarte et al. |
| 2010/0169766 A1 | 7/2010 | Duarte et al. |
| 2010/0185949 A1* | 7/2010 | Jaeger .................... G06F 3/0481 715/730 |
| 2010/0188352 A1 | 7/2010 | Ikeda |
| 2010/0214237 A1 | 8/2010 | Echeverri et al. |
| 2010/0220062 A1 | 9/2010 | Antila |
| 2010/0235726 A1 | 9/2010 | Ording et al. |
| 2010/0235785 A1 | 9/2010 | Ording et al. |
| 2010/0235793 A1 | 9/2010 | Ording et al. |
| 2010/0238139 A1 | 9/2010 | Goertz et al. |
| 2010/0241700 A1 | 9/2010 | Rasmussen et al. |
| 2010/0241749 A1 | 9/2010 | Rasmussen et al. |
| 2010/0250682 A1 | 9/2010 | Goldberg et al. |
| 2010/0281397 A1 | 11/2010 | Buchheit et al. |
| 2010/0283753 A1 | 11/2010 | Ohshita et al. |
| 2010/0293242 A1 | 11/2010 | Buchheit et al. |
| 2010/0293460 A1 | 11/2010 | Budelli |
| 2010/0299599 A1 | 11/2010 | Shin et al. |
| 2010/0309148 A1 | 12/2010 | Fleizach et al. |
| 2011/0001694 A1 | 1/2011 | Homma et al. |
| 2011/0010182 A1 | 1/2011 | Turski et al. |
| 2011/0010340 A1 | 1/2011 | Hung et al. |
| 2011/0029918 A1 | 2/2011 | Yoo et al. |
| 2011/0037725 A1 | 2/2011 | Pryor |
| 2011/0039602 A1 | 2/2011 | McNamara et al. |
| 2011/0050607 A1 | 3/2011 | Park |
| 2011/0055753 A1 | 3/2011 | Horodezky et al. |
| 2011/0069006 A1 | 3/2011 | Liu et al. |
| 2011/0074699 A1 | 3/2011 | Marr et al. |
| 2011/0074710 A1 | 3/2011 | Weeldreyer et al. |
| 2011/0078560 A1 | 3/2011 | Weeldreyer et al. |
| 2011/0106439 A1 | 5/2011 | Huang et al. |
| 2011/0122159 A1 | 5/2011 | Bergsten et al. |
| 2011/0128241 A1 | 6/2011 | Kang et al. |
| 2011/0130182 A1 | 6/2011 | Namba et al. |
| 2011/0175830 A1 | 7/2011 | Miyazawa et al. |
| 2011/0179387 A1 | 7/2011 | Shaffer et al. |
| 2011/0191718 A1 | 8/2011 | Hinckley et al. |
| 2011/0191719 A1 | 8/2011 | Hinckley et al. |
| 2011/0199393 A1 | 8/2011 | Nurse et al. |
| 2011/0202877 A1 | 8/2011 | Lassonde et al. |
| 2011/0221684 A1 | 9/2011 | Rydenhag |
| 2011/0231499 A1 | 9/2011 | Stovicek et al. |
| 2011/0231789 A1 | 9/2011 | Bukurak et al. |
| 2011/0231796 A1 | 9/2011 | Vigil |
| 2011/0258537 A1 | 10/2011 | Rives et al. |
| 2011/0264689 A1 | 10/2011 | Hirst et al. |
| 2011/0302532 A1 | 12/2011 | Missig |
| 2011/0320978 A1 | 12/2011 | Horodezky et al. |
| 2012/0042278 A1 | 2/2012 | Vaisanen et al. |
| 2012/0044177 A1 | 2/2012 | Ohta et al. |
| 2012/0046947 A1 | 2/2012 | Fleizach |
| 2012/0084694 A1* | 4/2012 | Sirpal .................... G06F 1/1616 715/769 |
| 2012/0088524 A1 | 4/2012 | Moldavsky et al. |
| 2012/0096345 A1 | 4/2012 | Ho et al. |
| 2012/0110431 A1 | 5/2012 | Rosenfeld et al. |
| 2012/0120002 A1 | 5/2012 | Ota et al. |
| 2012/0139844 A1 | 6/2012 | Ramstein et al. |
| 2012/0143972 A1 | 6/2012 | Malik et al. |
| 2012/0166998 A1 | 6/2012 | Cotterill et al. |
| 2012/0182226 A1* | 7/2012 | Tuli .................... G06F 3/0488 345/173 |
| 2012/0185498 A1 | 7/2012 | Jalon et al. |
| 2012/0192086 A1 | 7/2012 | Ghods et al. |
| 2012/0210334 A1 | 8/2012 | Sutedja et al. |
| 2012/0233571 A1 | 9/2012 | Wever et al. |
| 2012/0311507 A1 | 12/2012 | Murrett et al. |
| 2013/0016129 A1 | 1/2013 | Gossweiler, III et al. |
| 2013/0024820 A1 | 1/2013 | Kirkpatrick |
| 2013/0038541 A1* | 2/2013 | Bakker .................... G06F 3/0482 345/173 |
| 2013/0050119 A1 | 2/2013 | Nemoto et al. |
| 2013/0055119 A1 | 2/2013 | Luong |

(56) References Cited

U.S. PATENT DOCUMENTS

| | | |
|---|---|---|
| 2013/0055140 A1 | 2/2013 | Mosquera et al. |
| 2013/0076591 A1 | 3/2013 | Sirpal et al. |
| 2013/0086480 A1* | 4/2013 | Sirpal .................. G06F 3/1438 |
| | | 715/744 |
| 2013/0093764 A1 | 4/2013 | Andersson et al. |
| 2013/0097519 A1 | 4/2013 | Andersson et al. |
| 2013/0097520 A1 | 4/2013 | Lewin et al. |
| 2013/0097521 A1 | 4/2013 | Lewin et al. |
| 2013/0097526 A1 | 4/2013 | Stovicek et al. |
| 2013/0097534 A1 | 4/2013 | Lewin et al. |
| 2013/0097539 A1 | 4/2013 | M Nsson et al. |
| 2013/0097562 A1 | 4/2013 | Kermoian et al. |
| 2013/0113720 A1 | 5/2013 | Van Eerd et al. |
| 2013/0159893 A1 | 6/2013 | Lewin et al. |
| 2013/0159902 A1 | 6/2013 | Kwak et al. |
| 2013/0167013 A1 | 6/2013 | Poliak |
| 2013/0185290 A1 | 7/2013 | Hirst et al. |
| 2013/0214995 A1 | 8/2013 | Lewin et al. |
| 2013/0222244 A1 | 8/2013 | Mak et al. |
| 2013/0227490 A1 | 8/2013 | Thorsander et al. |
| 2013/0263040 A1* | 10/2013 | Rosenberg ............ G06F 3/0484 |
| | | 715/780 |
| 2013/0263052 A1 | 10/2013 | Fong et al. |
| 2013/0265225 A1 | 10/2013 | Nasiri et al. |
| 2013/0286435 A1 | 10/2013 | Anezaki et al. |
| 2013/0290291 A1 | 10/2013 | Loofbourrow et al. |
| 2013/0311867 A1 | 11/2013 | Patterson et al. |
| 2013/0321314 A1* | 12/2013 | Oh ........................... G06F 3/041 |
| | | 345/173 |
| 2014/0011547 A1* | 1/2014 | Jingushi .............. H04M 1/0202 |
| | | 455/566 |
| 2014/0033032 A1 | 1/2014 | Reynolds et al. |
| 2014/0040835 A1 | 2/2014 | Hildreth et al. |
| 2014/0045470 A1* | 2/2014 | Bridge .................... H04W 4/16 |
| | | 455/415 |
| 2014/0082521 A1* | 3/2014 | Carolan .................. H04L 51/00 |
| | | 715/752 |
| 2014/0122333 A1* | 5/2014 | Whipple ................ G06Q 20/42 |
| | | 705/44 |
| 2014/0129457 A1 | 5/2014 | Peeler et al. |
| 2014/0143728 A1 | 5/2014 | Coleman, Jr. et al. |
| 2014/0143738 A1 | 5/2014 | Underwood, IV et al. |
| 2014/0160073 A1 | 6/2014 | Matsuki et al. |
| 2014/0191986 A1 | 7/2014 | Kim et al. |
| 2014/0210756 A1 | 7/2014 | Lee et al. |
| 2014/0215382 A1 | 7/2014 | Engel et al. |
| 2014/0222933 A1 | 8/2014 | Stovicek et al. |
| 2014/0223381 A1 | 8/2014 | Huang et al. |
| 2014/0289633 A1* | 9/2014 | Jia ............................ G06F 3/167 |
| | | 715/728 |
| 2014/0298258 A1* | 10/2014 | Doan .................. G06F 3/04883 |
| | | 715/810 |
| 2014/0300543 A1 | 10/2014 | Kim et al. |
| 2014/0309849 A1 | 10/2014 | Ricci et al. |
| 2014/0351691 A1 | 11/2014 | Neil et al. |
| 2014/0368442 A1* | 12/2014 | Vahtola .................. G06F 3/013 |
| | | 345/173 |
| 2015/0028626 A1 | 1/2015 | Gopal et al. |
| 2015/0062027 A1* | 3/2015 | Yang ..................... G06F 3/0488 |
| | | 345/173 |
| 2015/0067582 A1* | 3/2015 | Donnelly ............. G06F 3/0485 |
| | | 715/784 |
| 2015/0067596 A1* | 3/2015 | Brown .................. G06F 3/0416 |
| | | 715/808 |
| 2015/0095819 A1* | 4/2015 | Hong ..................... G06F 3/0484 |
| | | 715/765 |
| 2015/0113437 A1* | 4/2015 | Bamford ............... G06F 3/0482 |
| | | 715/752 |
| 2015/0143258 A1 | 5/2015 | Mcdowell et al. |
| 2015/0199371 A1 | 7/2015 | Loofbourrow et al. |
| 2015/0212723 A1 | 7/2015 | Lim et al. |
| 2015/0235370 A1 | 8/2015 | Abovitz et al. |
| 2015/0248233 A1 | 9/2015 | Murrett et al. |
| 2015/0250682 A1 | 9/2015 | Bangera et al. |
| 2015/0286346 A1 | 10/2015 | Song et al. |
| 2015/0319297 A1 | 11/2015 | Rice et al. |
| 2015/0346916 A1 | 12/2015 | Jisrawi et al. |
| 2015/0346961 A1* | 12/2015 | Cui ........................ G06F 9/445 |
| | | 715/838 |
| 2015/0350143 A1 | 12/2015 | Lemay et al. |
| 2015/0363059 A1* | 12/2015 | Tsunoda .......... H04M 1/274583 |
| | | 715/739 |
| 2015/0363066 A1 | 12/2015 | Lemay et al. |
| 2016/0039426 A1 | 2/2016 | Ricci et al. |
| 2016/0062592 A1* | 3/2016 | Jung ................... G06F 3/04845 |
| | | 345/173 |
| 2016/0147438 A1 | 5/2016 | Migos et al. |
| 2016/0239142 A1* | 8/2016 | Kim ...................... G06F 3/0416 |
| 2016/0259528 A1* | 9/2016 | Foss ...................... G06F 3/0482 |
| 2017/0083213 A1 | 3/2017 | Missig et al. |
| 2017/0168711 A1* | 6/2017 | Temple ................. G06F 3/0233 |
| 2018/0004408 A1 | 1/2018 | Bocking et al. |
| 2018/0173383 A1 | 6/2018 | Jisrawi et al. |

FOREIGN PATENT DOCUMENTS

| | | |
|---|---|---|
| CN | 102571629 A | 7/2012 |
| CN | 103442129 A | 12/2013 |
| CN | 103561168 A | 2/2014 |
| EP | 795811 A1 | 9/1997 |
| EP | 1271295 A2 | 1/2003 |
| EP | 2270641 A1 | 1/2011 |
| EP | 2369820 A2 | 9/2011 |
| EP | 2381661 A1 | 10/2011 |
| EP | 2584770 A1 | 4/2013 |
| EP | 2770761 A1 | 8/2014 |
| TW | M401816 U | 4/2011 |
| WO | 1997/18508 A1 | 5/1997 |
| WO | 1999/38149 A1 | 7/1999 |
| WO | 2000/38042 A1 | 6/2000 |
| WO | 2002/103669 A1 | 12/2002 |
| WO | 2003/067497 A1 | 8/2003 |
| WO | 2004/070604 A2 | 8/2004 |
| WO | 2006/020305 A2 | 2/2006 |
| WO | 2006/115946 A2 | 11/2006 |
| WO | 2009/072475 A1 | 6/2009 |
| WO | 2012/178121 A1 | 12/2012 |
| WO | 2013/016045 A1 | 1/2013 |
| WO | 2014/081870 A2 | 5/2014 |

OTHER PUBLICATIONS

Decision for Refusal received for Japanese Patent Application No. 2016-569073, dated Oct. 25, 2018, 12 pages (6 pages of English Translation and 6 pages of Official Copy).

Notice of Allowance received for Korean Patent Application No. 10-2016-7032400, dated Nov. 1, 2018, 3 pages (1 page of English Translation and 2 pages of Official Copy).

Office Action received for European Patent Application No. 15727742.7, dated Sep. 4, 2018, 13 pages.

Board Opinion received for Chinese Patent Application No. 201280026797.1, dated Jul. 25, 2018, 11 pages (2 pages of English Translation and 9 Pages of Official Copy).

Notice of Acceptance received for Australian Patent Application No. 2015268855, dated Aug. 15, 2018, 3 pages.

Corrected Notice of Allowance received for U.S. Appl. No. 14/707,250, dated Jun. 4, 2018, 7 pages.

GIGAZINE, "Application for Efficiently Managing Overfilled Gmail", "Mailbox," "online", Online Available at <https://gigazine.net/news/20140411-mailbox/>, Apr. 11, 2014, 17 pages (Official Copy Only) (See Communication under 37 CFR § 1.98(a) (3).

"I Have Fallen in Love With an Iphone Application That Can Reproduce the Fun of E-Mail", Online Available at <https//weeklyascii.jp/elem/000/000156/156490>, Weekly ASCII, Japan, Jul. 23, 2013, 7 pages (Official Copy Only) (Official Copy Only) (See Communication under 37 CFR § 1.98(a) (3).

Office Action received for Japanese Patent Application No. 2016-569073, dated May 14, 2018, 12 pages (7 pages of English Translation and 5 pages of Official Copy).

(56) References Cited

OTHER PUBLICATIONS

Brodkin, Jon, "Review: in Windows 8.1, Mail is Finally Usable on Tablets and Desktops", Ars Technica, Online available at: https://arstechnica.com/information-technology/2013/10/review-in-windows-8-1-mail-is-finally-usable-on-tablets-and-desktops/, Oct. 17, 2013, 12 pages.
Chen et al., "Navigation Techniques for Dual-display E-book Readers", CHI, Apr. 5-10, 2008, 10 pages.
Decision to Grant received for European Patent Application No. 11191132.7, dated Dec. 8, 2016, 3 pages.
Extended European Search Report received for European Patent Application No. 11191132.7, dated Jan. 24, 2012, 7 pages.
Final Office Action received for U.S. Appl. No. 11/961,700, dated Sep. 29, 2011, 33 pages.
Final Office Action received for U.S. Appl. No. 11/969,796, dated Sep. 12, 2011, 30 pages.
Final Office Action received for U.S. Appl. No. 12/217,038, dated Oct. 31, 2011, 83 pages.
Final Office Action received for U.S. Appl. No. 12/794,625, dated Aug. 1, 2013, 12 pages.
Final Office Action received for U.S. Appl. No. 12/794,625, dated Jul. 17, 2015, 13 pages.
Final Office Action received for U.S. Appl. No. 13/077,754 dated Jan. 14, 2015, 16 pages.
Final Office Action received for U.S. Appl. No. 13/217,747, dated Feb. 21, 2014, 22 pages.
Final Office Action received for U.S. Appl. No. 13/217,747, dated Sep. 10, 2014, 24 pages.
Final Office Action received for U.S. Appl. No. 14/292,262, dated Dec. 27, 2016, 3 pages.
Final Office Action received for U.S. Appl. No. 14/700,039, dated Jul. 12, 2017, 80 pages.
Final Office Action received for U.S. Appl. No. 14/707,250, dated Dec. 16, 2016, 16 pages.
Guimbretiere, Francois, "Paper Augmented Digital Documents", ACM, vol. 5, No. 2, 2003, pp. 51-60.
Gutwin et al., "Improving Interpretation of Remote Gestures with Telepointer Traces", In Proceedings of the 2002 ACM Conference on Computer Supported Cooperative Work, Nov. 16-20, 2002, pp. 49-57.
Hamilton, Dave, "iOS 7: Apple Mail's 'Swipe to Delete' Only Goes to the Left", Available online at: http://www.macobserver.com/tmo/article/ios-7-mails-swipe-to-delete-reverses-direction-from-ios-6, Sep. 23, 2013, 2 pages.
"Introduction to Word Processing", available at: http://www2.raritanval.edu/departments/cis/full-time/Schwarz/security/word_one_pt2.htm, Nov. 17, 2008, 9 pages.
Intention to Grant received for European Patent Application No. 11191132.7, dated Jul. 22, 2016, 8 pages.
Intention to Grant received in European Patent Application No. 08727399.1, dated Nov. 30, 2012, 9 pages.
International Preliminary Report on Patentability received for PCT Application No. PCT/US2015/028626, dated Dec. 15, 2016, 31 pages.
International Preliminary Report on Patentability received for PCT Patent Application No. PCT/US2007/089030, dated Jul. 7, 2009, 7 pages.
International Preliminary Report on Patentability received for PCT Patent Application No. PCT/US2008/050426, dated Jul. 7, 2009, 8 pages.
International Preliminary Report on Patentability received for PCT Patent Application No. PCT/US2009/039625, dated Jan. 5, 2011, 6 pages.
International Preliminary Report on Patentability received for PCT Patent Application No. PCT/US2012/039867, dated Dec. 12, 2013, 8 pages.
International Preliminary Report on Patentability received for PCT Patent Application No. PCT/US2015/027026, dated Dec. 15, 2016, 15 pages.
International Search Report and Written Opinion received for PCT Application No. PCT/US2015/028626, dated Nov. 2, 2015, 37 pages.
International Search Report and Written Opinion received for PCT Patent Application No. PCT/US2007/089030, dated Jul. 9, 2008, 9 pages.
International Search Report and Written Opinion received for PCT Patent Application No. PCT/US2009/039625, dated Jun. 5, 2009, 8 pages.
International Search Report and Written Opinion received for PCT Patent Application No. PCT/US2012/039867 dated Aug. 13, 2012, 11 pages.
International Search Report and Written Opinion received for PCT Patent Application No. PCT/US2015/027026, dated Jun. 23, 2015, 17 pages.
International Search Report and Written Opinion received in International Application No. PCT/US2008/050426, dated Jun. 13, 2008, 10 pages.
Liao et al., "Pacer: Fine-grained Interactive Paper Via Camera-touch Hybrid Gestures on a Cell Phone", CHI 2010, ACM, Apr. 10-15, 2010, 10 pages.
Lyer, KS Sandhya, "Google Adds New Chat Box Style Compose and Reply Experience to Gmail", NDTV Gadgets360.com, Online available at: http://gadgets.ndtv.com/internet/news/google-adds-new-chat-box-style-compose-and-reply-experience-to-gmail-286779, Oct. 31, 2012, 6 pages.
"Microsoft Word 2000 Microsoft Corporation", pp. MSWord Figures 1-5, 2000.
Microsoft Corporation, "Microsoft Office Outlook 2003 Product Guide", 2004, p. 29.
Non-Final Office Action received for U.S. Appl. No. 13/077,711, dated Apr. 25, 2014, 15 pages.
Non-Final Office Action received for U.S. Appl. No. 13/077,754, dated Mar. 21, 2014, 13 pages.
Non-Final Office Action received for U.S. Appl. No. 11/961,700, dated Mar. 29, 2011, 26 pages.
Non-Final Office Action received for U.S. Appl. No. 11/969,796, dated Mar. 1, 2011, 28 pages.
Non-Final Office Action received for U.S. Appl. No, 12/217,038, dated Aug. 17, 2012, 42 pages.
Non-Final Office Action received for U.S. Appl. No. 12/217,038, dated Feb. 24, 2012, 167 pages.
Non-Final Office Action received for U.S. Appl. No. 12/217,038, dated Jun. 14, 2011, 92 pages.
Non-Final Office Action received for U.S. Appl. No. 12/217,038, dated Mar. 21, 2013, 46 pages.
Non-Final Office Action received for U.S. Appl. No. 12/794,625, dated Mar. 13, 2014, 13 pages.
Non-Final Office Action received for U.S. Appl. No. 12/794,625, dated Oct. 8, 2014, 12 pages.
Non-Final Office Action received for U.S. Appl. No. 12/794,625, dated Oct. 26, 2012, 7 pages.
Non-Final Office Action received for U.S. Appl. No. 13/077,754, dated Jul. 15, 2013, 11 pages.
Non-Final Office Action received for U.S. Appl. No. 13/077,754, dated Nov. 9, 2012, 9 pages.
Non-Final Office Action received for U.S. Appl. No. 13/217,747, dated Aug. 16, 2013, 19 pages.
Non-Final Office Action received for U.S. Appl. No. 13/217,747, dated Jan. 4, 2013, 17 pages.
Non-Final Office Action received for U.S. Appl. No. 14/197,111, dated Feb. 20, 2015, 60 pages.
Non-Final Office Action received for U.S. Appl. No. 14/292,262, dated Jul. 13, 2016, 17 pages.
Non-Final Office Action received for U.S. Appl. No. 14/700,039 , dated Nov. 3 , 2016, 82 pages.
Non-Final Office Action received for U.S. Appl. No. 14/707,250, dated Jul. 15, 2016, 16 pages.
Non-Final Office Action received for U.S. Appl. No. 14/707,250, dated Jun. 26, 2017, 21 pages.
Non-Final Office Action received for U.S. Appl. No. 15/012,178, dated Sep. 8, 2017, 11 pages.

(56) References Cited

OTHER PUBLICATIONS

Notice of Allowance received for U.S. Appl. No. 14/700,039, dated Jan. 26, 2018, 9 pages.
Notice of Allowance received for U.S. Appl. No. 11/969,796, dated Apr. 29, 2013, 13 pages.
Notice of Allowance received for U.S. Appl. No. 12/217,038, dated Oct. 18, 2013, 15 pages.
Notice of Allowance received for U.S. Appl. No. 12/794,625, dated Sep. 7, 2016, 5 pages.
Notice of Allowance received for U.S. Appl. No. 13/077,711, dated Mar. 23, 2015, 8 pages.
Notice of Allowance received for U.S. Appl. No. 13/077,711, dated Nov. 28, 2014, 7 pages.
Notice of Allowance received for U.S. Appl. No. 13/077,754, dated Sep. 18, 2015, 6 pages.
Notice of Allowance received for U.S. Appl. No. 13/217,747, dated Jan. 8, 2015, 11 pages.
Notice of Allowance received for U.S. Appl. No. 14/197,111, dated Aug. 25, 2015, 27 pages.
Notice of Allowance received for U.S. Appl. No. 14/292,262, dated Jun. 23, 2017, 6 pages.
Notice of Allowance received for U.S. Appl. No. 14/292,262, dated Oct. 27, 2017, 5 pages.
Office Action received for Chinese Patent Application No. 201280026797.1, dated Nov. 4, 2015, 31 pages (18 pages of English Translation and 13 pages of Official copy).
Office Action received for Chinese Patent Application No. 201280026797.1, dated Apr. 14, 2017, 18 pages (3 pages of English Translation and 15 pages of Official copy).
Office Action received for Chinese Patent Application No. 201280026797.1, dated Jul. 22, 2016, 19 pages (4 pages of English Translation and 15 pages of Official copy).
Office Action received for European Patent Application No. 08727399.1, dated Dec. 7, 2009, 5 pages.
Office Action received for European Patent Application No. 08727399.1, dated Jun. 28, 2011, 4 pages.
Office Action received for European Patent Application No. 11191132.7, dated Jan. 14, 2015, 6 pages.
Office Action received for European Patent Application No. 12726302.8 dated Jan. 22, 2016, 6 pages.
Office Action received for Taiwanese Patent Application No. 104116112, dated Apr. 19, 2017, 89 pages (31 pages of English Translation and 58 pages of Official copy).
Office Action received for Taiwanese Patent Application No. 104116112, dated Nov. 8, 2017, 12 pages (5 pages of English Translation and 7 pages of Official copy).

PCT Invitation to Pay Additional Fees and, Where Applicable, Protest Fee received for PCT Application No. PCT/US2015/028626, dated Aug. 12, 2015, 4 pages.
Taylor, C, "Mailbox Launches on Andriod", XP054975992, Retrieved from the Internet: URL: https://www.youtube.com/watch?v=sgL9883T97U, retrieved on Jul. 28, 2015, 1 pages.
"The Textbook of the Future", Nature, vol. 458, Apr. 2, 2009, pp. 568-570.
Villamor et al., "Touch Gesture Reference Guide", available at: https://static.lukew.com/TouchGestureGuide.pdf, Apr. 15, 2010, 7 pages.
Wang et al., "Detecting and Leveraging Finger Orientation for Interaction with Direct-touch Surfaces", ACM, Oct. 4-7, 2009, pp. 23-32.
Willems et al., "Pen Gestures in Online Map and Photograph Annotation Tasks", Tenth International Workshop on Frontiers in Handwriting Recognition, Oct. 9, 2006, 7 pages.
Wilson, Andrew D, "Touchlight: An Imaging Touch Screen and Display for Gesture-based Interaction", ACM, Oct. 13-15, 2004, 8 pages.
Wu et al., "Gesture Registration, Relaxation, and Reuse for Multi-point Direct-touch Surfaces", Proceedings of the First IEEE International Workshop on Horizontal Interactive Human-Computer Systems, 2006, 8 pages.
Kahol et al., "Documenting Motion Sequences with a Personalized Annotation", IEEE, 2006, pp. 37-45.
Liao et al., "PapierCraft: A Gesture-based Command System for Interactive Paper", ACM Transactions on Computer-Human Interaction, vol. 14, No. 4, Jan. 2008, pp. 18.1-18.27.
Notice of Allowance received for U.S. Appl. No. 14/707,250, dated Feb. 20, 2018, 8 pages.
Notice of Allowance received for U.S. Appl. No. 15/012,178, dated Apr. 5, 2018, 6 pages.
Office Action received for Chinese Patent Application No. 201280026797.1, dated Sep. 11, 2017, 16 pages (1 page of English Translation and 15 pages of Official Copy).
Intention to Grant received for European Patent Application No. 15727742.7, dated Apr. 10, 2019, 9 pages.
Office Action received for Chinese Patent Application No. 201580029263.8, dated Mar. 15, 2019, 10 pages (5 pages of English Translation and 5 pages of Official Copy).
Notice of Allowance received for Japanese Patent Application No. 2016-569073, dated Apr. 1, 2019, 3 pages (1 page of English Translation and 2 pages of Official Copy).
Notice of Allowance received for Chinese Patent Application No. 201580029263.8, dated Jun. 25, 2019, 2 pages (1 page of English Translation and 1 page of Official Copy).

\* cited by examiner

DISPLAYING OPTIONS, ASSIGNING NOTIFICATION, IGNORING MESSAGES, AND SIMULTANEOUS USER INTERFACE DISPLAYS IN A MESSAGING APPLICATION

CROSS REFERENCE TO RELATED APPLICATIONS

This application is a continuation of U.S. patent application Ser. No. 14/700,039, titled "Displaying Options, Assigning Notification, Ignoring Messages, and Simultaneous User Interface Displays In A Messaging Application," filed Apr. 29, 2015, which claims priority to U.S. Provisional Application Ser. No. 62/006,211, titled "Displaying Options, Assigning Notification, Ignoring Messages, and Simultaneous User Interface Displays in A Messaging Application", filed Jun. 1, 2014, the contents of which are hereby incorporated by reference in their entireties.

BACKGROUND

1. Field of Technology

The embodiments herein generally relate to electronic devices with touch screen displays. More particularly, the embodiments relate to user interfaces and gestures on a touch screen display.

2. Background

As portable electronic devices become more compact and the functions of the devices increase, it is increasingly difficult to design a user interface that allows users to easily interact with the multifunctional devices. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions.

To improve user interaction with portable electronic devices, some portable devices include more pushbuttons that are each associated with a particular functionality, assign multiple functions to each pushbutton, or use complex menu systems to allow users to access the various functionalities of the devices. These conventional user interfaces often result in complicated key sequences and menu hierarchies that must be memorized by the user.

SUMMARY

An electronic device with a touch-sensitive surface and display can execute a messaging application. A method for displaying swipe options in the messaging application comprises displaying a list of information corresponding to email messages. A contact is detected on the touch-sensitive surface of the electronic device and continuous movement of the contact is detected in a first direction, without breaking contact with the touch-sensitive surface, at a location on the display corresponding to a message of the plurality of email messages. One or more parameters of the movement of the contact are determined and, in accordance with a determination that a parameter of the movement meets a first criterion, user interface elements representing actions to be taken on the email message are displayed. Parameters include distance, rate, and any combination thereof and the first and second criterion can be a threshold distance, a threshold rate, or any combination thereof. The user interface elements representing actions can be selected and the action corresponding to the selected user interface element is applied to the email message, subsequently received email messages of the email message, the email thread associated with the email message, or any combination thereof. The user interface elements can be displayed by visually sliding out from a side of the email message. In accordance with a determination that the parameter of the movement meets a second criterion different from the first criterion, a default action is performed on the email message.

A method for, within a messaging application, associating an email message or subsequently received email messages with notification rules comprises, in response to receiving an action to compose a message, displaying a composition interface in the messaging application. Within the composition interface, a selectable user interface element is displayed that, when selected, changes notification rules for replies to the message. For the selectable user interface element can be a symbol such as a bell. A contact on the touch-sensitive surface at a location on the display corresponding to the selectable user interface element within the composition interface is detected and the contact indicative of selection of the selectable user interface element. In response to detection of the selection, changing an appearance of the selectable user interface element within the composition interface to indicate the activation of a notification rule that a subsequently received message in a conversation thread corresponding to the message will trigger a conversation notification. For example, the changed appearance of the selectable user interface element is visually distinguished from its previous state (e.g., outline of a bell) in a graphical indication such as color, size, and location. In subsequently received messages, a notification rule can display a VIP indicator, indicative of selection of the selectable user interface element, adjacent to the subsequently received messages. In addition, another notification rule displays conversation notifications, including push notifications, when subsequently received messages are received.

A method for ignoring a message or subsequently received messages comprises displaying information corresponding to a plurality of messages in a messaging application. An input is received at a location on the display corresponding to a displayed message and the input indicates deletion of the displayed message. For example, the location can include a selectable user interface element associated with a trash option. In response to receiving the input, selectable user interface elements representing deletion actions to be taken on subsequent messages in a conversation thread corresponding to the displayed message are displayed proximate to the location of the displayed message. For example, the selectable user interface elements are displayed in a sheet. In another embodiment, a prompt is displayed in response to receiving the input and can include options for trashing the displayed message or displaying additional deletion actions. In response to selection of one of the plurality of selectable user interface elements, the displayed message is deleted and a deletion action is set for subsequently received messages in the conversation thread.

A method for displaying composition interfaces along with email messages comprises displaying a first composition interface in a messaging application where the first composition interface includes a first message. While displaying the first composition interface, an action is received to compose a second message. In response to receiving the action, a second composition interface is displayed, the first composition interface is displayed in a first portion and the second composition interface is displayed in a second portion. For example, the first and second portions are displayed below a list of information corresponding to a plurality of messages in the messaging application. Alternatively, the first and second composition interfaces are displayed in a third portion below the list of information corresponding to the plurality of messages in the messaging application.

A method for displaying composition interfaces along with email messages comprises in response to a selection of a conversation view in a messaging application that is configured to display a plurality of email messages in the conversation view the following steps. One step includes identifying in the plurality of email messages a conversation thread that comprises email messages from the plurality of email messages. Another step includes determining information common to the email messages in the conversation thread. The common information comprises a conversation title based at least in part on a subject of at least one or more email messages in the conversation thread. Next steps include displaying a header comprising the common information in a header portion of the conversation view, and displaying, visually distinguished from the header area, a message area that comprises two or more of the email messages in the conversation thread. Each of the two or more email messages comprises sender information and content information.

A method for displaying composition interfaces along with email messages comprises receiving a search query that comprises at least one term for searching email messages in a messaging application. In response to receiving the search query, a step of the method includes determining whether one or more email messages in the messaging application include the at least one search term. Another step includes determining, for each of the one or more email messages in the messaging application including the search term, a field where the search term is found within the email message. When determining the field, the search term can appear in one or more of a plurality of different, predetermined locations. The method further includes displaying one or more email message query result groups, each of which is based on a different predetermined location and comprises the one or more email messages in the messaging application including the search term in the corresponding predetermined location.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 23C, 23D, and 23E illustrate an overlaid draft email and overlaid draft emails in an email application, according to one embodiment.

FIGS. 23H and 23I illustrate an overlaid draft email and overlaid draft emails in an email application, according to one embodiment.

FIGS. 24A and 24B illustrate a gesture for minimizing overlaid draft emails in an email application, according to one embodiment.

FIGS. 25A, 25B, and 25C illustrate a gesture for removing an overlaid draft email in an email application, according to one embodiment.

FIGS. 26A, 26B, and 26C illustrate a gesture for expanding a minimized overlaid draft email in an email application, according to one embodiment.

FIGS. 27A and 27B illustrate a gesture for expanding an existing email thread in an email application with an overlaid draft email, according to one embodiment.

FIGS. 30A and 30B illustrate gestures and an exemplary user interfaces for viewing an email thread in a conversation view with a common header including subject and participant information, according to some embodiments.

Figure 1A:
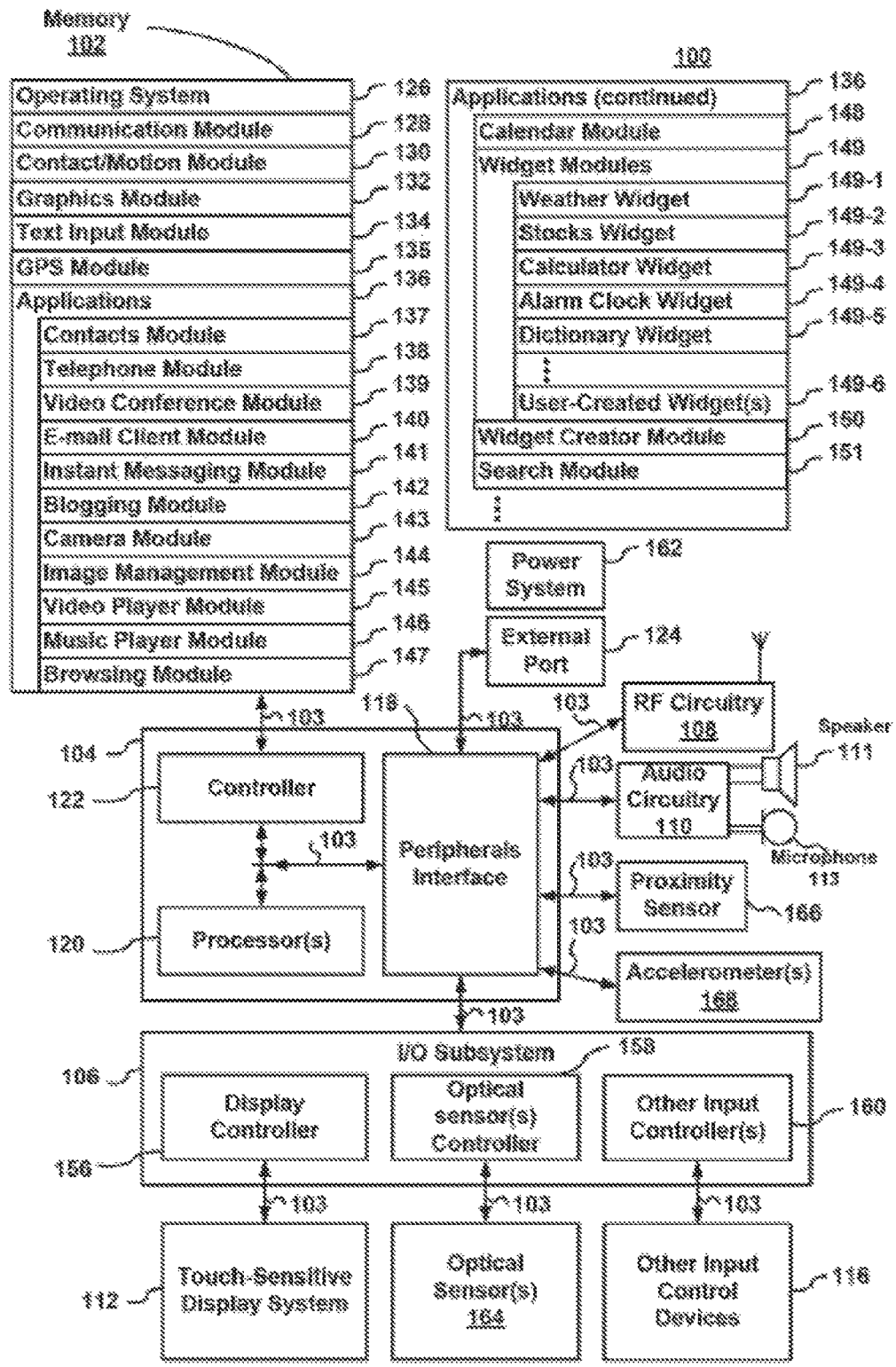
FIG. 1A is a block diagram illustrating a portable multifunction device with a touch-sensitive display in accordance with some embodiments.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DESCRIPTION OF EMBODIMENTS

Many electronic devices have graphical user interfaces that include a large number of content units such as electronic messages, photos, audio files, video files, text, hyperlinks, icons, control elements, and/or visual representations thereof. Many of these content units have associated metadata (e.g., time and/or date stamps, file sizes, author identification, status identification, and security settings), which may be informative to the user. To simplify a user's interaction with user interfaces containing large numbers of content units, electronic devices may display only a subset of all content units and/or associated metadata on a display at any one time. A user may need to access content units and/or associated metadata contained within a given user interface, but which are not displayed at that time.

Some methods for accessing additional content units and/or metadata associated with displayed content units require a sequence of user inputs that navigate in a menu system. For example, with these methods, a user may need to select a user interface object to display a menu. The displayed menu may or may not include a menu option for accessing additional content units and/or metadata associated with displayed content units. When the displayed menu does not include the desired menu option, the user needs to search through multiple menus and/or sub-menus to find a menu that has the correct menu option. After displaying the menu that has the desired menu option, the user needs to select the menu option to initiate gaining access to the desired content. Alternatively, an electronic device may, by default, continuously display larger numbers of content units and/or metadata associated with displayed content units. This clutters a display and can be distracting for users, which reduces the efficiency of the user when using the device.

In embodiments described below, improved methods for accessing additional content units present, but not displayed, in a graphical user interface are achieved by providing user interfaces that allow unlocking of a predefined navigation direction using simple user contacts on a touch-sensitive surface (e.g., where there is a favored navigation axis, but some additional, infrequently accessed, information such as metadata is available in response to navigation in a direction different from the favored navigation axis). In other embodiments described below, improved methods for accessing metadata associated with displayed content units are achieved by providing user interfaces that reveal hidden metadata upon detection of simple user inputs, related to traditional navigation inputs, on a touch-sensitive surface. These methods streamline to process of accessing additional user interface content units and/or metadata associated with displayed content units without overly cluttering the user interface display.

DETAILED DESCRIPTION

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volumecontrol of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
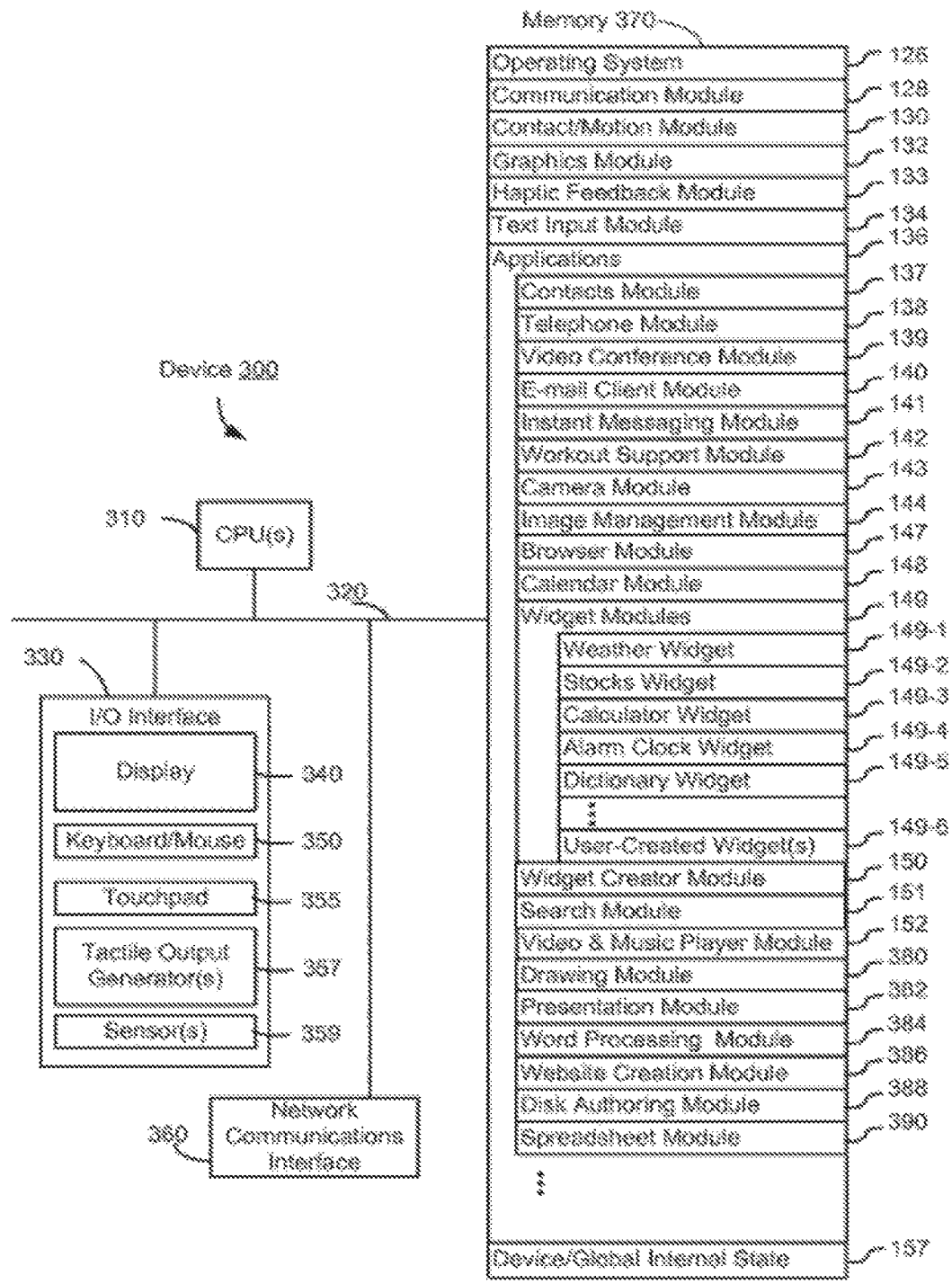
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail or email client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
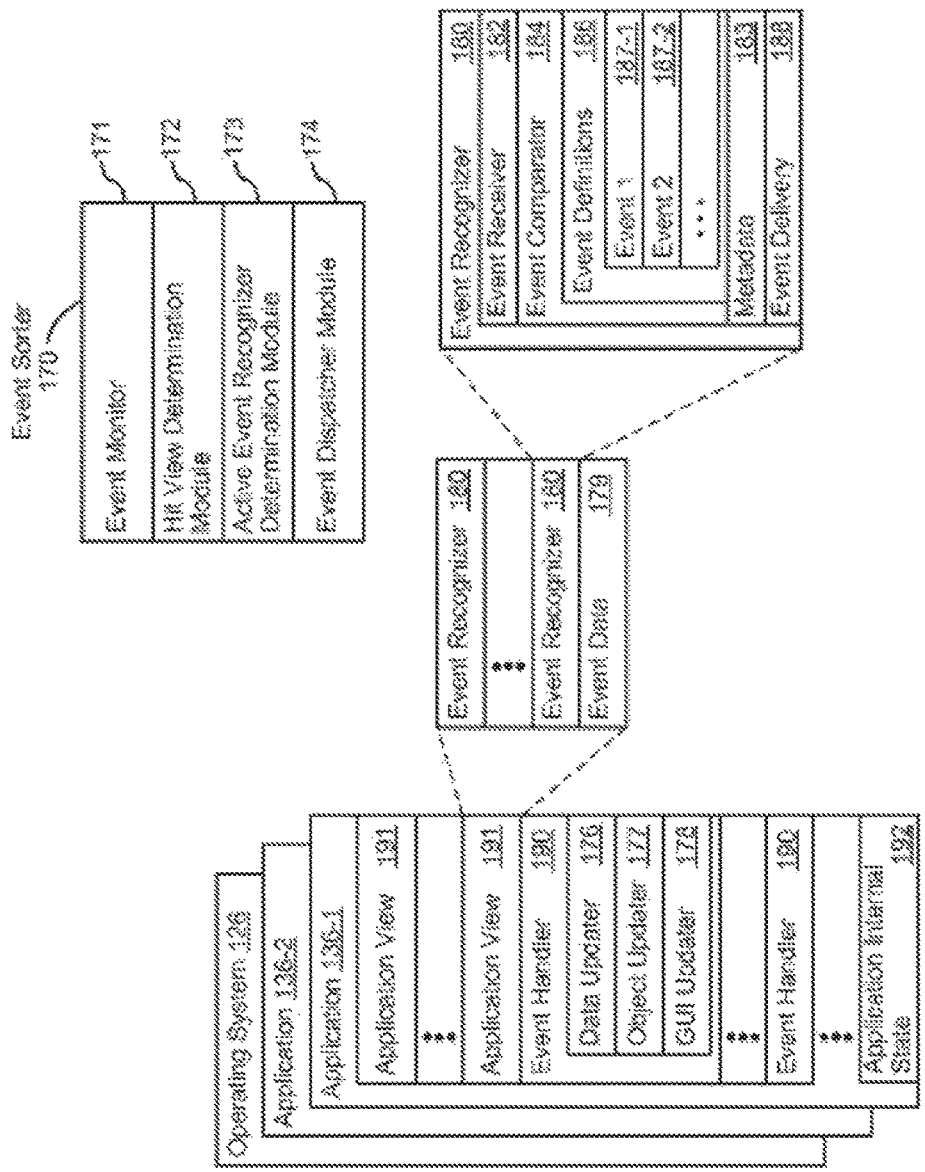
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
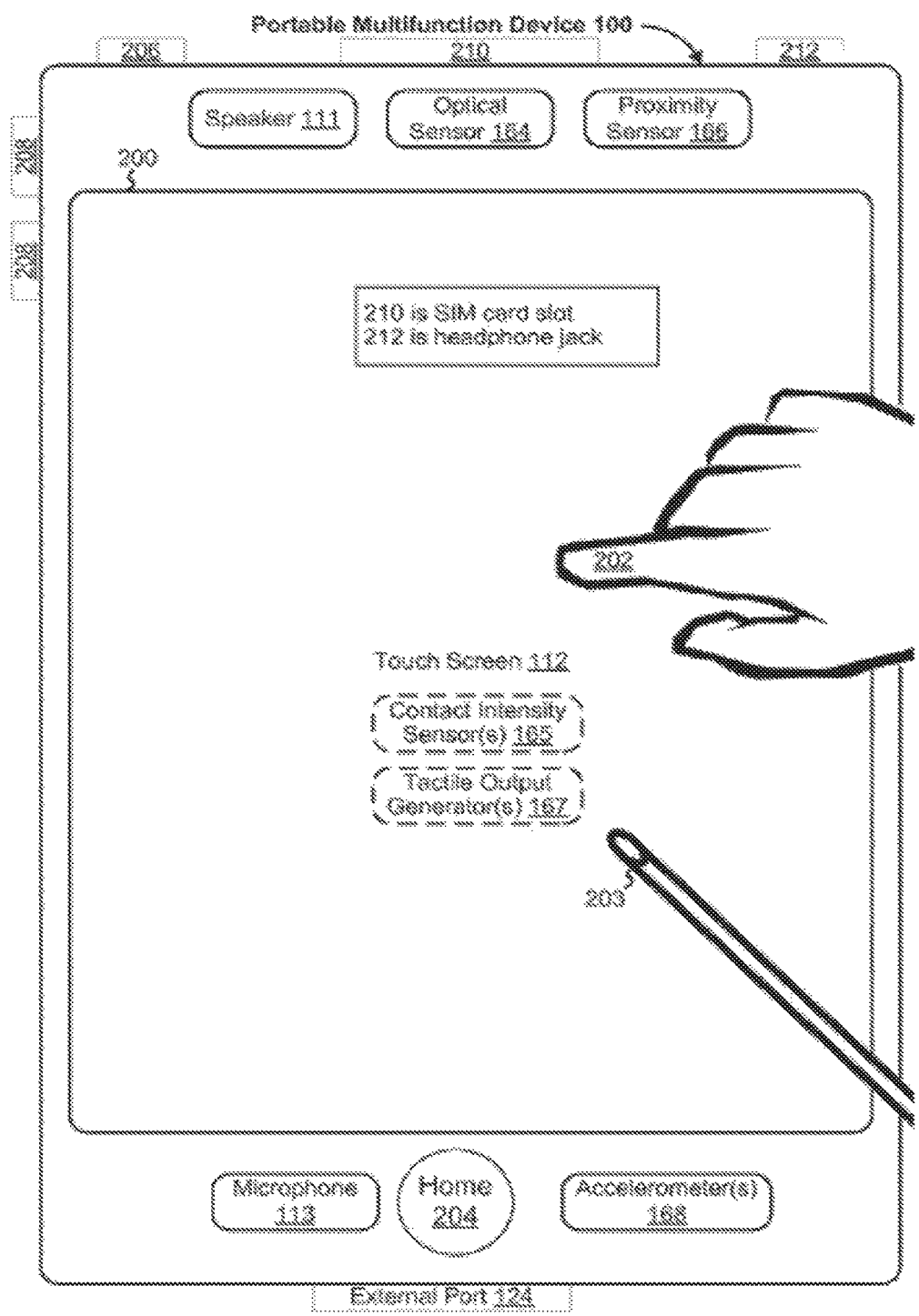
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
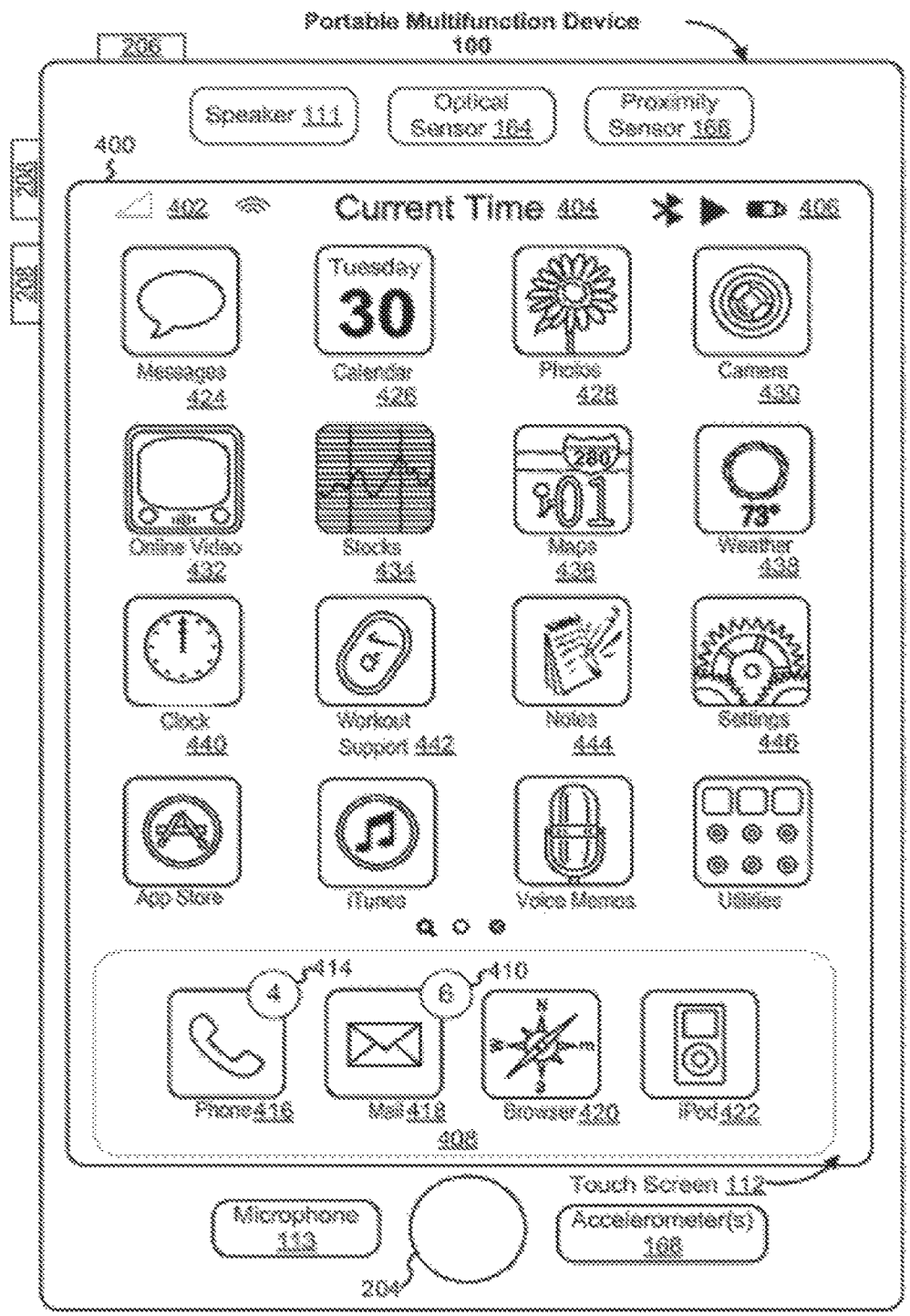
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for email client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video"
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
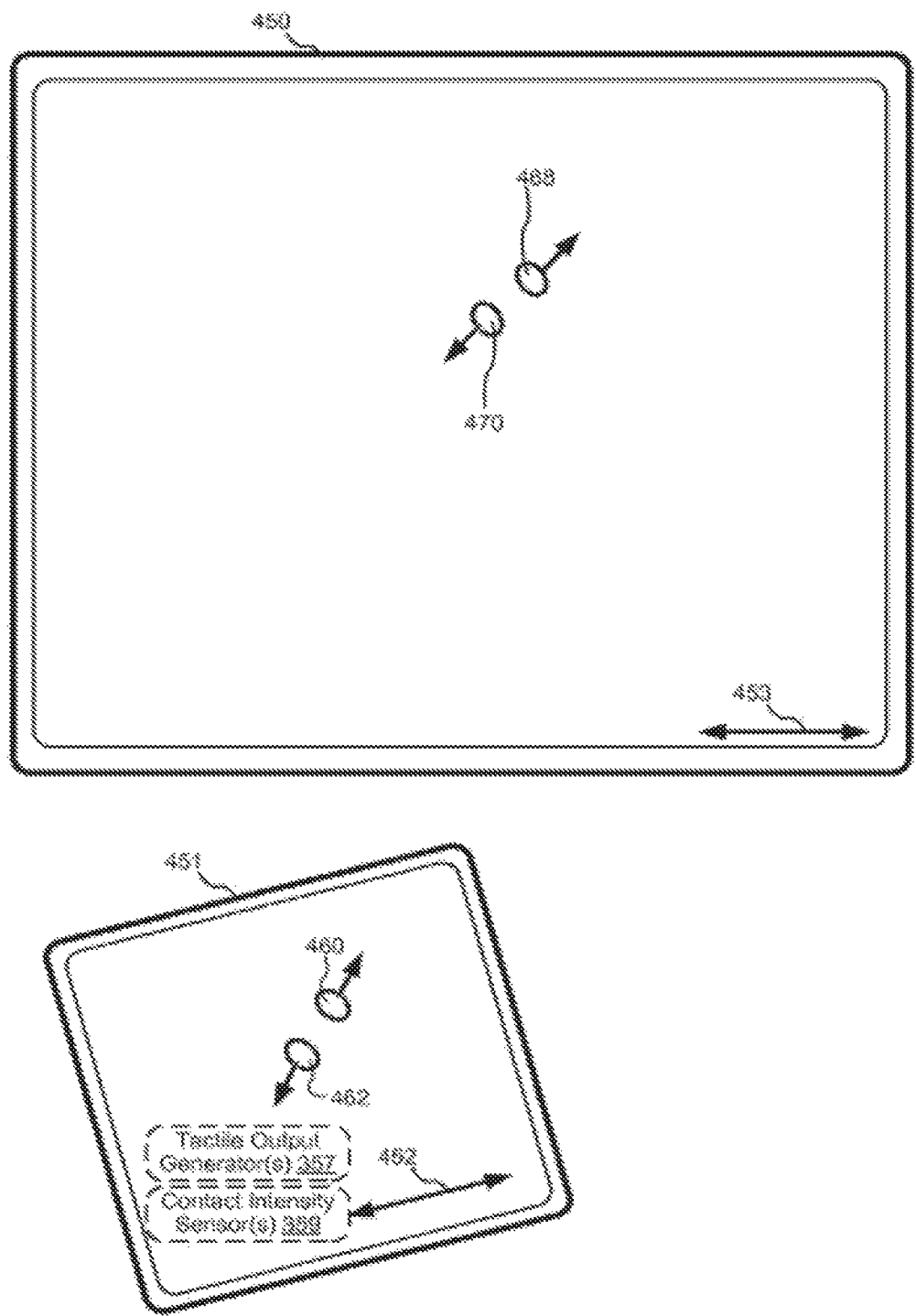
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357 for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Attention is now directed towards embodiments of user interfaces ("UI") and associated processes that may be implemented on an electronic device with a display and a touch-sensitive surface, such as device 300 or portable multifunction device 100.

As mentioned previously, the device 100 includes multiple applications 136 configured to execute on the device 100. One of the multiple applications 136 is the email client module 140 and a user can interact with the application on the computing device 100. As will be further described below, the email client module 140 has various user interfaces to enhance the user experience with the computing device 100 when using the application.

Swipe Options in an Email Client Module UI and Gestures

Figure 5A:
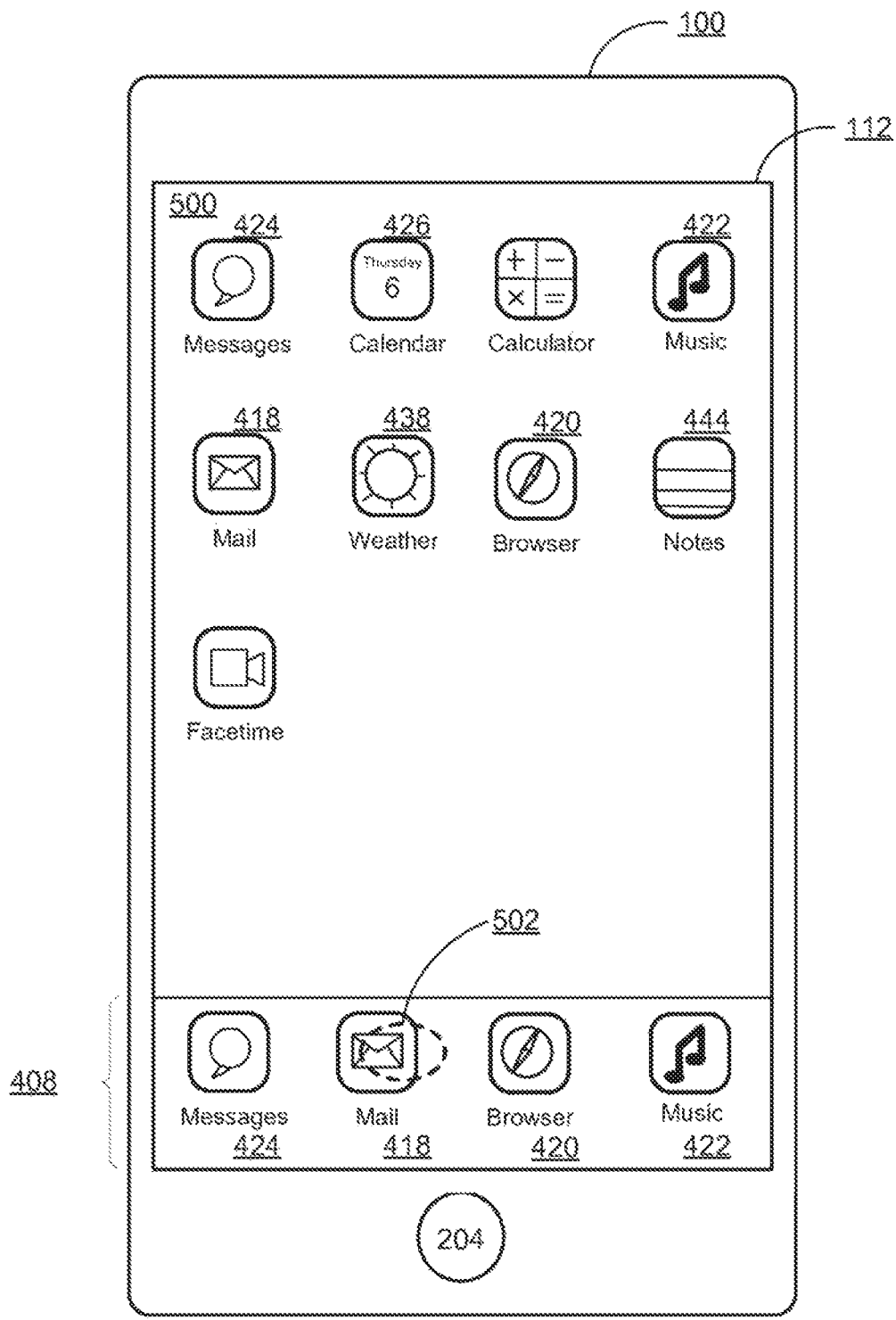
FIG. 5A illustrates a portrait view of icons for applications of the device, according to one embodiment.

FIG. 5A illustrates a portrait view of icons, also known as a "Springboard" layout, for applications of the device 100, according to one embodiment. For example, the tray 408 icons are for the following applications or modules:

Icon 424 for IM module 141, labeled "Messages";
Icon 418 for email client module 140, labeled "Mail," which optionally includes an indicator 410 of the number of unread emails;
Icon 420 for browser module 147, labeled "Browser"; and
Icon 422 for video and music player module 152, labeled "music"; and Icons for other applications include:
Icon 424 for IM module 141, labeled "Messages";
Icon 426 for calendar module 148, labeled "Calendar";
Icon 422 for video and music player module 152, labeled "music";
Icon 418 for email client module 140, labeled "Mail," which optionally includes an indicator 410 of the number of unread emails;
Icon 438 for weather widget 149-1, labeled "Weather";
Icon 420 for browser module 147, labeled "Browser"; and
Icon 444 for notes module 153, labeled "Notes."

In other embodiments, different and/or additional icons can be presented on the user interface 500.

Furthermore, FIG. 5A illustrates a gesture to execute or launch an application. The launch gesture is directed towards the "Mail" icon 418 indicative of a user request to execute the email client module 140 represented by the "Mail" icon 418. Although the launch gesture is described with respect to the portrait view of the icons, the launch gesture may also be received in a landscape view of the icons.

Figure 5B:
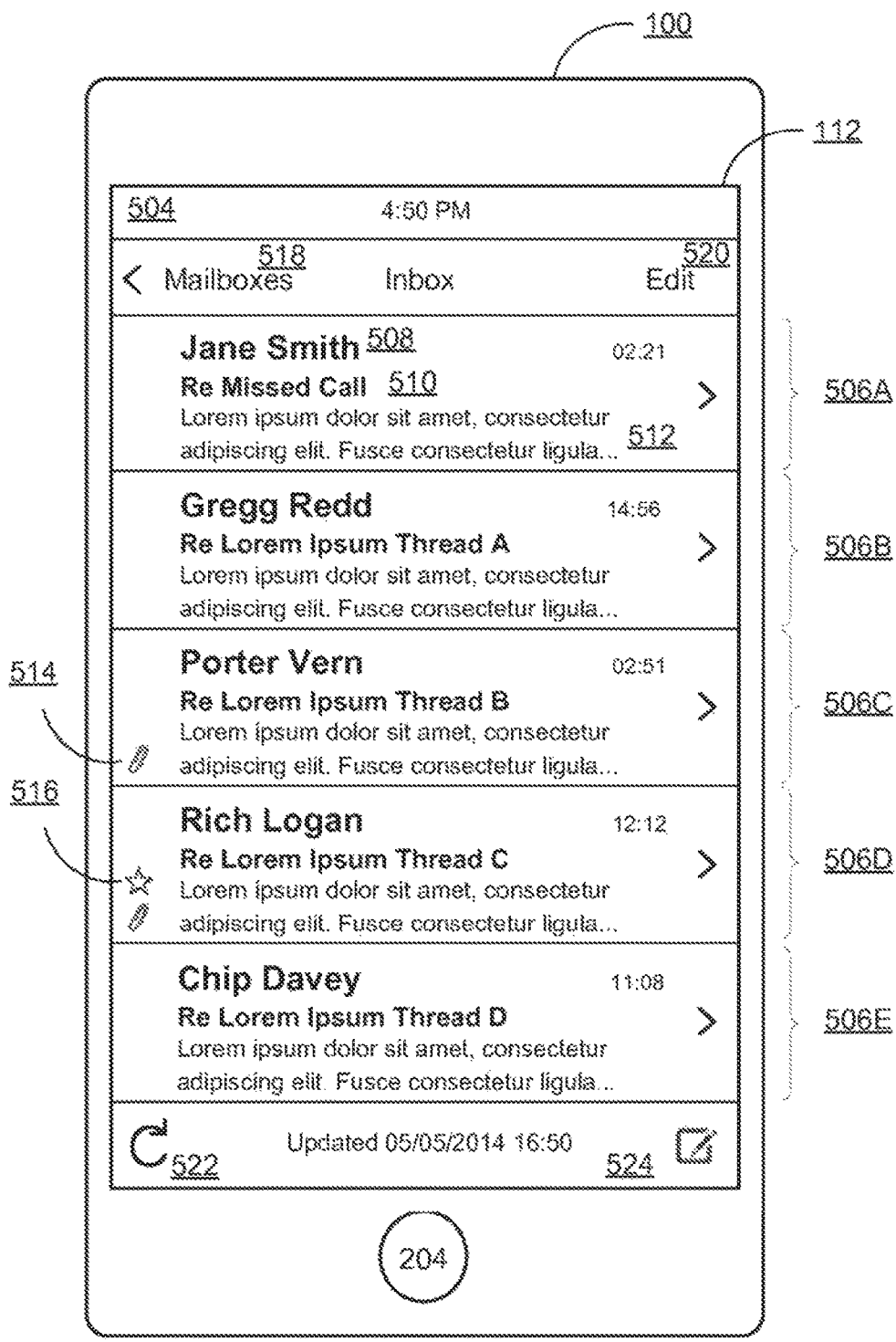
FIG. 5B illustrates a mail application view of an email application, according to one embodiment.

In one embodiment, the launch gesture or any other suitable gesture herein includes a tap on an icon. In general, a gesture is considered to be "on" an icon if the user's finger(s) touch at least a portion of the icon displayed on the user interface 500. In FIG. 5A, the launch gesture is represented by the contact 502 of the user's finger on the "Mail" icon 418, shown as a dotted ellipse. In response to the launch gesture, the device 100 dismisses (i.e., removes) the icons from display on the user interface 500 and displays in its place a mail application view 504 corresponding to the "Mail" icon 418 as shown in FIG. 5B. The application view 504 of the email client module 140 is the user interface of the email client module 140. The mail application view 504 corresponding to the "Mail" icon 418 includes email messages from the user's email account(s).

Responsive to user selection of the menu button, for example, through contact of the menu button 204, the device 100 dismisses the mail application view 504 of the "Mail" icon 418 from the user interface 500 and displays the icons as shown in FIG. 5A. In one embodiment, dismissal of an application merely removes the mail application view 504 from being displayed on the user interface 500. The dismissed application is still executing in a background process of the device 100 even though the mail application view 504 of the application is no longer displayed on the user interface. Thus, the email client module 140 shown in FIG. 5B is still executing in the background of the device 100 even though the mail application view 504 of the email client module 140 has been dismissed.

FIG. 5B illustrates a mail application view 504 of an email application, according to one embodiment. The mail application view 504 displays portions of email messages of email threads 506A, 506B 506C, 506D, 506E from an inbox of the user's email account. Each displayed portion of an email message of an email thread, herein referred to as message portion 506, displays sender information 508, subject information 510, and a portion of the body of the email 512 and can display any other suitable information associated with the message portion 506. In addition, a message portion 506 can include indicators such as an attachment indicator 514 and a VIP sender indicator 516. Additional indicators include a VIP thread indicator, further described in conjunction with FIG. 11. The attachment indicator 514 indicates that the associated email thread or message portion has an attachment such as a photo, a video, an audio file, a document, or any other suitable file that can be attached to an email message in an email thread 506. For example, the attachment indicator 514 is a paper clip icon. The VIP sender indicator 516 indicates that the received email is from a sender previously indicated as a VIP sender. For example, indicating a sender as a VIP sender indicates a request to receive a notification (e.g., through the VIP sender indicator 516) of any email sent from the sender. In the embodiment shown, the VIP sender indicator 516 is a star icon.

The mail application view 504 of the email application includes additional user interface elements such as a back element 518, an edit element 520, a refresh element 522, a new draft element 524, or any other suitable element that can be used in an email application. The back element 518, if selected, displays email accounts associated with the user or additional folders of an account. The edit element 520, if selected, displays options for a user to remove one or more email threads from the mail application view 504. The refresh element 522, if selected, refreshes the mail application view 504 and, for example, displays any new received emails. The new draft element 524, if selected, displays a new draft email in the email application.

Figure 5C:
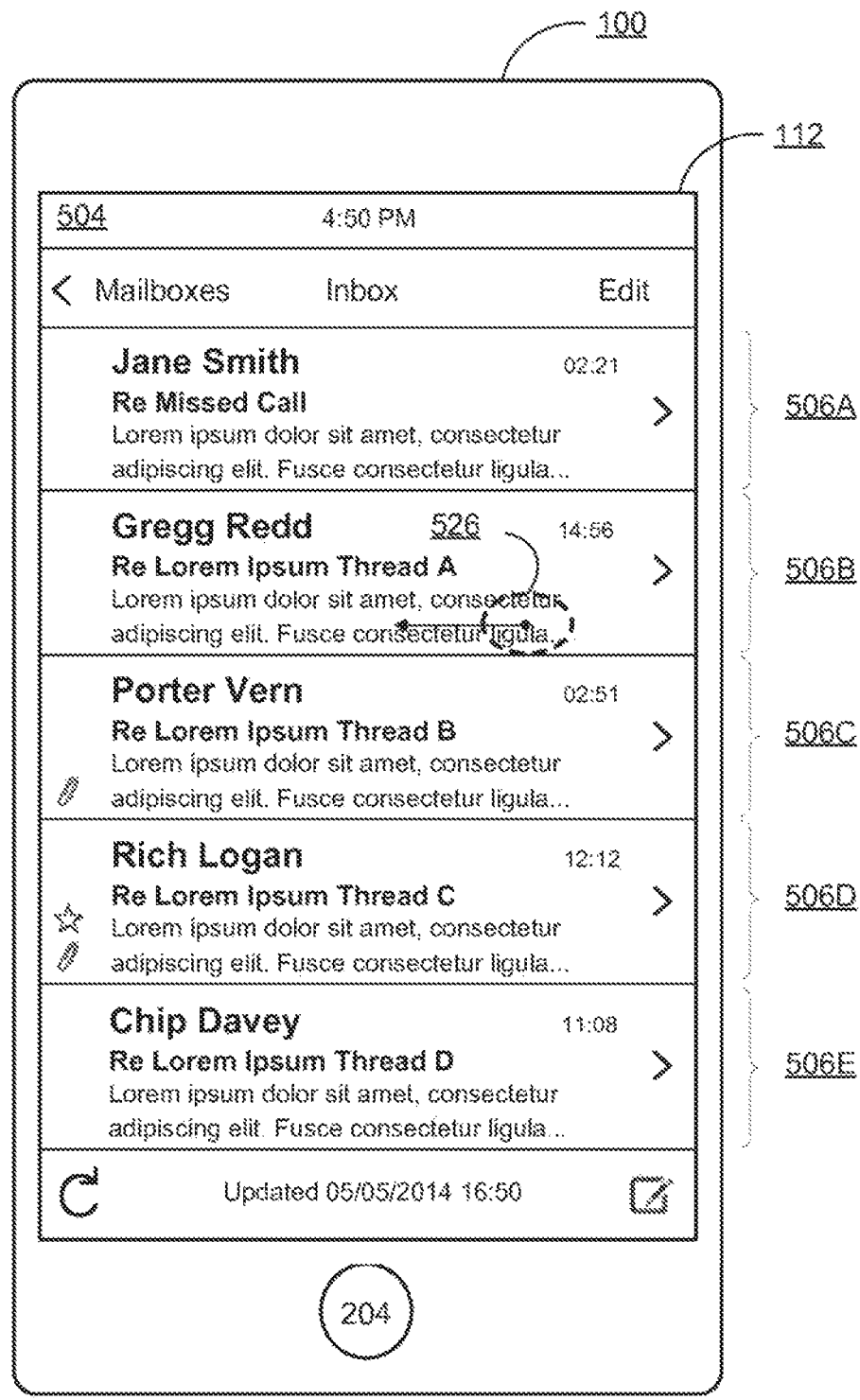
FIGS. 5C, 5D, 5E, 5F, 5G, and 5H illustrate a gesture for displaying and closing swipe options in the email application, according to one embodiment.
Figure 5D:
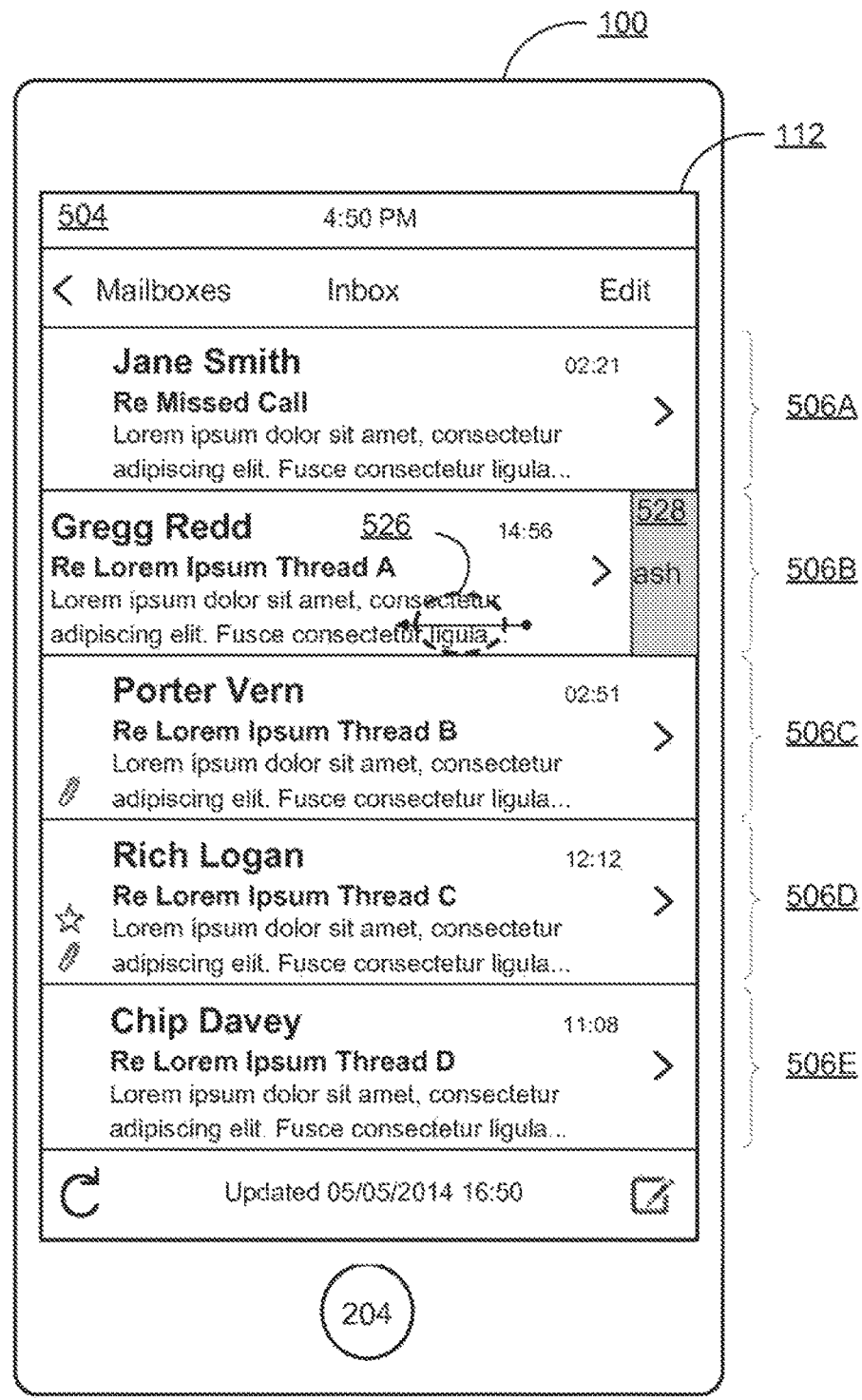
Figure 5E:
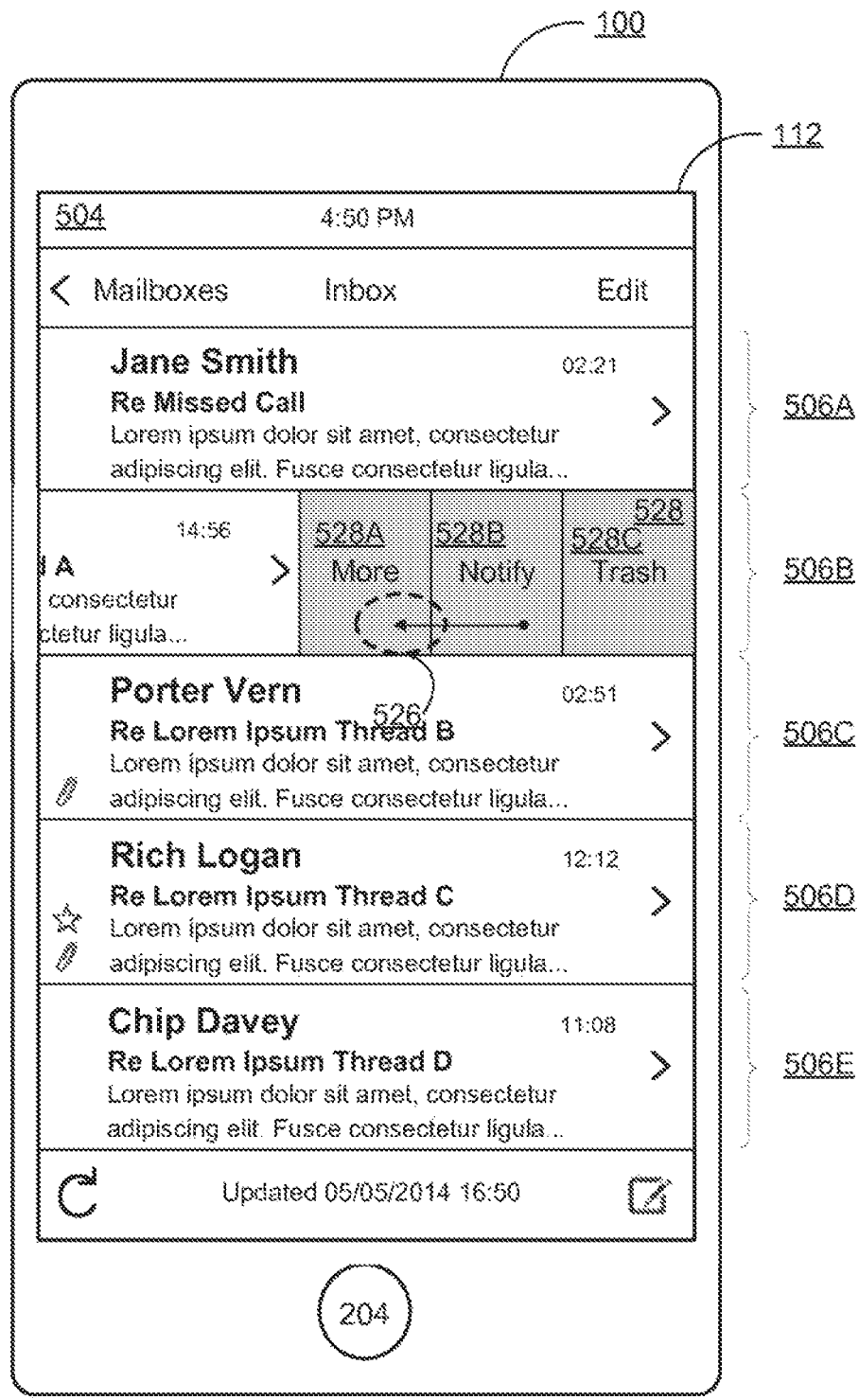

FIGS. 5C, 5D, and 5E illustrate receiving a gesture for displaying swipe options 528 in the email application, according to one embodiment. The display gesture is indicative of a user request to display swipe options 528 for an email thread 506 or message portion 506 in the email application. The display gesture may include a swipe in a direction substantially parallel with the email thread 506 or on the touchscreen 112 at a location on the display corresponding to an email message of an email thread 506.

In one embodiment, the display gesture includes dragging a contact (e.g., user's finger, a stylus) a threshold distance from an initial position to a second position on top of an email thread 506 displayed in the mail application view 504. For example, a contact 526 is detected by the device 100 at an initial position in the email thread 506B, as shown in FIG. 5C. The contact 526 is continuous and dragged at least a threshold distance, e.g., in a direction substantially parallel with the width of the email thread 506B, to a second position in the email thread 506B, as shown in FIG. 5E. For example, the contact 526 is maintained from the initial position a threshold distance to the second position shown in FIGS. 5C, 5D, and 5E in a continuous movement without the contact breaking contact with the touch screen 112 of the device 100. In another embodiment, instead of a threshold distance, the display gesture includes dragging a contact at a threshold rate on top of a message portion 506. Thus, the contact 526 is maintained and dragged at a rate in a direction substantially parallel with the width of the message portion 506B. In other embodiments, other parameters of the maintained contact 526 are evaluated for the display gesture. The other parameters can include strength of pressure of the contact 526, or number of contact points, or any other measurable parameter of the contact and its movement.

After completion of the display gesture or the threshold distance or rate is reached, user interface elements such as the swipe options 528 are displayed on one side (e.g., left, right) of the message portion 506B. In one embodiment, the swipe options 528 slide out continuously and/or proportionally to a distance or a normalized distance reached by the contact 526. Thus, if the contact 526 reached half the threshold distance, then half of the swipe options 528 are displayed on the right side of the message portion 506B, e.g., as shown by the swipe in progress of FIG. 5D. If the contact 526 reached half the threshold distance, half the threshold distance may equal a fourth of length of the swipe options 528 and then only a fourth of the swipe options 528 are displayed on the right side of the message portion 506B. In another embodiment, the swipe options 528 do not slide out or are not displayed until the contact 526 reaches the threshold distance, and then snap into place. In the embodiment where the display gesture includes a threshold rate, the swipe options 528 slide out at a rate proportional to the rate of the traversal of the contact 526.

In the embodiment where the swipe options 528 are partially displayed as the contact 526 is maintained, if the contact 526 is not maintained until the threshold distance is reached and/or broken, the swipe options 528 can "rubber band," bounce back, or slide out of view to the original view of the message portion 506B, hiding the swipe options 528.

In the illustrated example, once the threshold distance is reached, the swipe options 528 are displayed on the right side of the message portion 506B and the message portion 506B is shifted in the direction of the swipe but adjacent to the displayed swipe options 528. For example, the swipe options 528 include a more option 528A, a notify option 528B, and a trash option 528C in one embodiment, as shown in FIG. 5E. In the embodiment shown in FIGS. 5A-H, the swipe options 528 include three options. Each option in the displayed swipe options 528 are selectable and, once selected, can perform an action on the associated email thread or message associated with the message portion, display a popup associated with the option, display a sheet associated with the option for further actions to take on the associated email thread, or any combination thereof. Selection of options is further described in conjunction with FIGS. 8 and 13. However, in other embodiments, the swipe options 528 can include one or more options and the options can be customized by the user of the device 100 through a settings application of the device 100, further described in conjunction with FIGS. 9 and 17.

Figure 5F:
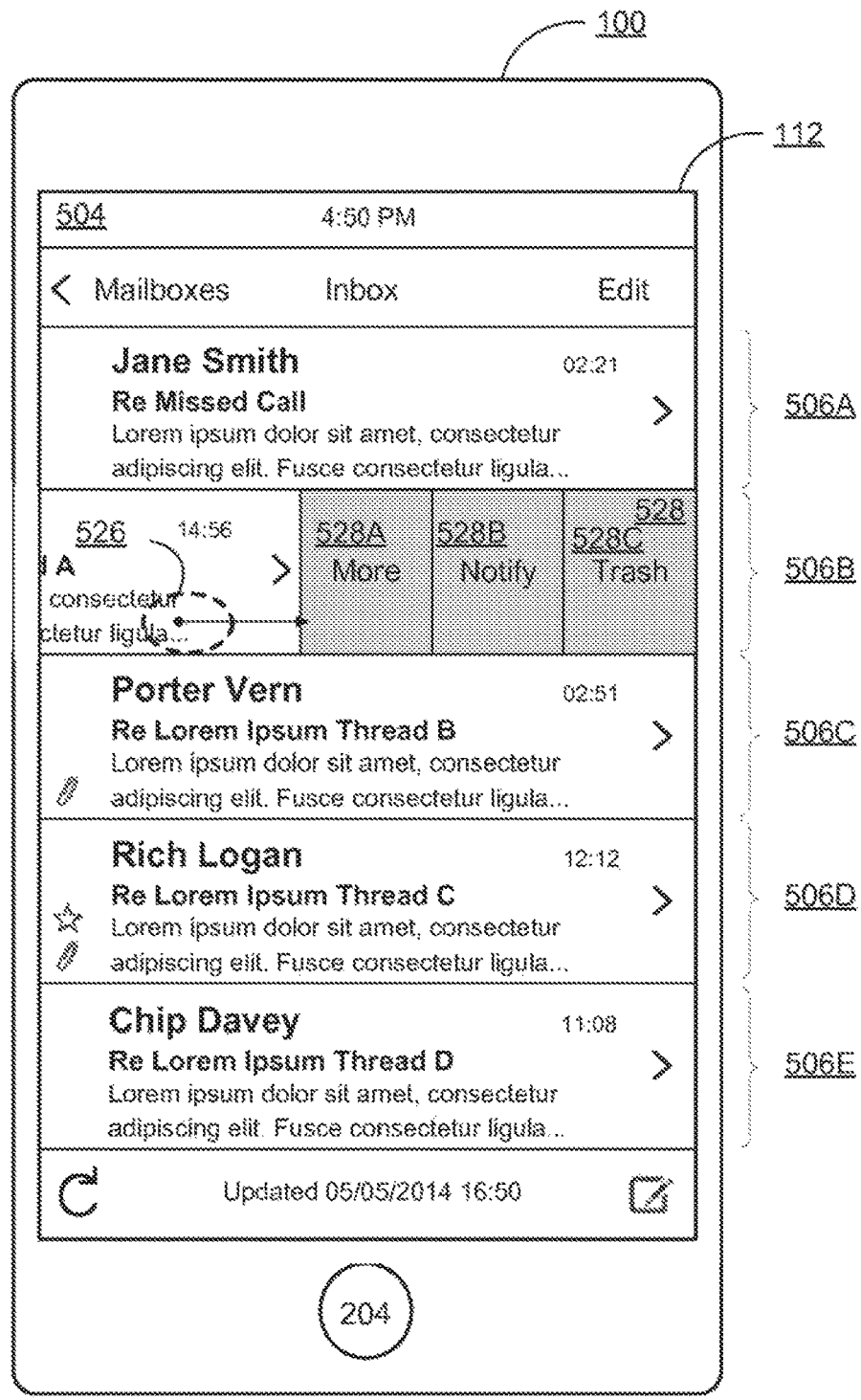
Figure 5G:
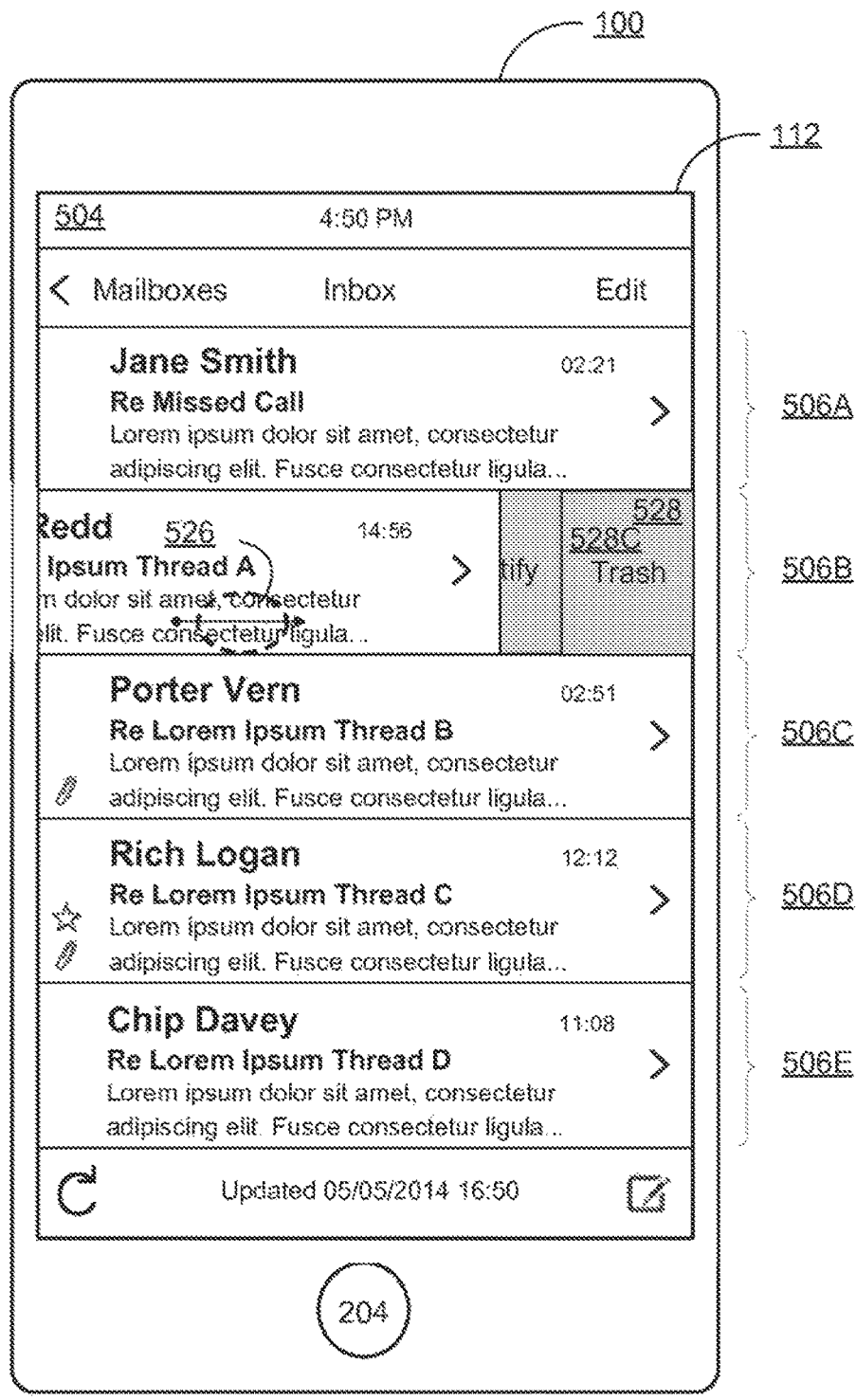
Figure 5H:

FIGS. 5F, 5G, and 5H illustrate receiving a gesture for closing swipe options 528 displayed in the email application, according to one embodiment. The close gesture is indicative of a user request to close the swipe options for message portion 506 in the email application. The close gesture may include a swipe in another, e.g., opposite, direction substantially parallel with the message portion 506 according to one embodiment. For example, the another direction is the opposite direction of the direction of the display gesture for displaying the swipe options 528 shown in FIGS. 5C, 5D, and 5E.

In one embodiment, the close gesture includes dragging a contact a threshold distance from an initial position to a second position on top of a message portion 506 displaying the swipe options 528 displayed in the mail application view 504. For example, a contact 526 is detected by the device 100 at an initial position in the message portion 506B, as shown in FIG. 5F. The contact 526 is maintained and dragged a threshold distance in the another direction, e.g., substantially parallel with the width of the message portion 506B to a second position in the message portion 506B, as shown in FIG. 5H. For example, the contact 526 is maintained from the initial position a threshold distance to the second position shown in FIGS. 5F, 5G, and 5H in a continuous movement without the contact breaking contact with the touch screen 112 of the device 100. In another embodiment, instead of a threshold distance, the close gesture includes dragging a contact at a threshold rate on top of a message portion displayed in the mail application view 504. Thus, the contact 526 is maintained and dragged at a rate in a direction substantially parallel with the width of the message portion 506B. In other embodiments, other parameters of the maintained contact 526 are evaluated for the display gesture. The other parameters can include strength of pressure of the contact or number of contact points.

After completion of the close gesture or the threshold distance or rate is reached, the swipe options 528 are no longer displayed. In one embodiment, the swipe options 528 slide in or close continuously and/or proportionally to the distance or a normalized distance reached by the contact 526, as previously described and as shown in FIG. 5G. In another embodiment, the swipe options 528 do not slide in, close, or are not displayed until the contact 526 reaches the threshold distance, and then snap out of sight. In the embodiment in which the close gesture includes a threshold rate, the swipe options 528 slide in or close at a rate proportional to the rate of the traversal of the contact 526.

In the embodiment in which the swipe options 528 are partially hidden as the contact 526 is maintained, if the contact 526 is not maintained until the threshold distance is reached and/or broken, the swipe options 528 can "rubber band" or bounce back out and display the full swipe options 528 of the message portion 506B, as shown in FIG. 5F. In the illustrated example, once the threshold distance or threshold rate is reached, the swipe options 528 are no longer visible, the message portion 506B is shifted back in the another direction, and the message portion 506B is visible in the email application.

In addition to displaying swipe options 528, a default action can be associated with a gesture as well such as an expanded swipe option 628. FIGS. 6A, 6B, 6C, and 6D illustrate receiving a gesture for displaying an expanded swipe option 628 in the email application, according to one embodiment. The display gesture is indicative of a user request to display an expanded swipe option 628 for a message portion 506B in the email application. The display gesture may include a swipe in a direction substantially parallel along the width of the message portion 506B. For example, the direction of the display gesture to display an expanded swipe option 628 is the same direction of the display gesture to display the swipe options 528.

Figure 6A:
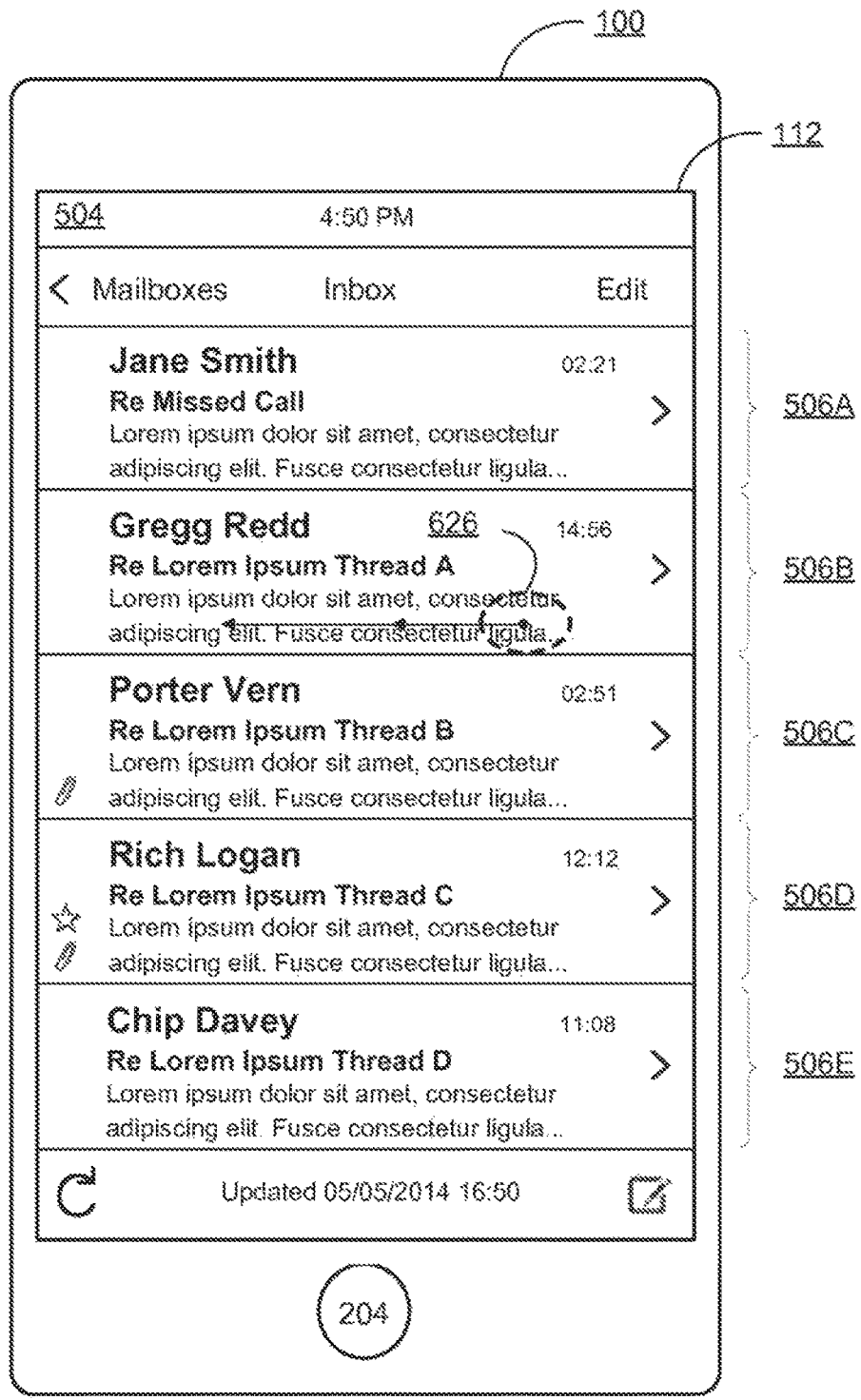
FIGS. 6A, 6B, 6C, 6D, 6E, 6F, and 6G illustrate a gesture for displaying and closing an expanded swipe option in the email application, according to one embodiment.

In one embodiment, the display gesture includes dragging a contact a threshold distance from an initial position to a second position on top of a message portion 506 displayed in the mail application view 504. For example, a contact 626 is detected by the device 100 at an initial position in the message portion 506B, as shown in FIG. 6A. The contact 626 is maintained and dragged at a threshold rate on top of or dragged a threshold distance in a direction substantially parallel with the width of the message portion 506B to a second position in the message portion 506B, as shown in FIG. 6D in a similar manner as described in FIG. 5.

Figure 6B:
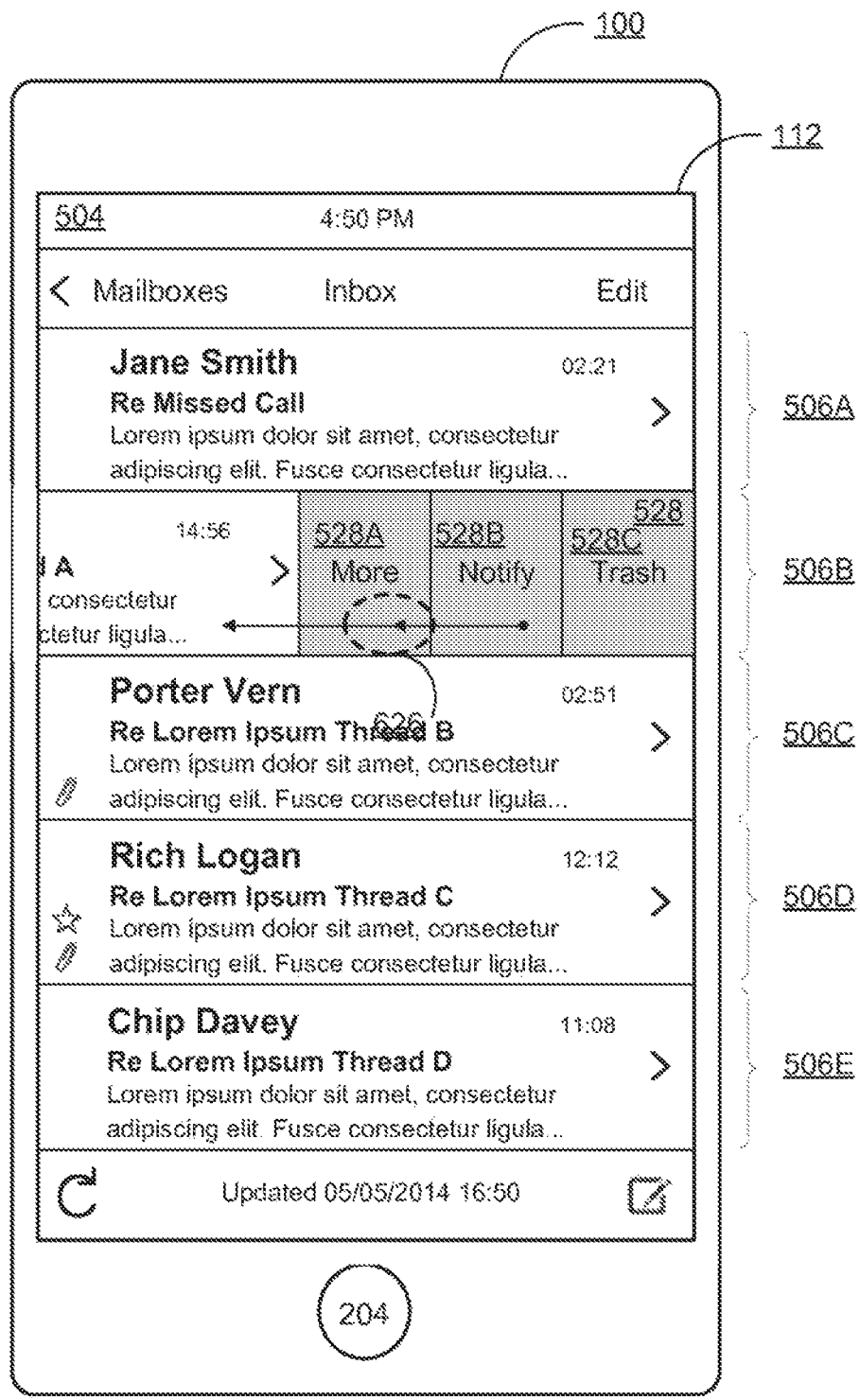

In one embodiment, the threshold distance to display an expanded swipe option 628 is greater than the threshold distance to display the swipe options described in FIG. 5, as shown in FIG. 6B. In this embodiment, where the direction of the swipe for displaying the expanded swipe option 628 and the direction of the swipe for displaying the swipe options 528 are the same, if the threshold distance for displaying swipe options 528 is reached, as shown in FIG. 6B, the swipe options 528 are shown. As the contact 626 is maintained and the threshold distance for displaying the expanded swipe option 628 is reached, as shown in FIG. 6D, the expanded swipe option 628 is shown.

In another embodiment, one or more threshold rates can be used as indicators of a user request to display either the swipe options 528 or the expanded swipe option 628. For example, if the rate of the movement of the contact 626 is less than a first threshold rate, then the swipe options 528 are displayed. If the rate of the movement of the contact 626 is greater than a second threshold rate, then the expanded swipe option 628 is displayed. In one embodiment, the first threshold rate can be less than or equal to the second threshold rate.

Figure 6C:
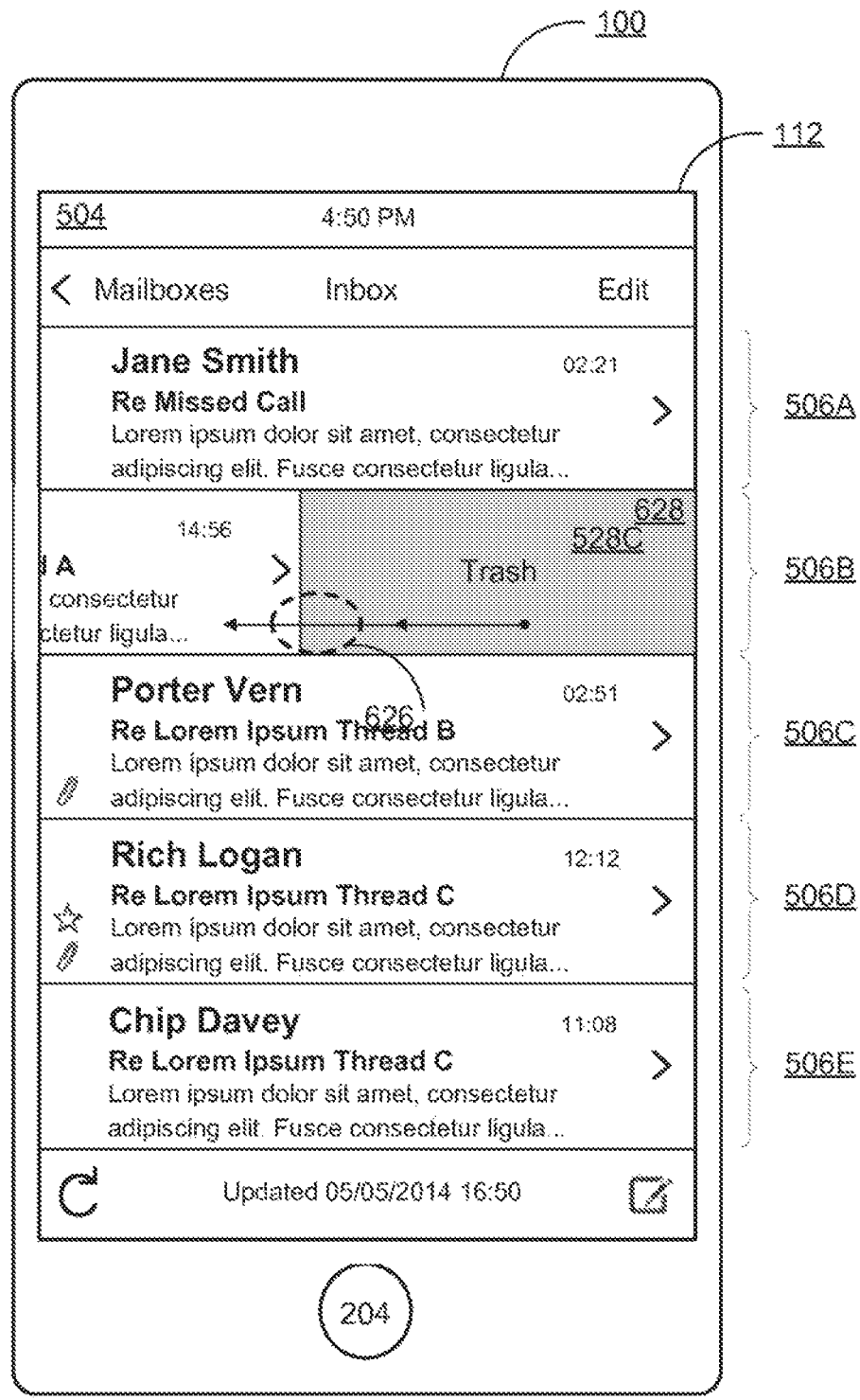
Figure 6D:
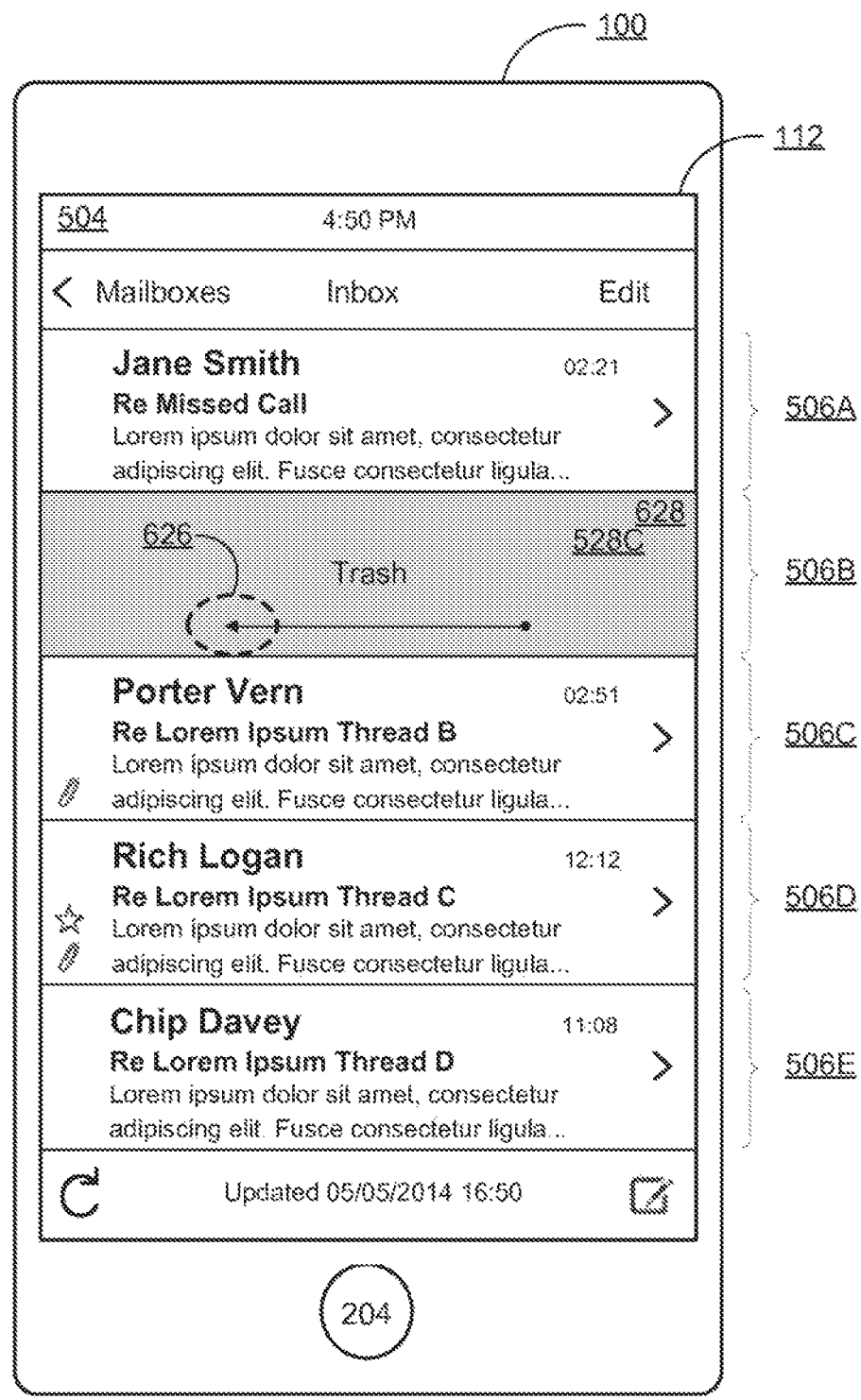

After completion of the display gesture or the threshold distance or rate is reached, the expanded swipe option 628 is displayed across the width of the message portion 506B as shown in FIG. 6D. In one embodiment, the expanded swipe option 628 slides out continuously and/or proportionally to the distance reached by the contact 626 in a similar manner as described previously in FIG. 5. In the embodiment where there are two threshold distances for displaying either the swipe options 528 or the expanded swipe option 628, once the contact 626 exceeds the first threshold distance for the swipe options 528, a portion of the expanded swipe option 628 is shown proportional to the distance reached between the first threshold distance and the second threshold distance, as shown in FIG. 6C. If half the distance between the first threshold distance and the second threshold distance is reached, then half of the expanded swipe option 628 or half of a cropped swipe option 628 is displayed on the right side of the message portion 506B. The distance between the first threshold distance and the second threshold distance can be a normalized distance by the length of the width of the message portion 506B or the difference between the first and second threshold distances.

In another embodiment, the expanded swipe option 628 does not slide out or is not displayed until the contact 626 reaches the threshold distance or second threshold distance from the preceding example or a threshold rate, and then snaps into place. In the embodiment where the expanded swipe option 628 is partially displayed as the contact 626 is maintained, if the contact 626 is not maintained until the threshold distance, such as the second threshold distance from the preceding example, is reached and/or broken, as shown in FIG. 6C, the expanded swipe option 628 can "rubber band" or bounce back to the original view of the message portion 506B, shown in FIG. 6A, or the swipe options 528, shown in FIG. 6B, hiding the swipe options 528.

In the illustrated example, once the threshold distance is reached, the expanded swipe option 628 is displayed instead of the message portion 506B and the message portion 506B is no longer shown in the email application. For example, the expanded swipe option 628 can be an option included in the swipe options 528 such as the trash option 528C or can be a different option that can be a default option or customized by the user of the device 100 through a settings application of the device 100, further described in conjunction with FIGS. 9 and 17. The expanded swipe option 628 is selectable and, once selected, can perform an action on the associated email thread or message associated with the message portion, display a popup associated with the option, display a sheet associated with the option for further actions to take on the associated email thread, or any combination thereof. Selection of options is further described in conjunction with FIGS. 8 and 13.

Figure 6E:
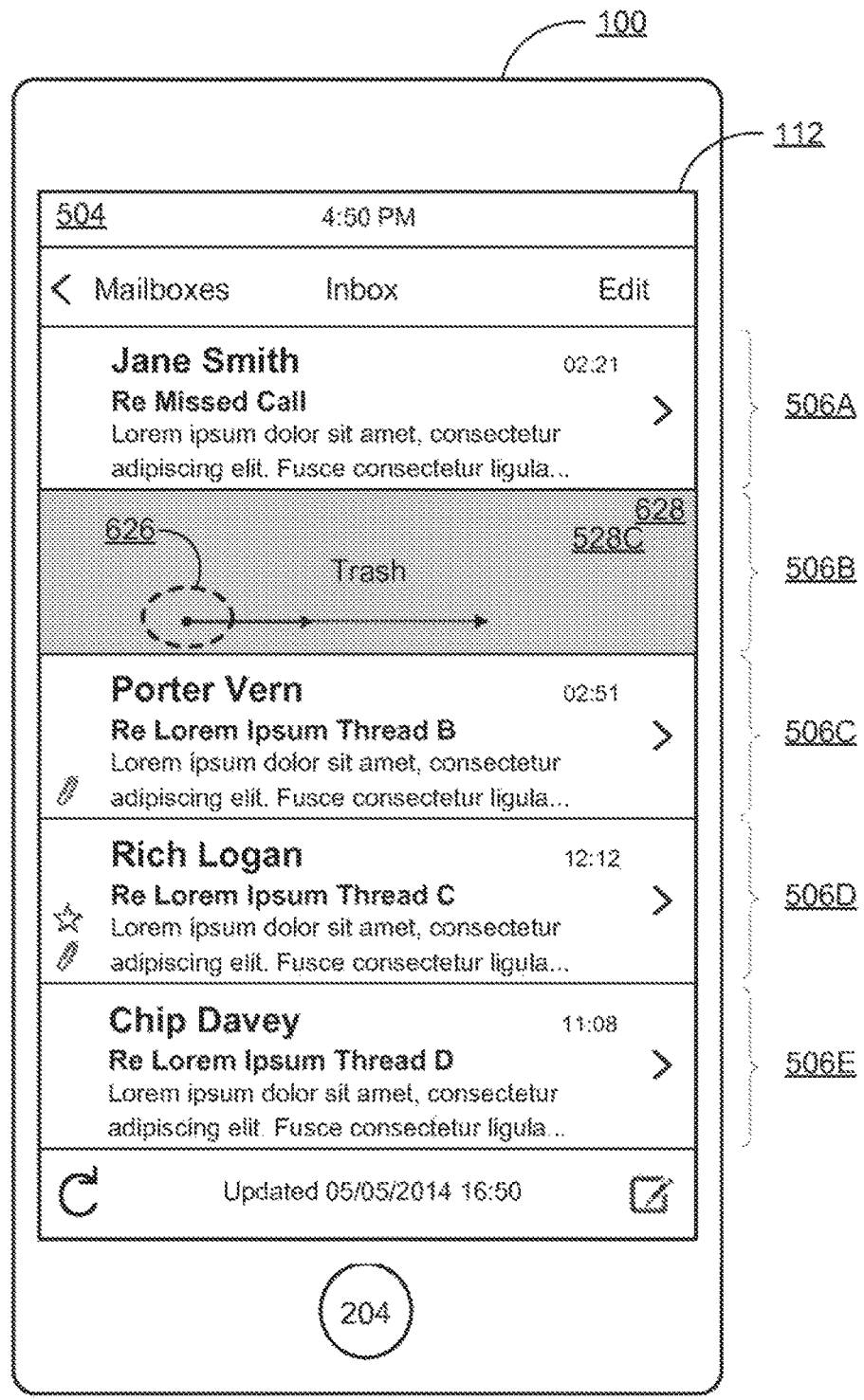
Figure 6F:
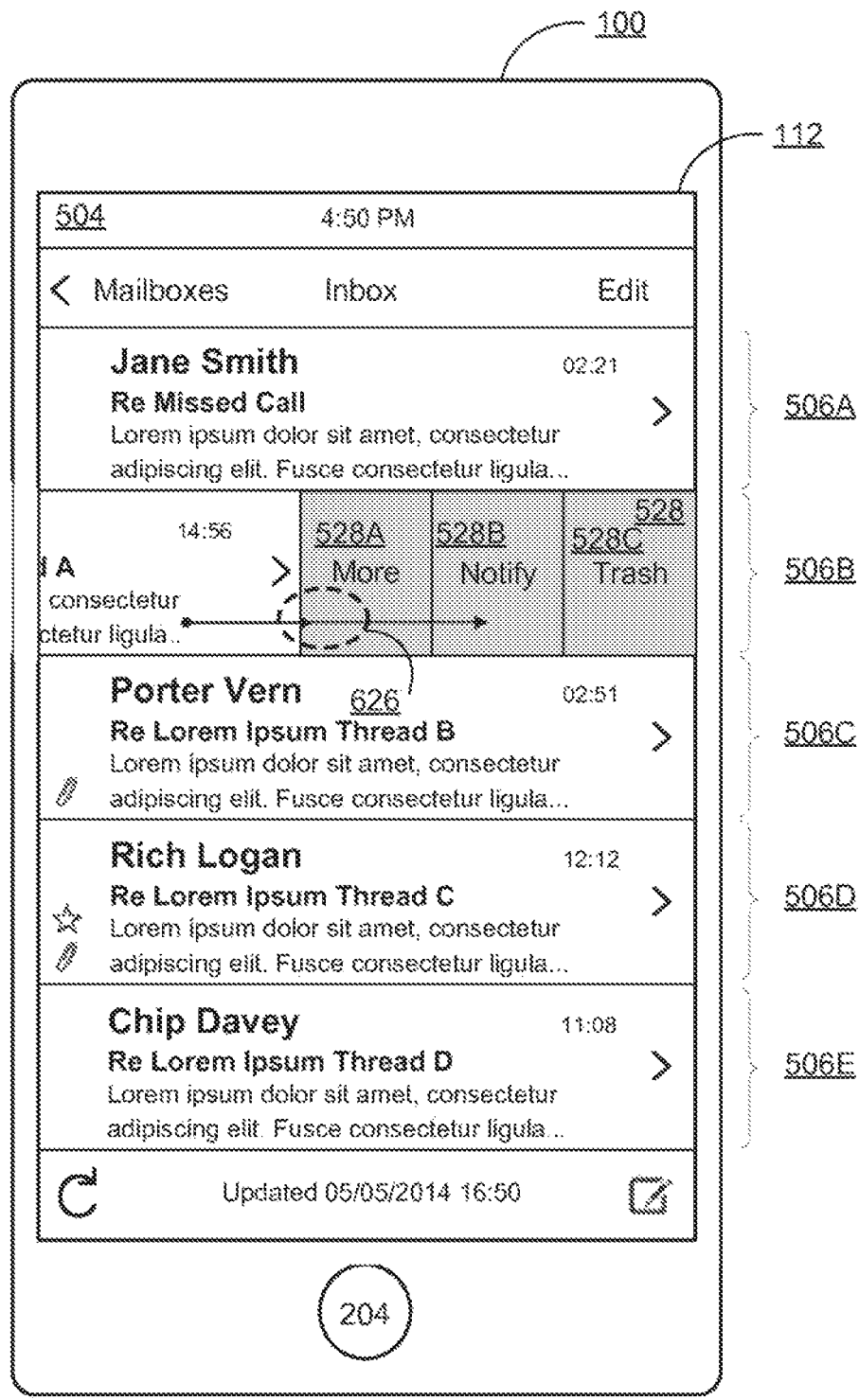
Figure 6G:
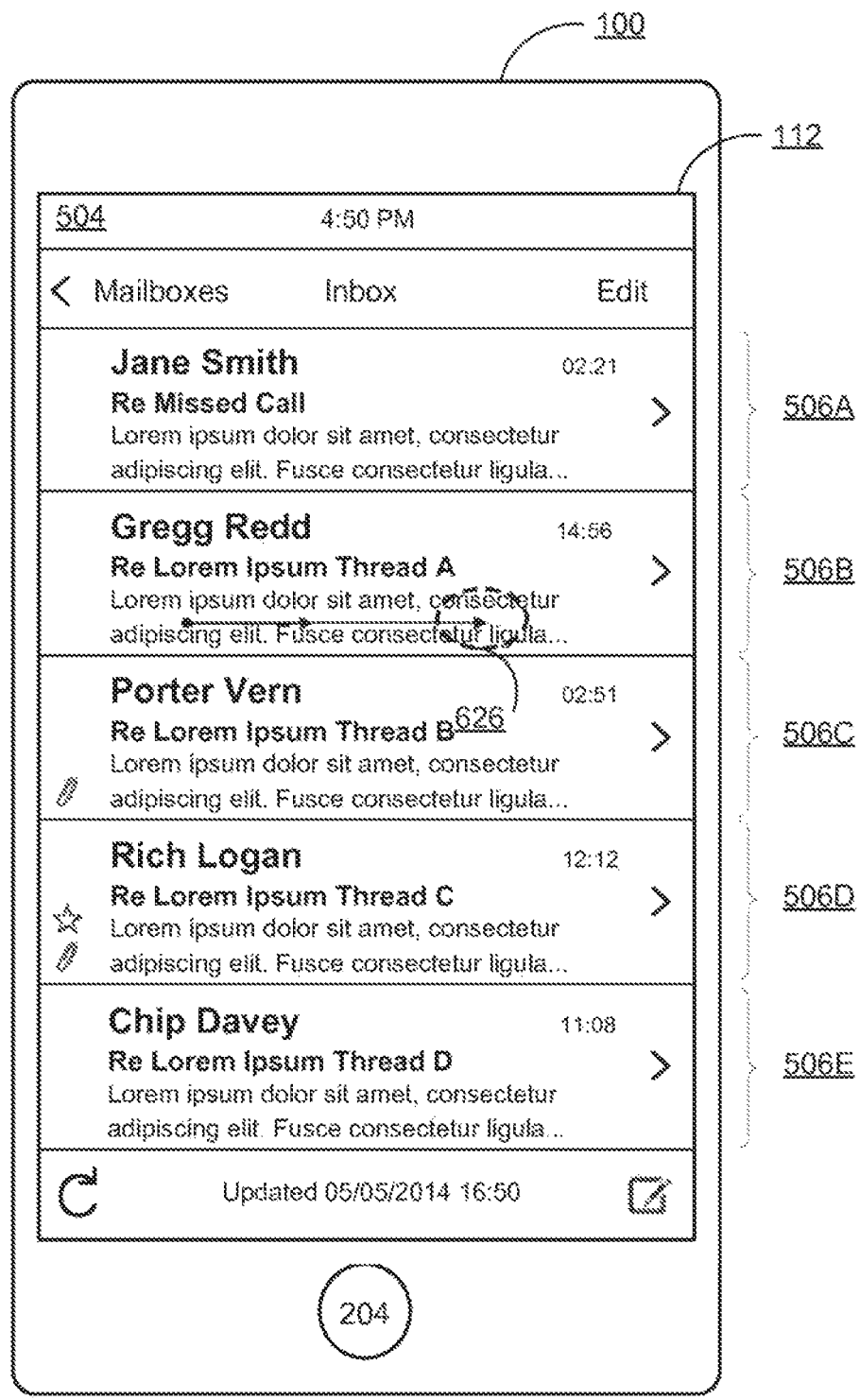

FIGS. 6E, 6F, and 6G illustrate receiving a gesture for closing an expanded swipe option 628 in the email application, according to one embodiment. The close gesture is indicative of a user request to close an expanded swipe option 628 for a message portion 506B in the email application. The close gesture may include a swipe in another direction substantially parallel with the width of the email thread 506B. For example, the another direction is the opposite of the direction of a swipe of a display gesture to display an expanded swipe option 628. In addition, the close gesture can be the same as the close gesture described previously in FIG. 5.

In one embodiment, the close gesture includes dragging a contact a threshold distance from an initial position to a second position on top of a message portion 506 displayed in the mail application view 504. For example, a contact 626 is detected by the device 100 at an initial position in the message portion 506B, as shown in FIG. 6E. The contact 626 is maintained and dragged at a threshold rate on top of or dragged a threshold distance in a direction substantially parallel with the width of the message portion 506B to a second position in the message portion 506B, as shown in FIG. 6G in a similar manner as the close gesture described previously in FIGS. 5 and 6A-D.

In one embodiment, the threshold distance to close an expanded swipe option 628 is greater than the threshold distance to close the swipe options described in FIG. 5, as shown in FIG. 6F, and in a similar manner as the threshold distance and threshold rate described in FIGS. 6A, 6B, 6C, and 6D. In this embodiment, where the direction of the swipe for displaying the expanded swipe option 628 and the direction of the swipe for displaying the swipe options 528 are the same, if the threshold distance for displaying swipe options 528 is reached, as shown in FIG. 6F, the swipe options 528 are shown instead of the expanded swipe option 628 shown in FIG. 6E. As the contact 626 is maintained and the threshold distance for closing the expanded swipe option 628 is reached and the threshold distance for displaying swipe options 528 is passed, the swipe options 528 are hidden as well in a similar manner as described in FIG. 5.

In another embodiment, one or more threshold rates can be used as indicators of a user request to close either the swipe options 528 or the expanded swipe option 628. For example, if the rate of the movement of the contact 626 is greater than a first threshold rate, then the expanded swipe option 628 is closed and the message portion 506B is displayed. If the rate of the movement of the contact 626 is less than a second threshold rate, then the expanded swipe option 628 is closed or hidden and the swipe options 528 are displayed. Then, if the movement of the contact 626 continues for a longer distance or is repeated, then the swipe options 528 can also be closed or hidden and the message portion 506 displayed. In this example, the first threshold rate can be greater than or equal to the second threshold rate.

After completion of the close gesture or the threshold distance or rate is reached, the message portion 506B is displayed again. In one embodiment, the expanded swipe option 628 slides in or closes continuously and/or proportionally to the distance or normalized distance reached by the contact 626, as described in FIGS. 5, 6A, 6B, 6C, and 6D. In the embodiment where there are two threshold distances for displaying either the swipe options 528 or the expanded swipe option 628, and the contact 626 is no longer at the second threshold for displaying the expanded swipe option 628 but not yet at the first threshold distance for displaying swipe options 528, the expanded swipe option 628 is shown proportional to the distance reached between the first threshold distance and the second threshold distance.

In another embodiment, the expanded swipe option 628 does not slide in or is not closed until the contact 626 reaches the threshold distance, such as the first threshold distance from the preceding example. In the embodiment where the expanded swipe option 628 is partially hidden as the contact 626 is maintained, if the contact 626 is not maintained until the threshold distance or first threshold distance is reached and/or broken, the expanded swipe option 628 can "rubber band" or bounce back and be displayed instead of the message portion 506B, shown in FIG. 6E.

In the illustrated example, once the threshold distance to close the expanded swipe option 528 is reached or the close gesture is completed, the expanded swipe option 628 is hidden and the message portion 506B is shown in the email application, as shown in FIG. 6G, according to one embodiment. For example, the expanded swipe option 628 can be an option included in the swipe options 528 such as the trash option 528C or can be a different option that can be a default option or customized by the user of the device 100 through a settings application of the device 100, further described in conjunction with FIGS. 9 and 17.

Figure 7A:
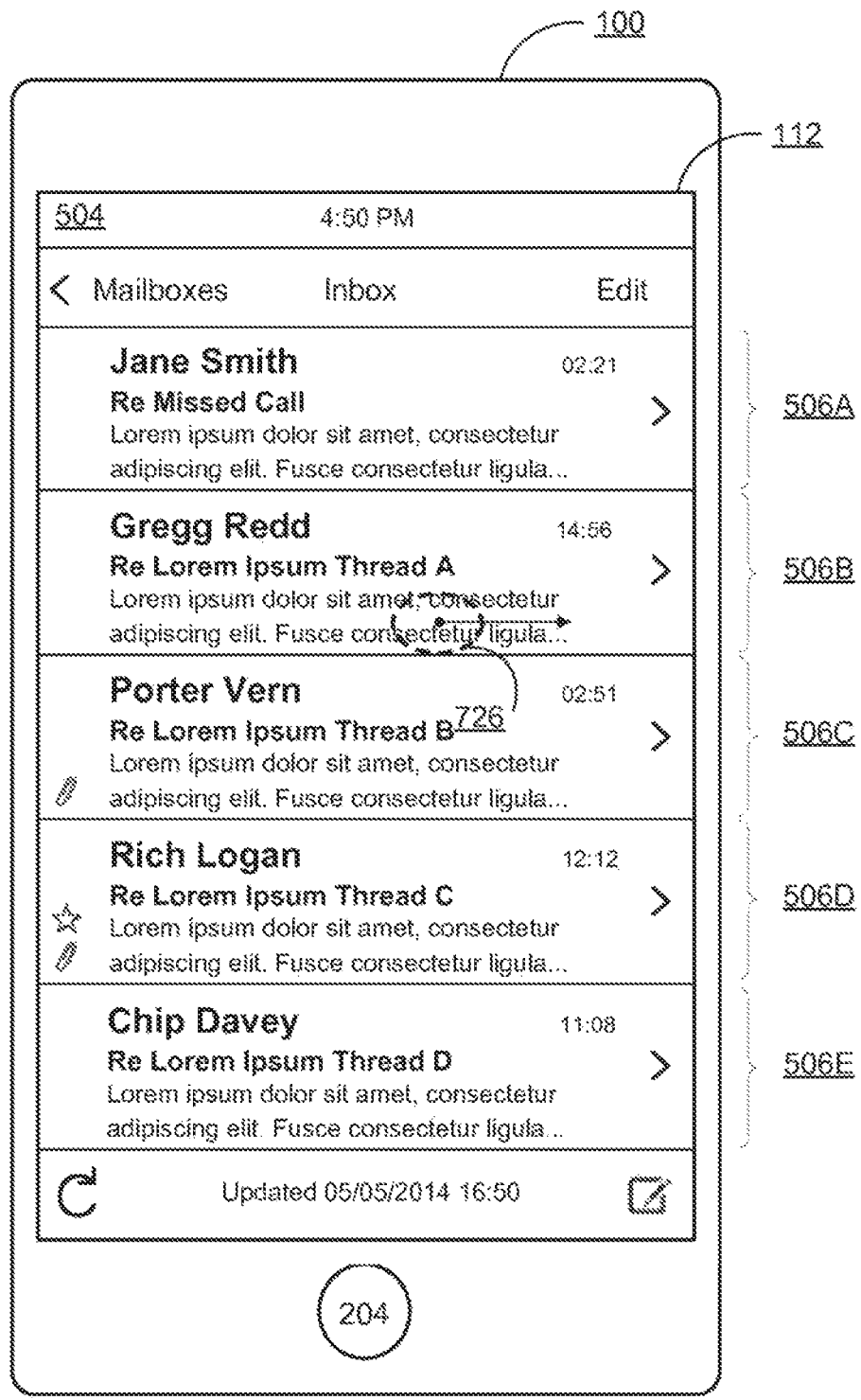
FIGS. 7A, 7B, 7C, 7D, and 7E illustrate a gesture for displaying and closing a swipe option in the email application, according to one embodiment.
Figure 7B:
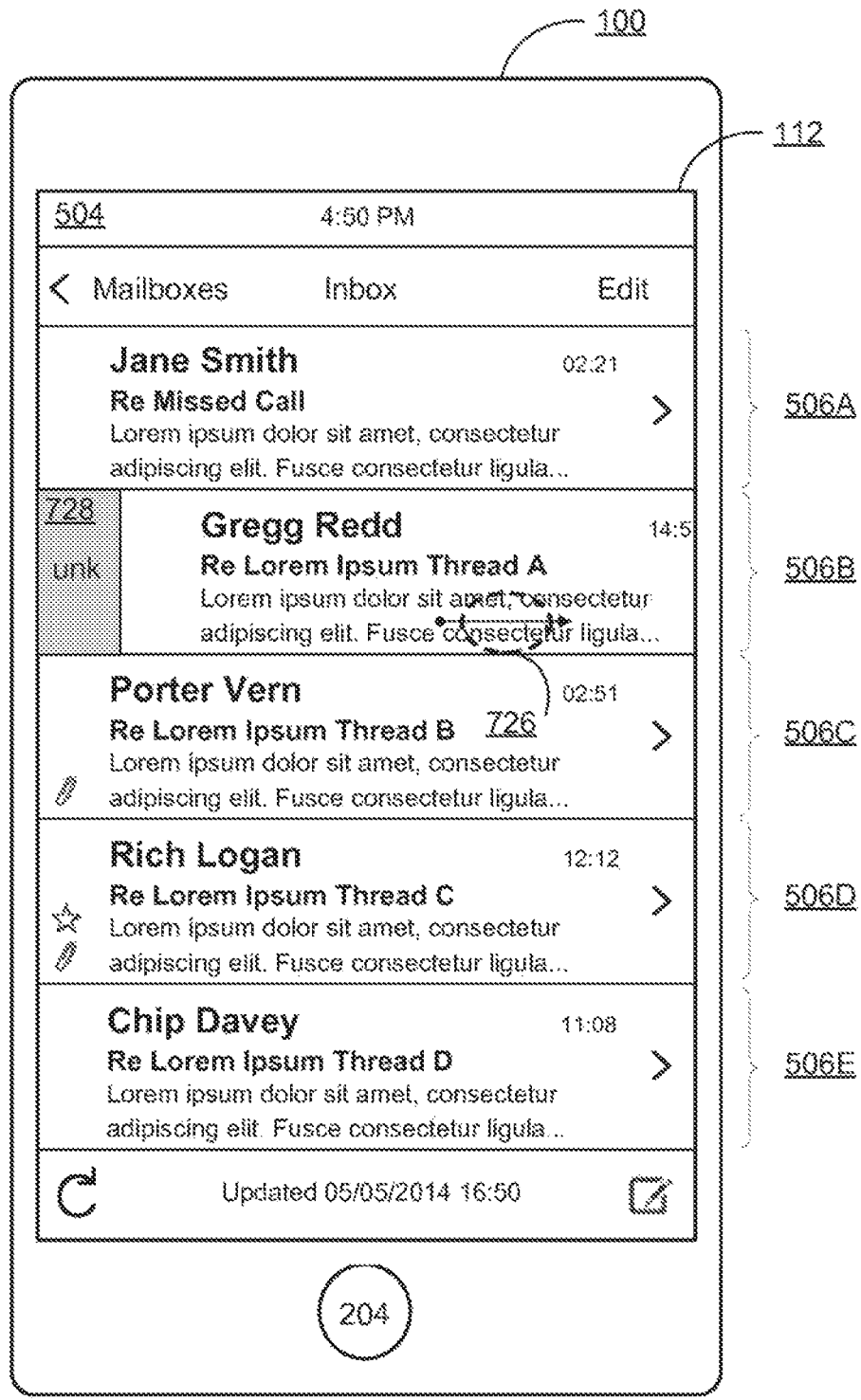
Figure 7C:
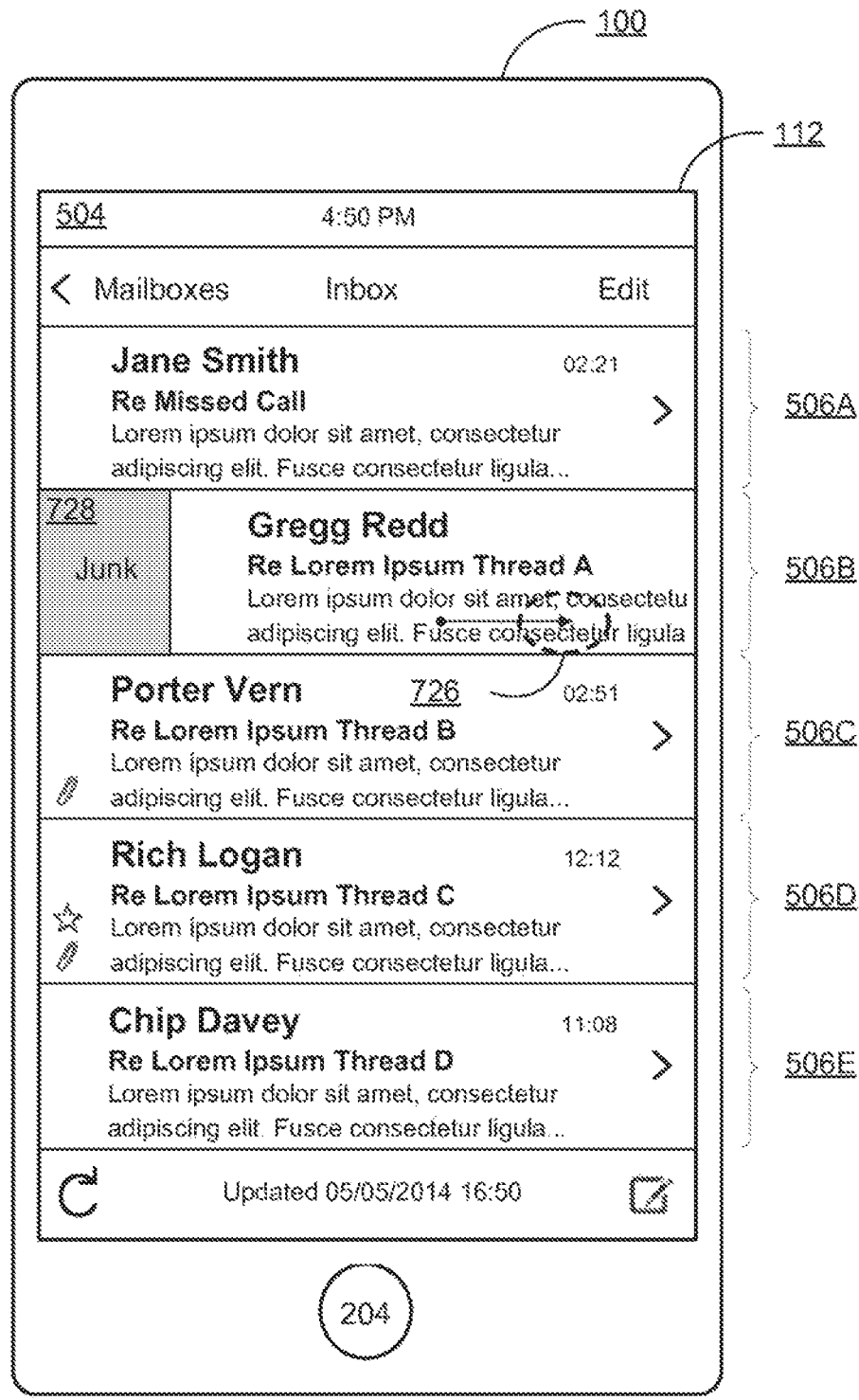
Figure 7D:
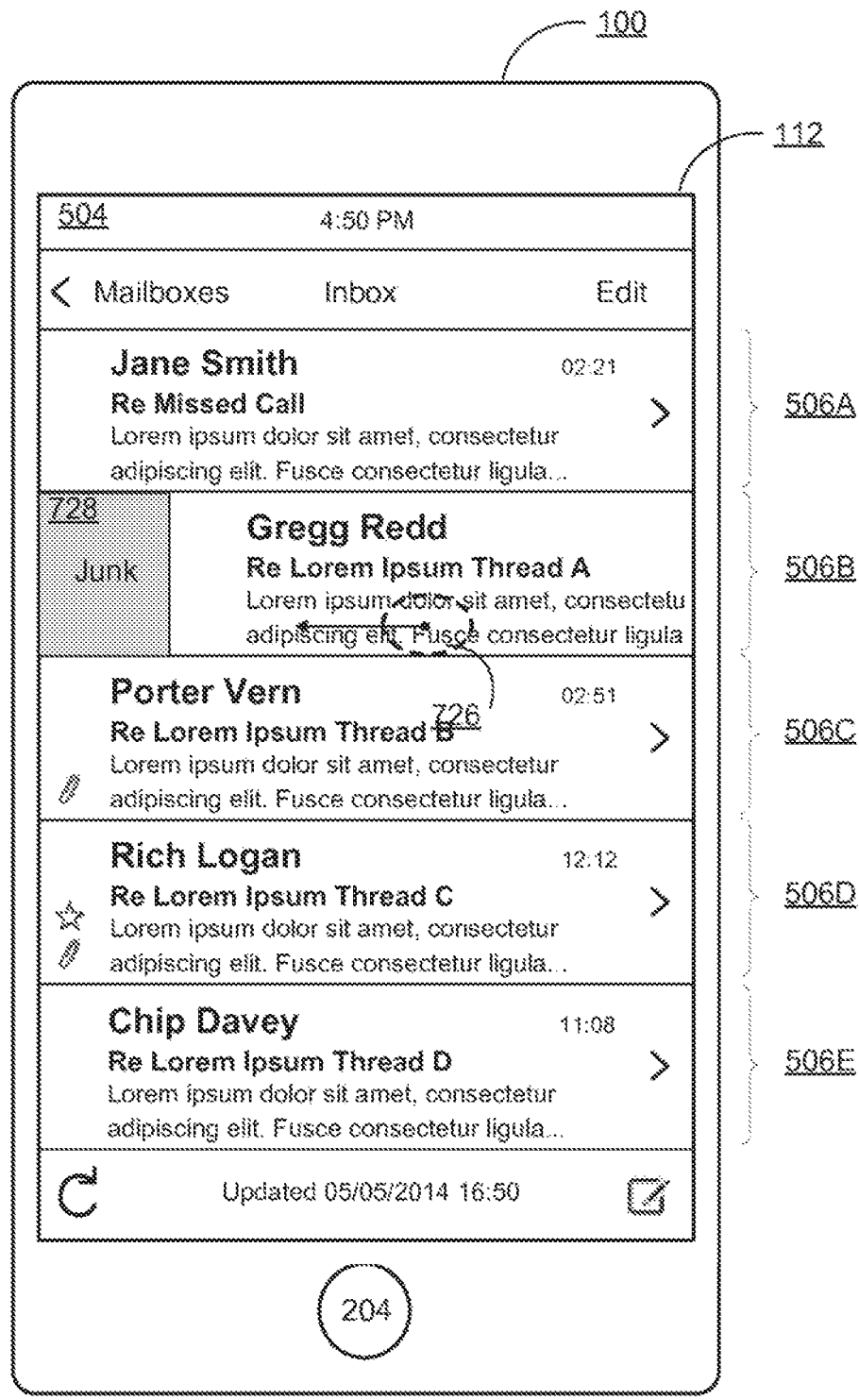
Figure 7E:
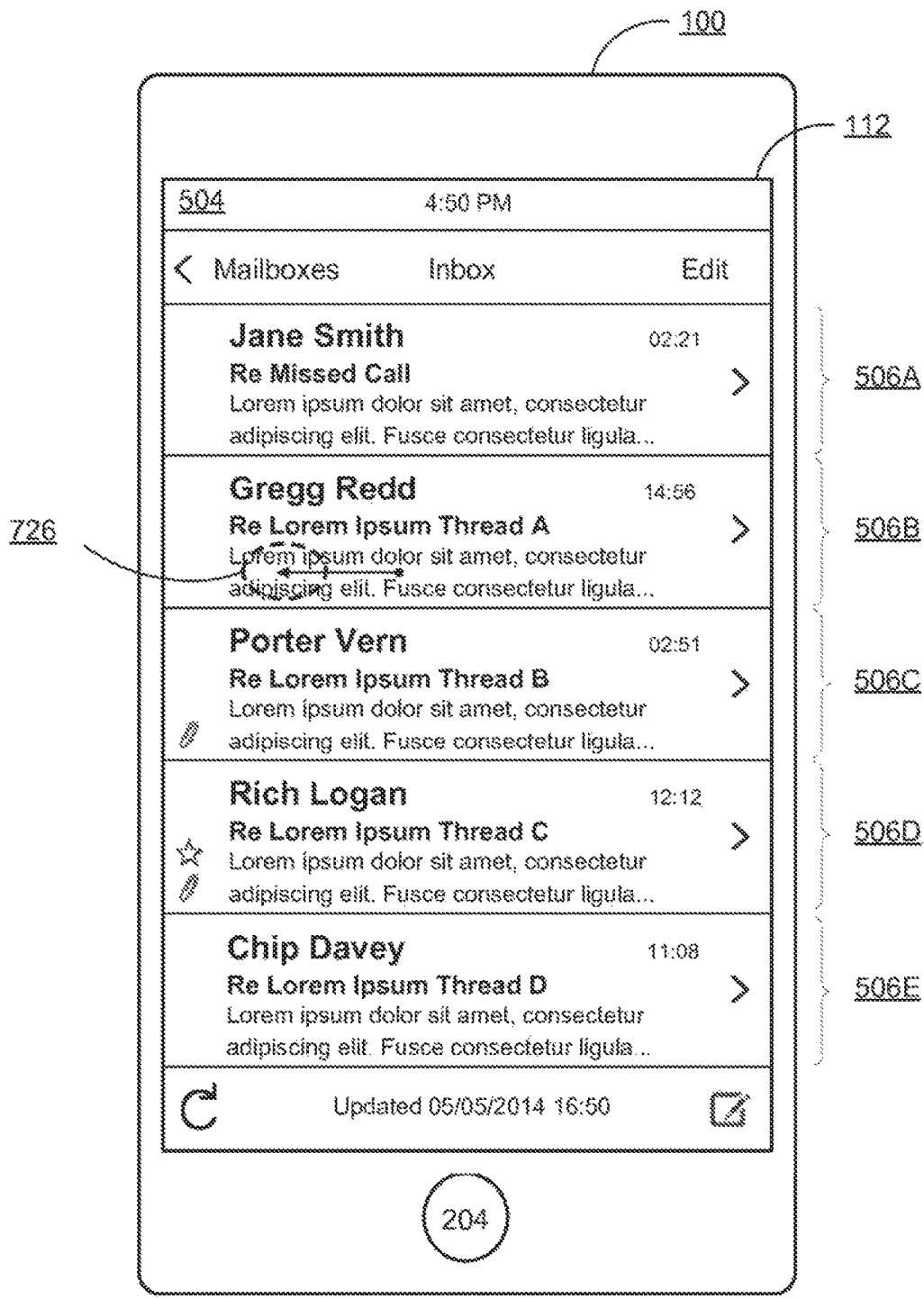

In addition to displaying swipe options 528 and an expanded swipe option 628, additional one or more options can be displayed with a gesture on the other side of the message portion such as swipe option 728. FIGS. 7A, 7B, and 7C illustrate a gesture for displaying a swipe option 728 in the email application and FIGS. 7D and 7E illustrate a gesture for closing a swipe option 728 in the email application, according to one embodiment. In one embodiment, the display gesture and close gesture are the same as the display gesture and close gesture described in conjunction with FIG. 5 for contact 726 and swipe option 728. In one embodiment, the display gesture and/or close gesture is unlike the display gesture and/or close gesture described in FIG. 5 in direction of the swipe, the threshold distance, the threshold rate, or any combination thereof. For example, if the swipe options 528 are displayed on a first side (e.g., right side) of the message portion 506, the swipe option 728 is shown on the other side or opposite side of the first side (e.g., left side) of the message portion 506. In this example, the direction of the swipe of the display gesture and/or close gesture to display and/or close the swipe option 728 is the opposite direction of the swipe of the display gesture and/or close gesture to display or close the swipe options 528 and expanded swipe option 628. In one embodiment, the threshold distance and/or threshold rate for the display gesture and/or close gesture shown in FIGS. 7A, 7B, and 7C is equal to the threshold distance and/or threshold rate of the display gesture and/or close gesture described in conjunction with FIG. 5.

In one embodiment, the displayed or closed swipe option 728 is presented and animated in a similar manner as the swipe options 528 described in conjunction with FIG. 5. For example, the swipe option 728 is a junk option. In the embodiment shown in FIG. 7, the swipe option 728 includes one option. However, in other embodiments, the swipe option 728 can include a plurality of options and one or more of the plurality of options can be customized by the user of the device 100 through a settings application of the device 100, further described in conjunction with FIGS. 9 and 17.

One or more of the previously mentioned options (e.g., options in the swipe options 528, the expanded swipe option 628, and the swipe option 728) can be selected through a gesture to present a sheet associated with the swipe option. Once selected, an action is performed on the associated email thread or message associated with the message portion, display a popup associated with the option, display a sheet associated with the option for further actions to take on the associated email thread, or any combination thereof. Selection of options is further described in conjunction with FIGS. 8 and 13.

Displaying Sheets for Options in an Email Client Module UI and Gestures

Figure 8A:
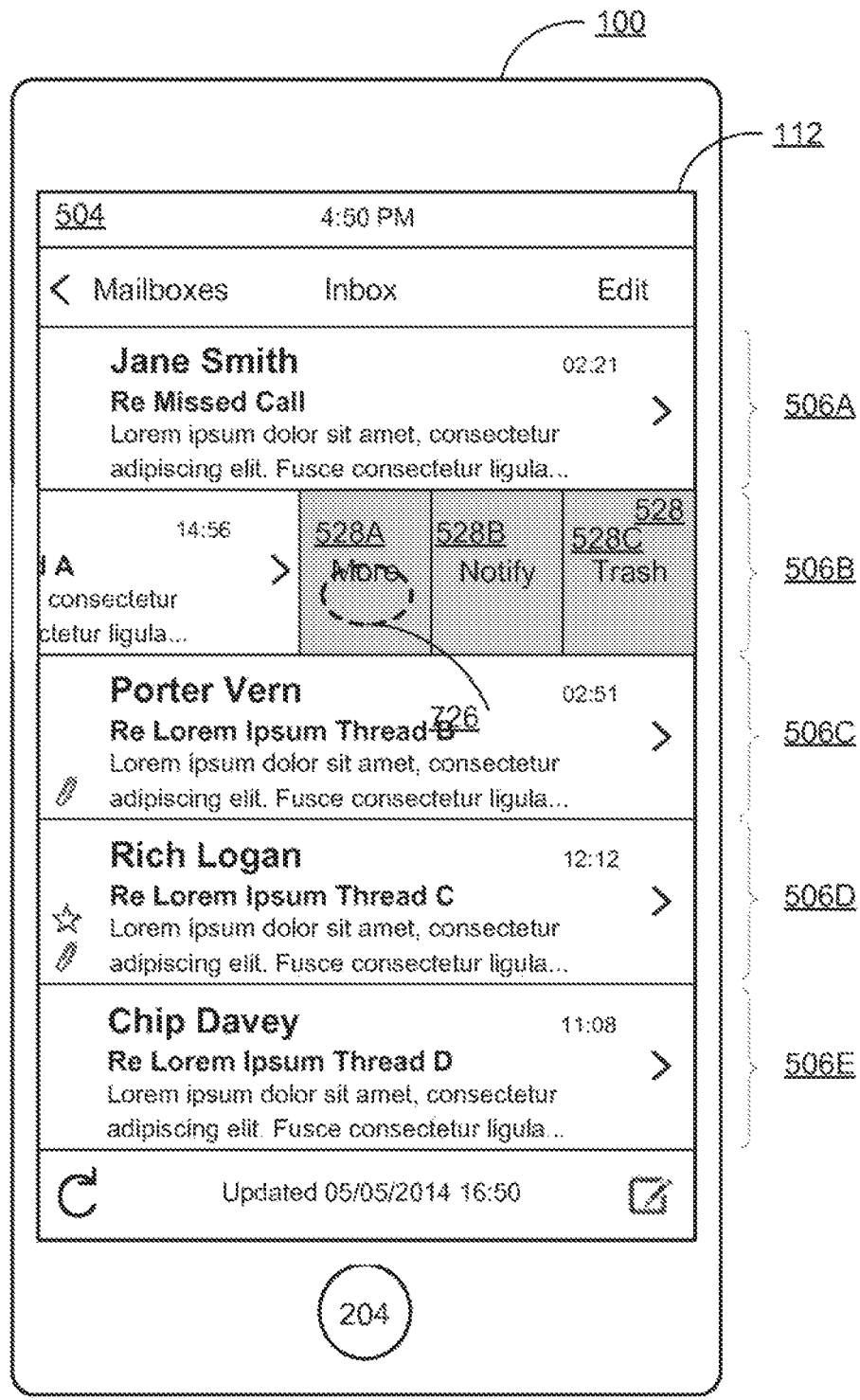
FIG. 8A illustrates a gesture for displaying a sheet for an option in the swipe options in the email application, according to one embodiment.
Figure 8B:
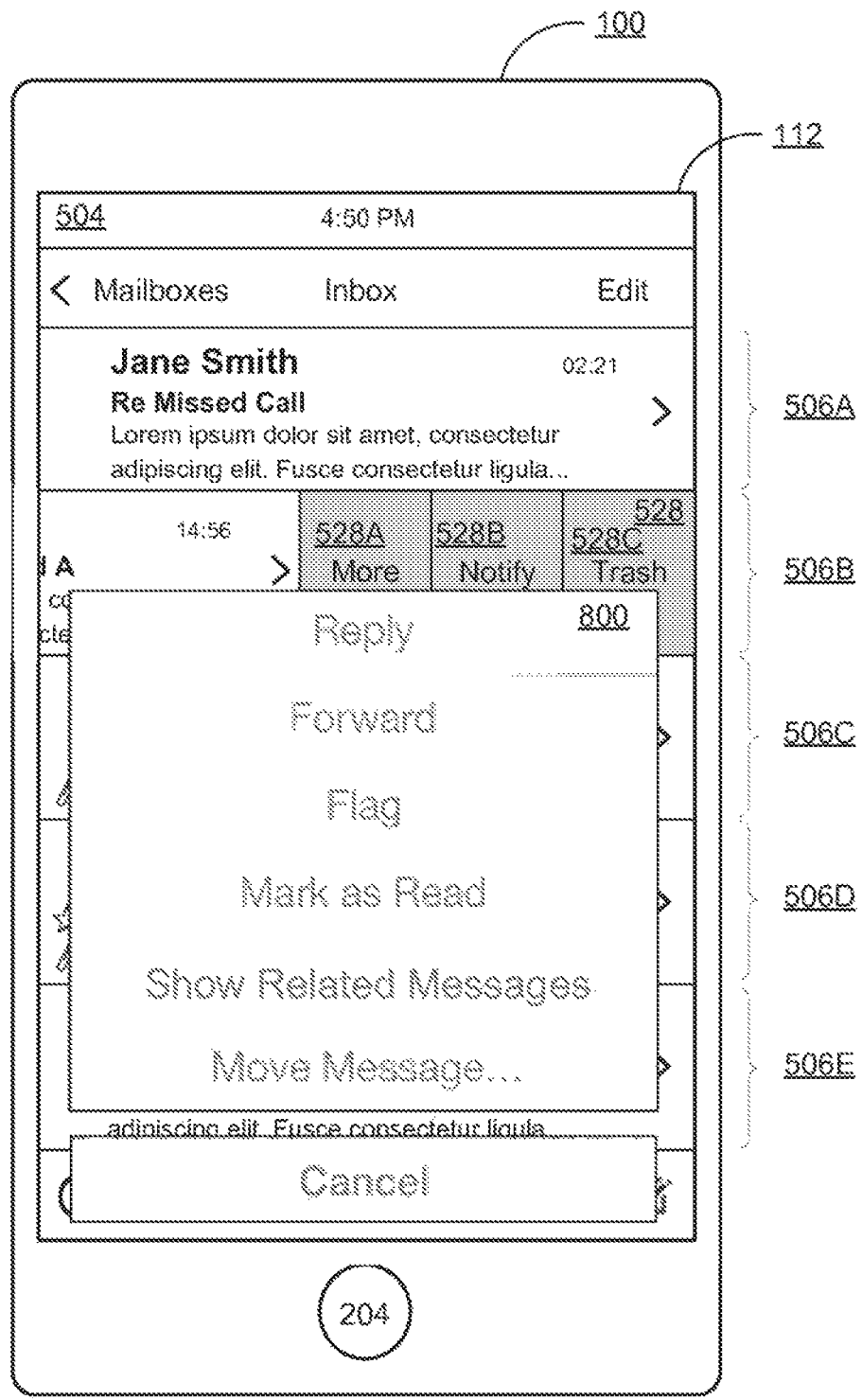
FIG. 8B illustrates a sheet for an option in the swipe options in the email application, according to one embodiment.

FIG. 8A illustrates receiving a gesture for displaying a sheet for a more option 528A in the swipe options 528 in the email application and FIG. 8B illustrates a sheet 800 for the more option 528A option, according to one embodiment. The gesture described herein is also applicable to displaying a sheet for any of the other options displayed in the swipe options 528, the expanded swipe option 628, and the swipe option 728. In one embodiment, the gesture includes a tap on an option, e.g., the more option 528A, shown as contact 826 in FIG. 8A (dotted ellipse). In response to the gesture, the device 100 displays a sheet 800 of the more option 528A as shown in FIG. 8B.

In one embodiment, the sheet 800 for the more option 528A, as shown in FIG. 8B, includes the following actions to take with the message portion 506B: reply, forward, flag, mark as read, show related messages, move message, and cancel. The included actions can be customized by the user of the device 100 through a settings application of the device 100, further described in conjunction with FIG. 9. If the user selects an action displayed on the sheet 800, for example by contacting a portion of the display corresponding to the action on the sheet 800, the action is applied to the corresponding email thread 506B or message associated with the message portion 506B.

Customization of Swipe Options in an Email Client Module UI

The options in the swipe options 528, the expanded swipe option 628 and the swipe option 728 can be customized by users in a settings application. FIGS. 9A-F illustrate pages 902, 904, 906, 908, 910, and 912 in an application view of a settings application, according to one embodiment. FIG. 9 describes customizing options in the swipe options 528, the expanded swipe option 628, the swipe option 728, and actions presented on sheets for the options. In alternative embodiments, different application(s) other than the settings application or different page(s) in the settings applications can be used to customize the options and sheets.

Figure 9A:
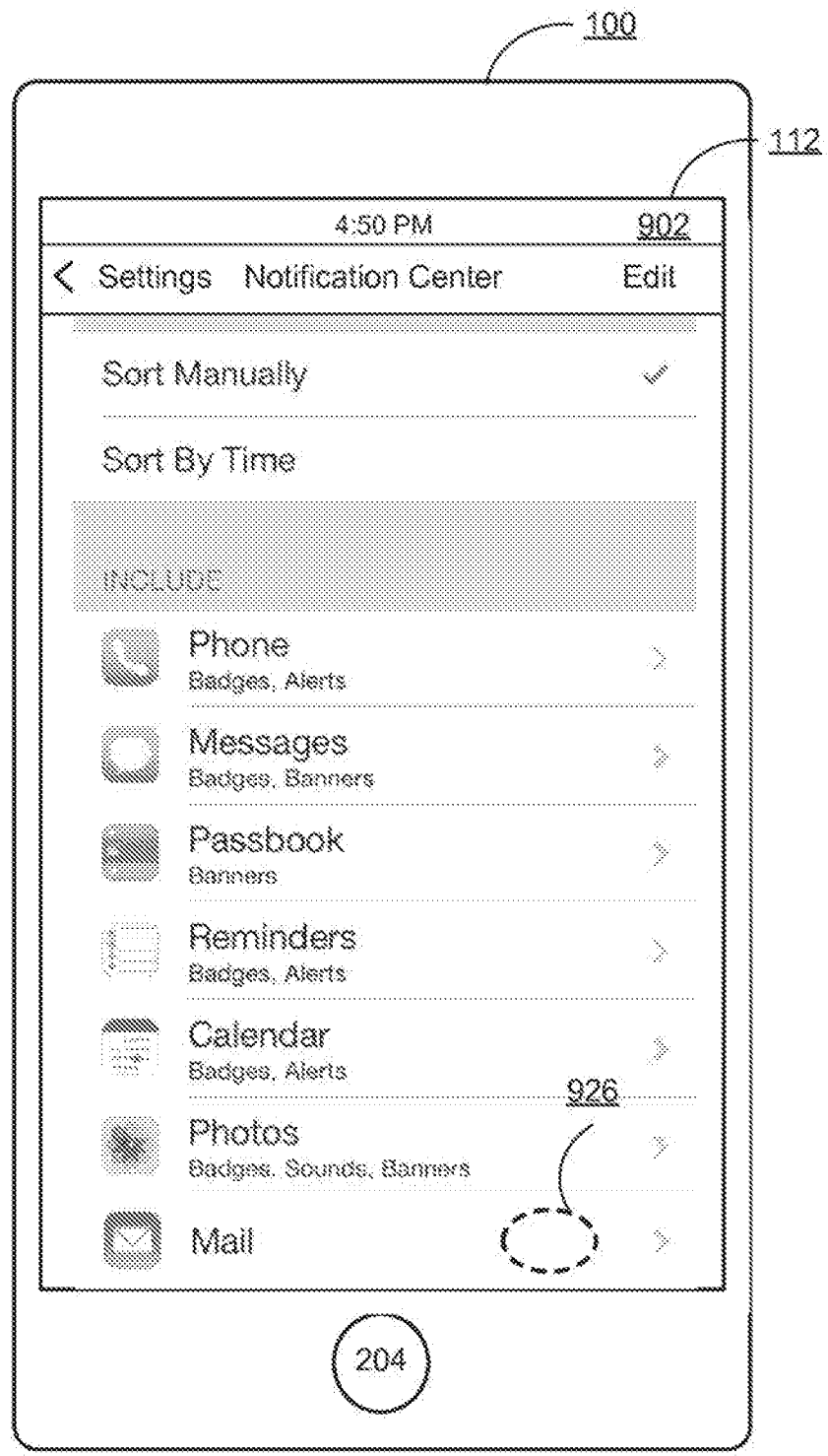
FIGS. 9A, 9B, 9C, 9D, 9E, and 9F illustrate pages in an application view of a settings application, according to one embodiment.
Figure 9B:
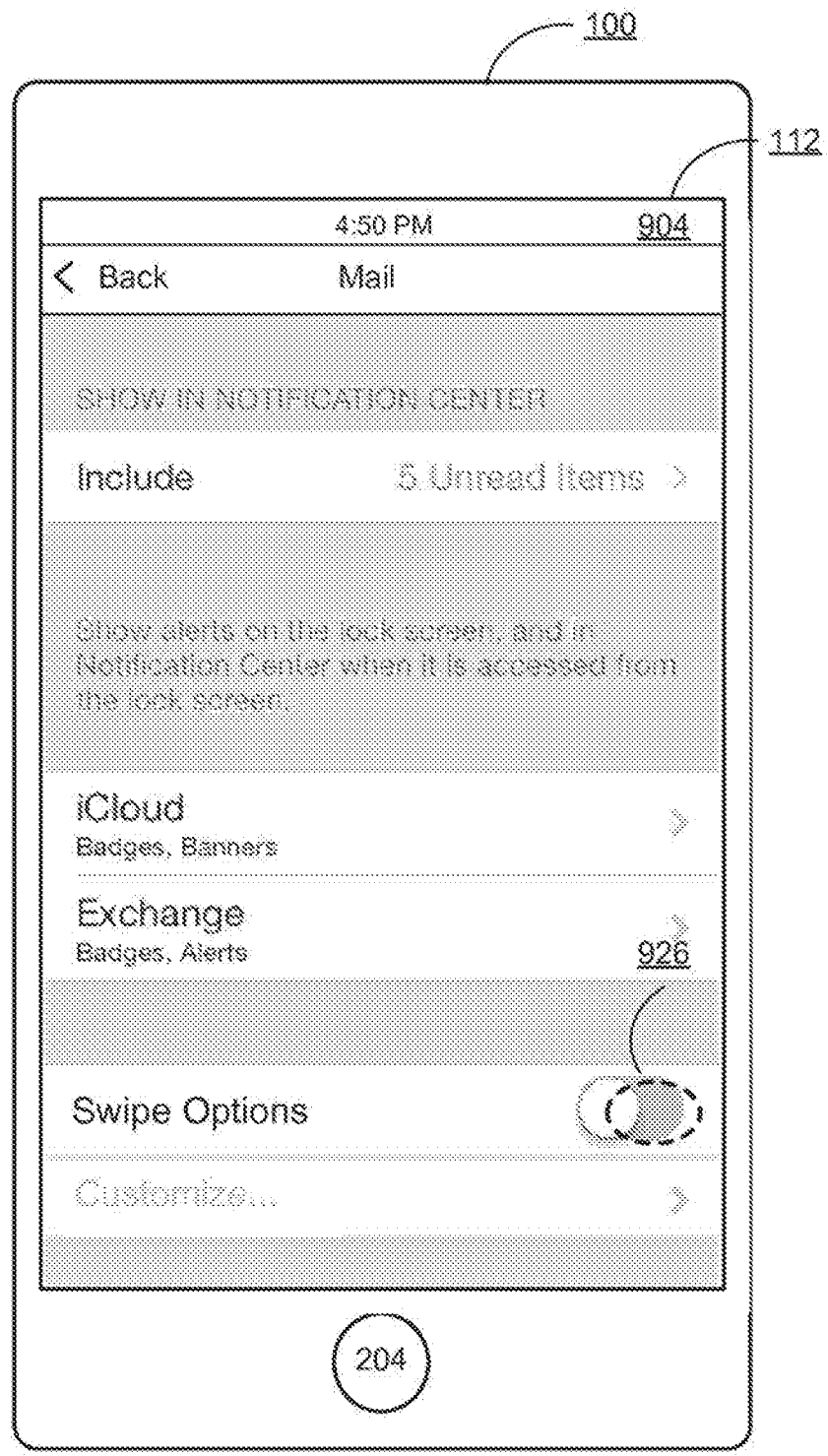
Figure 9C:
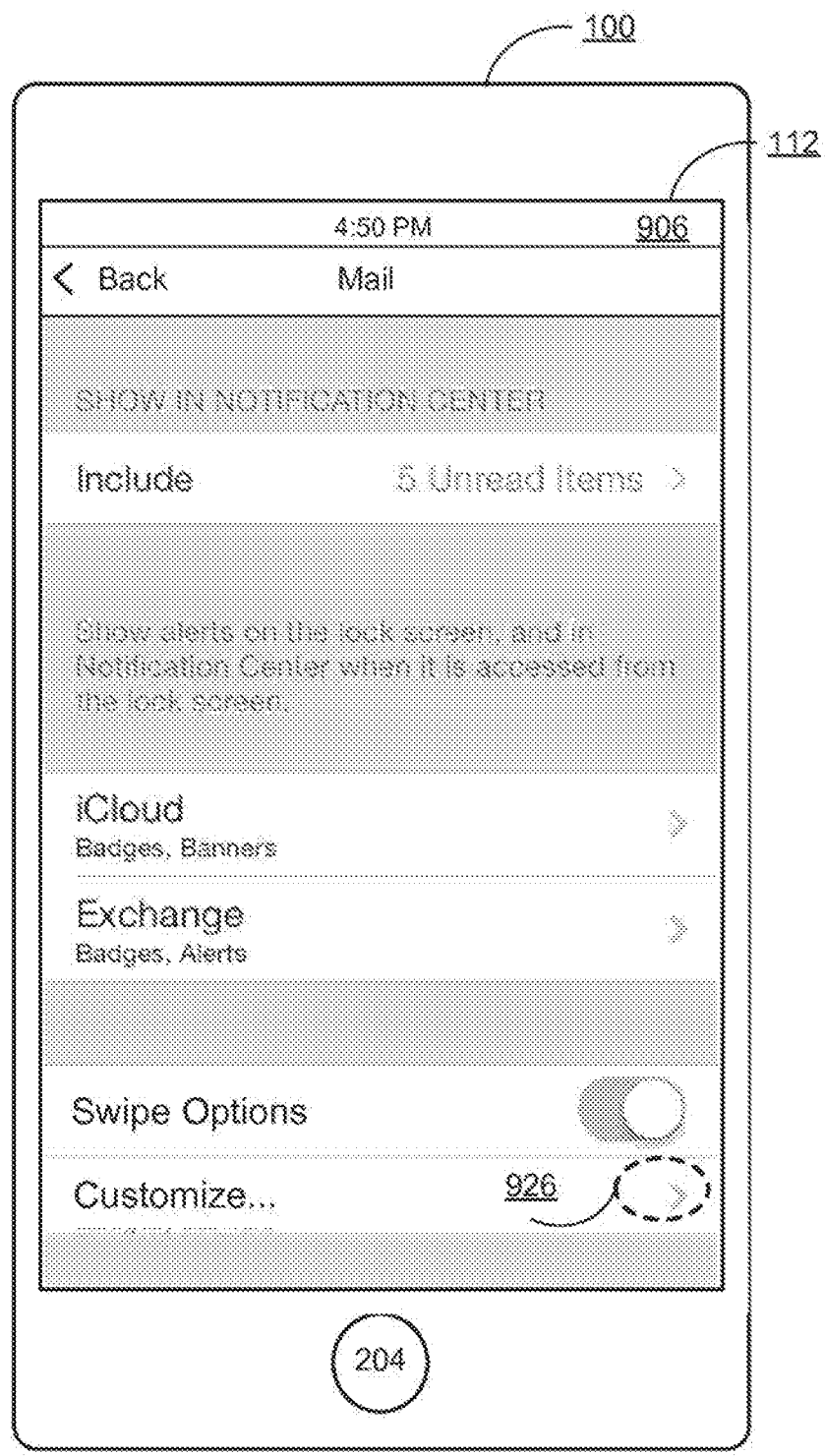
Figure 9D:
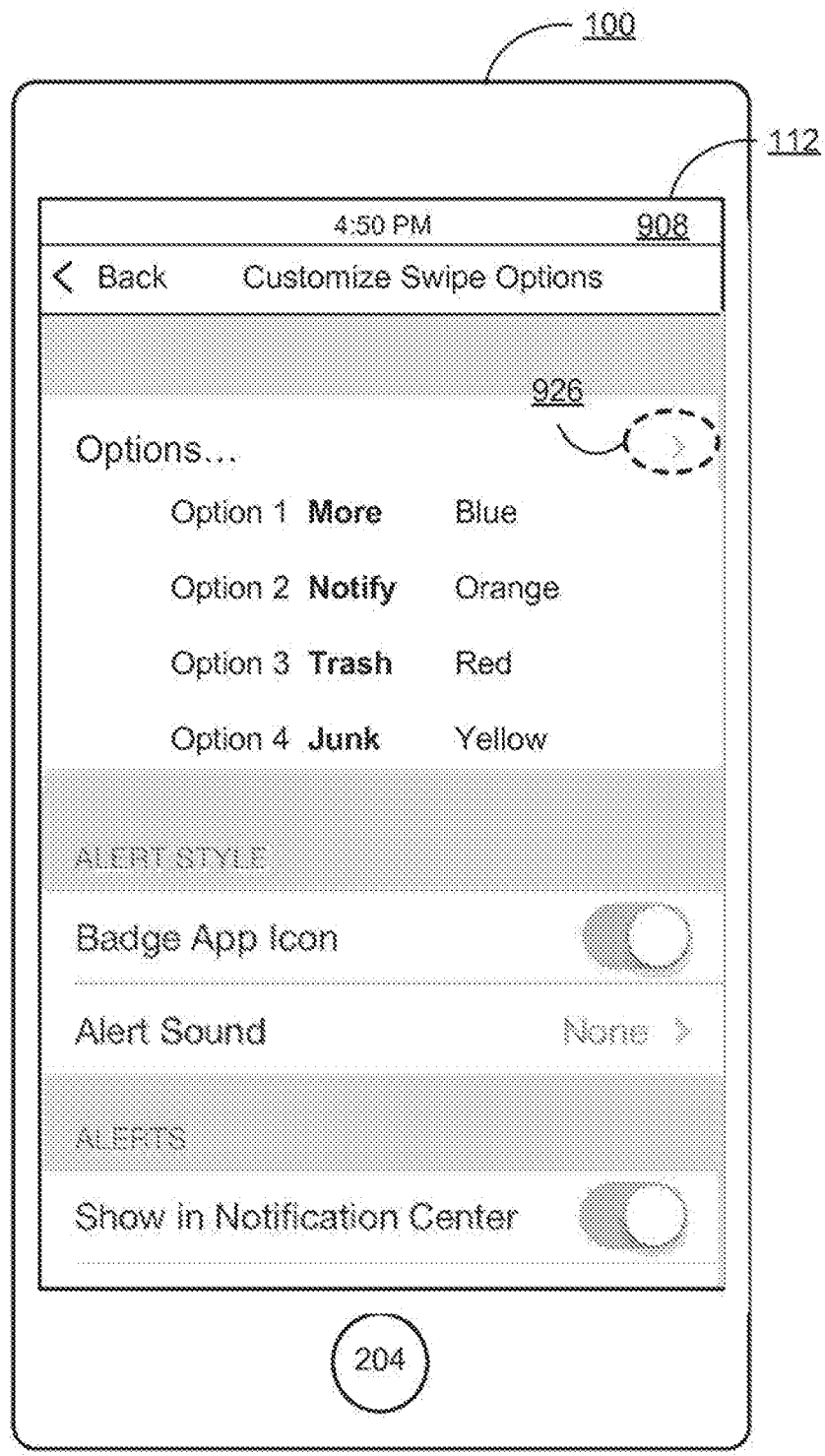
Figure 9E:
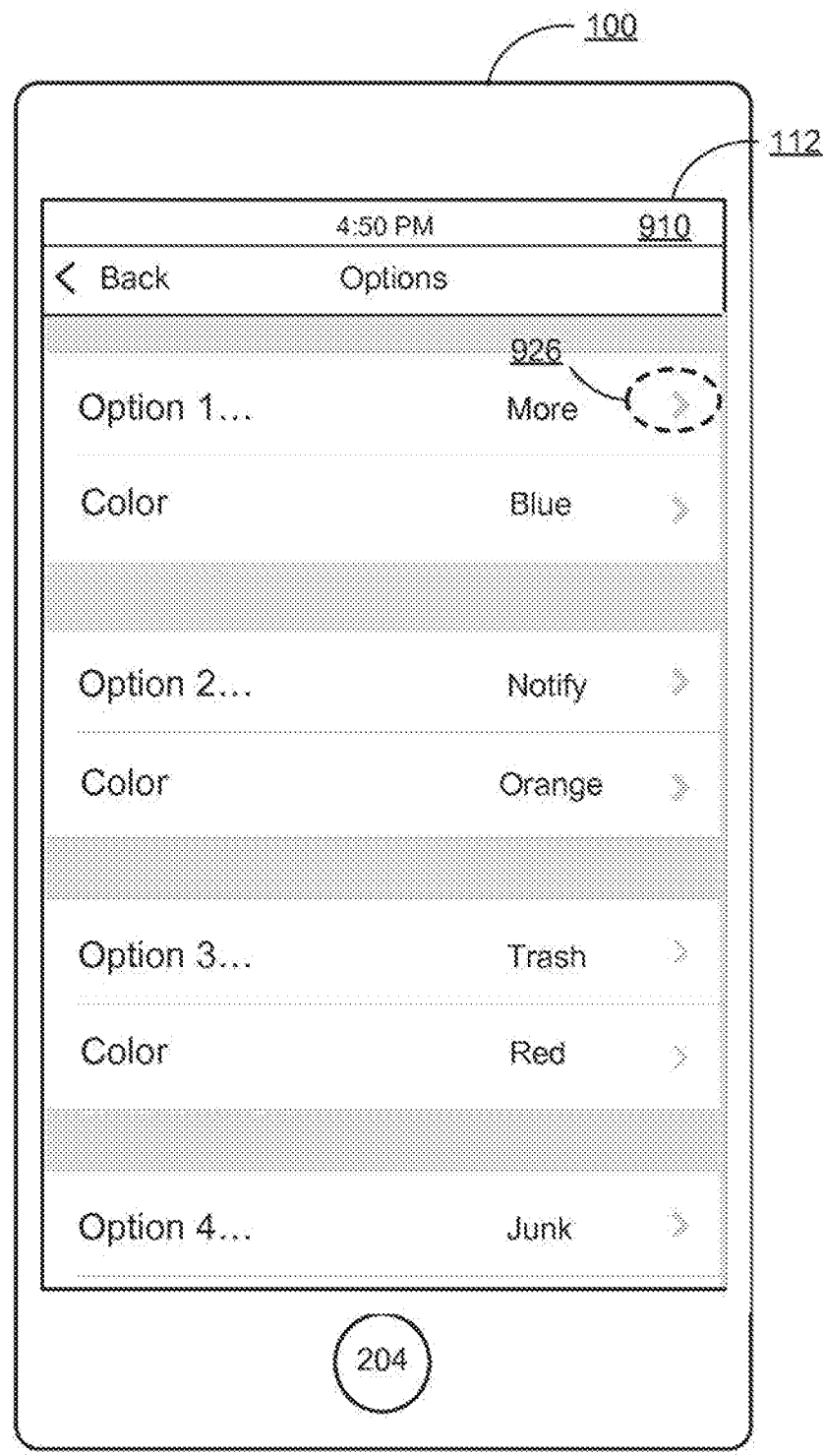
Figure 9F:
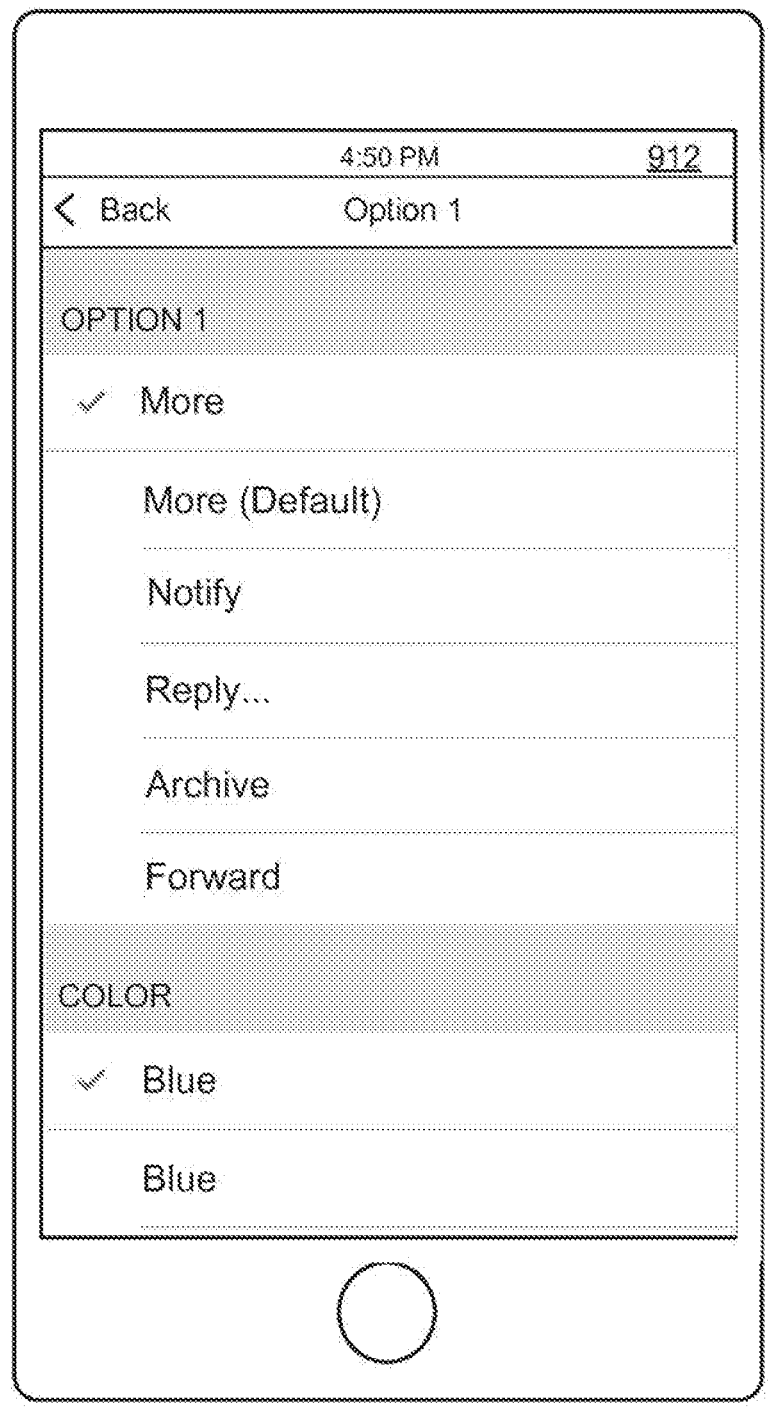

FIG. 9A illustrates an "expand" gesture in a notification center 902 associated with the settings application. In one embodiment, the expand gesture includes a tap on a representation of the "Mail" icon 418, shown as contact 926 in FIG. 9A. Responsive to the expand gesture, a mail page 904 is displayed in the settings application, as shown in FIG. 9B. In the mail page 904, the user can select whether to activate swipe options (e.g., options in swipe options 528, the expanded swipe option 628, the swipe option 728) in the email application through, as an example, selection of a radio button. Responsive to contact 926 with the radio button, a customize option may become available as shown in the modified mail page 906 in FIG. 9C according to one embodiment. Responsive to an expand gesture detected by the device 100 for the customize option, for example through contact 926 with the customize option, a customize swipe options page 908 is displayed in the settings application. The customize swipe options page 908 includes an option to customize the options and customize alert settings associated with swipe options. Responsive to an expand gesture detected by the device 100 for options, for example through contact 926 with options, an options page 910 is displayed in the settings application, as shown in FIG. 9E. In the options page 910, one or more of the options (e.g., options in the swipe options 528, the expanded swipe option 628, the swipe option 728) can be customized or may have a default option. Features of the options can be customized as well such as color. For example, the more option 528A can be blue, the notify option 528B can be orange, the trash option 528C can be red, and the junk option can be yellow. Responsive to the expand gesture detected by the device 100 for option 1, for example through contact 926 of the option 1 option, an option 1 page 912 is displayed in the settings application as shown in FIG. 9F.

Method for Swipe Options in an Email Client Module UI

Figure 10:
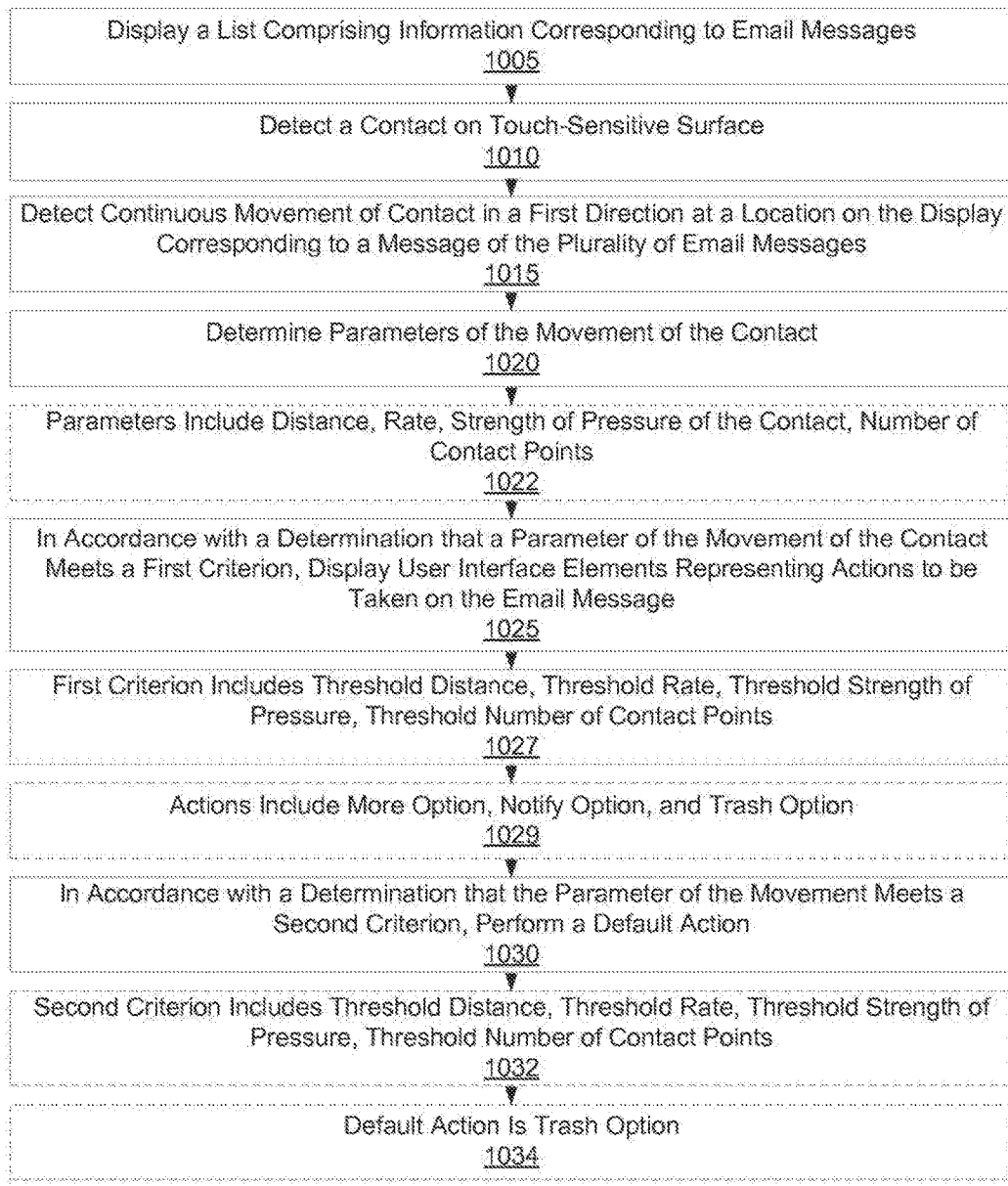
FIG. 10 is a flowchart of a method for displaying one or more swipe options in an email application, according to one embodiment.

FIG. 10 is a flowchart of a method for displaying one or more swipe options in an email application, according to one embodiment. Embodiments of the process described here may be implemented on an electronic device with a touch-sensitive surface and display, such as device 100.

A list comprising information corresponding to a plurality of email messages is displayed 1005. The list includes portions of email messages of email threads, as described previously in conjunction with FIG. 5B. Information includes sender information, subject information, and a portion of the email. In addition, information can include indicators such as an attachment indicator, a VIP sender indicator, and a VIP thread indicator.

A contact 526 on the touch-sensitive surface is detected 1010. Continuous movement of the contact 526 in a first direction, without breaking contact with the touch-sensitive surface, is detected 1015 at a location on the display corresponding to a message of the plurality of email messages, as shown previously in FIGS. 5C, 5D, and 5E. The location on the display corresponding to the message of the plurality of email messages can be a row displaying the portion of the message, as shown in the rows displaying portions of email messages of email threads 506 in FIGS. 5-7. Depending on the direction of the continuous movement, displayed user interface elements can vary. For example, a first direction can display swipe options 528 and/or the expanded swipe option 628 and a second direction can display the swipe option 728 and/or additional options.

One or more parameters of the movement of the contact are determined 1020. Parameters of the movement of the contact 526 include 1022 distance, rate, strength of pressure of the contact 526, number of contact points, or any other measurable parameter of the contact 526 and its movement, as described previously in FIGS. 5, 6, and 7.

In accordance with a determination that a parameter of the movement meets a first criterion, a plurality of user interface elements representing actions to be taken on the email message is displayed 1025. User interface elements representing actions to be taken are selectable and include 1029 options displayed in the swipe options 528, the expanded swipe option 628, or swipe options 728. For example, the swipe options 528 include a more option 528A, a notify option 528B, and a trash option 528C. In one embodiment, the default action or expanded swipe option 628 is 1034 an option (e.g., trash option 528C) in the swipe options 528. The options displayed in the swipe options 528, the expanded swipe option 628, and swipe options 728 can be default actions or personalized by a user as described in conjunction with FIG. 9. The options can be customized based on color (e.g., color coded based on category where red is for delete or the trash option 528C, orange is for flag or the notify option 528B, and blue is for additional options such as the more option 528A), action associated with the option, graphical indications, or any combination thereof. Criteria, such as the first criterion, of parameters include 1027 various threshold distances, threshold rates, threshold strengths of pressure of the contact 526, threshold numbers of contact points, or any other suitable threshold for a parameter.

In some embodiments, the plurality of user interface elements is displayed 1025 or visually slides out from a side (e.g., right) continuously and/or proportionally to a distance or a normalized distance reached by the contact 526 or based on the first criterion. Thus, as a result, the portion of the email message of the email thread displayed in the row associated with the plurality of user interface elements being displayed is slid off the display in the direction of the continuous movement and can be slid off simultaneously as the plurality of user interface elements slide into view on the row. In one embodiment, if the first criterion is not met, the plurality of user interface elements are not displayed 1025. In the embodiment in which the plurality of user interface elements slide out from a side continuously and/or proportionally to a distance or a normalized distance reached by the contact 526, if the first criterion is not met, the plurality of user interface elements rubber band back to the side and are not displayed. In some embodiments, the plurality of user interface elements collapse to a thin line along the bottom of the row displaying a portion of an email message of an email thread that also displays the plurality of user interface elements. In one embodiment, if contact is maintained by the user, whether the first criterion is met, for longer than a threshold duration, the plurality of user interface elements are not displayed, rubber band back and disappear, or collapse to a thin line.

In accordance with a determination that the parameter of the movement meets a second criterion different from the first criterion, a default action is performed 1030 on the email message. Criteria, such as the first criterion and second criterion, of parameters include various threshold distances (e.g., a threshold distance of the first criterion is less than a threshold distance of the second criterion), threshold rates, threshold strengths of pressure of the contact 526, threshold numbers of contact points, or any other suitable threshold for a parameter, as described previously. In some embodiments, the default action is not performed 1030 until a user selects the displayed default action, such as the expanded swipe option 628. For example, a user interface element associated with the default action is displayed across the entire row displaying a portion of an email message of an email thread 506. The user interface element, according to one embodiment, is the trash option 528C.

The default action can be displayed, in one embodiment, or slide out from the side (e.g., right, same as the side the plurality of user interface elements is displayed 1025) continuously and/or proportionally to a distance or a normalized distance reached by the contact 526, based on the second criterion, or only if the second criterion is met. In the embodiment in which the user interface element associated with the default action slides out from a side continuously and/or proportionally to a distance or a normalized distance reached by the contact 526, if the second criterion is not met, the plurality of user interface elements rubber band back to the displayed plurality of user interface elements (e.g., swipe options 528) or no options are displayed. In some embodiments, the user interface element associated with the default action collapses to a thin line along the bottom of the row displaying a portion of an email message of an email thread that also displays the plurality of user interface elements. In one embodiment, if contact is maintained by the user, whether the second criterion is met, for longer than a threshold duration, the user interface element is not displayed, rubber bands back to the previously displayed plurality of user interface elements, rubber bands and disappears, or collapses to a thin line.

The displayed user interface elements are selectable and, in some embodiments, upon selection of a user interface element, a sheet is displayed including additional user interface elements associated with additional actions to take on the message. If a user interface element associated with the default action (e.g., trash option 528C) is selected, a prompt is displayed requesting confirmation of the selection. Upon receiving confirmation of the selection of the user interface element associated with the default action, a sheet including additional user interface elements associated with additional actions to take on the message is also displayed.

VIP Threads in an Email Client Module UI and Gestures

Figure 11A:
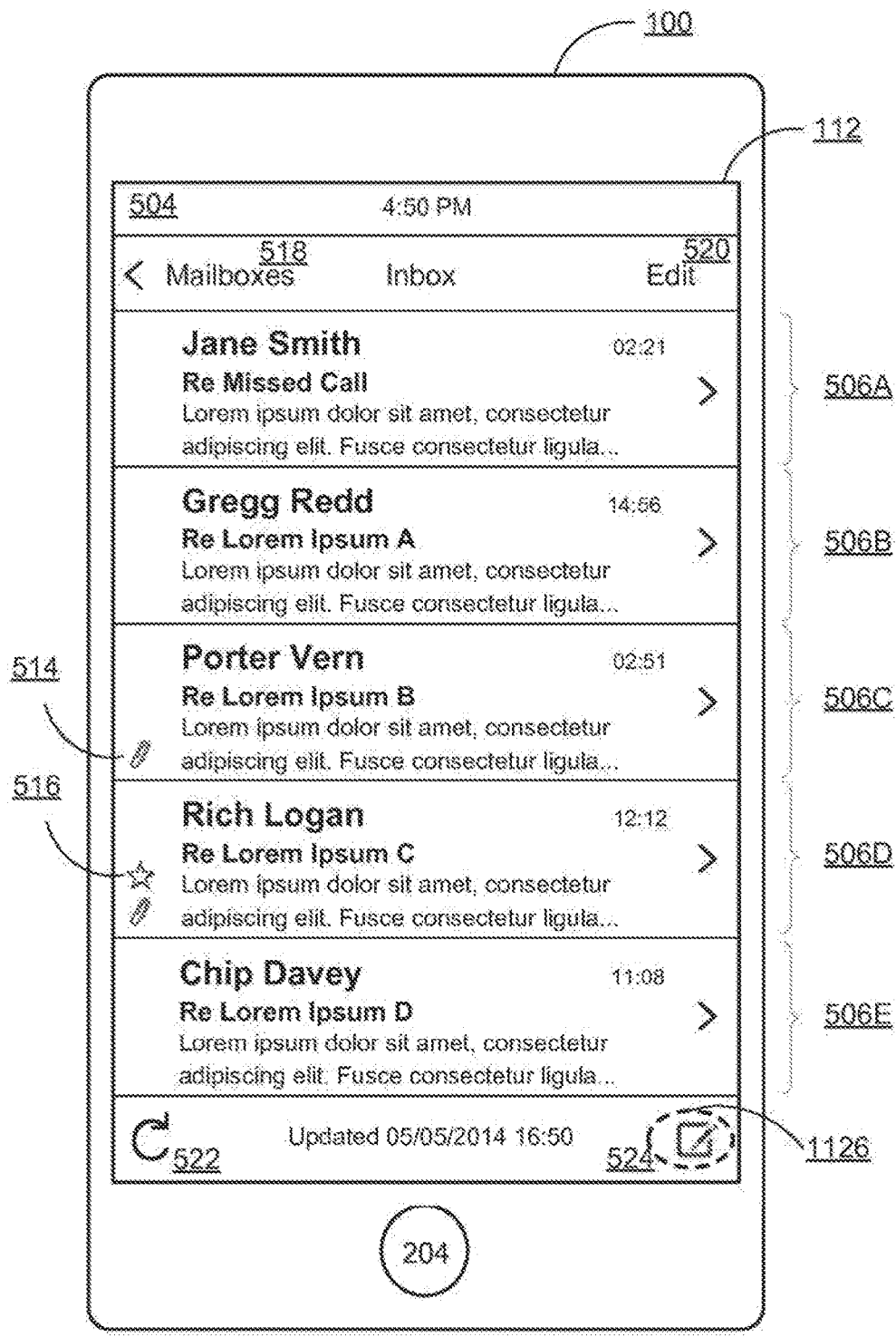
FIGS. 11A, 11B, 11C, 11D, and 11E illustrate states of a notification element for email threads in an email application, according to one embodiment.
Figure 11B:
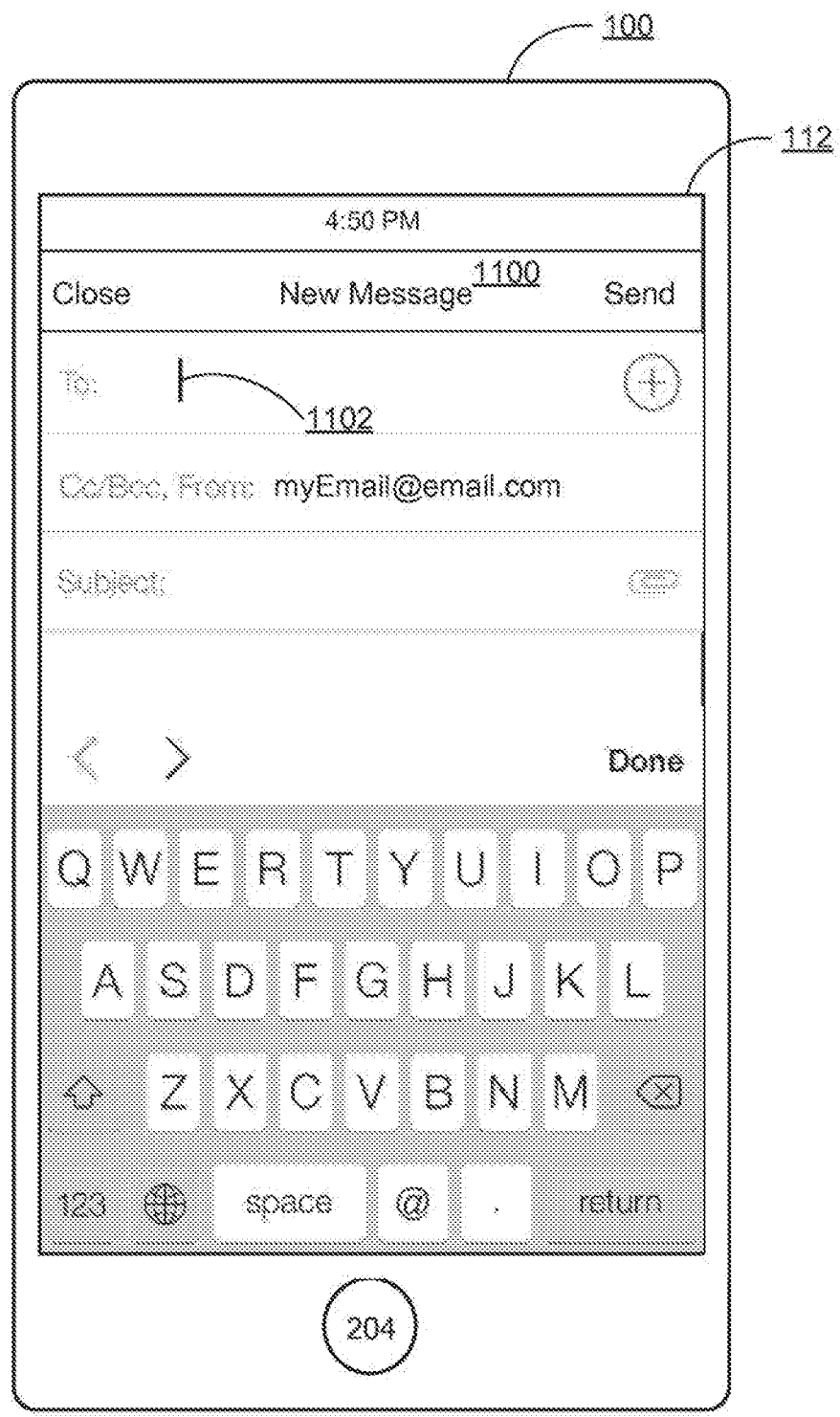

An email thread can be assigned a higher priority than other email threads by a user through indicating the email thread as a VIP thread. FIG. 11A illustrates a mail application view 504 of an email application, according to one embodiment. The mail application view 504 displays email messages of email threads 506A, 506B 506C, 506D, 506E from the inbox of the user's email account, as described in FIG. 5. FIG. 11A also illustrates receiving a gesture indicative of a request to draft a new email and open a composition interface. For example, the draft gesture includes a contact 1126 detected by the device 100 on the new draft element 524. Responsive to the detected contact 1126, a message composition interface or draft user interface (UI) 1100 is shown, for example as illustrated in FIG. 11B. By default, a cursor 1102 can appear on the draft UI 1100, e.g., in the "To" line as a default.

Figure 11C:
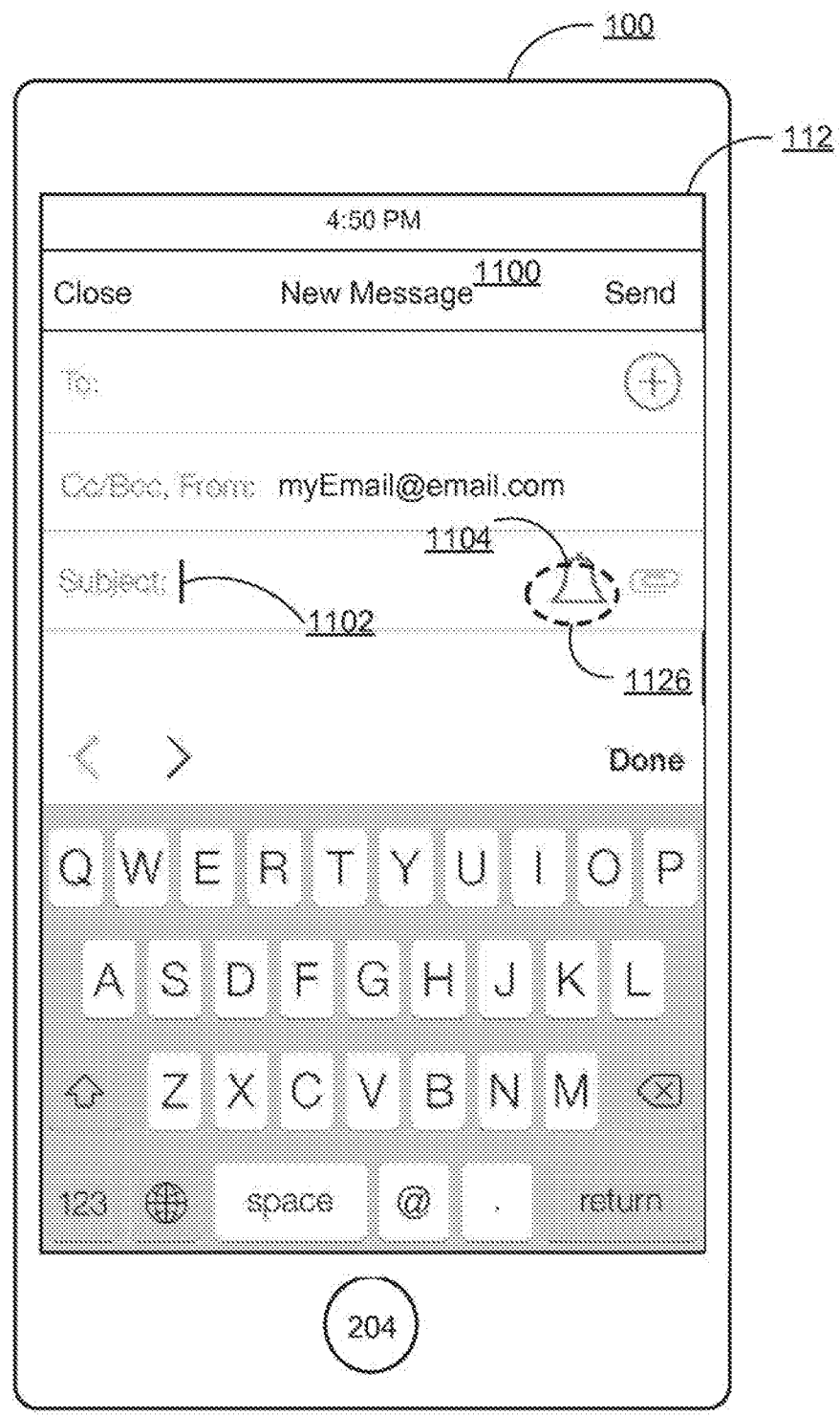
Figure 11D:

FIG. 11C illustrates the cursor 1102 in the subject line of the draft UI 1100. When the cursor 1102 is in the subject line, a notification element 1104 appears or is visually distinguished, for example, from its previous state (not shown) in FIG. 11B. In the example shown, the notification element 1104 is an outline of a bell in blue, but may be any other suitable element. Other suitable elements include different objects, different visual characteristics (e.g., color, shape, size, location, style), or any combination thereof. Upon selection of the notification element 1104 as shown by the contact 1126 in FIG. 11C, the notification element 1104 is updated to appear visually distinguished from its previous state. The notification element can be visually distinguished as a different object, having a different visual characteristic (e.g., color, shape, size, location, style), or any combination thereof. For example, the notification element 1104 is now a bell shaded blue, shown in FIG. 11D.

Figure 11E:

FIG. 11E illustrates the cursor 1102 in the body of the draft UI 1100 and, responsive to the cursor 1102 no longer in the subject line of the draft UI 1100, the notification element 1104 appears visually distinguished again from its previous state. The notification element visually distinguished, as above. As shown in FIG. 11E, the notification element 1104 is now a striped bell. In one embodiment, the notification element 1104 can be a bell shaded grey. Additional embodiments include the notification element 1104 as visually distinguished, as above.

Figure 11F:
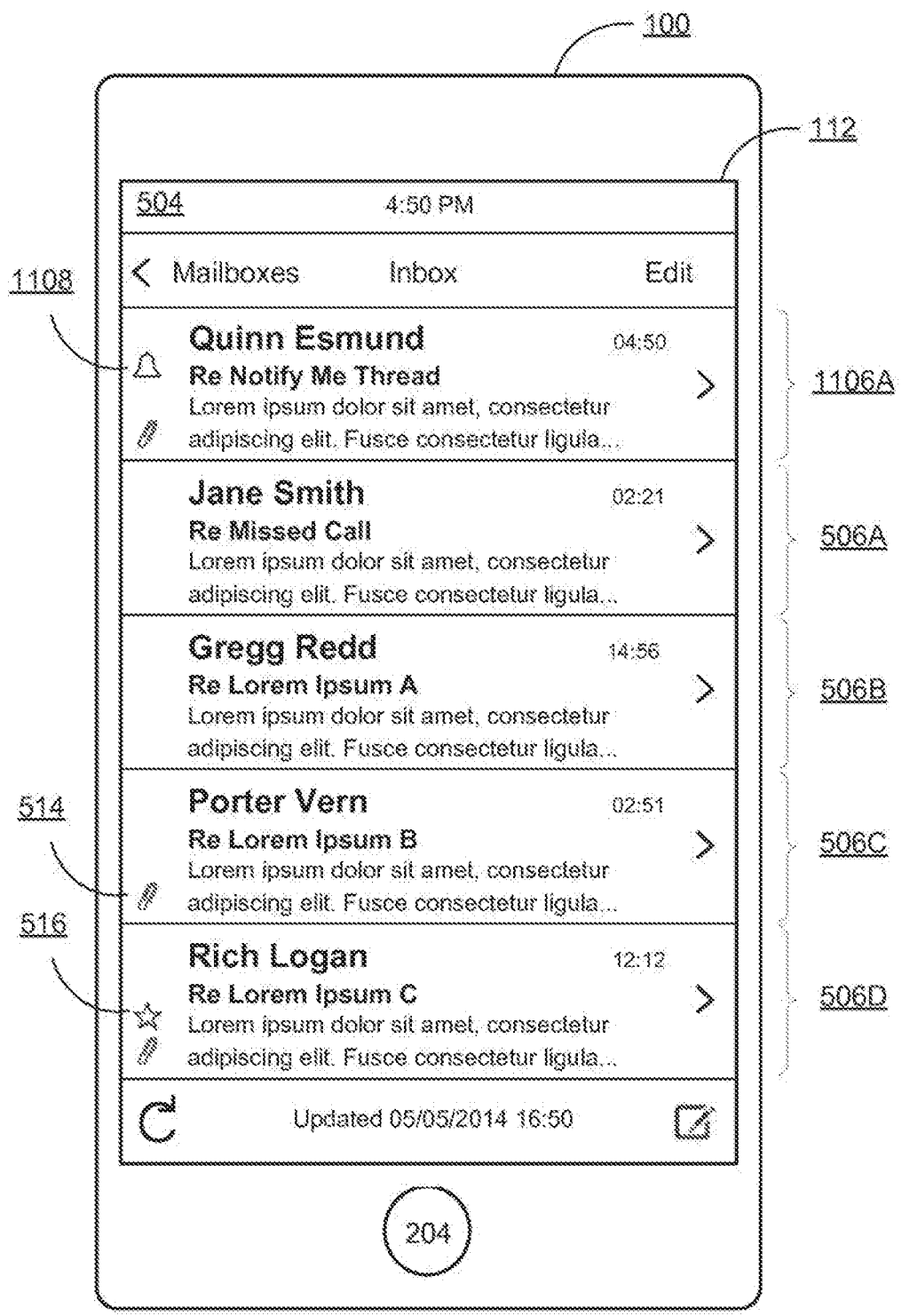
FIG. 11F illustrates a gesture for associating a notification element with a new email in an email application, according to one embodiment.

Future emails or email messages received in the email thread 1106A include a VIP thread indicator 1108 as shown in FIG. 11F, indicating the selection of the notification element 1104 for the email thread 1106A. For example, the email message in the email thread with the subject line "Notify Me Thread," also shown in FIG. 11E, is now a VIP thread. Selection of the notification element 1104 or associating an email thread as a VIP thread changes notification rules for replies to messages of the email thread. A notification rule includes displaying a VIP thread indicator 1108 for subsequent messages of the email thread.

Figure 12:
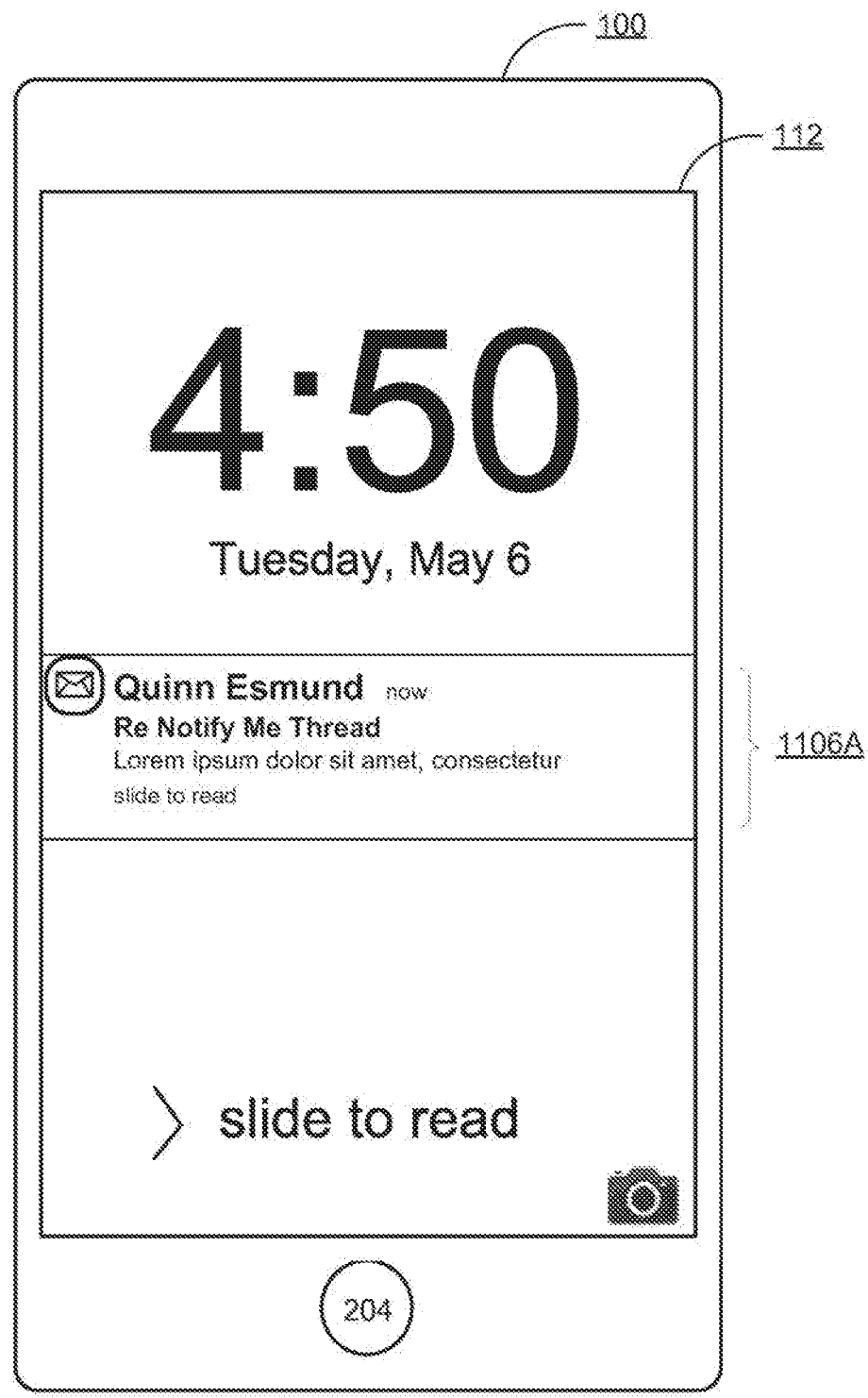
FIG. 12 illustrates a push notification for an email thread associated with a notification element, according to one embodiment.
Figure 13A:
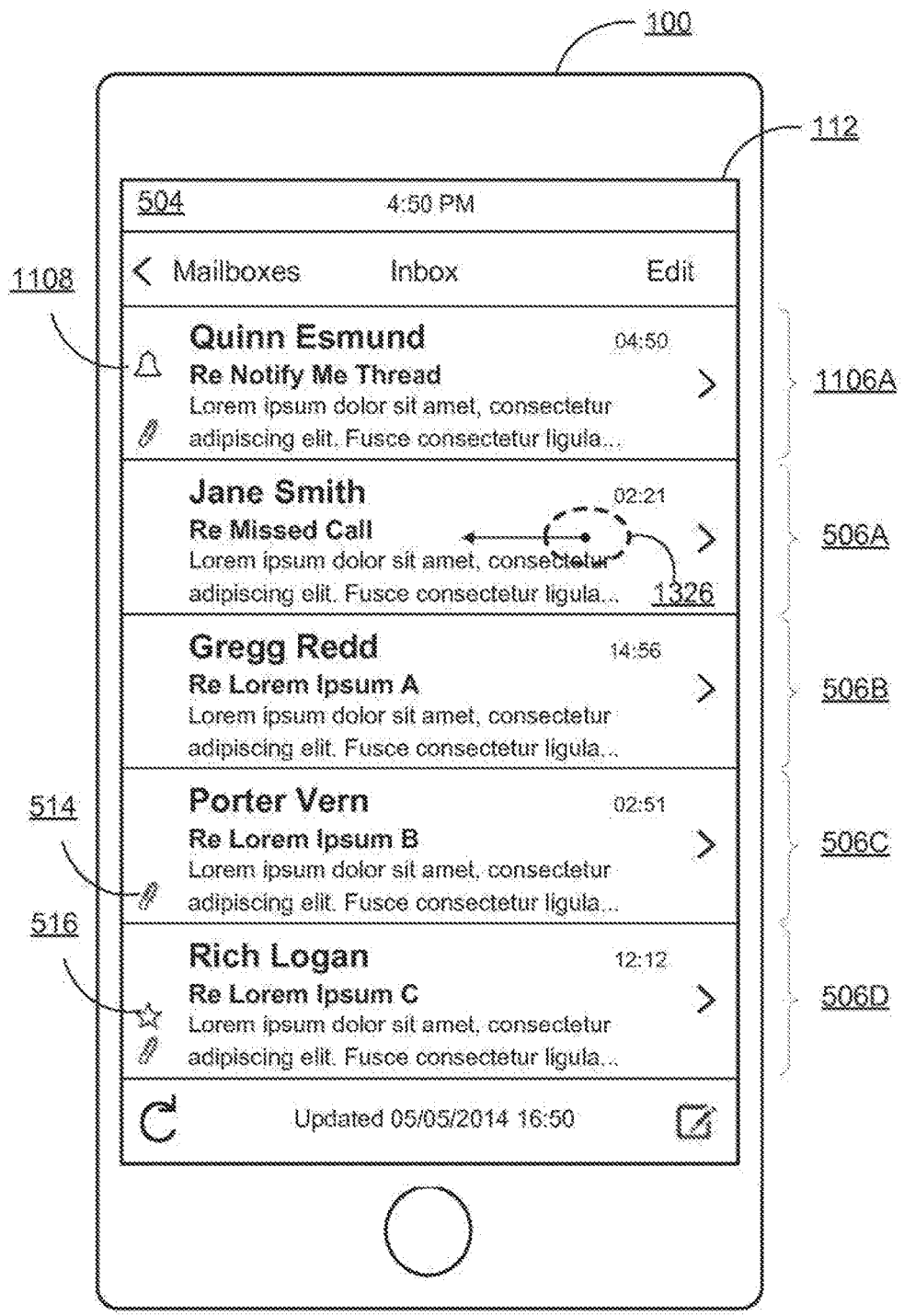
FIGS. 13A, 13B, 13C, and 13D illustrate a gesture for associating a notification element with an existing email thread in an email application, according to one embodiment.
Figure 13B:
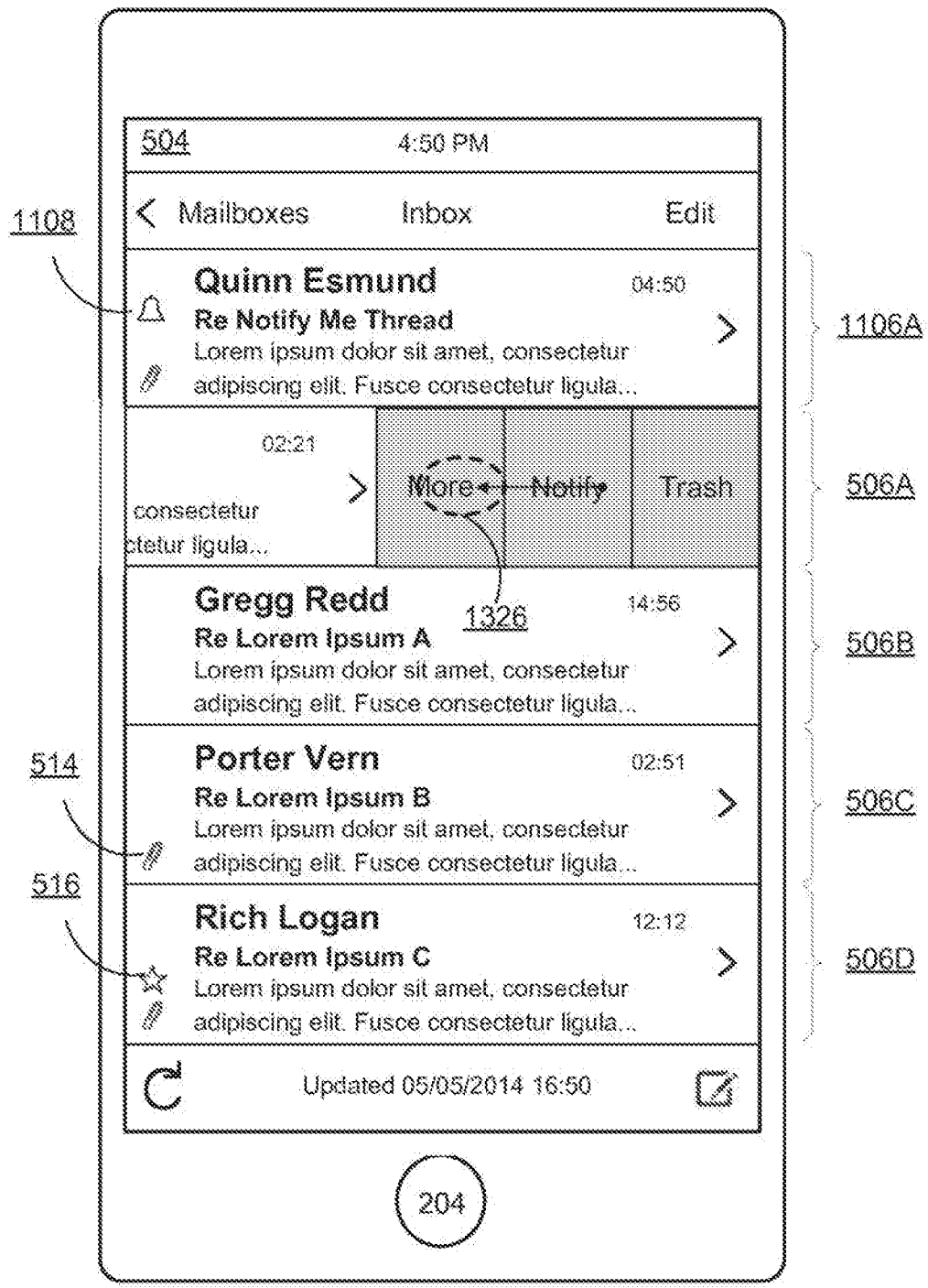
Figure 13C:
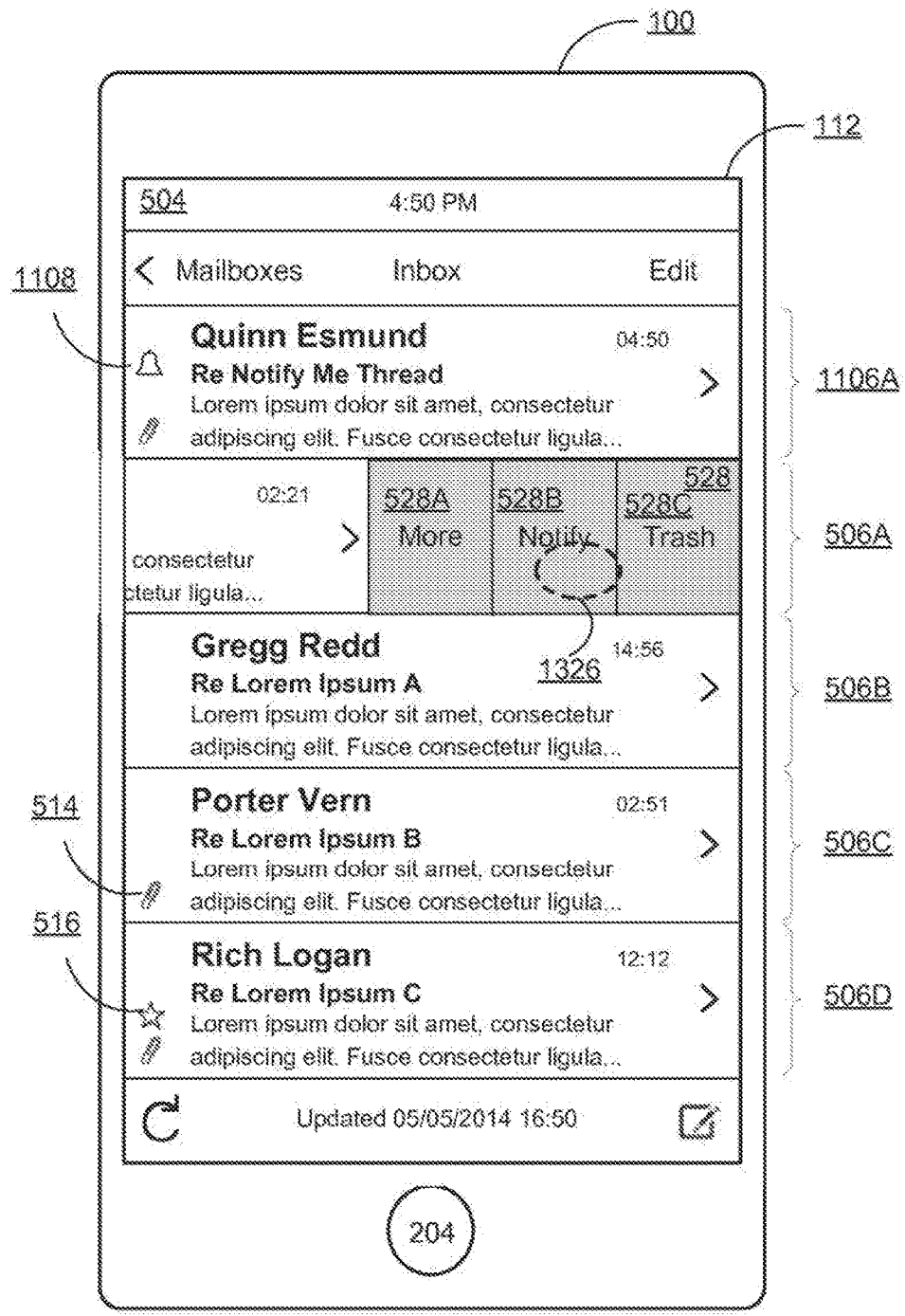
Figure 13D:
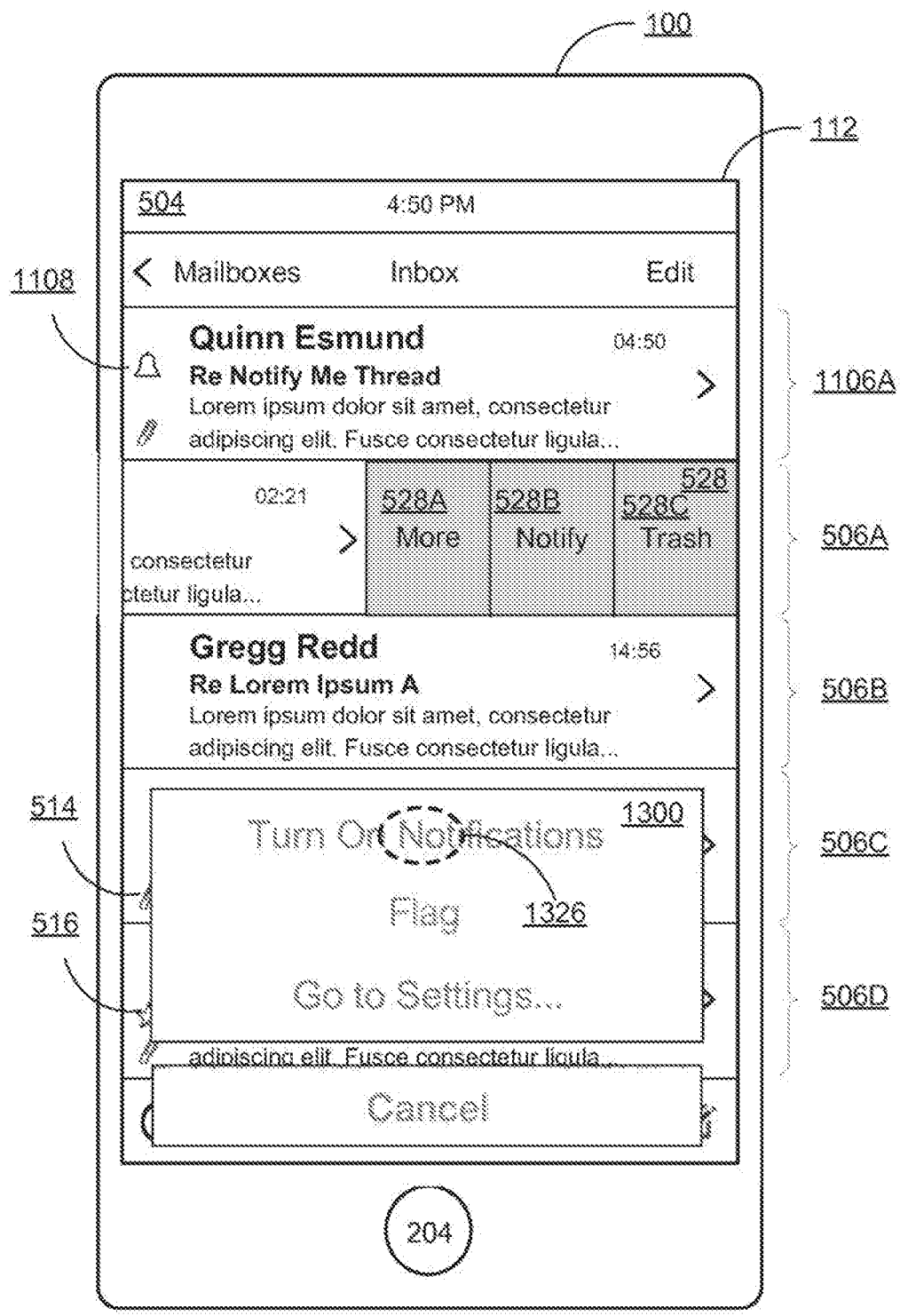

In addition to the VIP thread indicator 1108, additional notification rules include a user associated with the account receiving push notifications for the email thread with the VIP thread indicator 1108, as shown in FIG. 12 or any other configured notification type. FIG. 12 illustrates a locked or initial screen of the device 100, according to an embodiment. The message portion 1106A is shown on the locked or initial screen. In one embodiment, the message portion 1106A can include a VIP thread indicator 1108 (not shown). VIP of Existing Threads in an Email Client Module UI and Gestures Though previously described in the context of drafting a new email, existing email threads 1106, 506 can be associated with a VIP Thread indicator 1108 as well. As shown in FIG. 13A, an existing email thread 506A is not currently associated with a VIP thread indicator 1108. The user can display sheet options 528 for the email thread 506A using a display gesture as previously described in FIG. 5 with contact 1326. Responsive to completion of the display gesture or once the threshold distance or rate is reached as shown in FIG. 13B, the sheet options 528 appear to the right of the message portion 506A, according to this embodiment. In this embodiment, the sheet options 528 include a notify option 528B. Upon selection of the notify option 528B such as through a sheet gesture as previously described in FIG. 8, as shown by contact 1326 with the notify option 528B or user interface element associated with the notify option 528B in FIG. 13C, a sheet 1300 is displayed for the notify option 528B. In one embodiment, the sheet 1300 includes the following actions to take with the message portion 506A or the message associated with the message portion 506A: notify me, flag, go to settings, and cancel. The included actions can be customized by the user of the device 100 through a settings application of the device 100, further described in conjunction with FIG. 17. As shown in FIG. 13D, a user can select a "turn off notifications" action, shown by contact 1326 with the turn off notifications action in the sheet 1300, to associate the email thread 506A with a notification element 1104 and, consequently, a VIP thread indicator 1108.

Figure 14A:
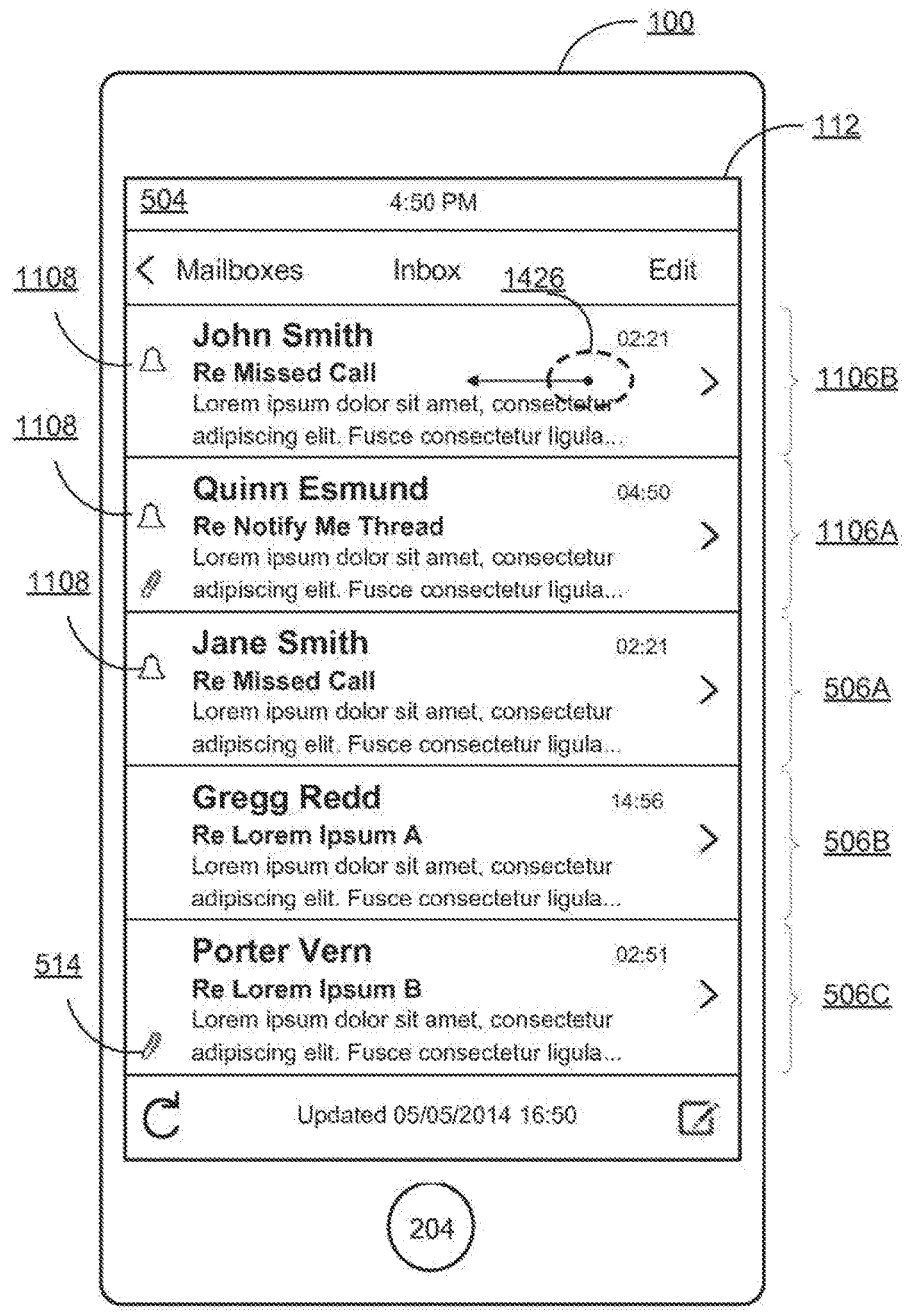
FIGS. 14A, 14B, 14C, 14D, and 14E illustrate a gesture for de-associating a notification element with an existing email thread in an email application, according to one embodiment.
Figure 14B:
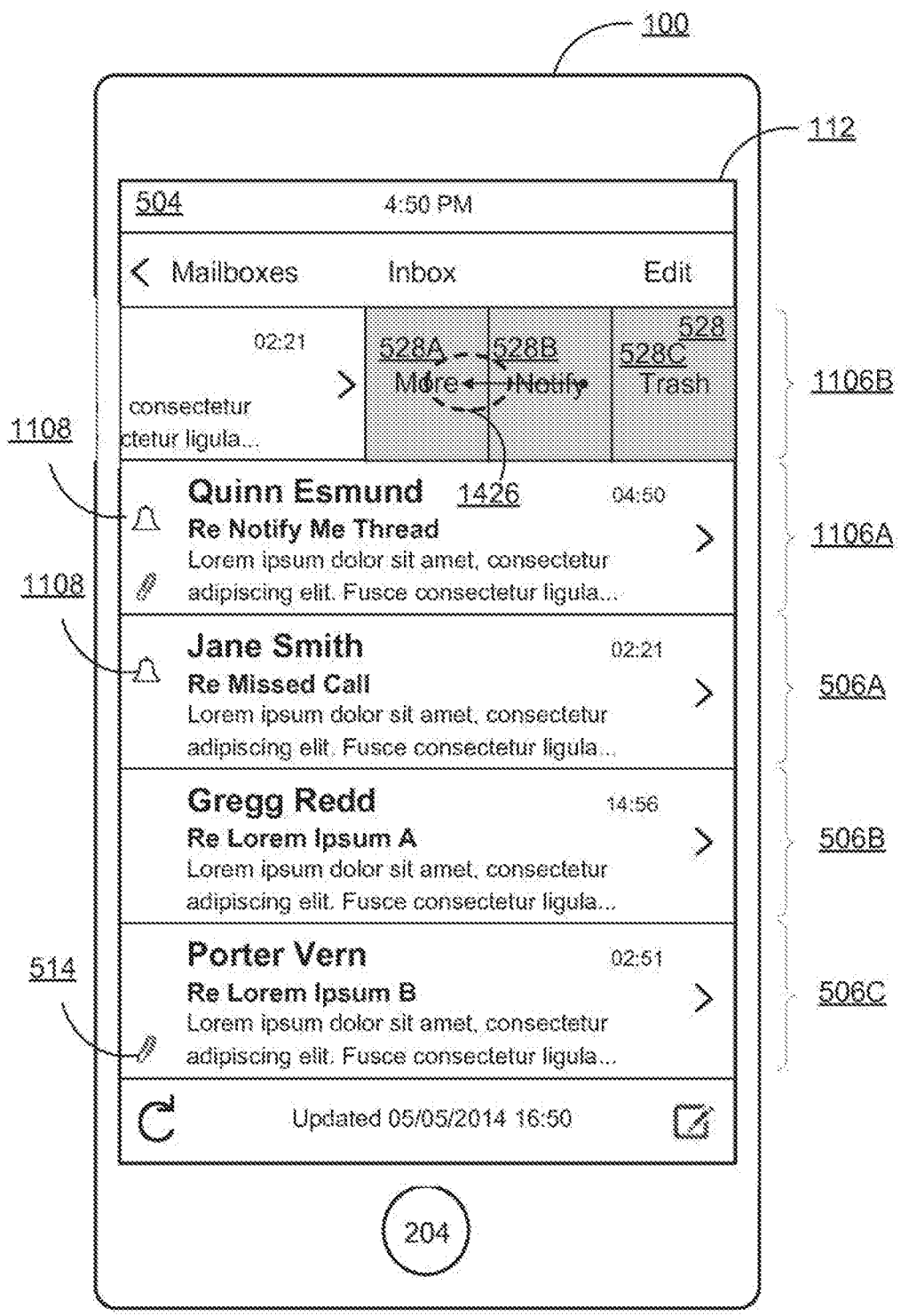
Figure 14C:
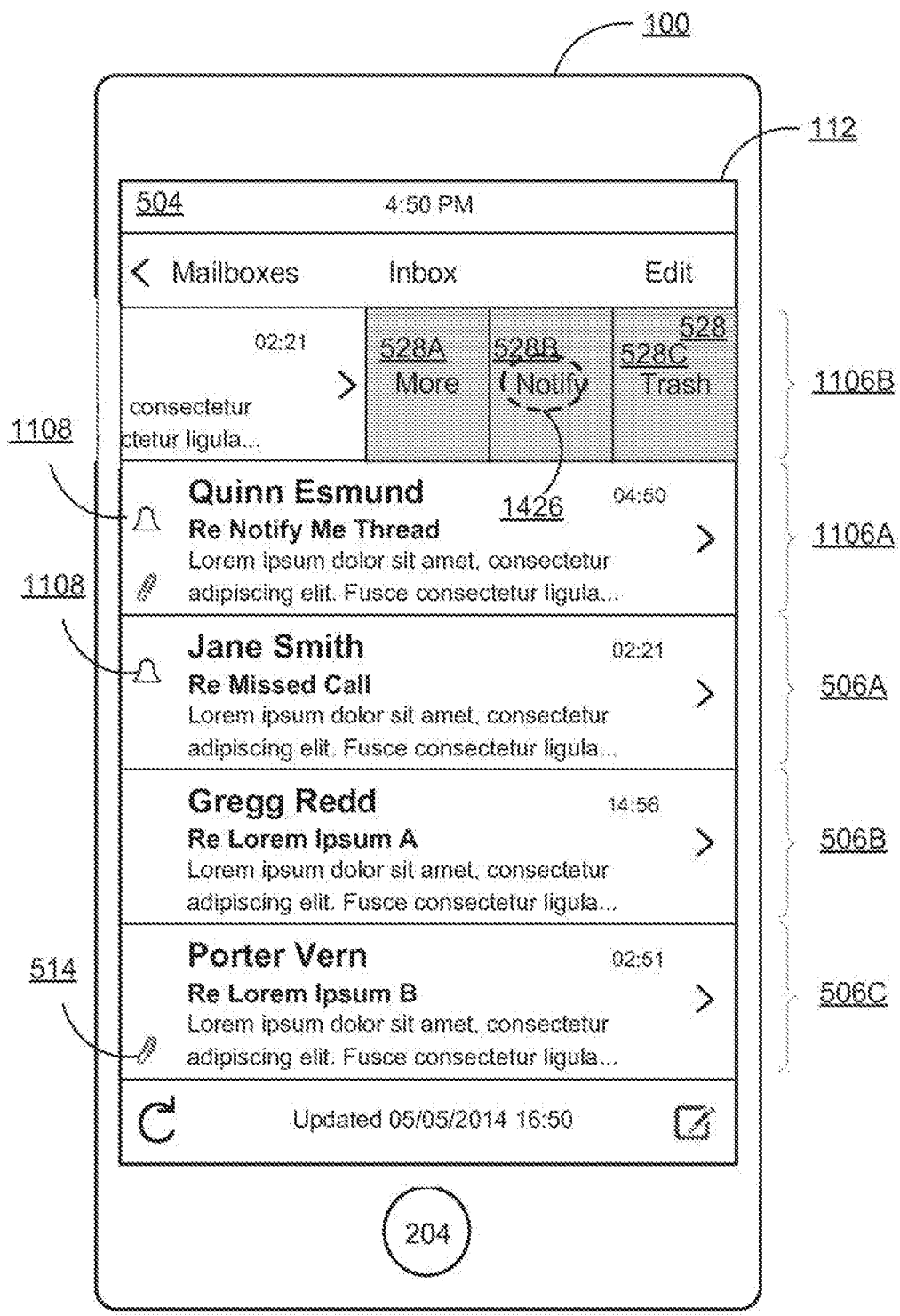
Figure 14D:
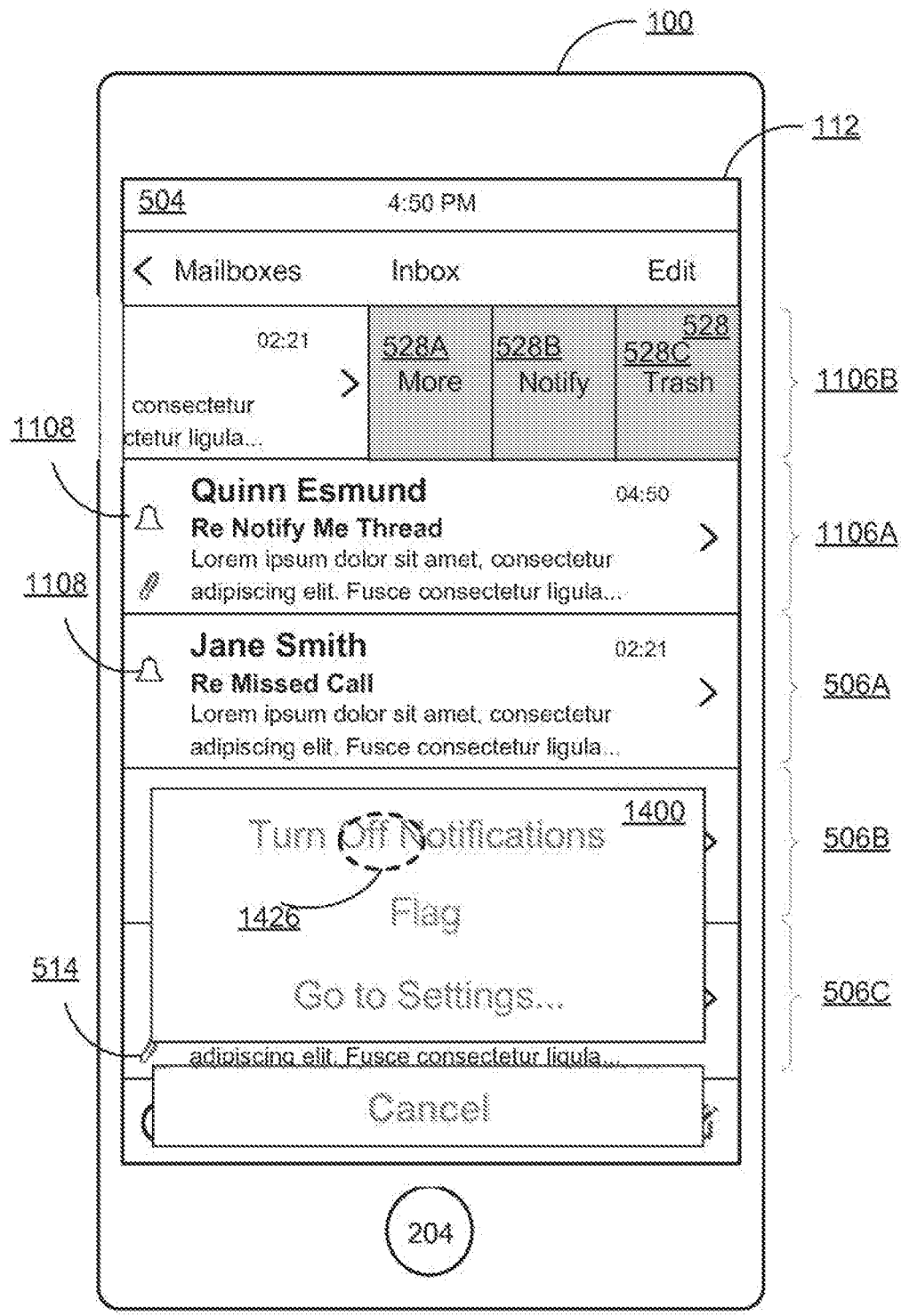
Figure 14E:
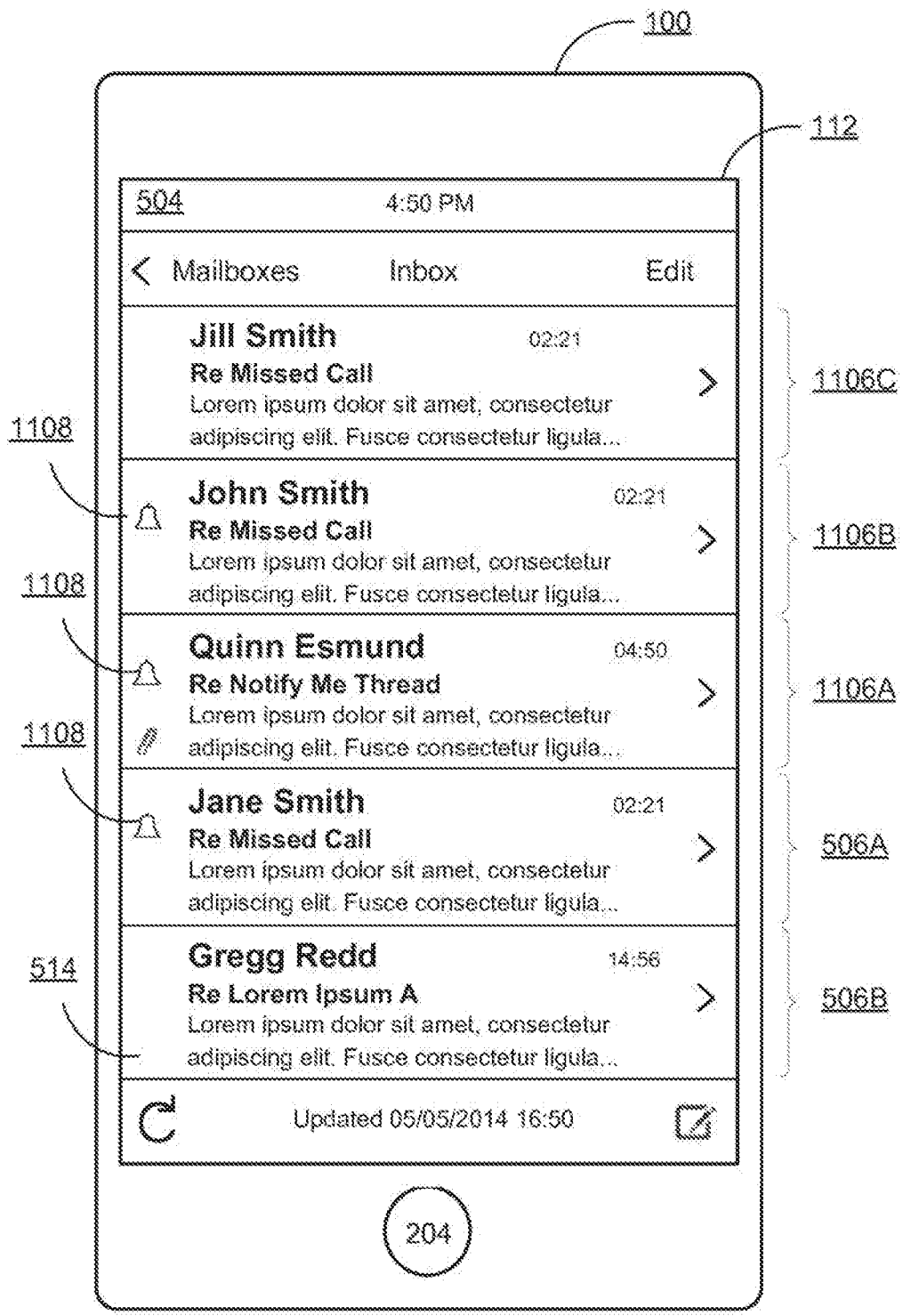

Responsive to selection of the turn off notifications action in the sheet 1300 in FIG. 13D, the email thread 506A and any future messages associated with the email thread 506A, such as a message portion 1106B, no longer include a VIP thread indicator 1108. In a similar manner as described in FIG. 13, an email thread 1106B can also be de-associated with a VIP thread indicator 1108. The user can display sheet options 528 and a sheet 1400 associated with the notify option 528B using the display gesture and the sheet gesture with contact 1426, shown in FIGS. 14A, 14B, and 14C in a similar manner as described in FIGS. 5, 6, and 13. If the email thread 1106B is already associated with a VIP thread indicator 1108, the sheet 1400 can display different actions from the actions shown in the sheet 1300. For example, as shown in FIG. 14D, the sheet 1400 includes the following actions to take with the email thread 1106B: turn off notifications, flag, go to settings, and cancel. Again, the included actions can be customized by the user as described previously in FIG. 13. As shown in FIG. 14D, a user can select the "turn off notifications" action, shown by contact 1426 with the turn off notifications action in the sheet 1400, to de-associate the email message or future email messages in the email thread 1106B from the VIP thread indicator 1108. As shown in FIG. 14E, past email messages associated with the email thread 506A, such as the message portion 1106B, can still have the VIP thread indicator 1108 and future emails, such as the message portion 1106C, do not have the VIP thread indicator 1108. In an alternative embodiment, the email message associated with the message portion 1106B, the email thread 1106C, the email thread 506A, or any combination thereof can be de-associated with the notification element 1104.

Method for VIP Threads in an Email Client Module UI

Figure 15:
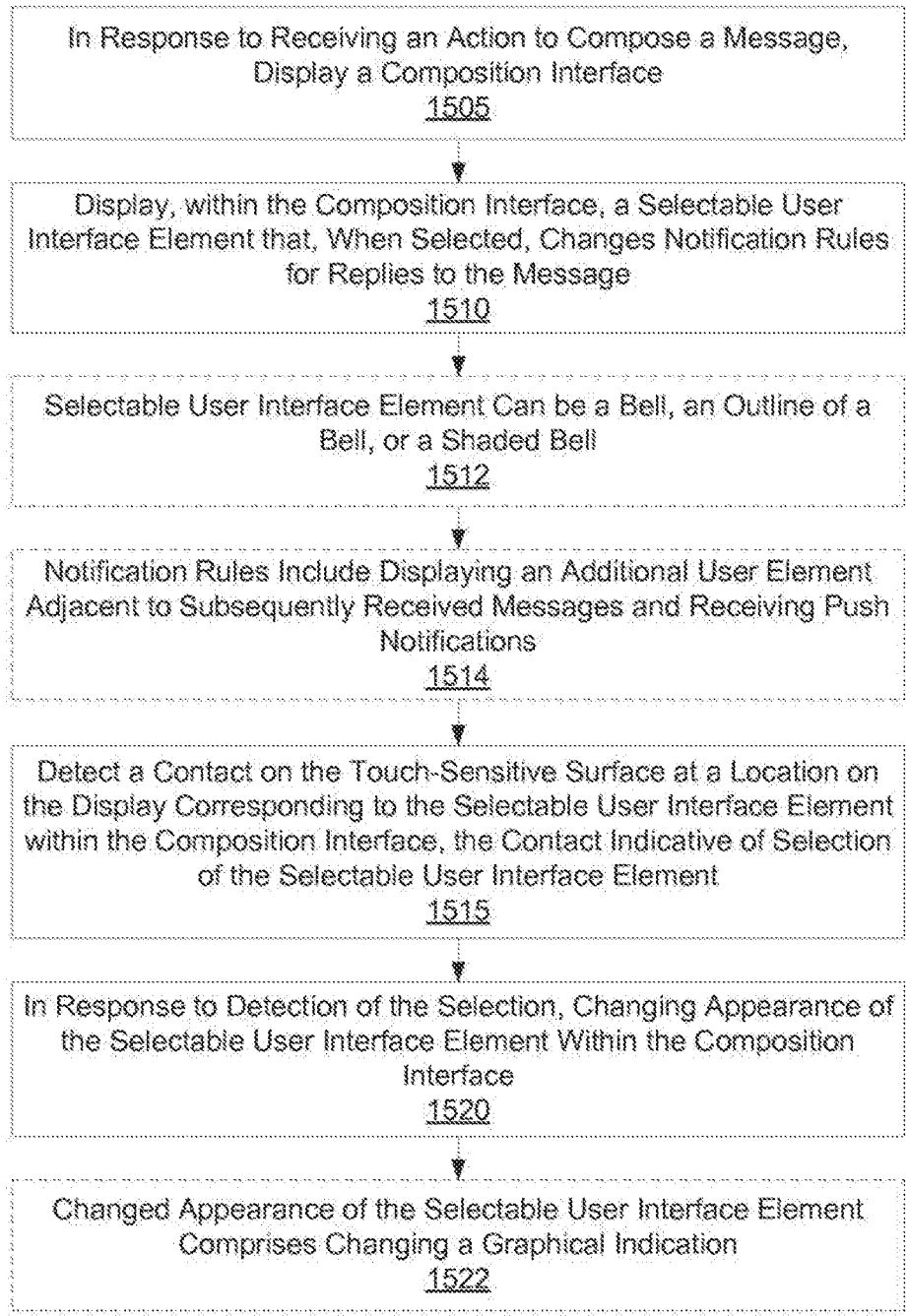
FIG. 15 is a flowchart of a method for associating a notification element with an email thread in an email application, according to one embodiment.

FIG. 15 is a flowchart of a method for associating a notification element 1104 with an email thread 506, 1106 in an email application, according to one embodiment. Embodiments of the process described here may be implemented on an electronic device with a touch-sensitive surface and display, such as device 100. Within a messaging application of the electronic device, in response to receiving an action to compose a message, a composition interface is displayed 1505 in the messaging application. For example, the action can be contact 1126 of an additional user interface element (e.g., new draft element 524) and contact with the additional user interface element is indicative of displaying the composition interface. The composition interface is an interface for drafting a new message in the email application.

Within the composition interface, a selectable user interface element is displayed 1510 that, when selected, changes notification rules for replies to the message. In one embodiment, the selectable user interface element displayed is 1512 a bell, an outline of a bell, a shaded bell, or any other suitable graphically altered bell. Alternative embodiments of the selectable user interface element are described further in conjunction with FIGS. 11E and 11F. In one embodiment, the selectable user interface element is displayed on a subject line of the composition interface. For example, the selectable user interface element can appear or be visually distinguished from a previously displayed selectable user interface element (e.g., grey outline of a bell) in response to indication of a cursor in the composition interface in the subject line, as shown in FIG. 11C.

Notification rules include 1514 displaying an additional user interface adjacent to subsequently received messages in the conversation thread corresponding to the message, receiving push notifications for subsequently received messages in the conversation thread corresponding to the message, and any combination thereof, as further described in conjunction with FIGS. 11E and 11F. The additional user interface element displayed adjacent to subsequently received messages can be a bell, an outline of a bell, a shaded bell and any other visually distinguished elements as described in conjunction with FIG. 11D. In one embodiment, the conversation notification can be the same as the displayed selectable user interface element but the conversation notification is not selectable.

A contact 1126 on the touch-sensitive surface is detected 1515 at a location on the display corresponding to the selectable user interface element within the composition interface. The contact 1126 is indicative of selection of the selectable user interface element. In response to detection of the selection, an appearance of the selectable user interface element is changed 1520 within the composition interface to indicate the activation of a notification rule that a subsequently received message in a conversation or email thread corresponding to the message will trigger a conversation notification, as described in conjunction with FIG. 13A. A changed appearance of the selectable user interface element within the composition interface further comprises 1522 changing a graphical indication of the selectable user interface element. Graphical indications include color, shape, size, location, and any combination thereof of the selectable user interface element. The conversation notification can be a push notification indicative of a subsequently received message on the electronic device outside the messaging application. In addition, the push notification can be displayed when the electronic device is locked and the display is inactive.

In a similar method as described previously in conjunction with FIG. 10, a user interface element can be displayed for subsequently received messages associated with the message composed. An additional contact is detected on the touch-sensitive surface and, without breaking contact with the touch-sensitive surface, continuous movement of the contact in a first direction at a location on the display corresponding to messages associated with the message is detected. One or more parameters of the movement of the contact are determined and, in accordance with a determination that a parameter of the movement meets a first criterion, a user interface element representing an action to change notification rules for replies to the message (e.g., notify me option 528B), is displayed. Then, the user interface element representing the action to change notification rules can be selected.

Figure 16A:
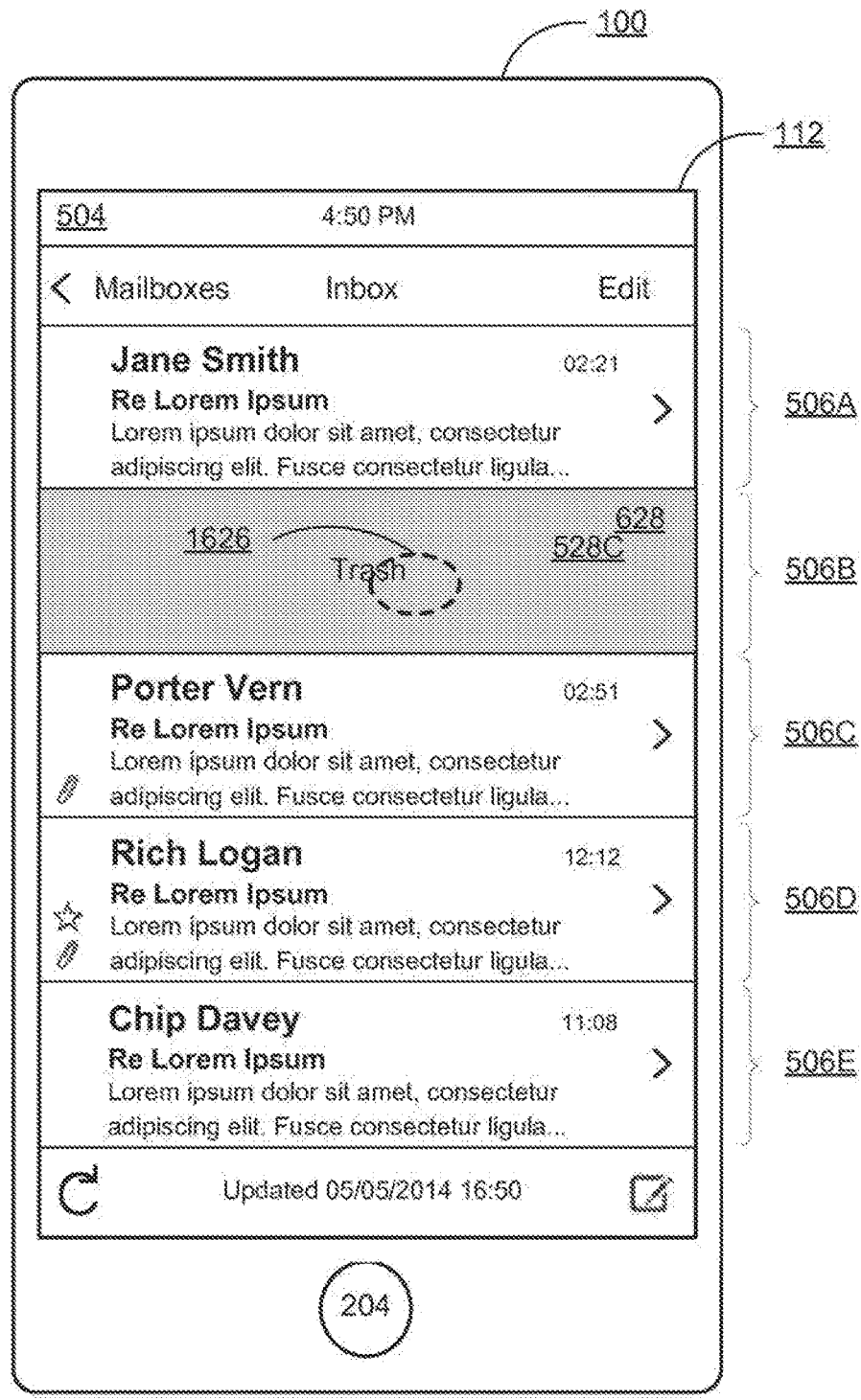
FIG. 16A illustrates a gesture for selecting an expanded swipe option in an email application, according to one embodiment.
Figure 16B:
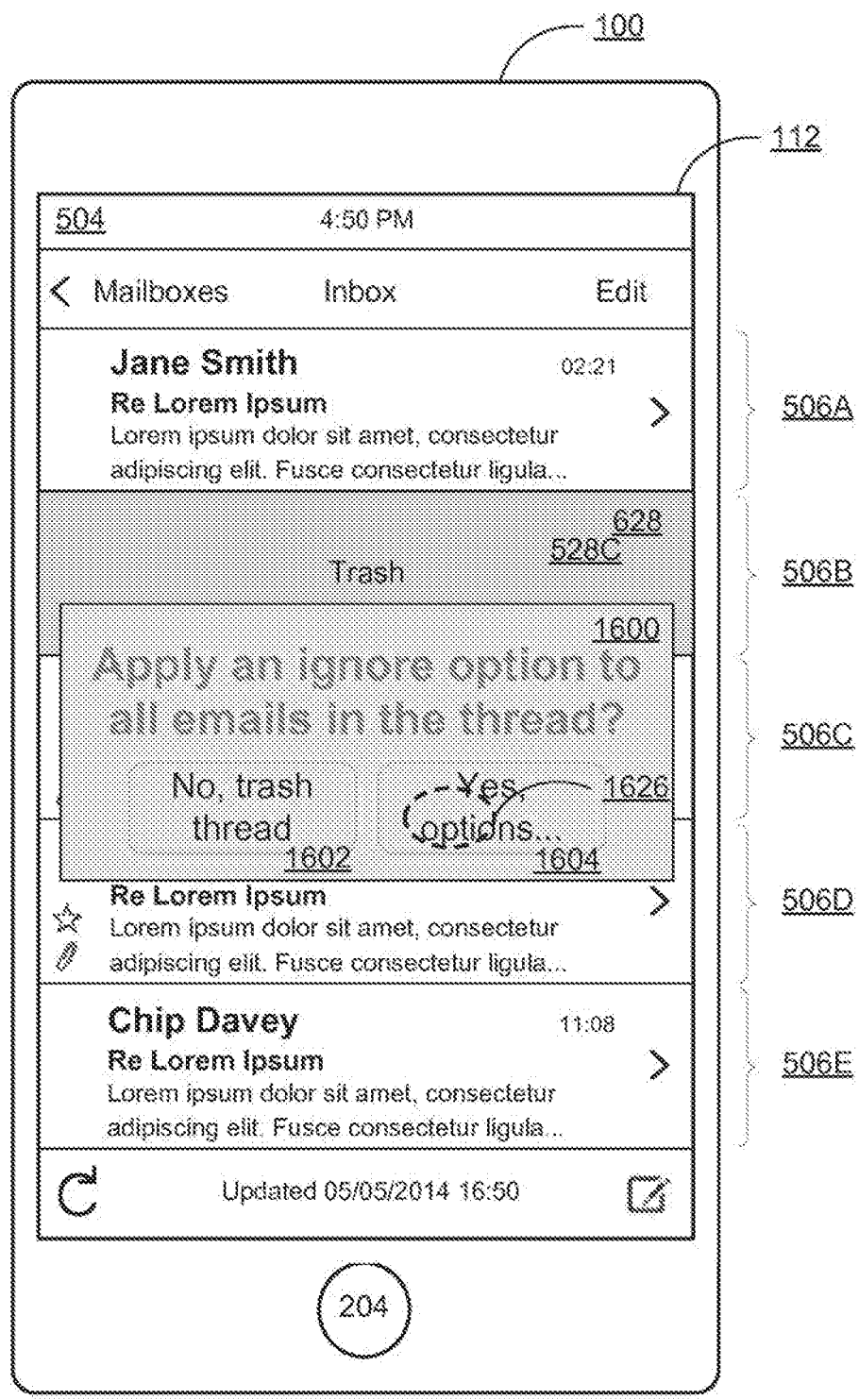
FIG. 16B illustrates a prompt in response to selection of an expanded swipe option in an email application, according to one embodiment.
Figure 16C:
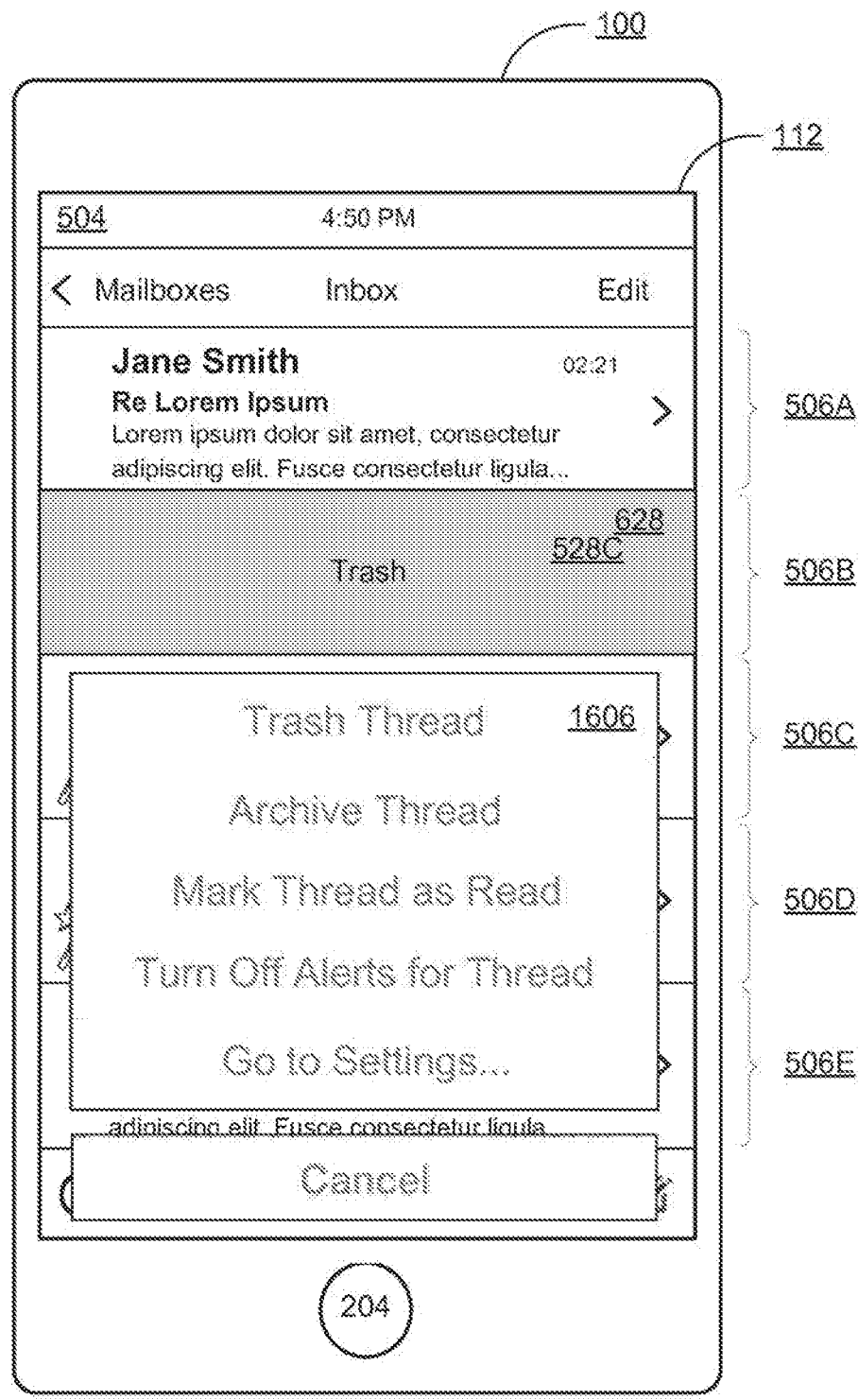
FIG. 16C illustrates a sheet for additional options associated with the expanded swipe option in an email application, according to one embodiment.

Selection of the user interface element representing the action to change notification rules results in changed notification rules that are different or opposite of the notification rules described above. For example, the notification rules include not displaying an additional user element adjacent to subsequently received messages in the conversation thread corresponding to the message, not receiving push notifications for subsequently received messages in the conversation thread corresponding to the message, and any combination thereof. Alternatively, selection of the user interface element can display a sheet 1300 and 1400 for additional actions to change notification rules, as described in conjunction with FIGS. 13 and 14. The additional actions displayed on the sheet include turning off notifications for subsequently received messages, flagging subsequently received messages, a go to settings action, and any combination thereof Ignoring Threads in an Email Client Module UI and Gestures Email threads 506 also can be ignored. As shown in FIG. 16A, illustrated is a gesture for selecting an expanded swipe option 628 in an email application, according to one embodiment. For example, the sheet gesture with contact 1626 is the sheet gesture as described previously in FIGS. 8 and 14. In the example, the expanded swipe option 628 is the trash option 528C. In one embodiment, the expanded swipe option 628 is only available or offered if the email thread includes multiple email messages. In one embodiment, a prompt 1600 is displayed responsive to completion of the sheet gesture or once the threshold distance or rate is reached, as shown in FIG. 16B. The prompt 1600 prompts the user to select to trash the email message associated with a message portion 506B or apply ignore options instead, shown as buttons 1602 and 1604 respectively. Selection of the button 1602 with contact 1626 moves the email associated with the message portion 1106B into the trash. In an alternative embodiment, the email associated with the message portion 1106B may automatically be trashed after completion of the sheet gesture or once the threshold distance or rate is reached and no prompt, an alternative prompt, or a sheet 1606 can be displayed. Selection of the button 1604 with contact 1626 displays a sheet 1606 for ignore options, as shown in FIG. 16C. The sheet 1606 includes the following ignore options: trash thread, archive thread, mark thread as read, turn off alerts for thread, go to settings, and cancel. The included ignore options can be customized by the user as described further in conjunction with FIG. 17.

Just as email threads can be ignored, email threads can also be un-ignored. In one embodiment, the email thread can be un-ignored manually (e.g., through the expanded sheet option 628) or automatically. For example, the email thread can be automatically un-ignored if a reengage condition is met such as a VIP sender replies to the email thread, the sender replies to the user only, the user's name is mentioned in an email message of the email thread, or any other user-specific information appears in the email thread.

Customization of Ignore Options in an Email Client Module UI

FIGS. 17A-D illustrate pages 1702, 1704, 1706, and 1708 in an application view of a settings application, according to one embodiment. FIG. 17 describes customizing the ignore options in sheet 1606. In alternative embodiments, different application(s) other than the setting application or different page(s) in the settings application can be used to customize the ignore options in sheet 1606.

Figure 17A:
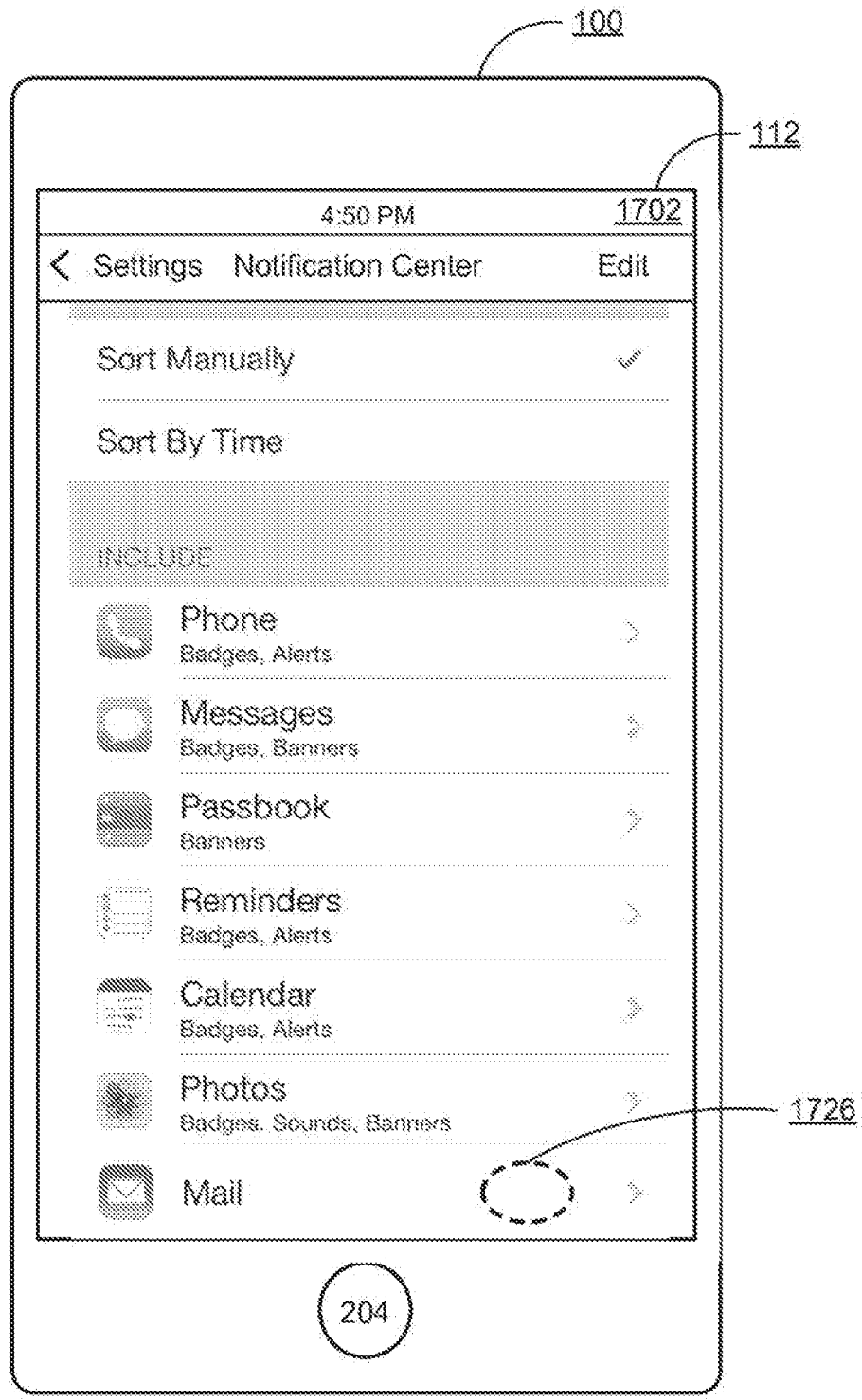
FIGS. 17A, 17B, 17C, and 17D illustrate pages in an application view of a settings application, according to one embodiment.
Figure 17B:
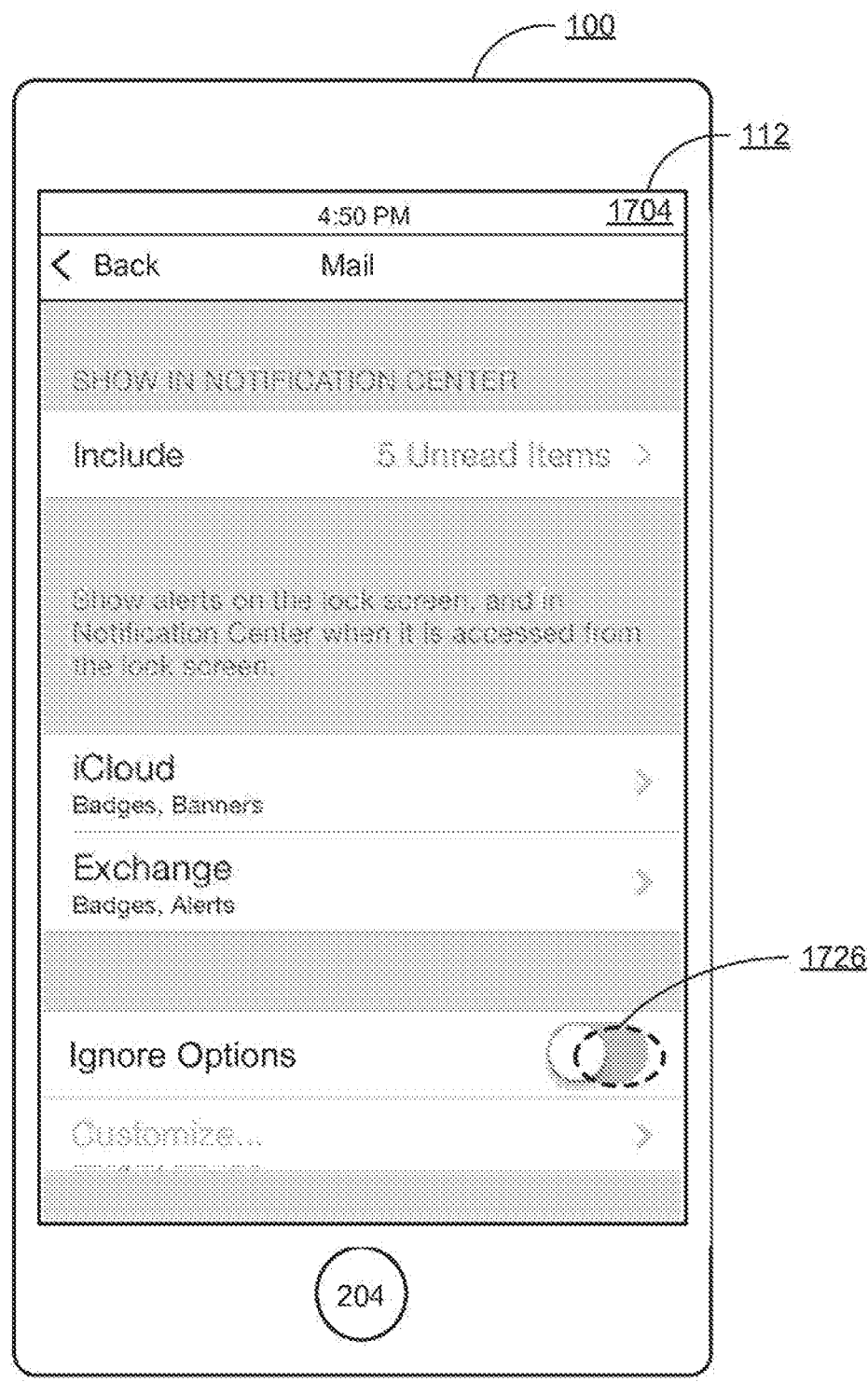
Figure 17C:
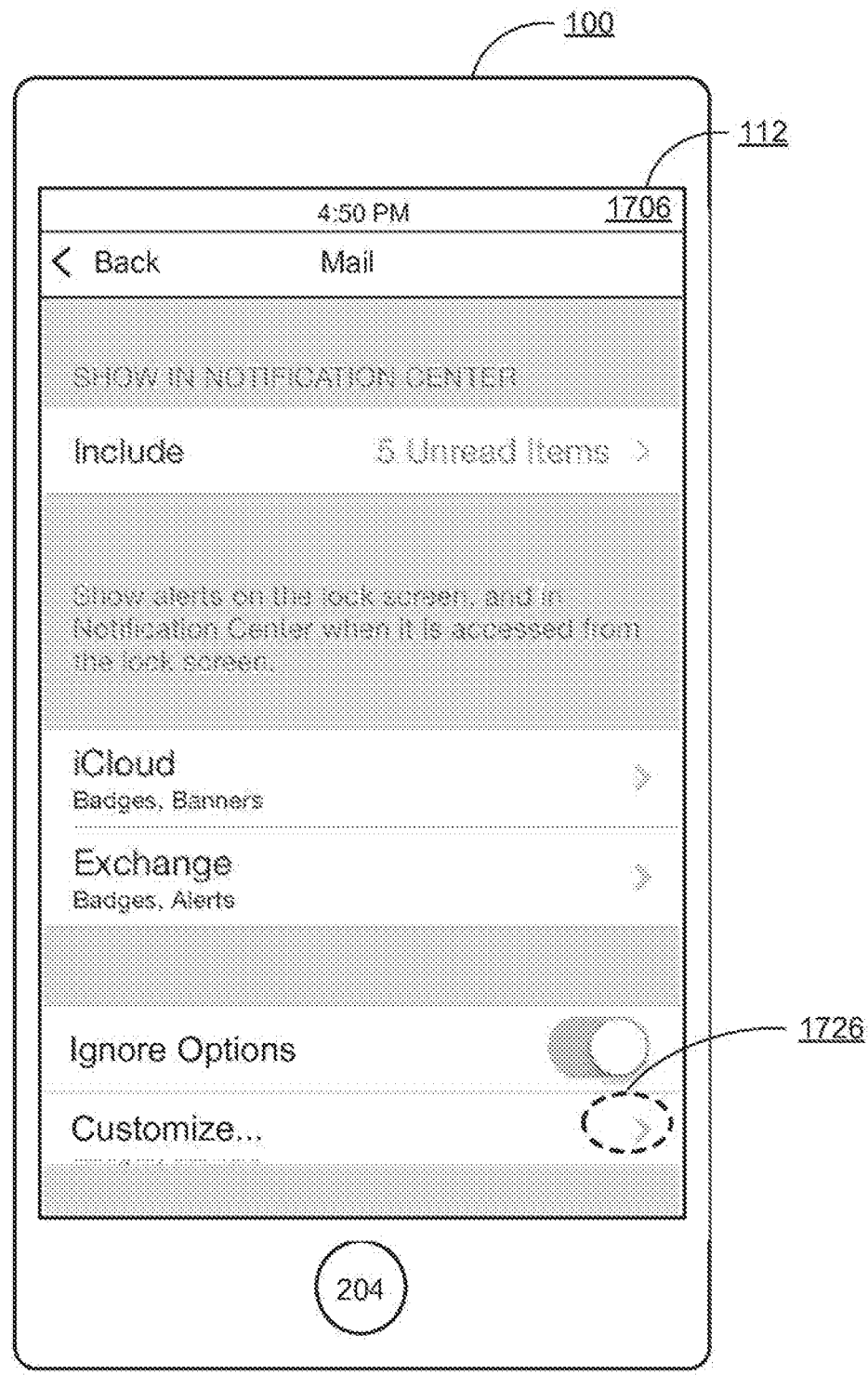
Figure 17D:

FIG. 17A illustrates an "expand" gesture in a notification center 1702 associated with the settings application. The expand gesture with contact 1726 is similar or the same as the expand gesture with contact 926 previously described in FIG. 9A. Responsive to the expand gesture with contact 1726 with the representation of the "Mail" icon 418, a mail page 1704 is displayed in the settings application, as shown in FIG. 17B. In the mail page 1704, the user can select whether to activate ignore options in the email application through, as an example, selection of a radio button. Responsive to contact 1726 with the radio button, a customize option may become available as shown in the modified mail page 1706 in FIG. 17C. Responsive to an expand gesture detected by the device 100 for the customize option, for example through contact 1726 with the customize option, a customize ignore options page 1708 is displayed in the settings application. The customize swipe options page 1708 includes an option to customize the sheet options and customize alert settings associated with sheet options. In a similar manner as described previously in FIG. 9, the user can customize the sheet options, shown in FIG. 17D. For example, the options include trash thread, archive thread, mark thread as read, and go to settings, as shown in FIG. 16C. Additional options include unsubscribe, no alerts, move to special folder (through a filter on inbox), and demote (email threads are not presented in chronological order and/or future email messages are kept with the email thread or email message associated with the message portion 1106B associated with the ignore option such as email thread 1106B).

Method for Ignoring Threads in an Email Client Module UI

Figure 18:
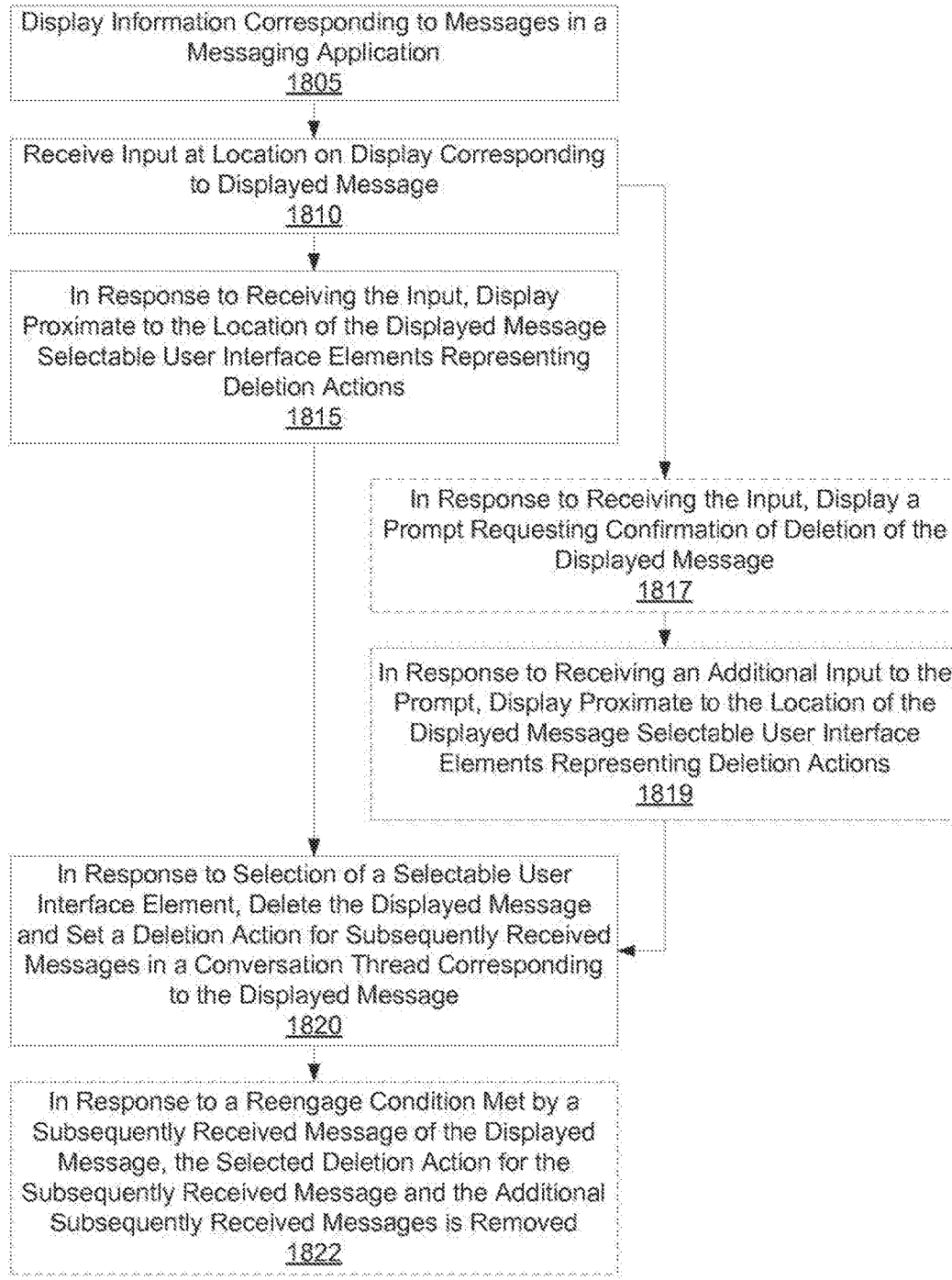
FIG. 18 is a flowchart of a method for ignoring an email thread in an email application, according to one embodiment.

FIG. 18 is a flowchart of a method for ignoring an email thread in an email application, according to one embodiment. Embodiments of the process described here may be implemented on an electronic device with a display, such as device 100. Information corresponding to a plurality of messages in a messaging application is displayed 1805, as previously described in conjunction with FIG. 5B. Information includes sender information, subject information, and a portion of the email or messages. In addition, information can include indicators such as an attachment indicator, a VIP sender indicator, and a VIP thread indicator.

Input at a location on the display corresponding to a displayed message is received 1810. The input indicates deletion of the displayed message. Input, for example, is a contact 1626 with the location on the display corresponding to the displayed message. In addition, the location on the display corresponding to the displayed message can display a selectable user interface element corresponding to a request for deletion of the displayed message. In one embodiment, the selectable user interface element is an expanded swipe option 628 displayed instead of the displayed message, as shown and described in FIGS. 6D, 6E and 16A.

In response to receiving the input, a plurality of selectable user interface elements representing deletion actions to be taken on subsequent messages in a conversation thread corresponding to the displayed message is displayed 1815 proximate to the location of the displayed message. The plurality of selectable user interface elements representing deletion actions to be taken can be displayed in a sheet 1606 as shown in FIG. 16C and include unsubscribe, move to designated folder, demote and any combination thereof. In one embodiment, a selectable user interface element representing an unsubscribe deletion action includes trash displayed message, trash subsequently received messages of the displayed message, trash conversation thread (e.g., trash thread) corresponding to the displayed message, archive displayed message, archive subsequently received messages of the displayed message, archive conversation thread (e.g., archive thread) corresponding to the displayed message, mark displayed message as read, mark subsequently received messages of the displayed message as read, mark the conversation thread as read, turn off all alerts for subsequently received messages of the displayed message, turn off all alerts for the conversation thread and any combination thereof. A selectable user interface element representing a demote deletion action includes displaying subsequently received messages of the displayed message are presented with the conversation thread and not as a new message of the conversation thread.

In one embodiment, in response to receiving the input, a prompt 1600 is displayed 1817, as shown in FIG. 16B, requesting confirmation of deletion of the displayed message. For example, the request can be a question such as "Apply an ignore option to all emails in the thread?" as shown in FIG. 16B. The prompt requesting confirmation of deletion of the displayed message includes selectable user interface elements including deletion of the displayed message, deletion of the conversation thread corresponding to the displayed message, request for additional deletion actions, and any combination thereof. For example, the selectable user interface elements can be "No, trash thread" 1602, and "Yes, options . . . " 1604 for the question shown on the prompt 160 in FIG. 16B. In response to receiving an additional input to the prompt, the plurality of selectable user interface elements representing deletion actions to be taken on subsequent messages in a conversation thread corresponding to the displayed message is displayed 1819 proximate to the location of the displayed message, in a similar manner as described in step 1815. In response to selection of one of the plurality of selectable user interface elements, the displayed message is deleted 1820 and a deletion action is set for subsequently received messages in the conversation thread, as previously described in step 1815.

In response to a reengage condition being met by a subsequently received message of the displayed message, the selected deletion action for the subsequently received message and additional subsequently received messages of the subsequently received message of the display message is removed 1822. Reengage conditions include a sender previously designated as a VIP sender replies to the email thread, the sender replies to a user associated with the electronic device, the sender replies to a user associated with the electronic device only, the user's name is mentioned in an email message of the conversation thread, and any combination thereof as previously described in conjunction with FIG. 16.

Draft Emails UI

Figure 19A:
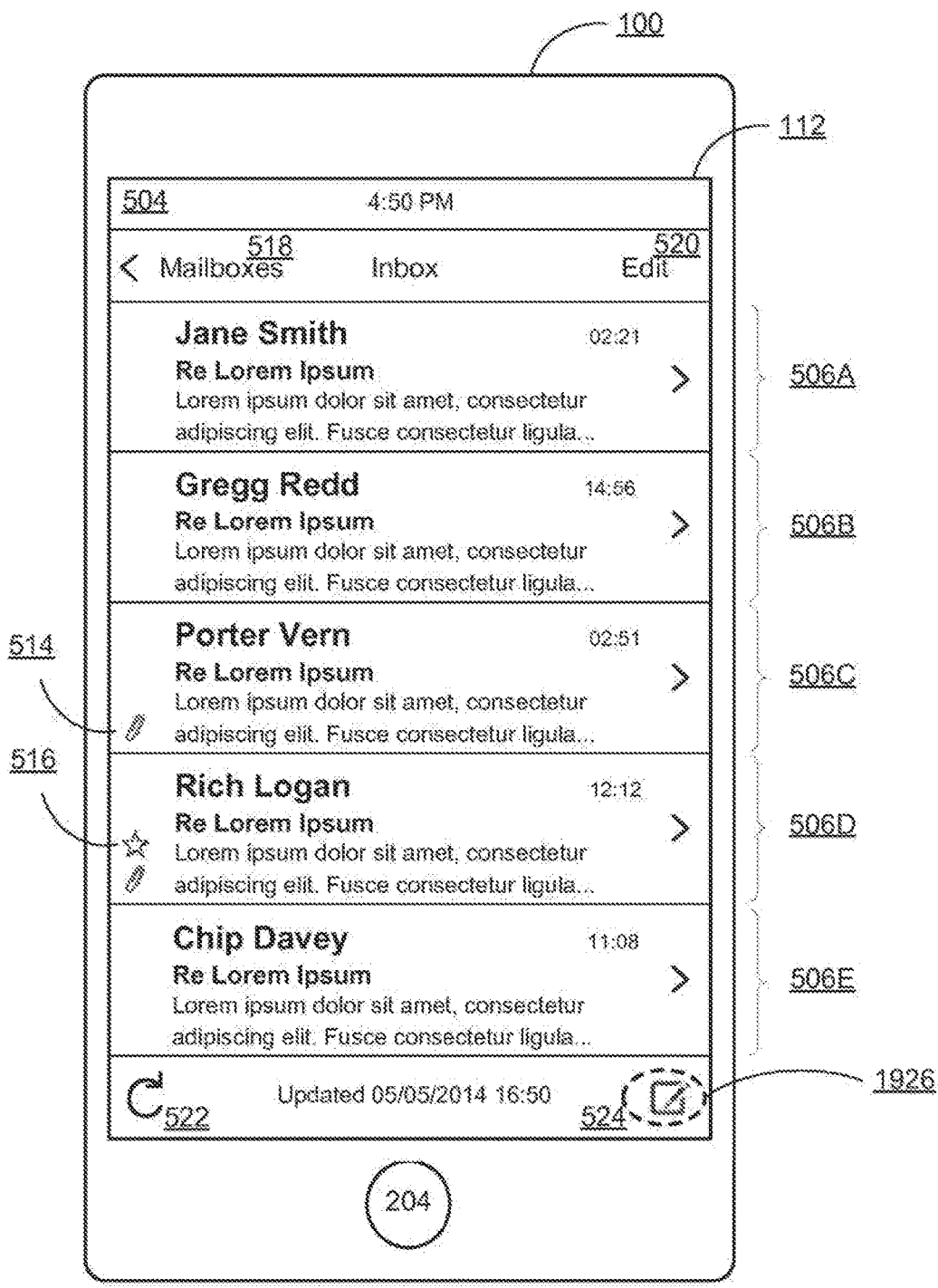
FIGS. 19A and 19B illustrate a draft UI in an email application, according to one embodiment.
Figure 19B:
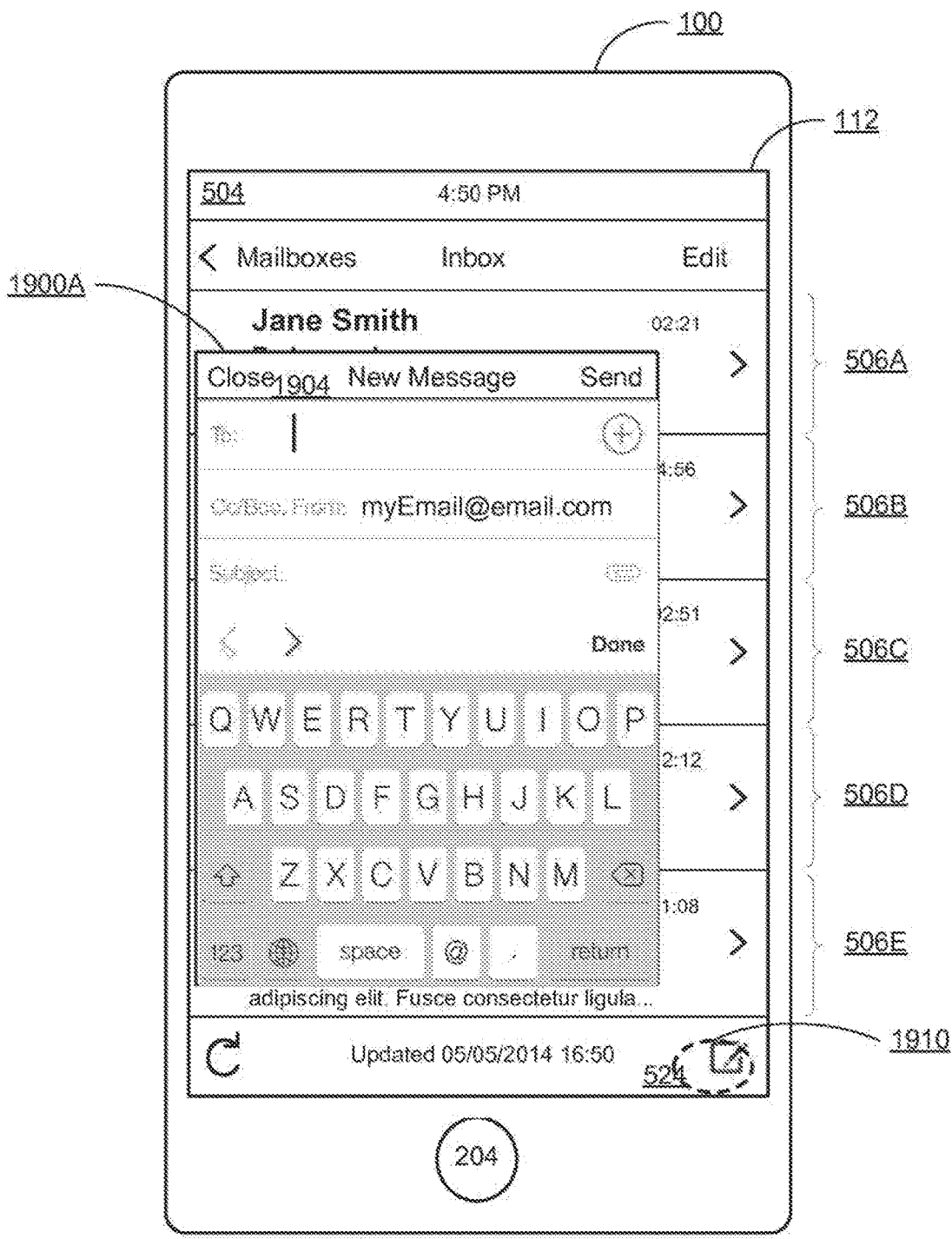
Figure 19C:
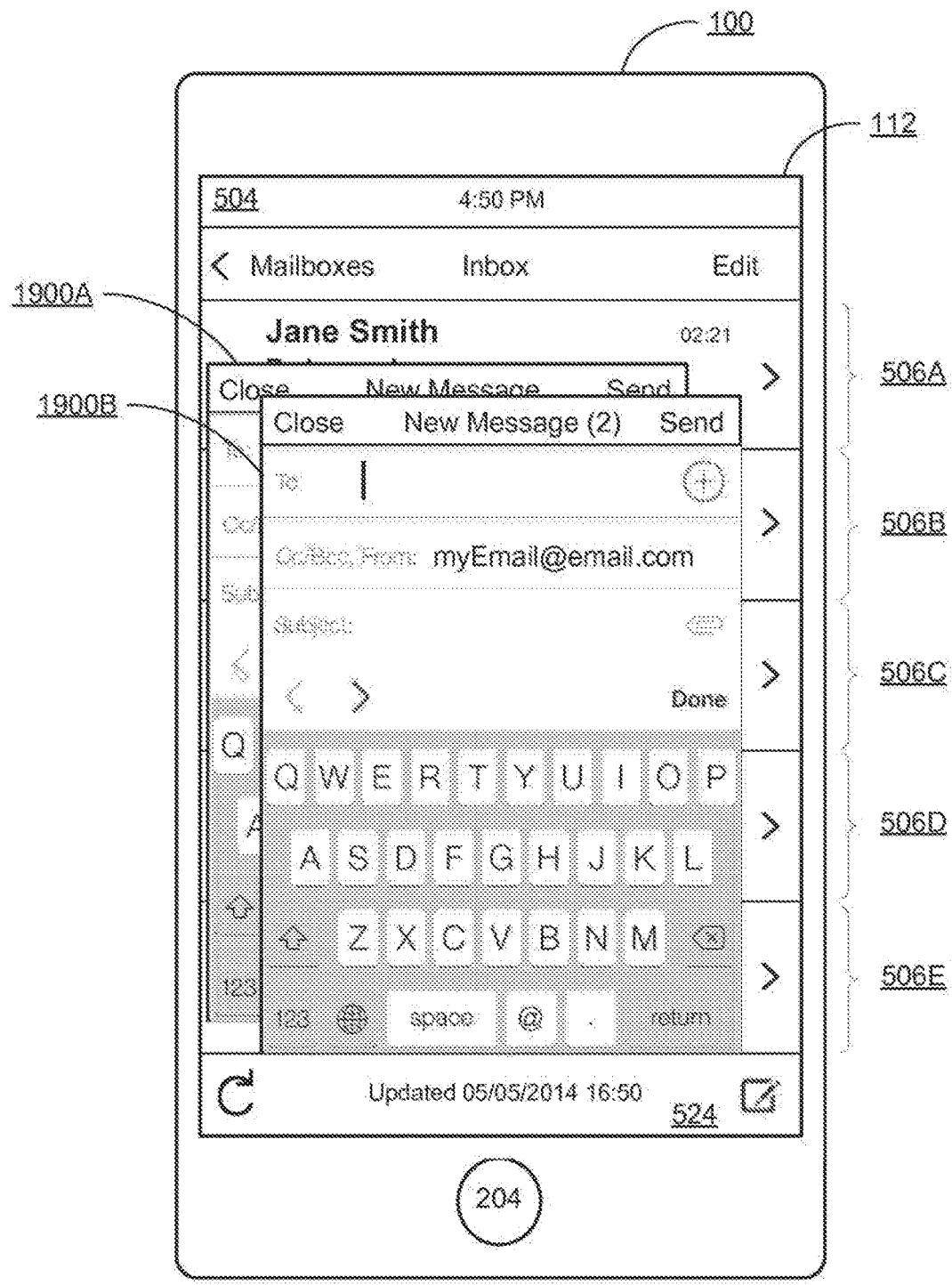
FIG. 19C illustrates overlaid draft emails in an email application, according to one embodiment.

FIG. 19A illustrates a mail application view 504 of an email application, according to one embodiment. The mail application view 504 displays portions of email messages of email threads 506A, 506B 506C, 506D, 506E from the inbox of the user's email account, as described in FIGS. 5B and 11 IA. Contact 1910 is detected by the device 100 on a new draft element 524. Responsive to the detected contact 1910, a message composition interface or a first draft UI 1900A is shown as illustrated in FIG. 19B, according to one embodiment. As displayed, the draft UI 1900A is displayed on top of the mail application view 504. FIG. 19B also illustrates contact 1910 detected by the device 100 on the new draft element 524 again. Responsive to the detected contact 1910, a second draft UI 1900B is displayed on top of the first draft UI 1900A, both the first and second draft UIs 1900A and 1900B displayed on top of the mail application view 504 in one embodiment, as shown in FIG. 19C. Alternatively, responsive to the detected contact 1910 in FIG. 19B, the first draft UI 1900A could be displayed in a draft section 1902 of the mail application view 504, as shown in FIG. 19D, and the second draft UI 1900B could be displayed on top of the mail application view 504 including the draft section 1902.

Although the first and second draft UIs 1900A and 1900B are displayed at a width narrower than width of the touchscreen 112 of the device 100, in alternative embodiments, the draft UIs 1900A and 1900B can be displayed at a full width and height equal to the width and height of the touchscreen 112. In addition, the draft UIs 1900 also are moveable when displayed on top of other draft UIs 1900 or the mail application view 504 according to one embodiment. A user can touch-and-drag the draft UIs 1900 through a contact with the header or a portion of the draft UIs 1900.

Figure 19D:
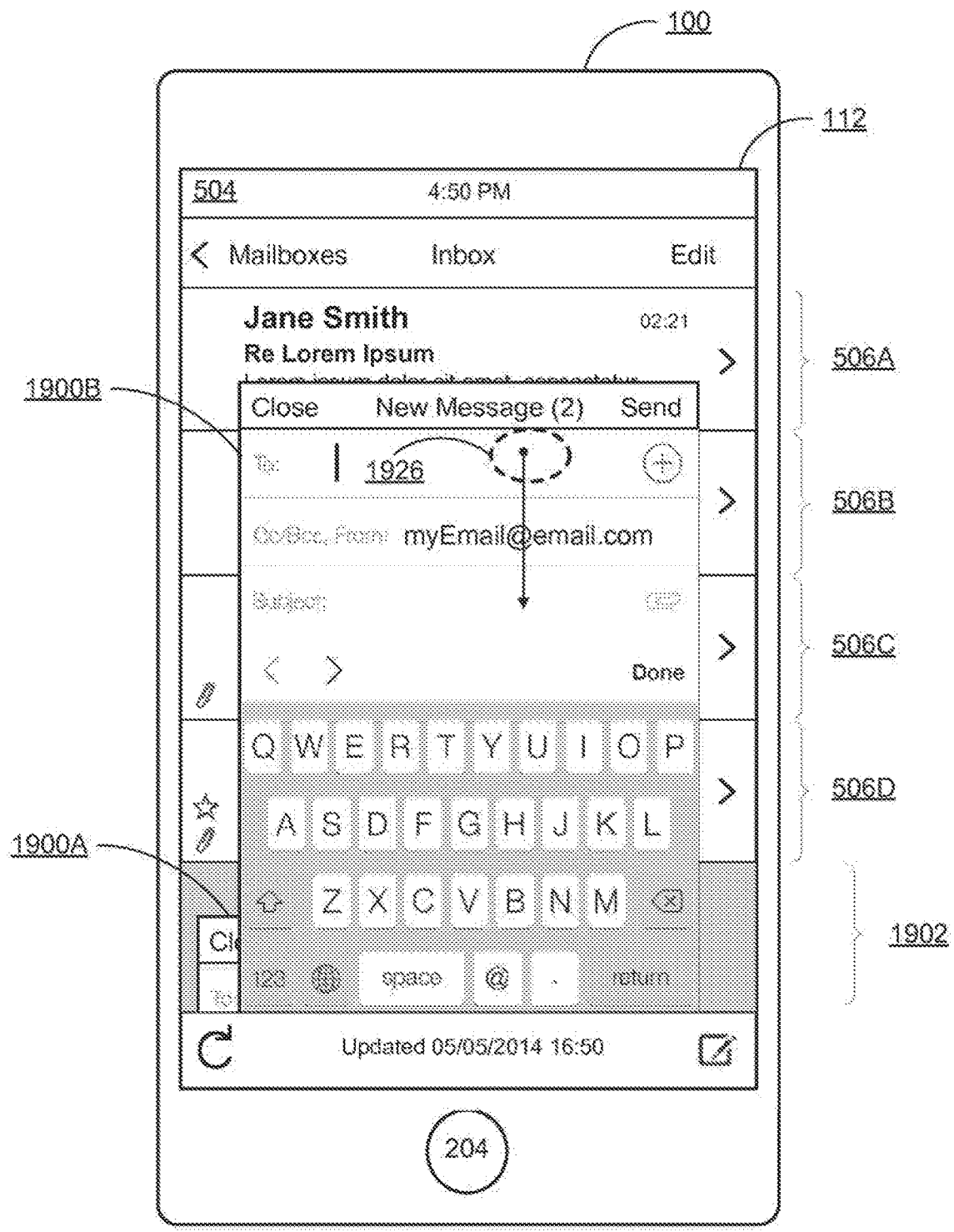
FIGS. 19D and 19E illustrate a gesture for minimizing overlaid draft emails in an email application, according to one embodiment.
Figure 19E:
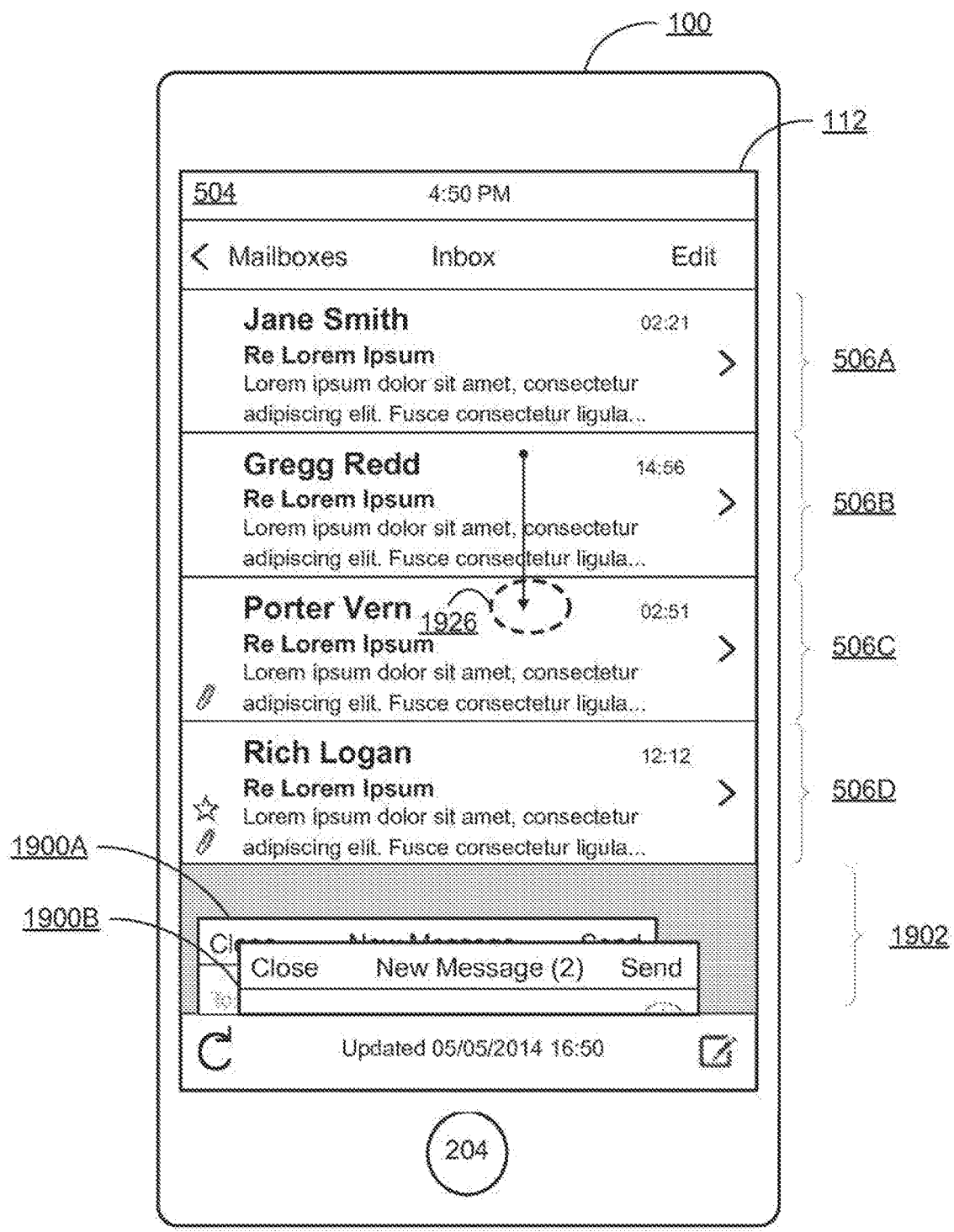

Draft UIs 1900 displayed on top of the mail application view 504 or the mail application view 504 and the draft section 1902 can be minimized to the draft section 1902 using a minimize gesture as shown in FIG. 19D, according to one embodiment. FIGS. 19D and 19E illustrate the minimize gesture for minimizing draft UIs 1900 in an email application, according to one embodiment. The minimize gesture is indicative of a user request to minimize draft UIs 1900 displayed on top of the mail application view 504 in the email application. The minimize gesture may include a swipe in a direction substantially perpendicular to the width of the message portion 506. In one embodiment, the minimize gesture can be a swipe all the way down into a draft section 1902.

In one embodiment, the minimize gesture includes dragging a contact a threshold distance from an initial position to a second position on top of the mail application view 504. For example, a contact 1926 is detected by the device 100 at an initial position in the message portion 506B, as shown in FIG. 19D. The contact 1926 is maintained and dragged a threshold distance in a direction substantially perpendicular with the width of the message portion 506B to a second position in the message portion 506B, as shown in FIG. 19E. For example, the contact 1926 is maintained from the initial position a threshold distance to the second position shown in FIGS. 19D and 19E in a continuous movement without the contact breaking contact with the touch screen 112 of the device 100. In another embodiment, instead of a threshold distance, the minimize gesture includes dragging a contact at a threshold rate on top of the one or more draft UIs 1900 displayed on top of the mail application view 504. Thus, the contact 1926 is maintained and dragged at a rate in a direction substantially perpendicular with the width of the message portion 506B. In other embodiments, other parameters of the maintained contact 1926 are evaluated for the minimize gesture. The other parameters besides distance and rate can be strength of pressure of the contact or number of contact points, or other measurable parameters.

After completion of the minimize gesture or the threshold distance or rate is reached, draft UIs 1900 displayed on top of the mail application view 504 are minimized or dropped down into a draft section 1902, as shown in FIG. 19E. In one embodiment, the draft UIs 1900 minimize or drop down into the draft section 1902 and the movement of the draft UIs 1900 into the draft section 1902 is continuous and/or proportional to the distance or a normalized distance or at a rate reached by the contact 1926 in a similar manner as the threshold distances and threshold rates described in FIGS. 5, 6 and 7. In the embodiment where the draft UIs 1900 are partially displayed as the contact 1926 is maintained, if the contact 1926s not maintained until the threshold distance is reached and/or broken, portions of the draft UIs 1900 still visible can be displayed on top of the mail application view 504. In another embodiment, the draft UIs 1900 can "rubber band" or snap to the draft section 1902 after a threshold is crossed by the contact 1926.

Figure 20A:
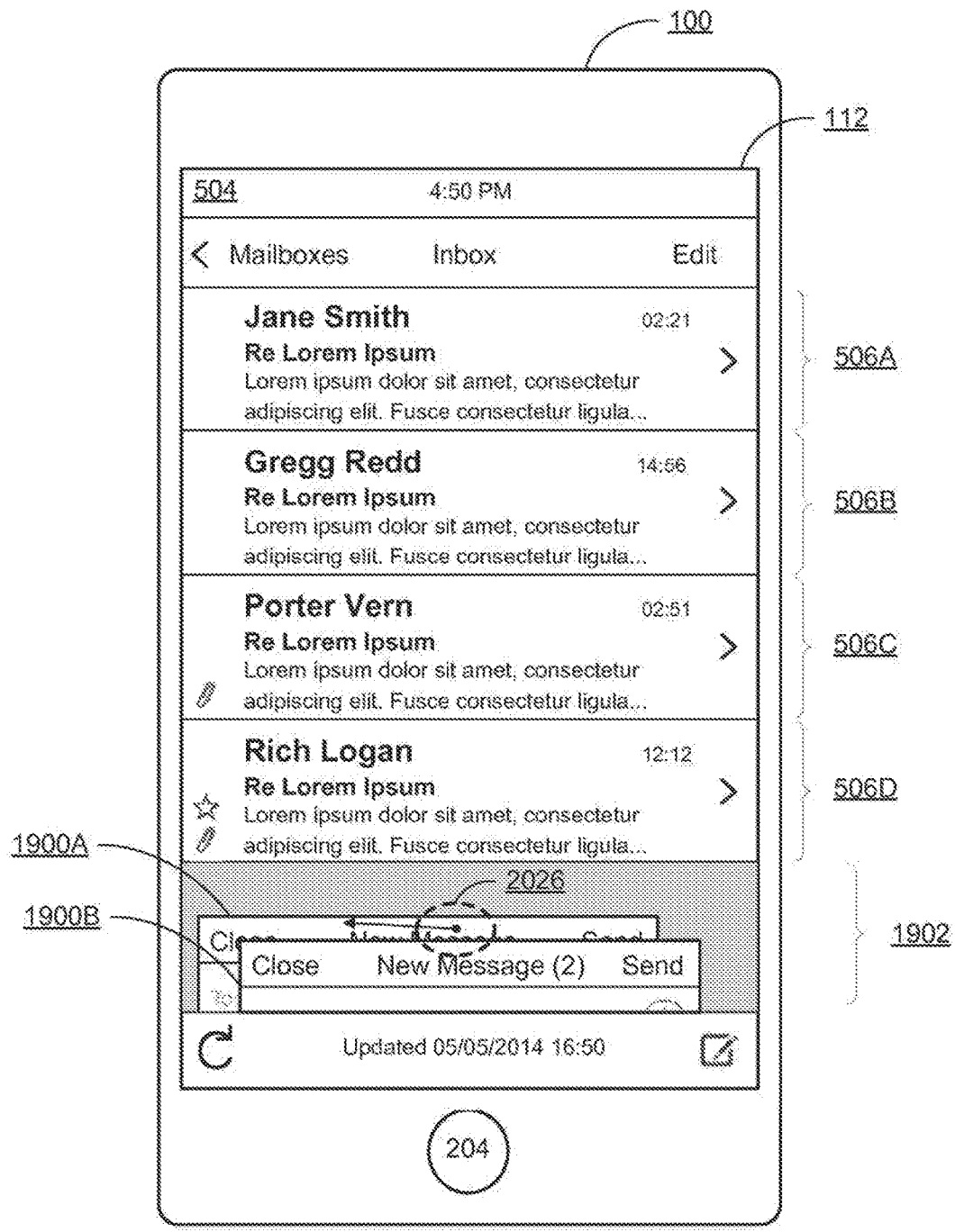
FIGS. 20A, 20B, and 20C illustrate a gesture for removing an overlaid draft email in an email application, according to one embodiment.
Figure 20B:
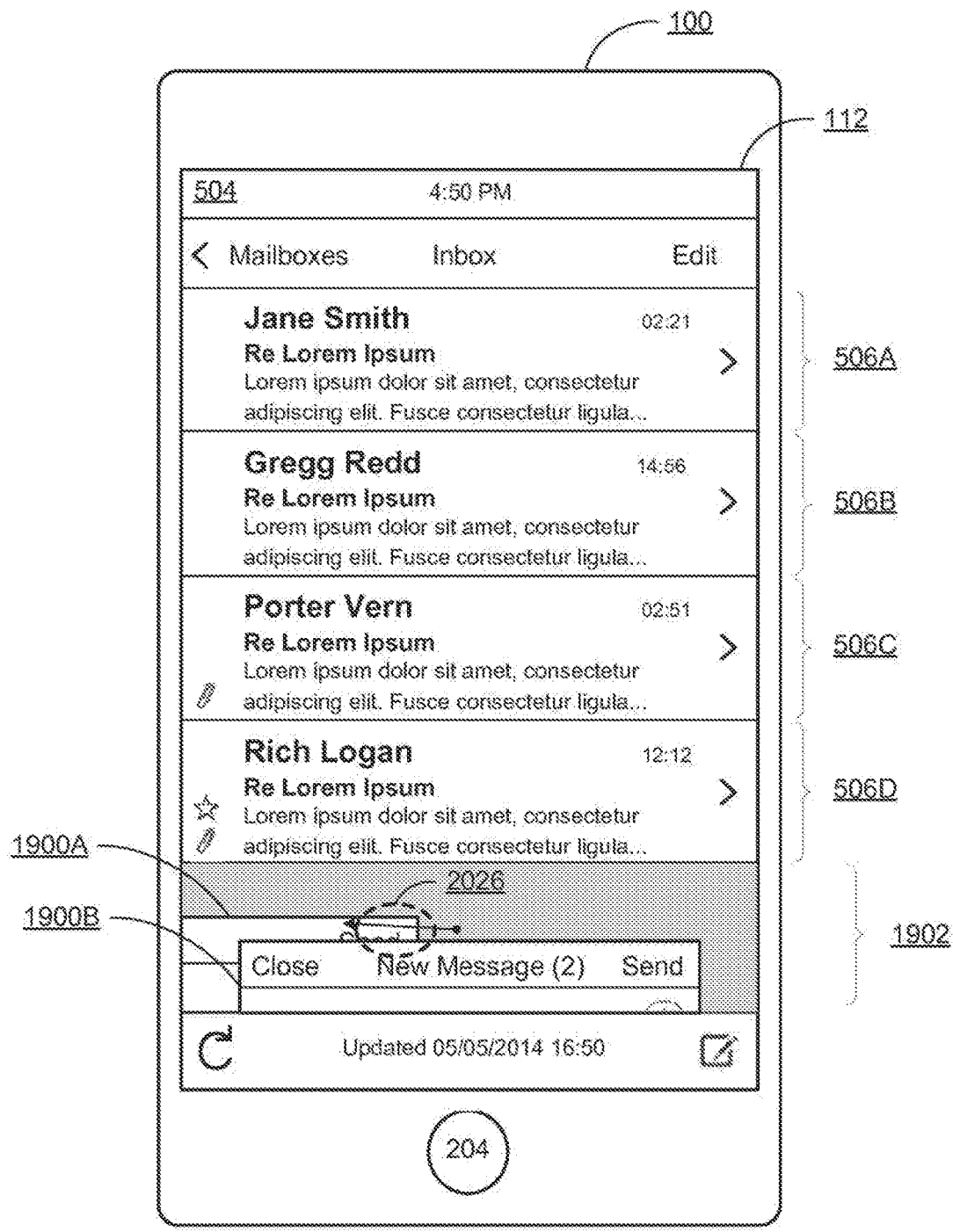
Figure 20C:
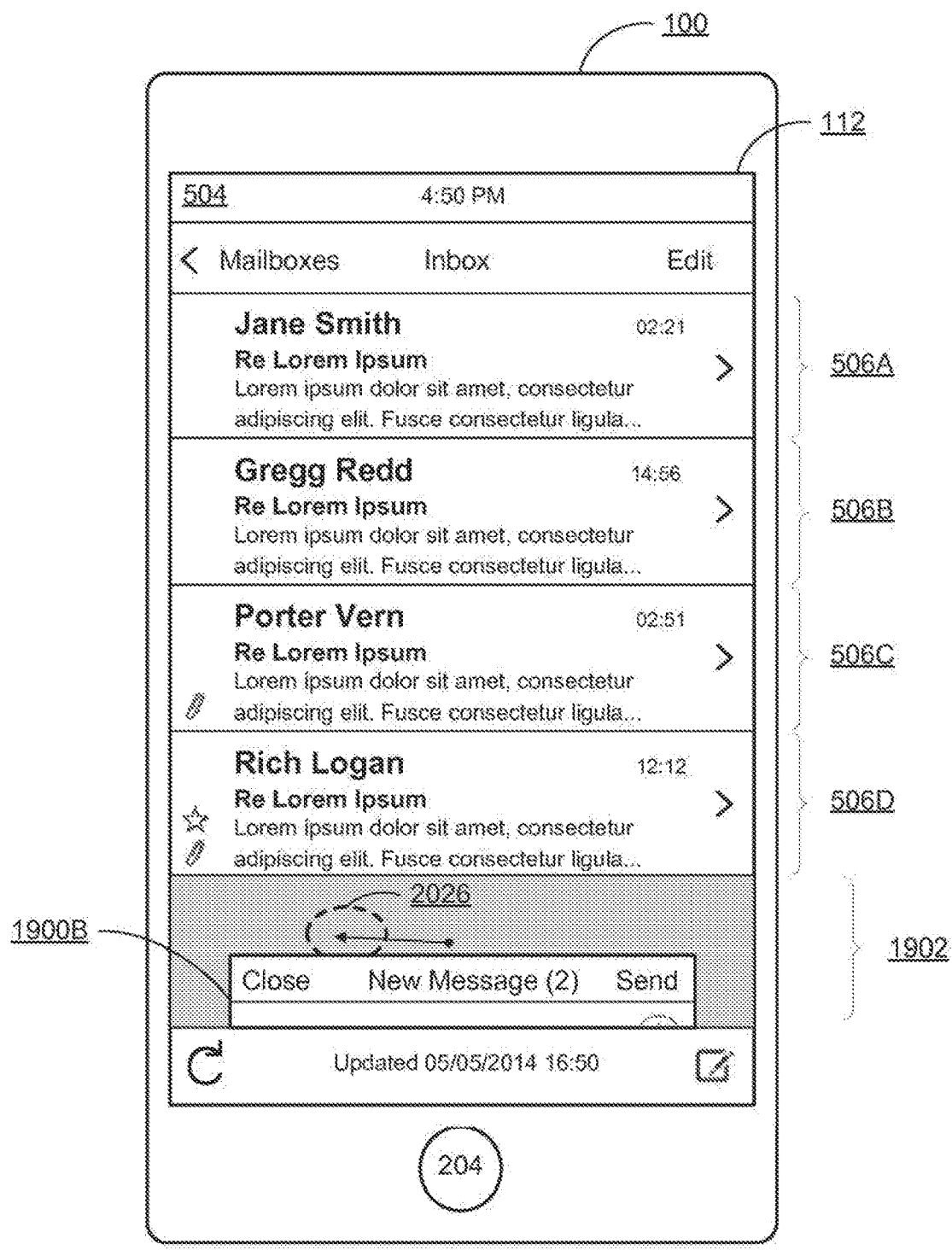

Draft UIs 1900 displayed in a draft section 1902 or on top of the mail application view 504 can be removed with a remove gesture as shown in FIG. 20A. The draft UIs 1900 can be dismissed based on threshold rates and threshold distances of contact 2026 movement. The remove gestures dismiss or cancel a draft UI 1900A through contact 2026 with the draft UI 1900A, as shown in FIGS. 20A, 20B, and 20C, and can be based on a threshold distance or a threshold rate. In addition, the remove gesture can reach a designated location (e.g., edge of the screen 112) and thus dismiss or cancel the draft UI 1900A.

Figure 21A:
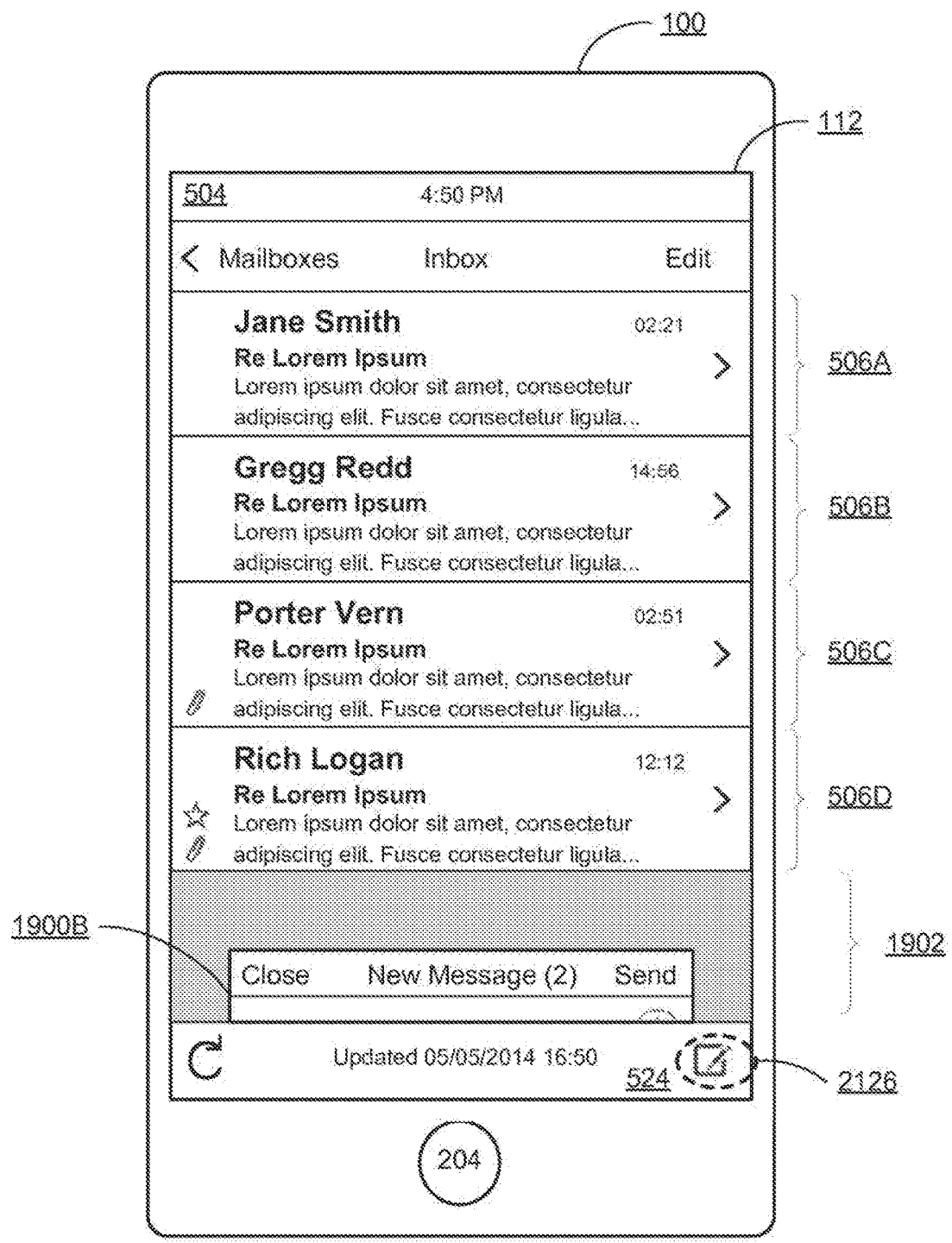
FIGS. 21A, 21B, and 21C illustrate a gesture for expanding a minimized overlaid draft email in an email application, according to one embodiment.
Figure 21B:
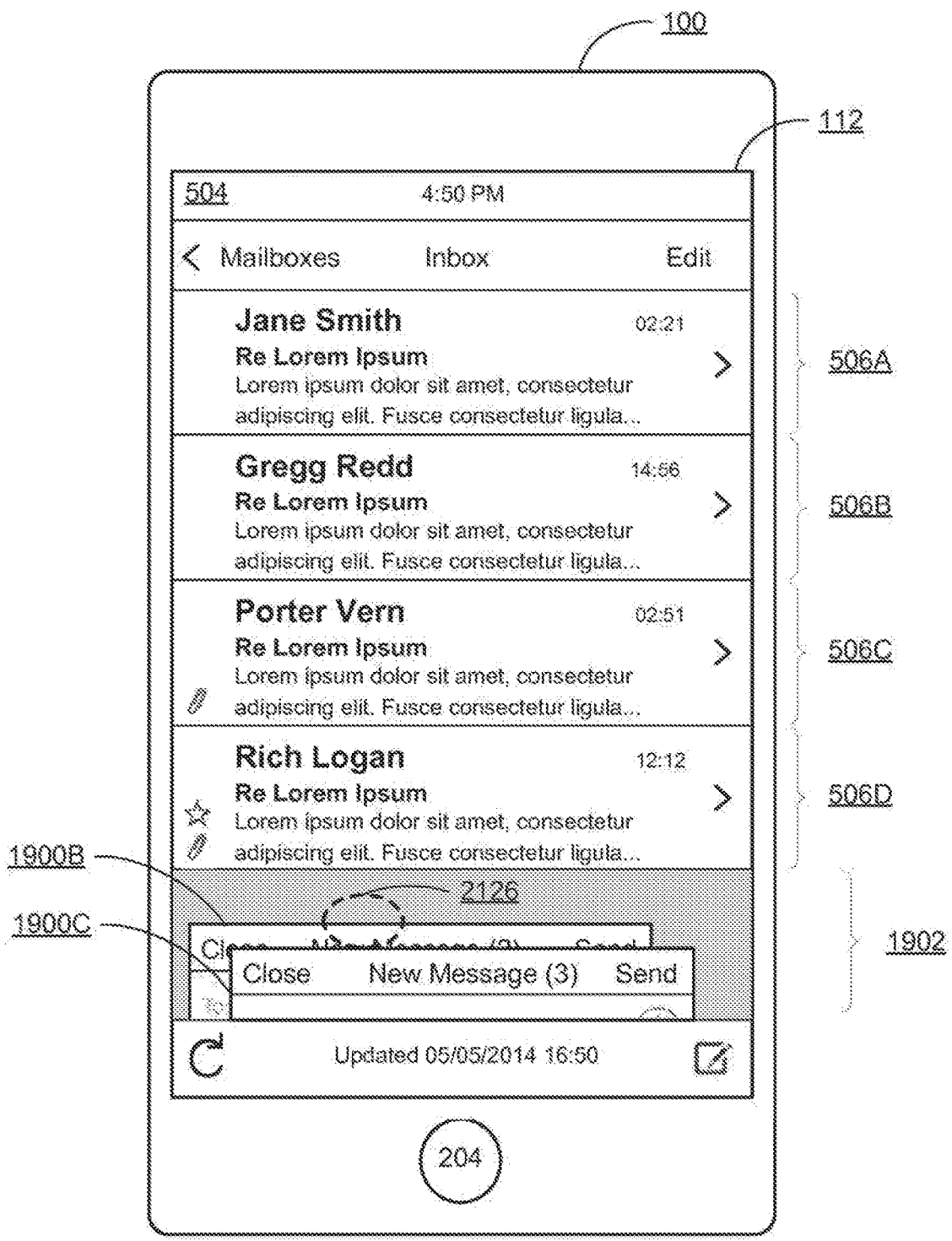
Figure 21C:
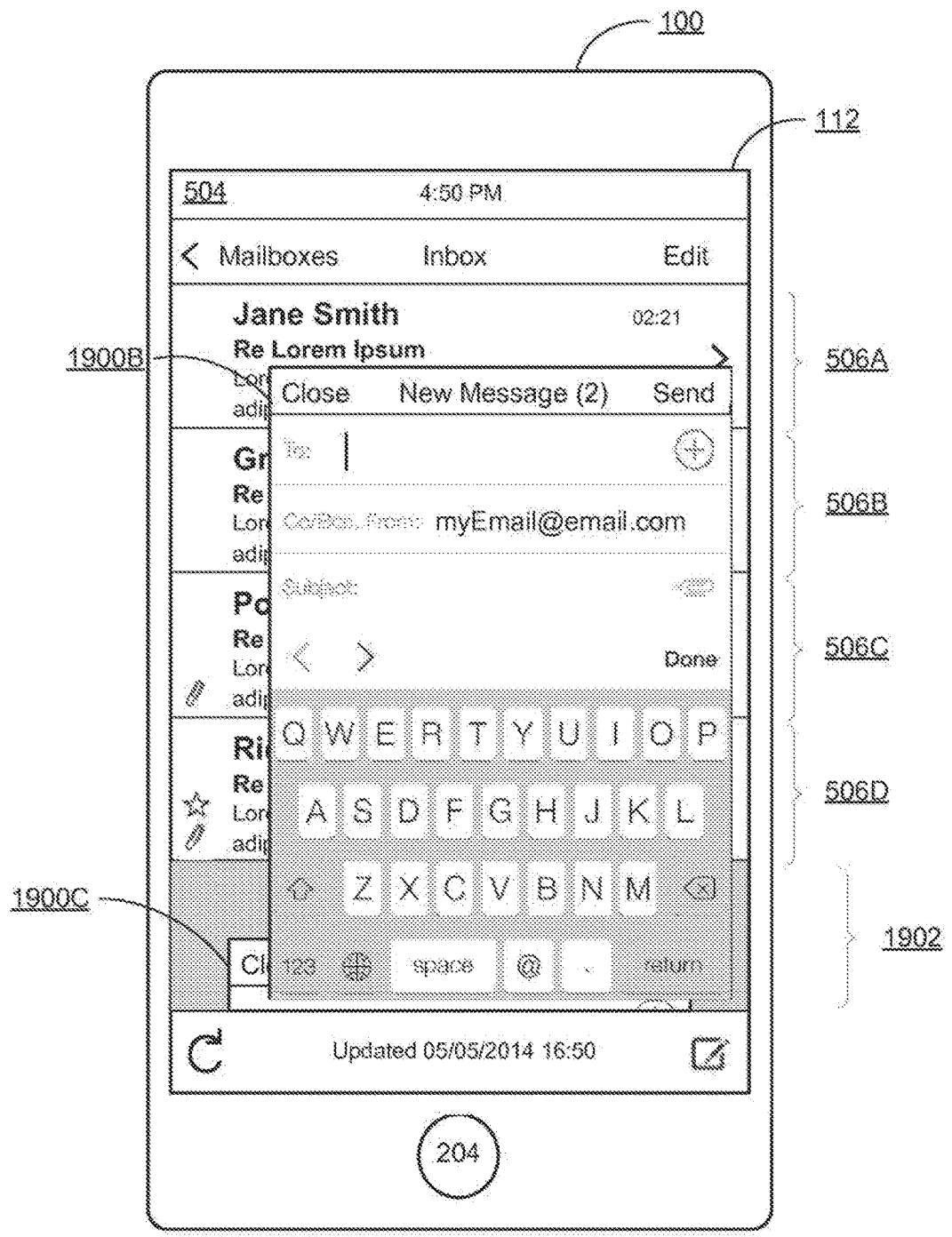

FIG. 21A illustrates a mail application view 504 of an email application, according to one embodiment. For example, the illustrated mail application view 504 is similar to the illustrated mail application view 504 in FIG. 19A. Contact 2126 is detected by the device 100 on a new draft element 524, for example, through a draft gesture as previously described in FIG. 11A. Responsive to the detected contact 2126, a message composition interface or a third draft UI 1900C is shown as illustrated in FIG. 21B in the draft section 1902. In this embodiment, the draft UI 1900C is displayed in the draft section 1902 instead of on top of the mail application view 504. FIG. 19B also illustrates contact 1910 detected by the device 100 on the draft UI 1900B. Responsive to the detected contact 1910, the draft UI 1900B is displayed on top of the mail application view 504, as shown in FIG. 21C.

Figure 22A:
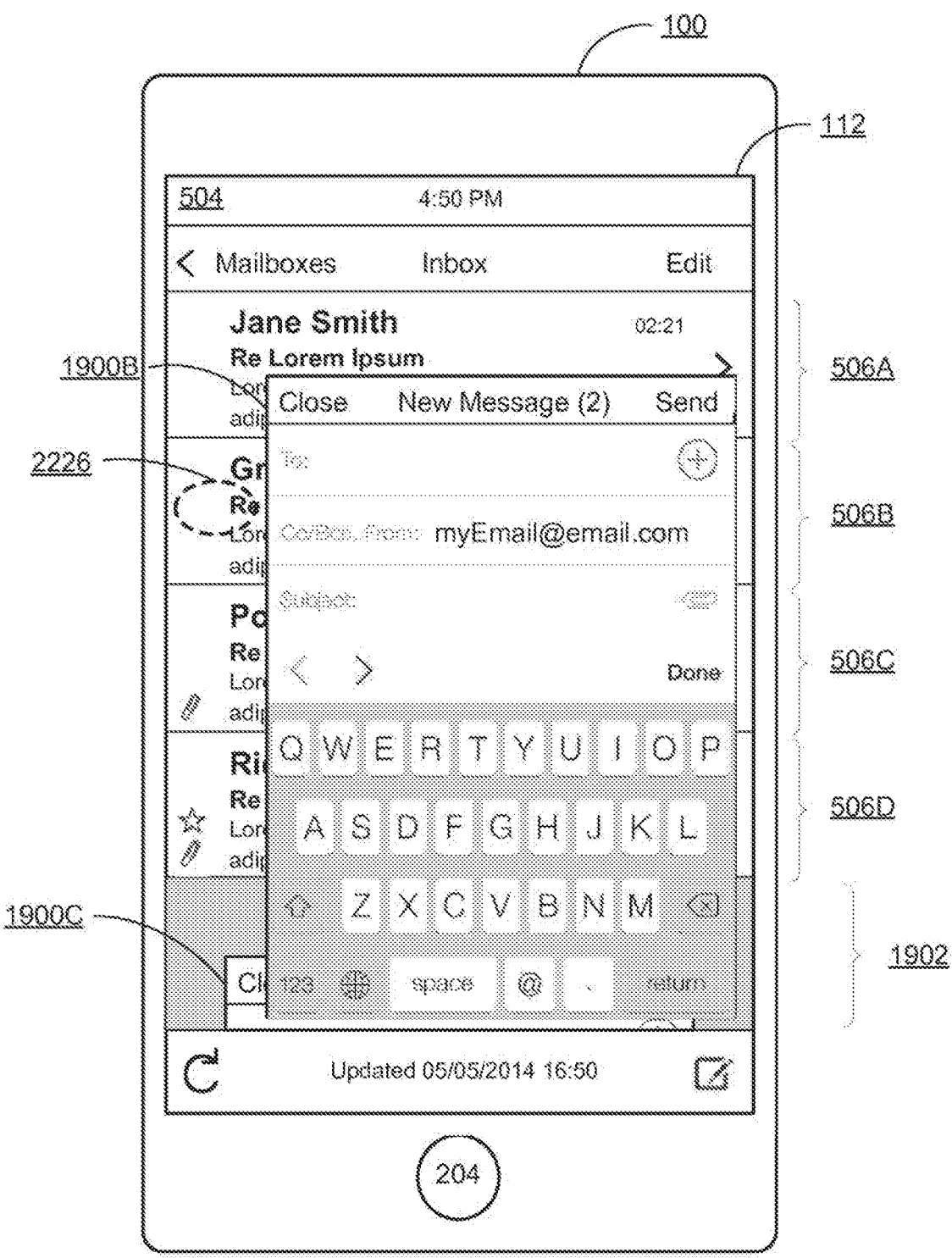
FIGS. 22A and 22B illustrate a gesture for expanding an existing email thread in an email application with an overlaid draft email, according to one embodiment.

While a draft UI 1900B is displayed on top of the mail application view 504, the user can still access the email messages associated with message portions 506 in their account. FIG. 22A illustrates a "thread" gesture for expanding an existing email message associated with the message portion in an email application with a draft UI 1900B displayed on top of the mail application view 504, according to one embodiment. Responsive to selection of the email message associated with a message portion 506B, the draft UI 1900B is minimized to the draft section 1902 and message portion 506B is displayed in a thread section 2204, as shown in FIG. 22B, according to one embodiment.

Figure 23A:
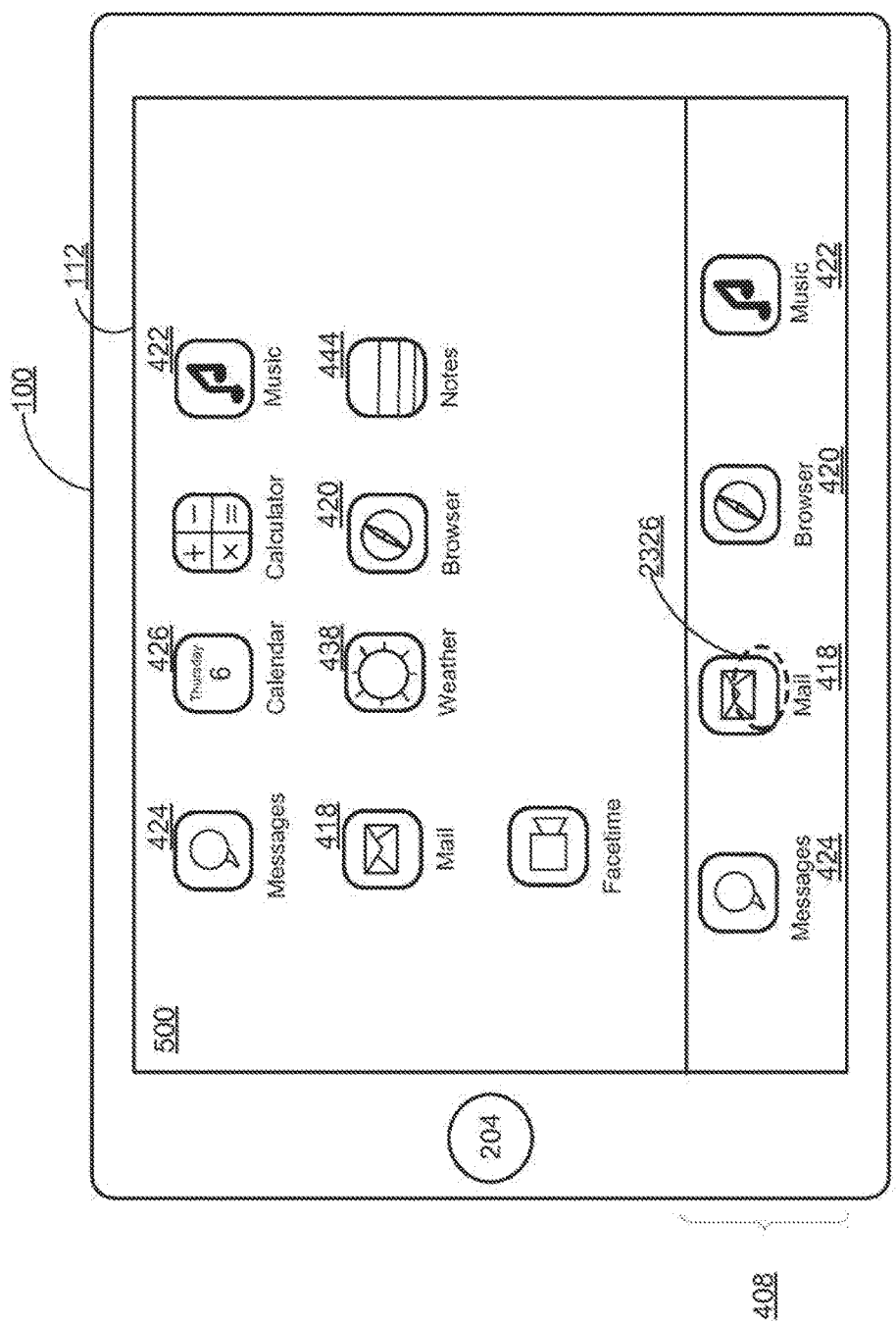
FIG. 23A illustrates a landscape view of an icon view of a computing device, according to one embodiment.

FIG. 23A illustrates a landscape view of icons for applications of the device 100, according to one embodiment. For example, the tray 408 icons and icons for other applications are similar icons as displayed in a portrait view of the device 100 as shown in FIG. 5A. In a similar manner as described in FIG. 5A, a launch gesture is used to execute the email client module 140 through contact 2326 with the "Mail" icon 418, shown in FIG. 23A.

Figure 23B:
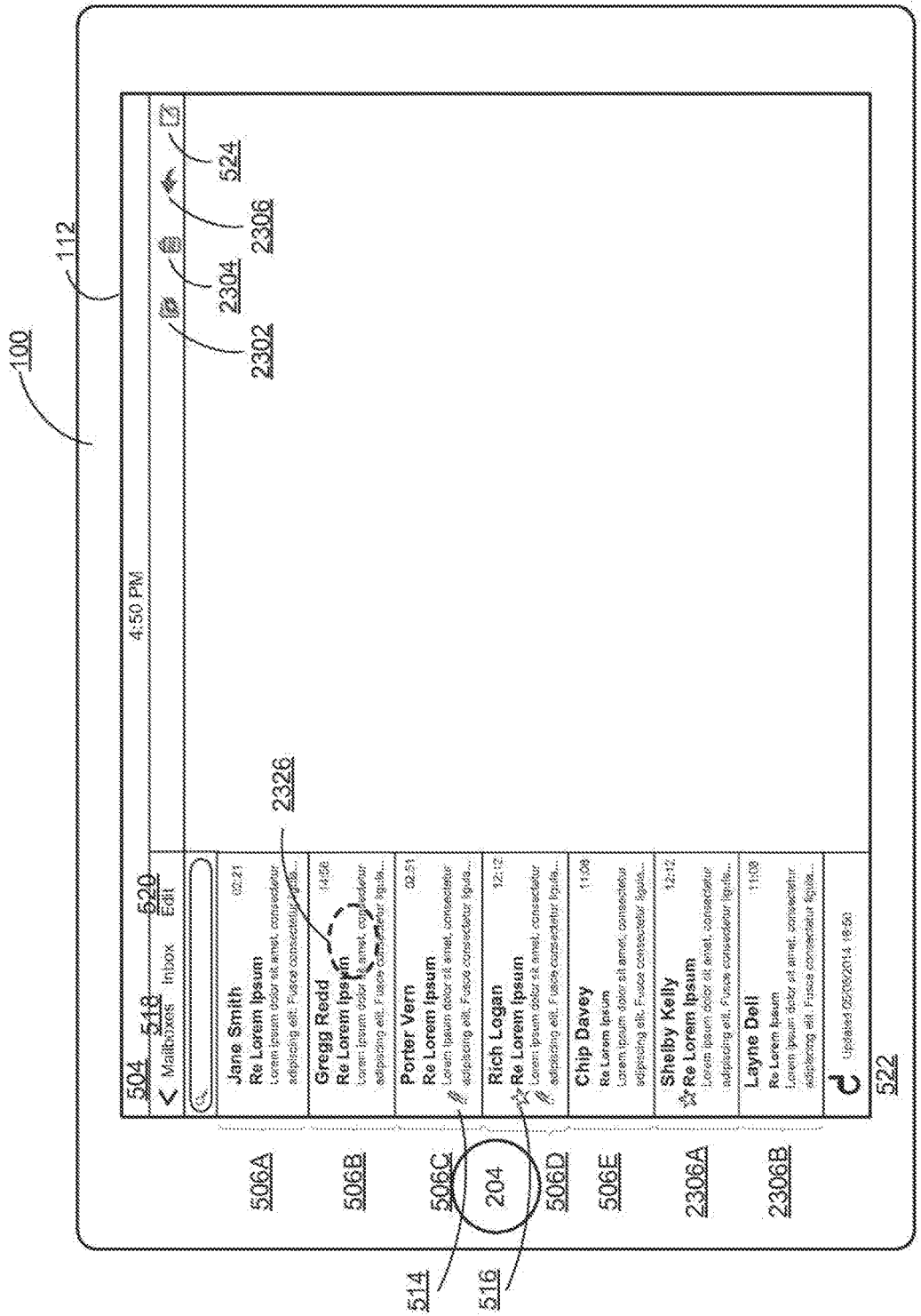
FIG. 23B illustrates an application view of an email application, according to one embodiment.

FIG. 23B illustrates a mail application view 504 of an email application, according to one embodiment. For example, the mail application view 504 includes email messages of email threads 506A, 506B, 506C, 506D, 506E, 2306A and 2306B from the inbox of the user's email account. Each message portion 506, 2306 displays sender information 508, subject information 510, and a portion of the body of the email 512. In addition, a message portion 506, 2306 can include indicators such as an attachment indicator 514 and a VIP sender indicator 516, as described in FIG. 5B, and the message portions 506, 2306 can also include a VIP thread indicator 1108 (not shown) described in FIG. 11. As also described in FIG. 5B, additional user interface elements are displayed in the mail application view 504 and include a back element 518, an edit element 520, a refresh element 522, and a new draft element 524. The mail application view 504 can also include an archive element 2302, a trash icon 2304, and a reply action element 2306. The archive element 2302 archives a selected email thread 506, 2306, the trash icon 2304 trashes a selected email thread 506, 2306, and the reply action element 2306 allows the user to reply to a selected email thread 506, 2306.

Figure 22B:
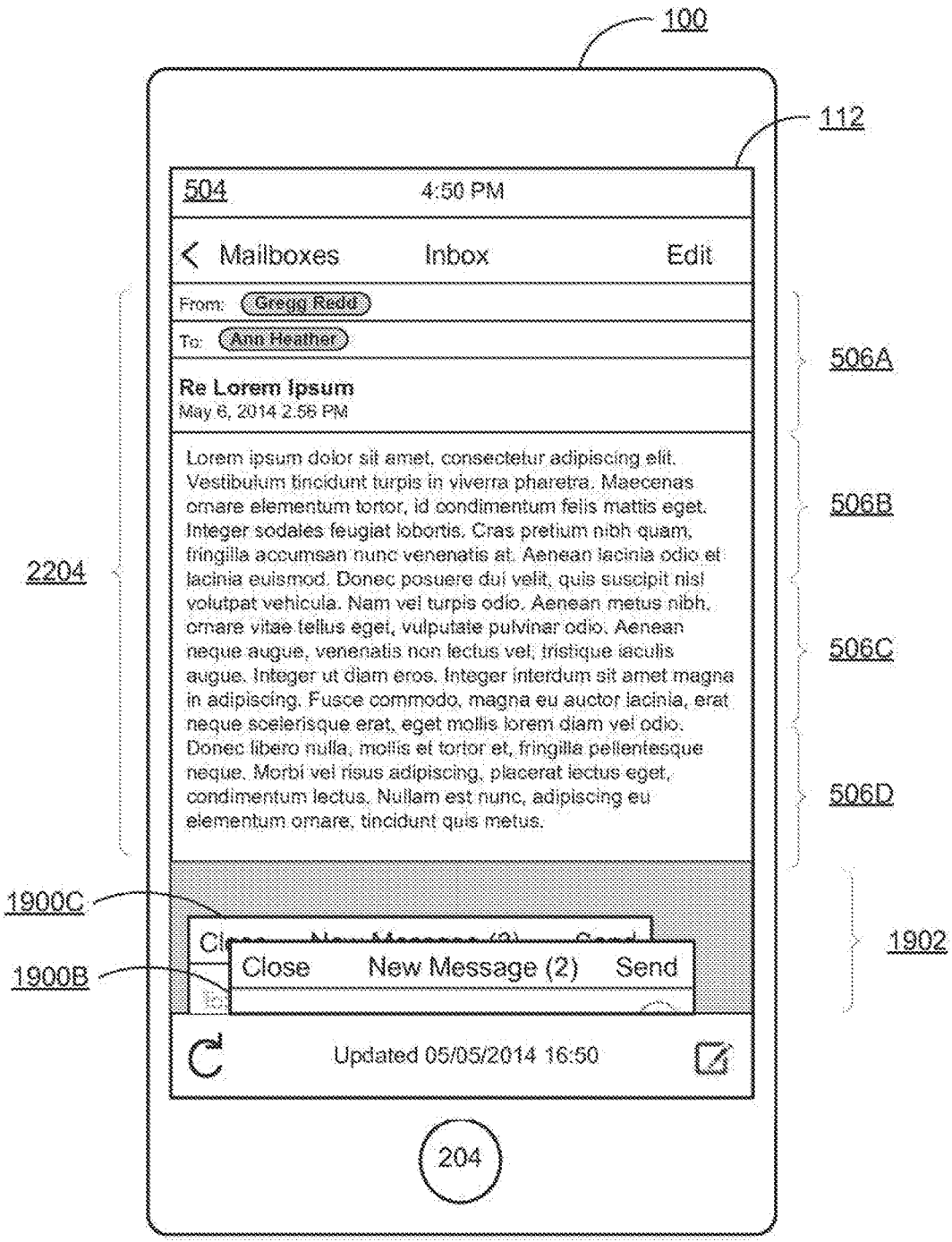
Figure 23C:
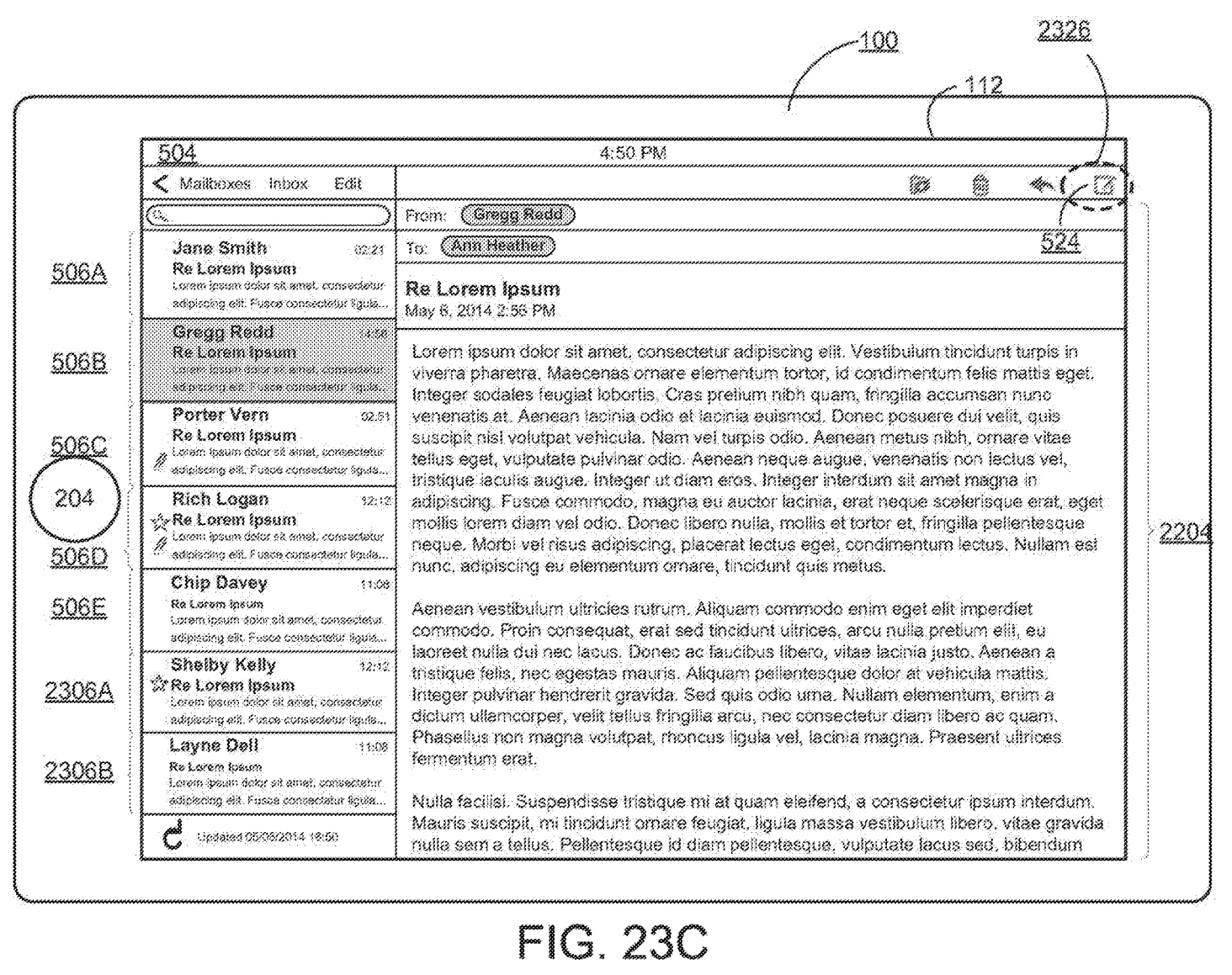
Figure 23D:
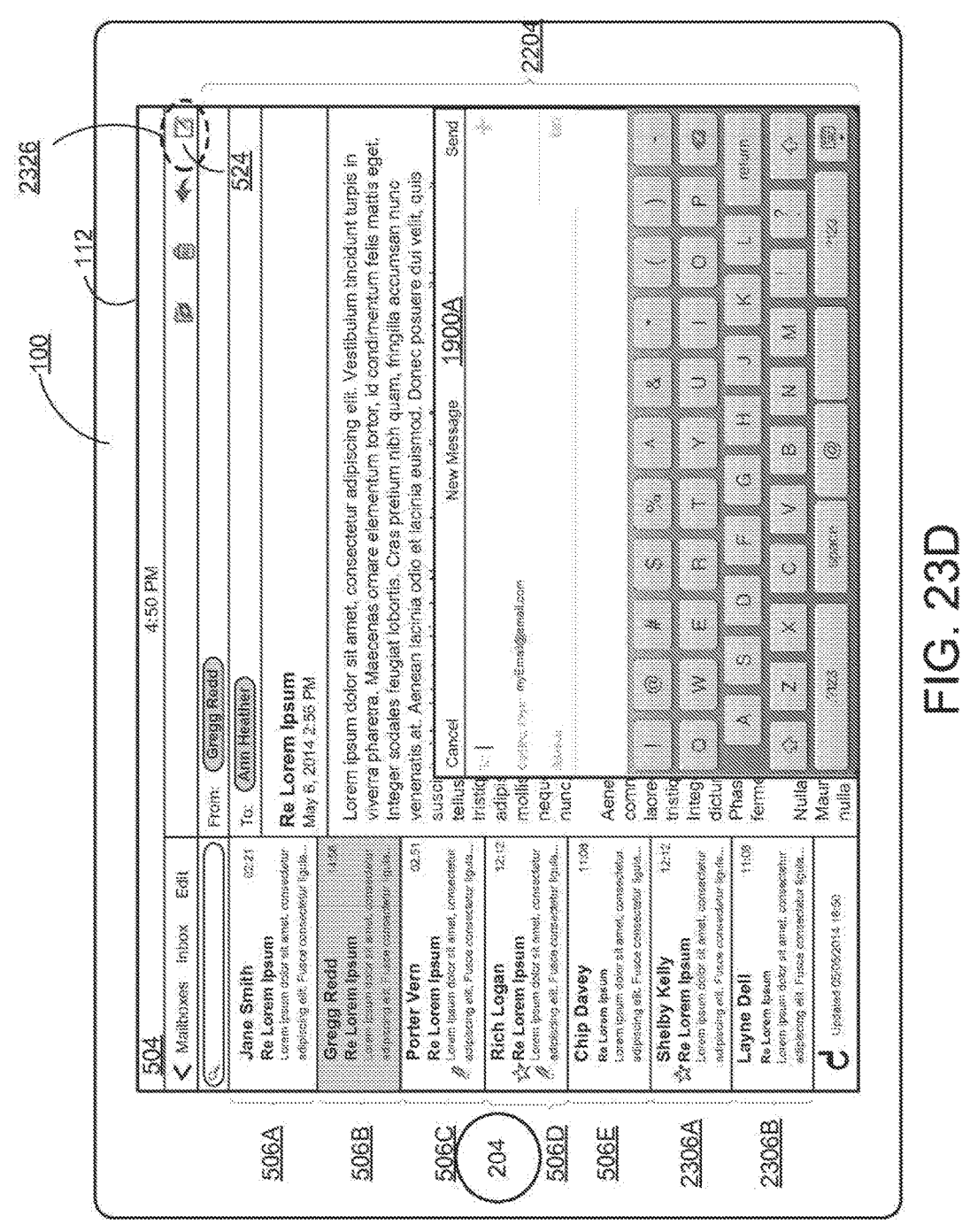
Figure 23E:
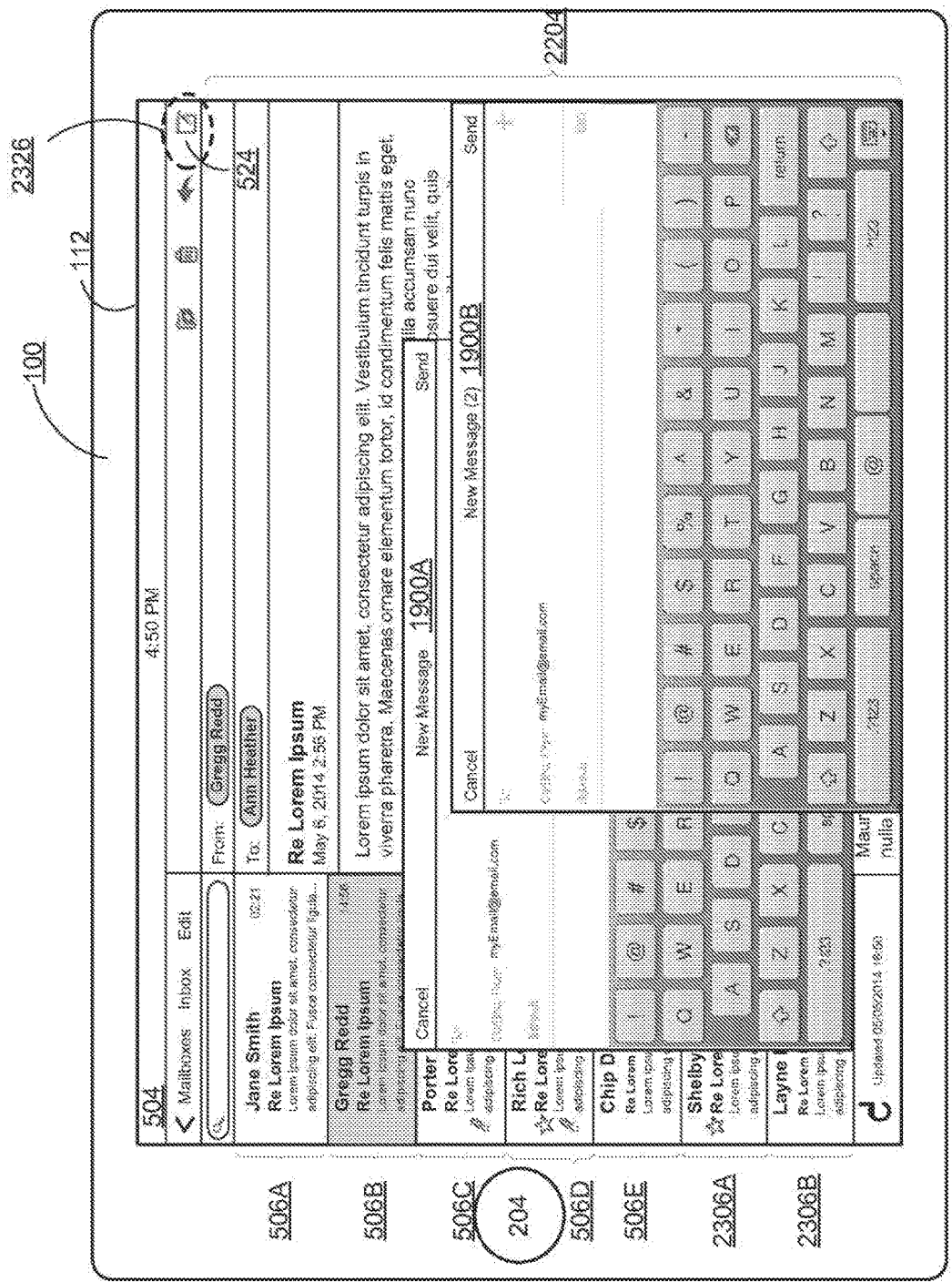

Illustrated in FIG. 23B is a gesture, as previously described in FIG. 22B, to display an email message associated with a message portion 506B. Responsive to the thread gesture, the email message associated with the message portion 506B is displayed in a thread section 2204, as shown in FIG. 23C, according to one embodiment. When a draft gesture, as described previously in FIG. 11A, is received on the new draft element 524, as shown in FIG. 23C through contact 2326, a first draft UI 1900A is displayed on top of the thread section 2204 the mail application view 504, as shown in FIG. 23D, according to one embodiment. In FIG. 23D, an additional draft gesture is received and a second draft UI 1900B is displayed on top of the thread section 2204 and the first draft UI 1900A, as shown in FIG. 23E, according to one embodiment.

Figure 23F:
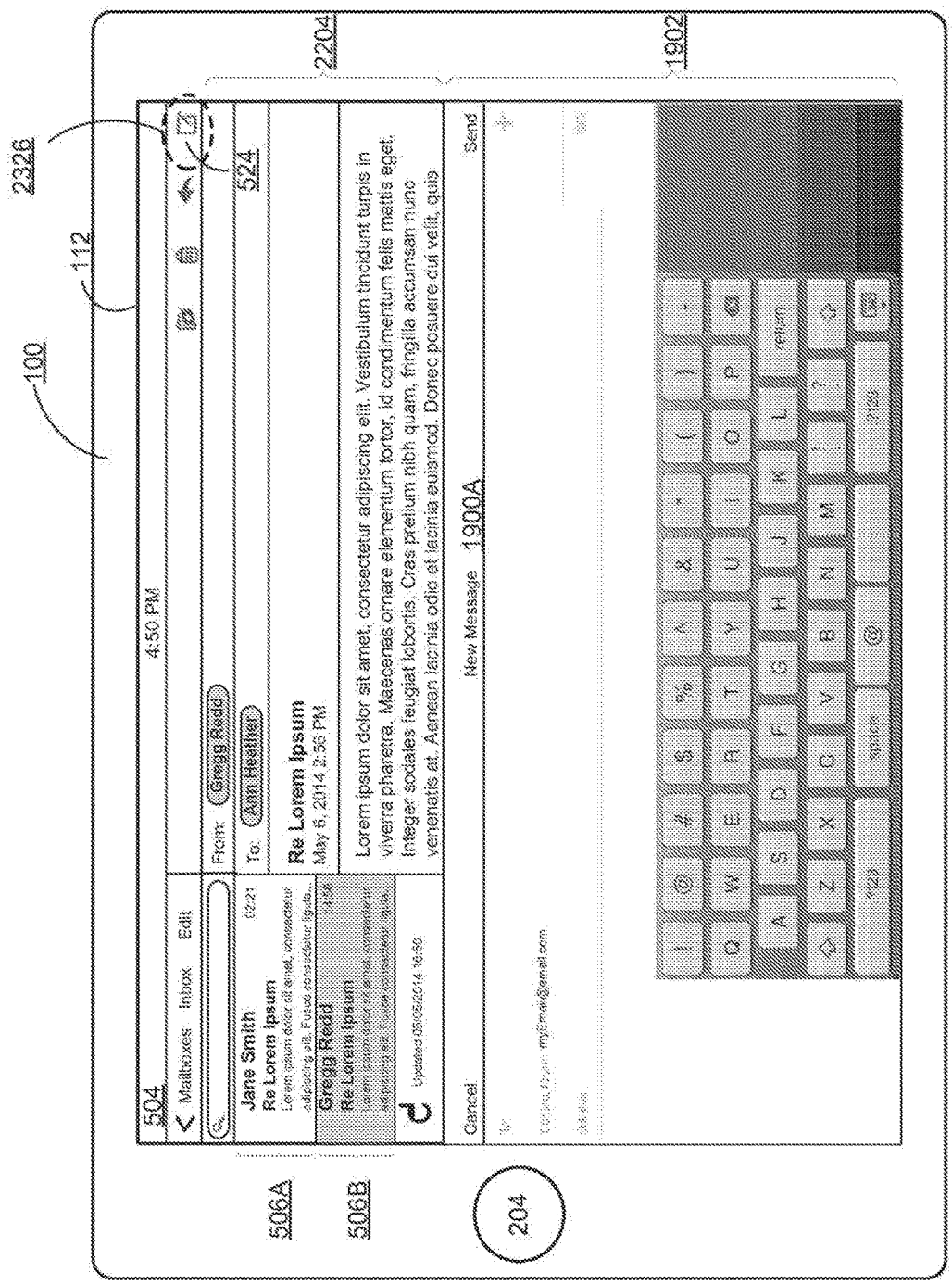
FIGS. 23F and 23G illustrate an overlaid draft email and overlaid draft emails in an email application, according to one embodiment.
Figure 23G:
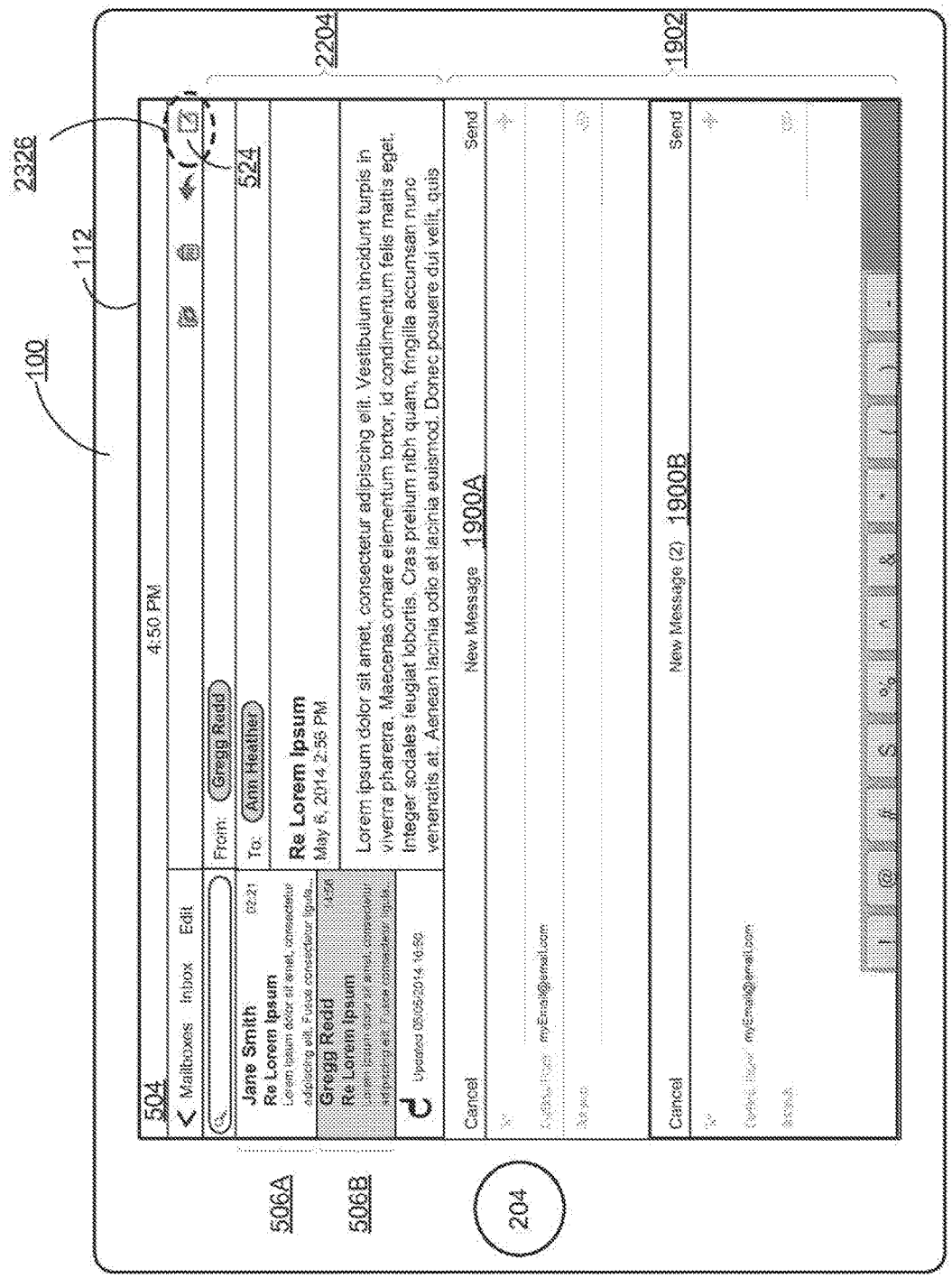

In an alternative embodiment, in response to receiving a draft gesture through a contact 2326 in FIG. 23C, the first draft UI 1900A is displayed in a draft section 1902 and can be displayed at a width of the touch screen 112 of the device 100, as shown in FIG. 23F, according to one embodiment. Responsive to receiving another draft gesture through contact 2326 in FIG. 23F, the second draft UI 1900B is displayed in the draft section 1902 and the second draft UI 1900A as well and can be displayed at a width of or a smaller width than the width of the touch screen 112 as well, as shown in FIG. 23G, according to one embodiment. In addition, the width of the second draft UI 1900B can be at the width of or a smaller width than the width of the touch screen 112 as well.

Figure 23H:
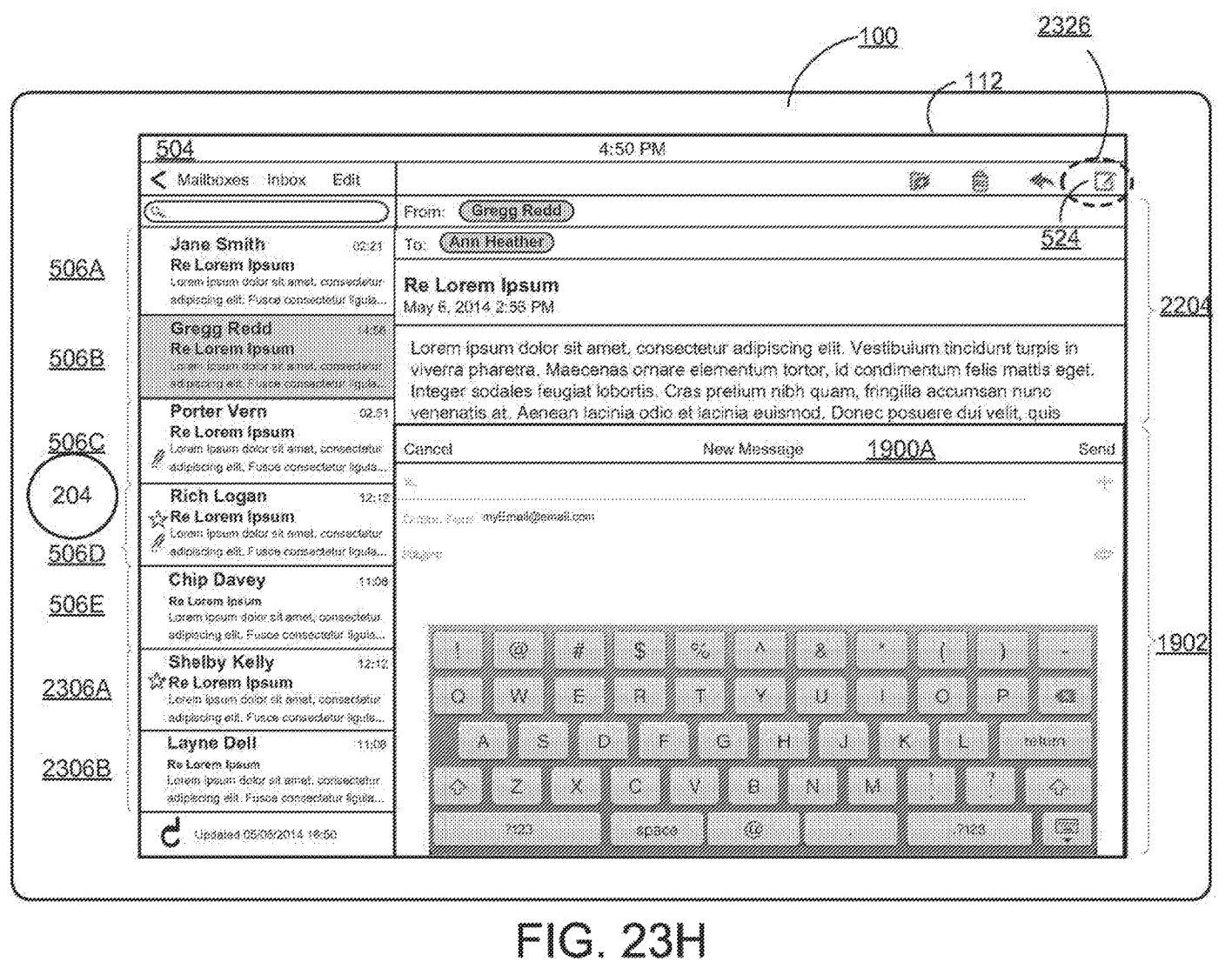
Figure 23I:
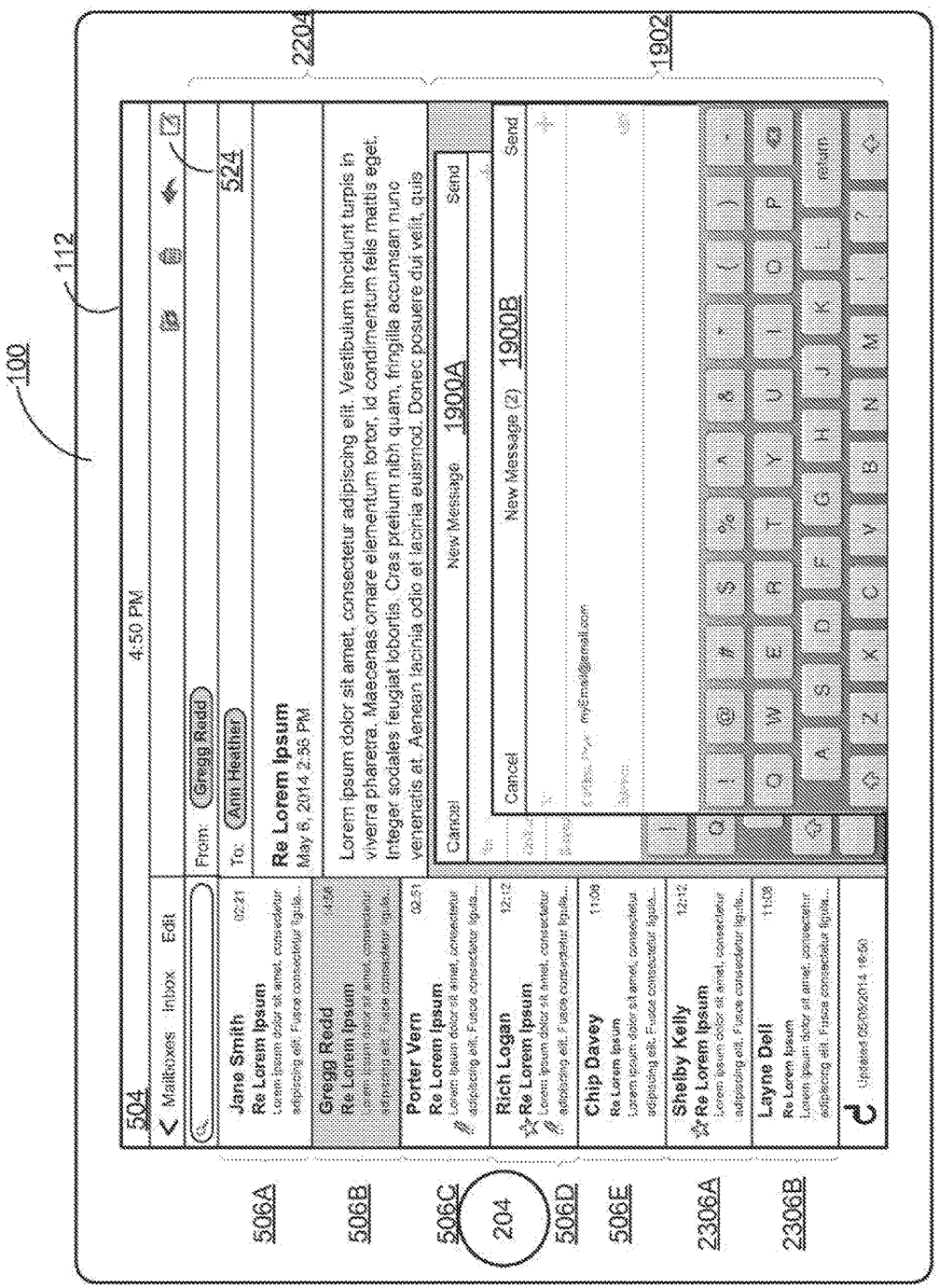

In yet another embodiment, in response to receiving a draft gesture through a contact 2326 in FIG. 23C, the first draft UI 1900A is displayed in a draft section 1902 and can be displayed at a width of or a smaller width than the width of the thread section 2204, as shown in FIG. 23H, according to one embodiment. Responsive to receiving another draft gesture through contact 2326 in FIG. 23H, the second draft UI 1900B is displayed in the draft section 1902 and the second draft UI 1900A as well and can be displayed at a width of or a smaller width than the width of the thread section 2204, as shown in FIG. 23I, according to one embodiment.

Figure 24A:
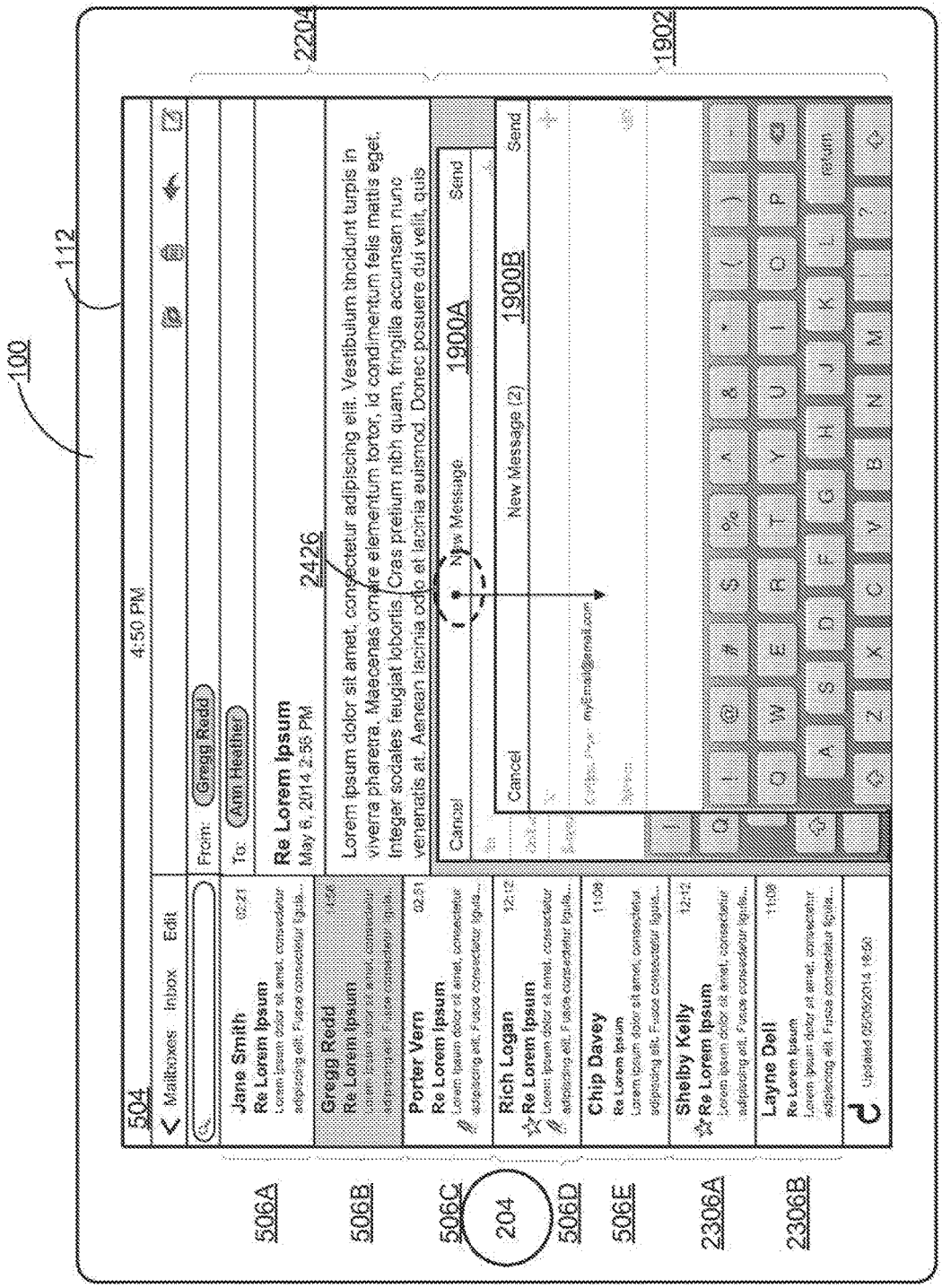
Figure 24B:
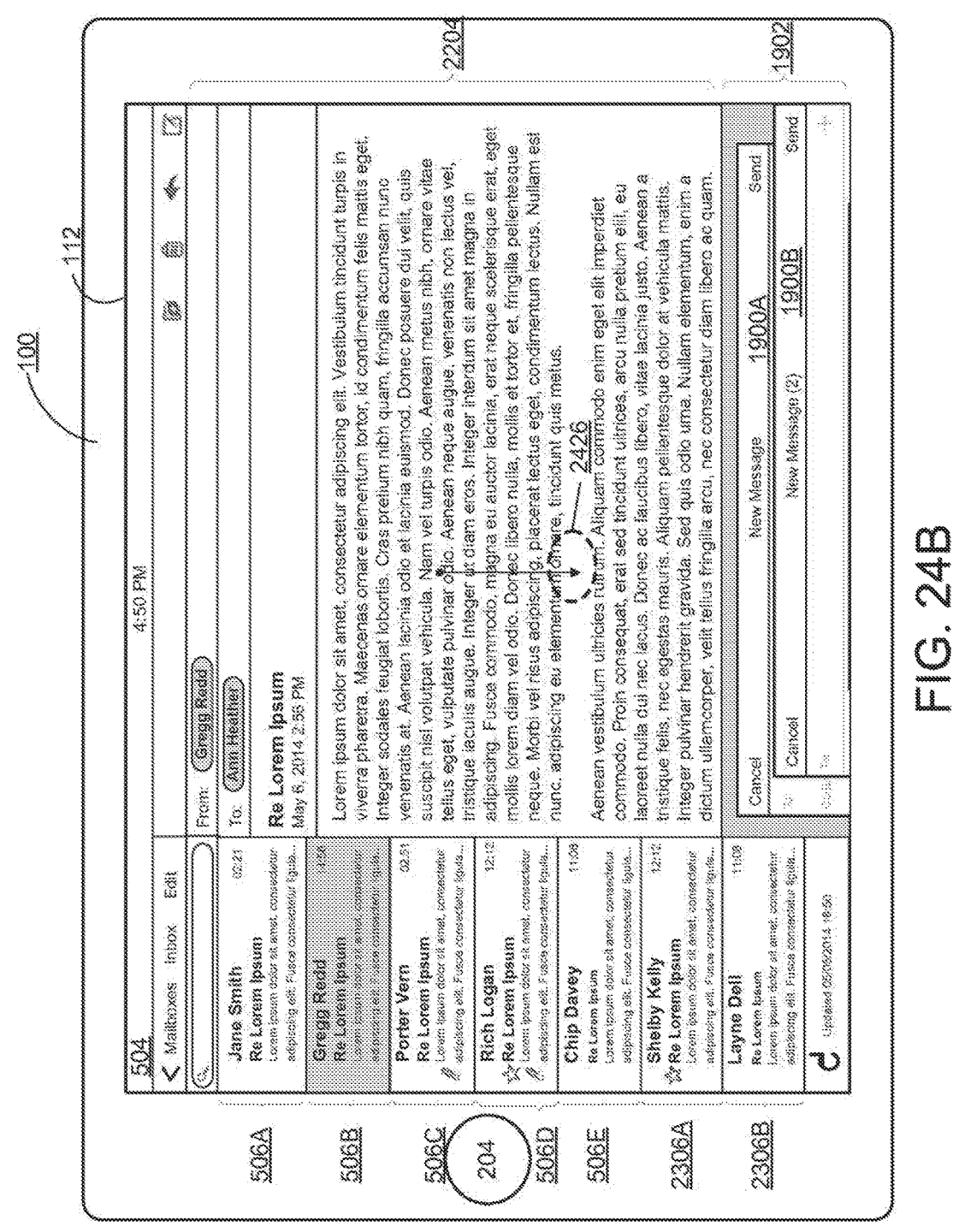

FIG. 24A illustrates a minimize gesture to minimize draft UIs 1900 to a smaller draft section 1902, according to one embodiment. The minimize gesture can be the same as the minimize gesture previously described in FIG. 19, according to one embodiment. Contact 2426 is detected by the device 100 at an initial position and maintained to a second position, completing the minimize gesture, as shown in FIG. 24B, according to one embodiment.

Figure 25A:
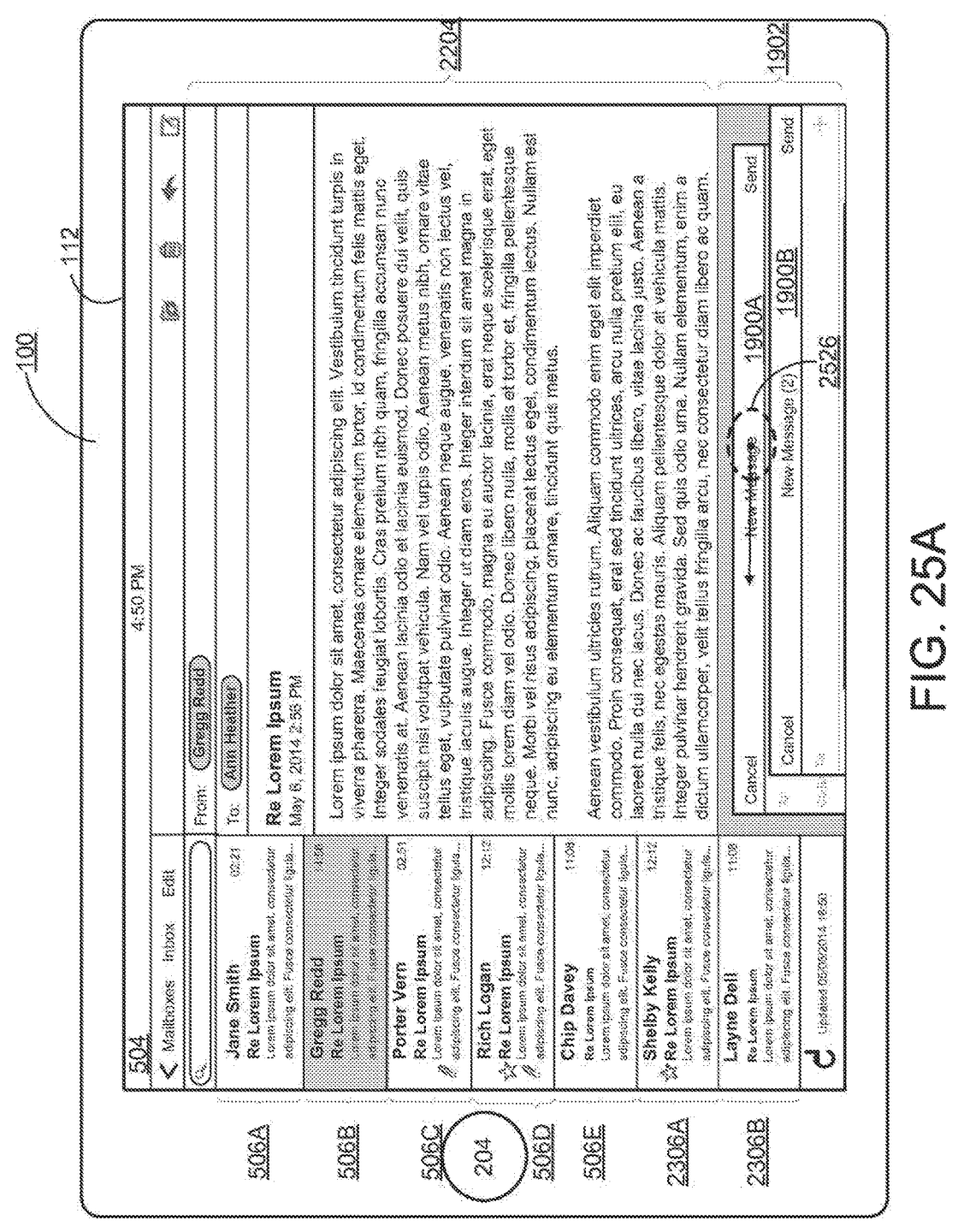
Figure 25B:
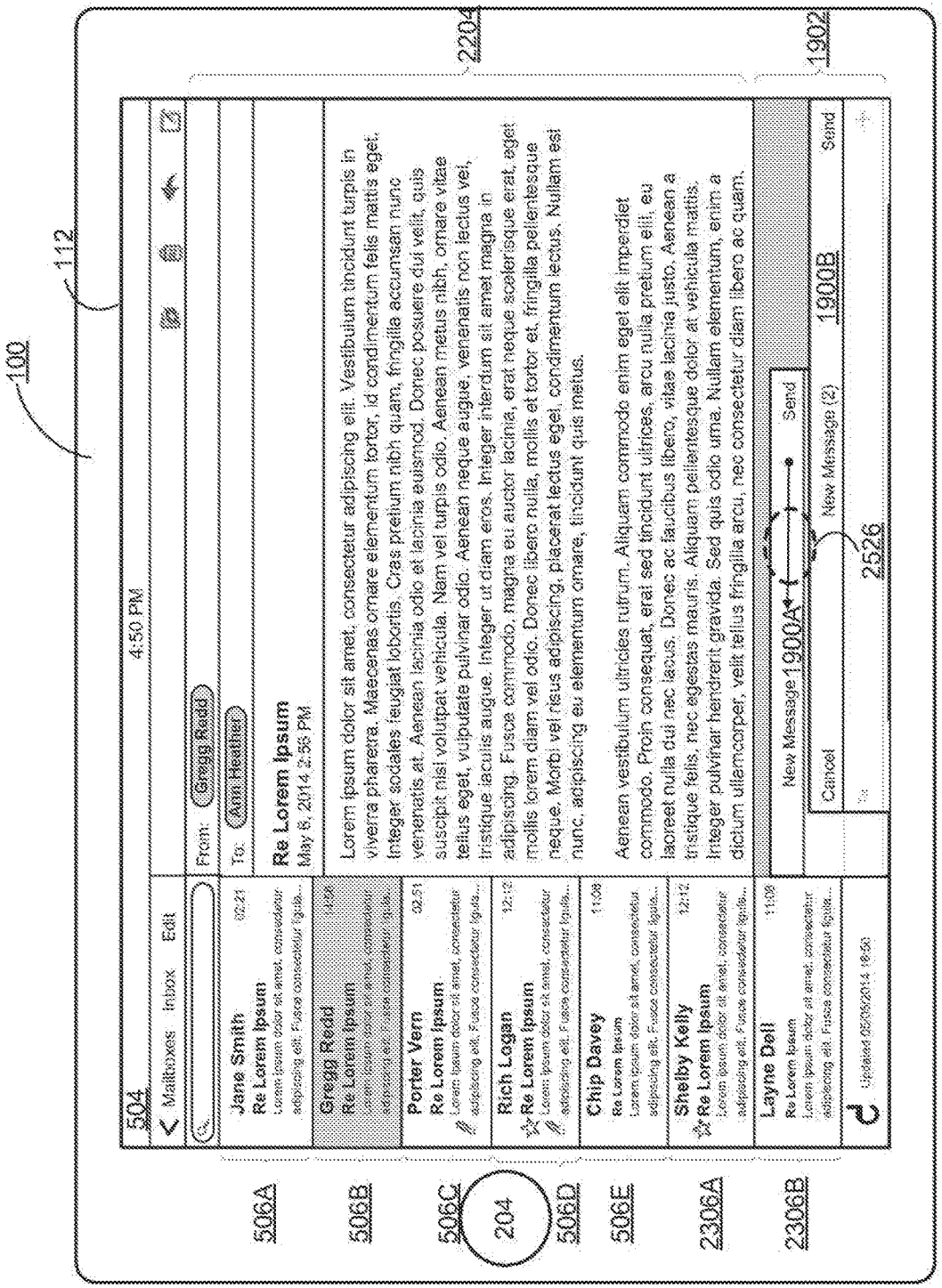
Figure 25C:
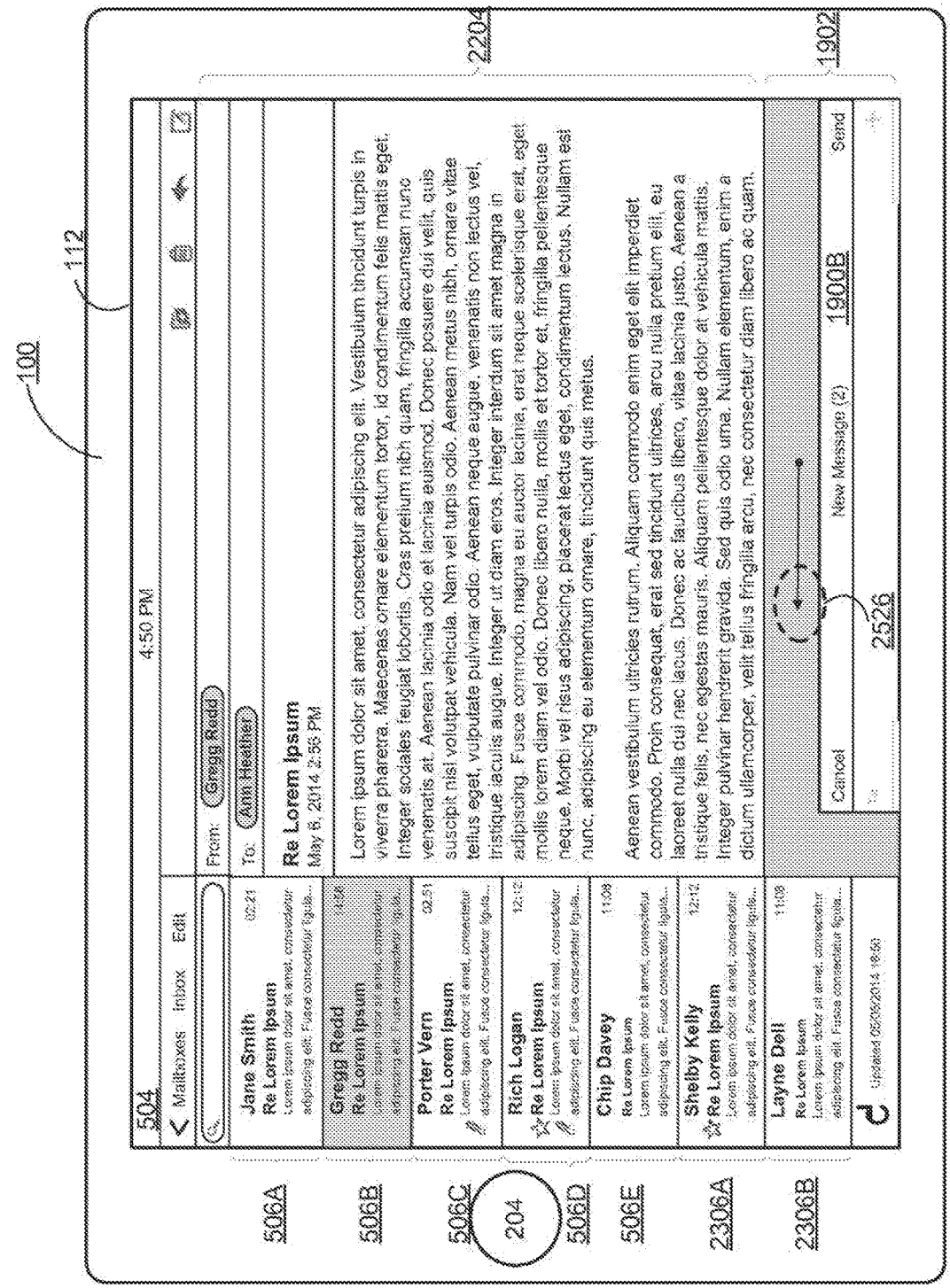

FIG. 25A illustrates a "remove" gesture to remove a draft UI 1900, according to one embodiment. The remove gesture can be the same as the remove gesture previously described in FIG. 20. Contact 2526 is detected by the device 100 at an initial position and maintained to a second position, completing the remove gesture, as shown in FIGS. 25B and 25C, according to one embodiment. Alternatively, a draft UI 1900 can be removed through selection of the "cancel" element, similar to the "close" element 1904 in FIG. 19.

Figure 26A:
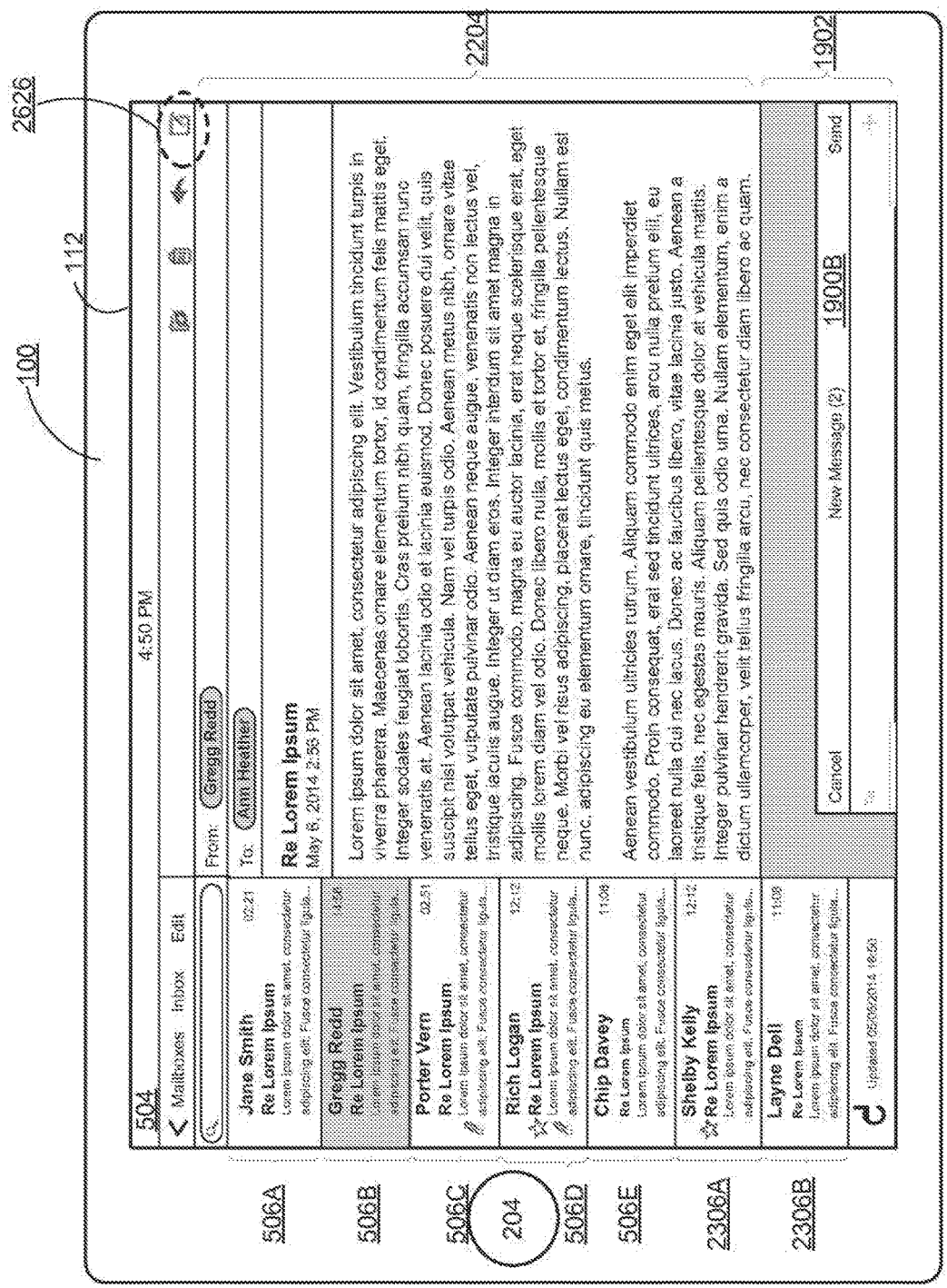

FIG. 26A illustrates a "draft" gesture indicative of a request to draft a new email, according to one embodiment. The draft gesture can be the same as the draft gesture previously described in FIGS. 11A and 21A for contact 2626. Responsive to completion of the draft gesture or once the threshold distance or rate is reached, a third draft UI 1900C is displayed in the draft section 1902 on top of the second draft UI 1900B, as shown in FIG. 26B, according to one embodiment.

Figure 26B:
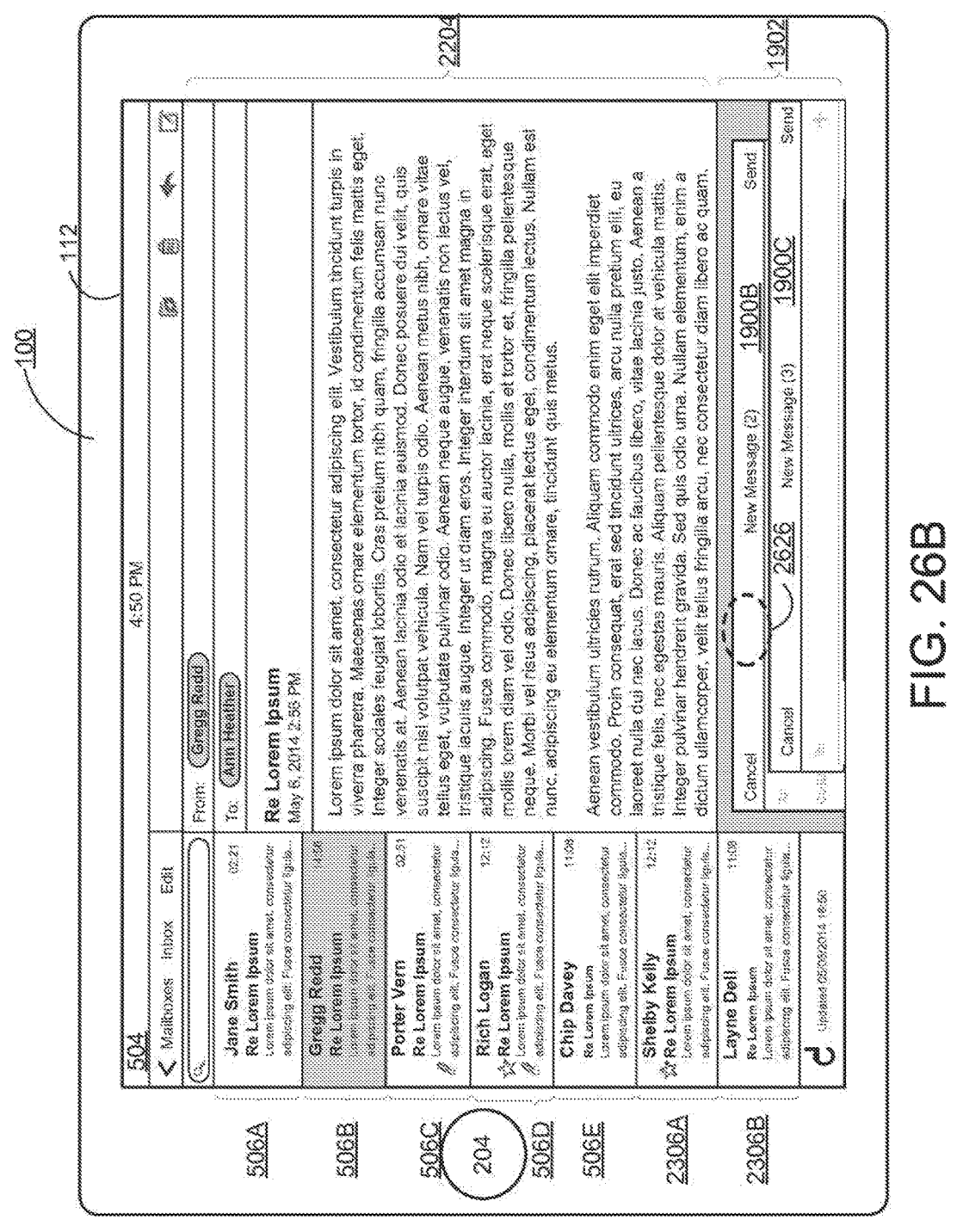
Figure 26C:
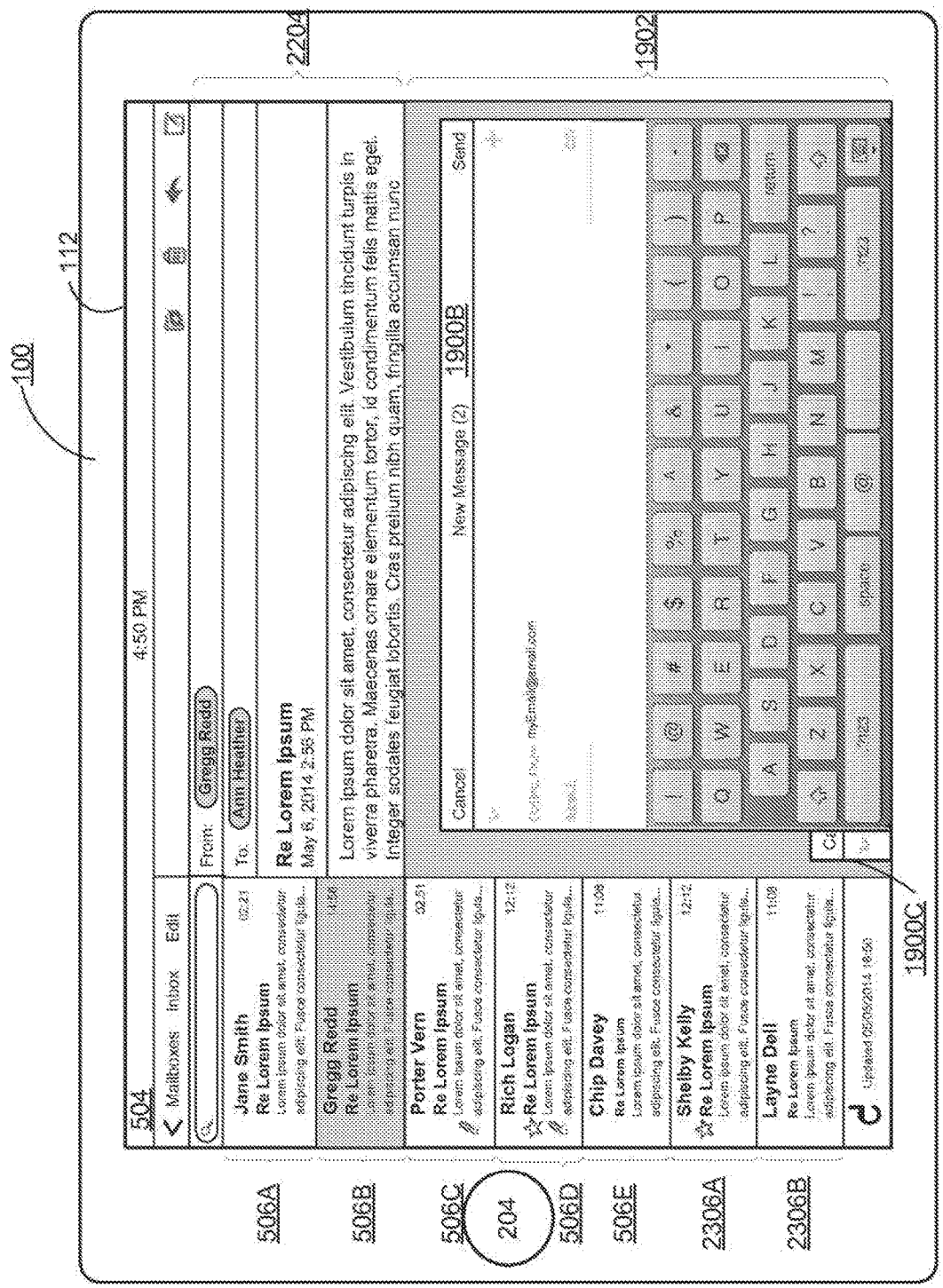

FIG. 26B illustrates contact 2626 detected by the device 100 with the third draft UI 1900C. Responsive to the detected contact 2626, the draft UI 1900B is presented in a larger draft section 1902 in the mail application view 504, as shown in FIG. 26C, according to one embodiment. In another embodiment, the draft UI 1900B can be displayed on top of the thread section 2204 and the draft section 1902. The width of the draft UIs 1900 in the draft section 1902 can be at a width equal to or less than width of the thread section 2204.

Figure 27A:
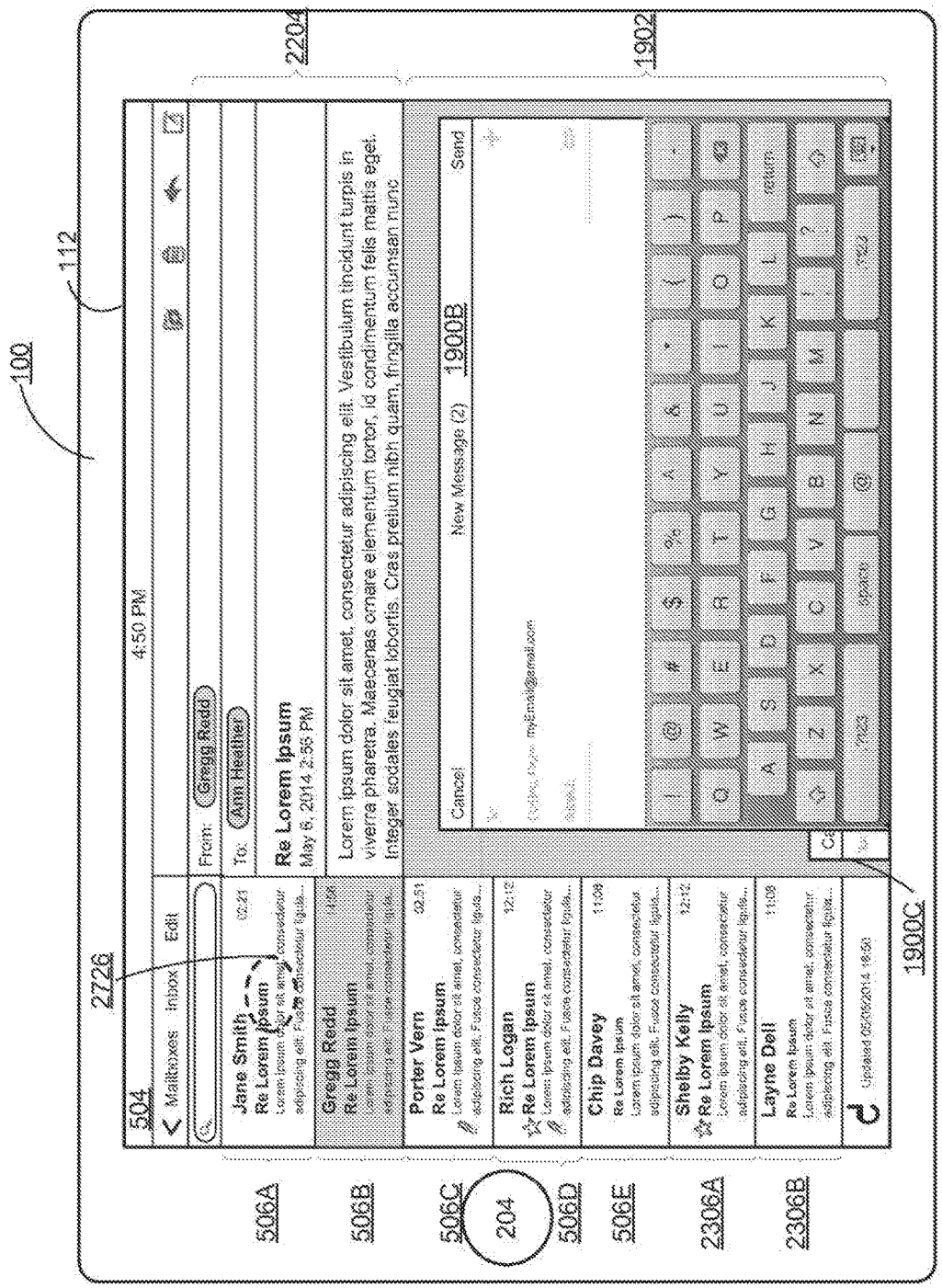
Figure 27B:
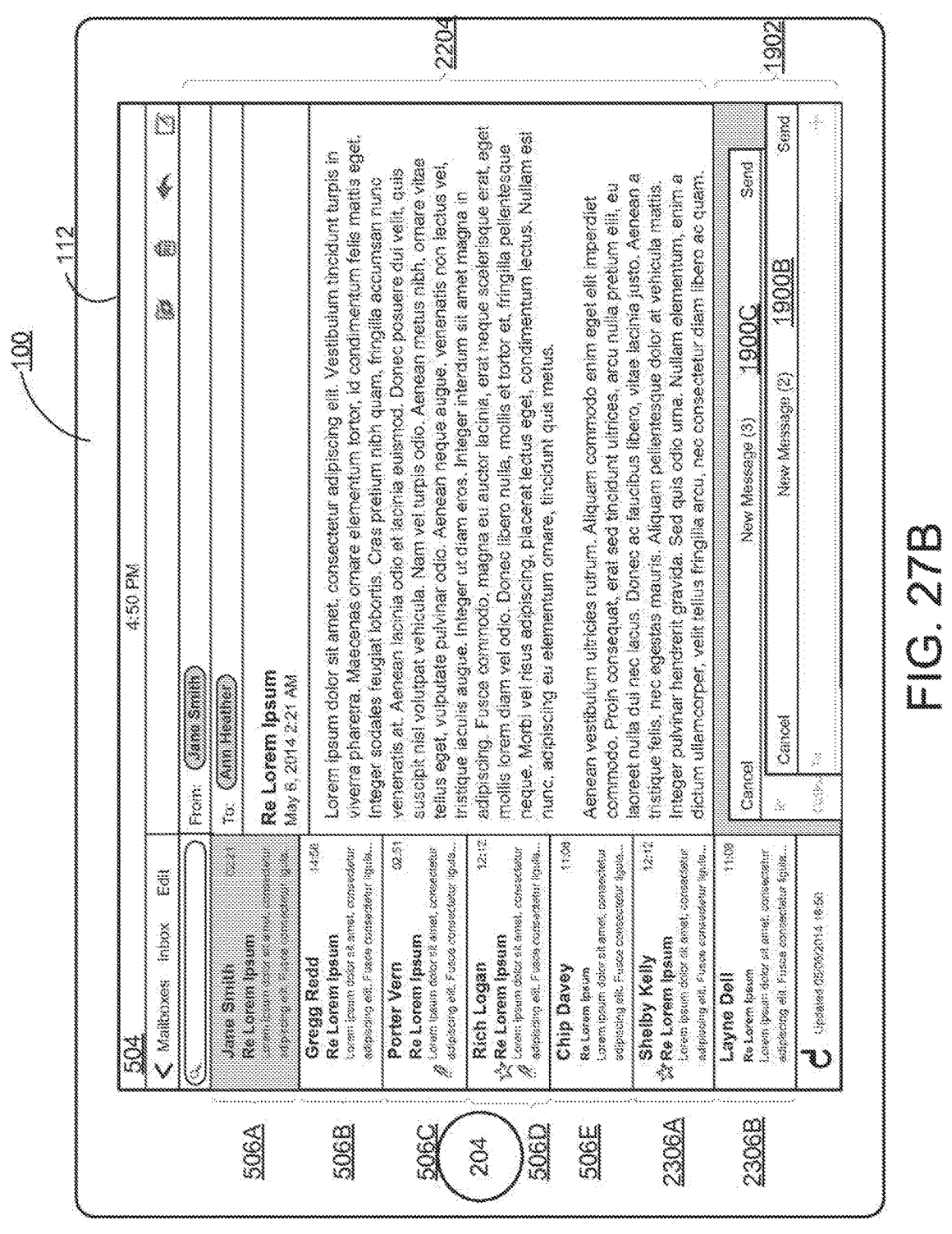

While a draft UI 1900B is displayed in a larger draft section 1902 or on top of the thread section 2204 and the draft section 1902, the user can still access the email threads 506, 2306 in their account. FIG. 27A illustrates a gesture for expanding an existing email thread 506A in an email application with a draft UI 1900B displayed in a larger draft section 1902, according to one embodiment. Responsive to selection of the email message associated with the message portion 506A through contact 2726, the draft UI 1900B is minimized to the smaller draft section 1902 and the email message associated with the message portion 506A is displayed in an expanded thread section 2204, as shown in FIG. 27B, according to one embodiment.

Figure 28:
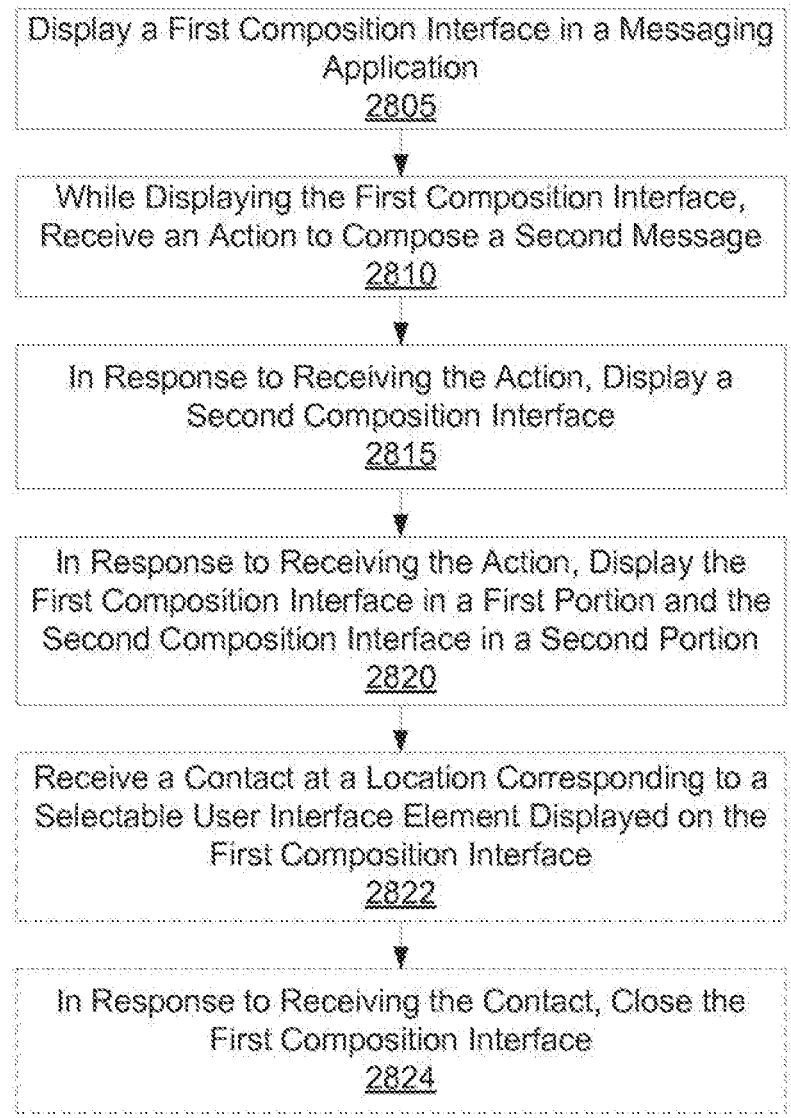
FIG. 28 is a flowchart of a method for displaying message composition interfaces in an email thread in an email application, according to one embodiment.

FIG. 28 is a flowchart of a method for displaying message composition interfaces or draft UIs in an email thread in an email application, according to one embodiment. Embodiments of the process described here may be implemented on an electronic device with a touch-sensitive surface and display, such as device 100. A first composition interface (e.g., 1900A in FIG. 19B) is displayed 2805 and the first composition interface includes a first message. For example, the first composition interface, including the first message, is displayed in response to receiving another action to compose the first message. While displaying the first composition interface, an action is received 2810 to compose a second message. The action is a contact (e.g., 1926 in FIGS. 19 and 2326 in FIG. 23C) with an additional user interface element and contact with the additional user interface element is indicative of displaying a composition interface (e.g., the first and second composition interfaces). For example, the additional user interface element is the new draft element 524, as shown in FIGS. 19B and 23C.

In response to receiving 2810 the action, a second composition interface (e.g., 1900B in FIG. C) is displayed 2815, the first composition interface is displayed 2820 in a first portion and the second composition interface is displayed 2825 in a second portion. In addition, the first and the second composition interfaces are resizable. In various embodiments, the area of the first portion and the area of the second portion can be equal or different. For example, the area of the second portion is greater than the area of the first portion and this can be in response to the second portion displaying the second composition interface while displaying the first composition interface. Since the second composition interface was displayed while the first composition interface was displayed, the second composition interface can also be displayed on top of the first composition interface in various embodiments.

A second contact (e.g., 1926 and 2426) can be received on the touch-sensitive surface at a location corresponding to a composition interface (e.g., the first composition interface or the second composition interface). Continuous movement of the second contact in a first direction, without breaking the second contact with the touch-sensitive surface, is detected, as shown in FIGS. 19D and 19E. One or more parameters of the movement of the second contact are determined and, in accordance with a determination that a parameter of the movement meets a first criterion, the first composition interface and the second composition interface are displayed in a third portion (e.g., draft section 1902 in FIG. 20A) below a list comprising information corresponding to a plurality of email messages associated with the messaging application. Portions of the plurality of email messages can be displayed as shown in the message portion 506A-D in FIG. 20.

In a similar manner, a third contact can be received on the touch-sensitive surface at a location corresponding to the third portion. Continuous movement of the second contact in a second direction, without breaking the third contact with the touch-sensitive surface, is detected. One or more parameters of the movement of the third contact are determined and, in accordance with a determination that a parameter of the movement meets a first criterion, the first composition interface and the second composition interface are displayed in a fourth portion below the list comprising information corresponding to the plurality of email messages associated with the messaging application, wherein the area of the fourth portion greater than the area of the third portion, as shown in FIG. 26C.

Composition interfaces can also be removed. A fifth contact (e.g., 2026 and 2526) is received on the touch-sensitive surface at a location corresponding to first composition interface and continuous movement of the fifth contact in a third direction, without breaking the fifth contact with the touch-sensitive surface, is detected, as shown in FIGS. 20 and 25. One or more of the parameters of the movement of the fifth contact are determined and, in accordance with a determination that a parameter of the movement meets a third criterion, the first composition interface is closed. Alternatively, a sixth contact is received 2822 on the touch-sensitive surface at a location corresponding to a selectable user interface element displayed on the first composition interface. In response to receiving the sixth contact at the location, the first composition interface is closed 2824.

In one embodiment, the first direction is a downward motion, substantially parallel with the orientation of the display and the second direction is opposite of the first direction and still substantially parallel with the orientation of the display. The third direction, then, is substantially perpendicular to the first and second direction and, therefore, to the orientation of the display. The one or more parameters include distance, rate, strength of pressure of the contact, number of contact points, and any combination thereof, as previously described in conjunction with FIG. 10. In addition, the criteria (e.g, first, second, and third criterion) include a threshold distance, a threshold rate, threshold strength of pressure of the contact, a threshold number of contact points, and any combination thereof, as also previously described in conjunction with FIG. 10.

Conversation View in an Email UI

Figure 29A:
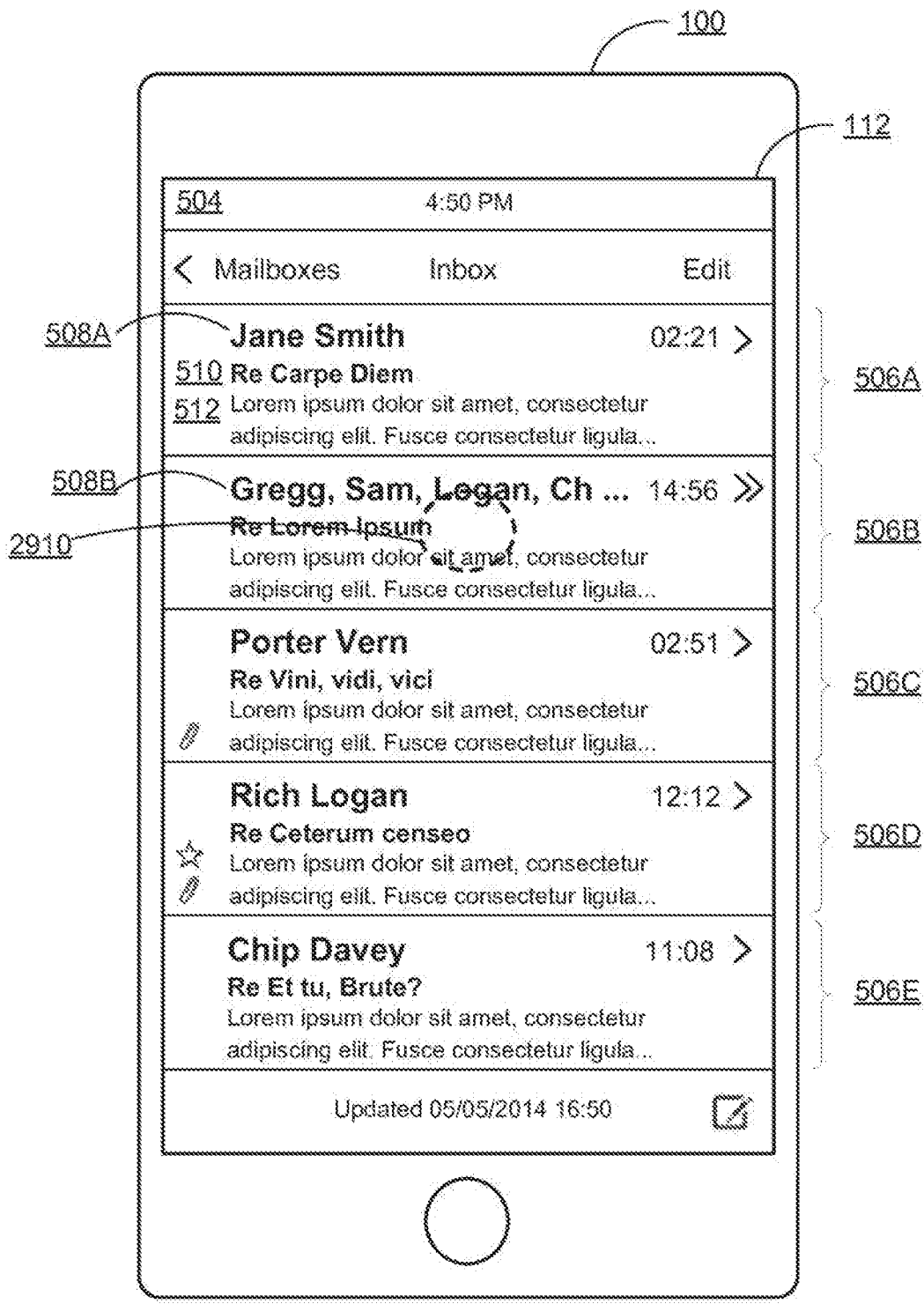
FIGS. 29A-E illustrate gestures and an exemplary user interfaces for viewing an email thread in a conversation view with a common header including subject and participant information, according to some embodiments.

FIG. 29A illustrates an application view 504 of an email application, according to one embodiment. The application view 504 displays email messages or email threads 506A, 506B 506C, 506D, 506E from the inbox of the user's email account. Each email message or thread 506 displays sender information 508, subject information 510, and a portion of the body of the email 512. In one embodiment the sender information includes the name of the sender, e.g. the sender's first or last name, and the time or date when the email message was received. In case of an email thread, the sender information 508B includes a list of names of the senders who participate in the email thread. In this case, the time and date typically indicate when the last email message in the thread was received. In one embodiment, the list of names is truncated to fit within a line of the displayed email thread 506A as shown in FIG. 29A. The displayed, truncated list may include the character string " . . . " to indicate the truncation of the sender information 508B.

Figure 29B:
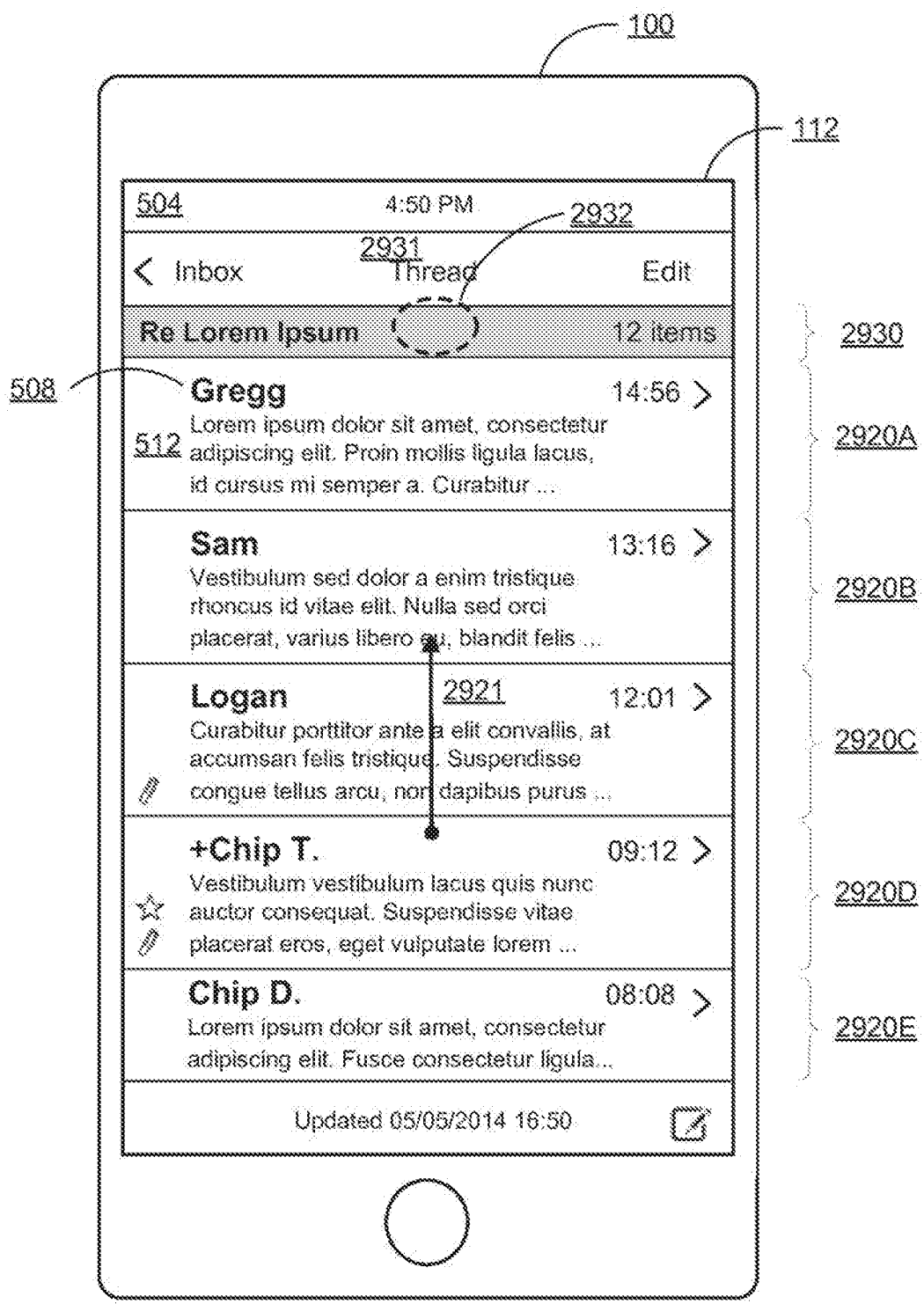

Contact 2910 is detected by the device 100 on the email thread 506B. The contact 2910 in one embodiment is a tap on the email thread 506B. Responsive to the detected contact 2910, the application view 504 of the email application displays email messages 2920A, 2920B, 2920C, 2920D, and 2920E from the email thread 506B as illustrated in FIG. 29B, according to one embodiment. Each email message 2920 displays sender information 508, and a portion of the body of the email 512. The sender information 508 include name of the sender of the email message 2920, who participates in the email thread 506B. Email messages of the email thread 506B that are not initially displayed in the application view 504 after contact 2910 can be displayed following a scrolling gesture 2921. This scrolling gesture is applied in a direction substantially perpendicular to the text lines of the displayed email messages, as shown in FIG. 29B. Applying this scrolling gesture displays email messages that follow email message 2920E in the email thread 505B. Once these subsequent email messages are displayed, reversing the direction of the scrolling gesture displays email messages that precede the currently displayed email messages in the email thread 506B.

As displayed, an additional user interface element that is a thread header element 2930 is displayed in the application view 504 above the displayed email message 2920A. The thread header element 2930 may show the subject line common to the email messages and the number of email messages (items) in the email thread 506B. Furthermore, the title element 2931 displays the character string "Thread" indicating to the user that an email thread is displayed in the application view 504.

Figure 29C:
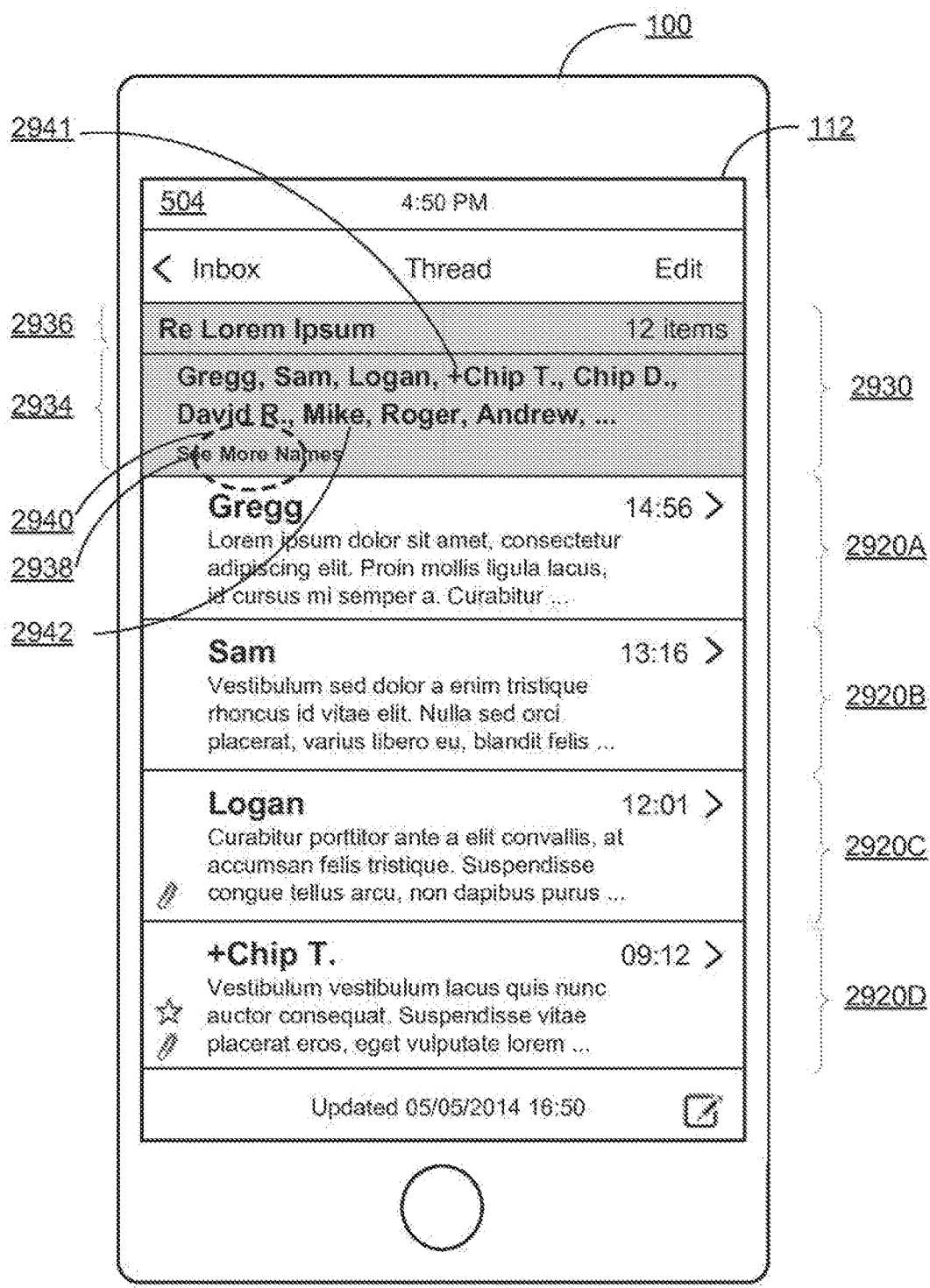

FIG. 29B also illustrates a first expand gesture in the application view 504 associated with the email thread 506B, according to one embodiment. The first expand gesture with contact 2932 is a tap on the thread header element 2930. Responsive to the first expand gesture with contact 2932 detected by the device 100, the thread header element expands to display a list of names of senders who participate in the email thread 506B. In one embodiment, the displayed names in the list include only the first names of the senders. If the email thread 506B includes senders having the same first names, the list includes their first name and the initial of their last name as shown in FIG. 29C. Alternatively, the list of sender names as displayed includes the first and last names of each sender. The display order of first and last name may vary and can optionally be selected by the user of the email application. In case the last name is displayed first, a comma is displayed after the last name to visually separate the last from the first name of the sender.

FIG. 29C illustrates expanding the thread header element 2930 in an email application, according to one embodiment. The first expand gesture is indicative of a user request to expand the thread header element 2930 to display a thread participants section 2934 below a subject line section 2936. The thread participants section 2934 includes the sender names of email messages in the thread, whereas the subject line section 2936 includes a subject line, which is common to the email messages in the thread, and a number of messages (items) in the thread. Below the thread header element 2930 the email messages 2920A, 29210B, 2920C, and 2920D are displayed in the application view 504. If the list of sender names in the email thread requires more than two lines to be displayed in thread participants section 2934, the section 2934 includes a more option 2938 that allows for displaying additional lines including sender names not displayed in the first two lines.

Figure 29D:
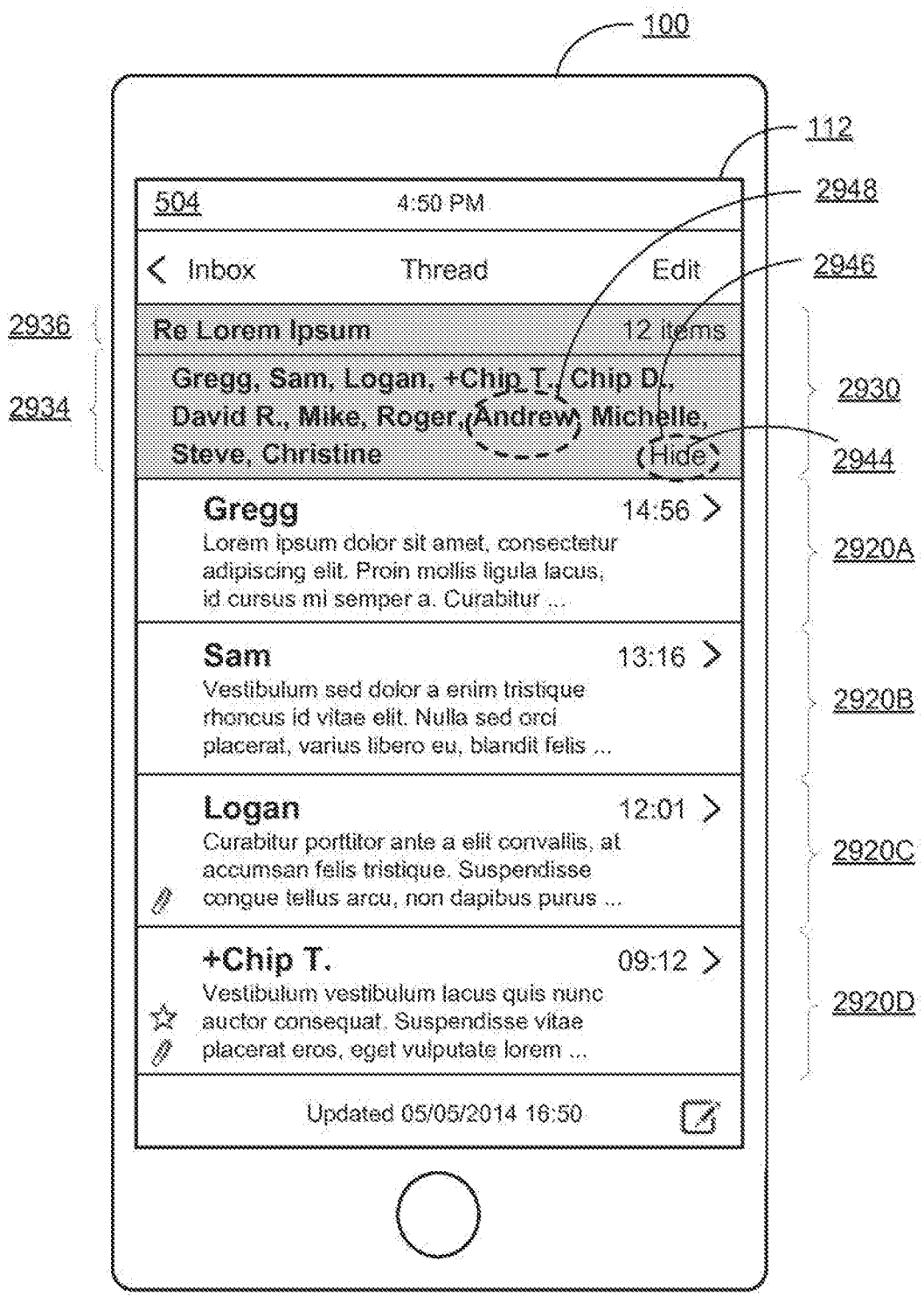

FIG. 29C also illustrates a second expand gesture in the application view 504 associated with the email thread 506B, according to one embodiment. The second expand gesture with contact 2940 is similar or the same as the expand gesture with contact 926 previously described in FIG. 9A. In one embodiment, the second expand gesture includes, for example, a tap or contact on an option as a more option 2938, shown as a contact 2940 in FIG. 29C. The more option 2938 is displayed as part of the thread participant section 2934. Responsive to the second expand gesture with contact 2940 detected by the device 100, the section 2934 expands to display the names of all the senders in the thread, as shown in FIG. 29D. With the display of all the participant names the more option 2938 is no longer displayed in the thread participant section 2934. Instead of the more option, a hide option 2944 is displayed in the thread participant section 2934, as shown in FIG. 29D.

Figure 29E:
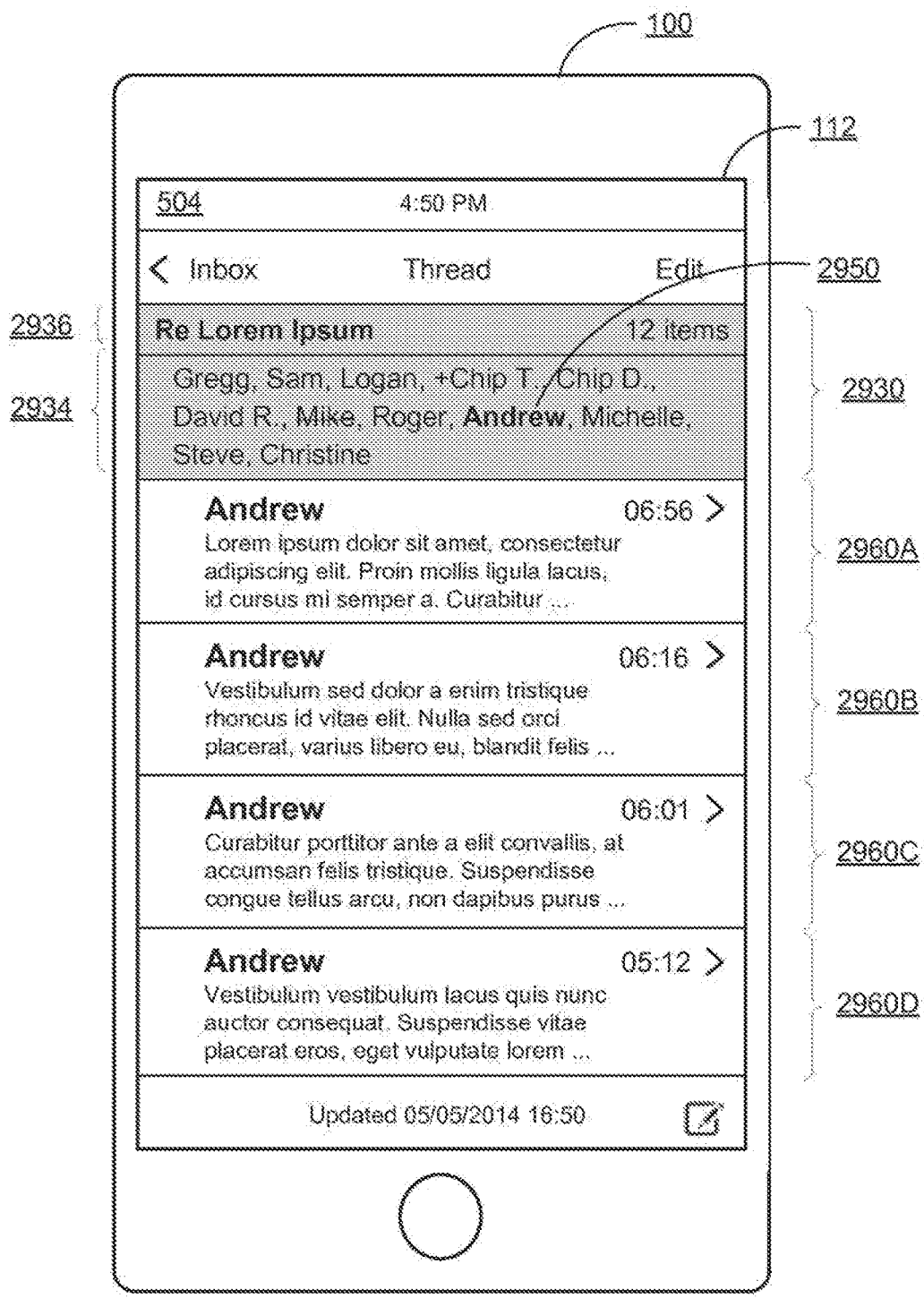

Similar to the first two lines in the thread participant section 2934, only the first name of the senders may be displayed in any additional lines. In other embodiments, first and abbreviated or unabbreviated last name, or last name followed by comma and first name for each participant are displayed as described above. Senders who were not originally part of the email thread, but added by the user of the email application to the thread, as described below, have a "+" sign displayed in front of their displayed names 2941. In comparison, senders who are excluded by the user from the email thread, as described below, have their displayed names 2942 struck through as shown in FIGS. 29C-E (e.g., Mike).

FIG. 29D illustrates a gesture in the application view 504 associated with the email thread 506B, according to one embodiment. In one embodiment, the hide gesture includes a tap or contact on the hide option 2944, shown as contact 2946 in FIG. 19D. Responsive to the hide gesture with contact 2946 detected by the device 100 on the hide option 2944 displayed in the thread participants section 2934, the section 2934 is contracted to again display the more option 2938 and only the first two lines of sender names who participate in the email thread, as shown in FIG. 29C.

FIG. 29D also illustrates a filter gesture in the application view 504 associated with the email thread 506B, according to one embodiment. The select-sender gesture includes a contact on a name in the thread participant section 2934, shown as contact 2948 in FIG. 19D. In the example of FIG. 19D, the sender named "Andrew" is selected responsive to the "select-sender" gesture with contact 2948 detected by the device 100. Additional senders may be selected by the select-sender gesture including a tap on their corresponding names displayed in the thread participant section 2934 (not shown). Upon selection of a sender name, the name of the selected sender in the thread participant section 2934 appears visually distinguished. For example, the selected name 2950 is displayed in a bold font in section 2934, shown in FIG. 29E. Names of senders that are not selected appear visually distinguished from the names of the selected senders. As shown in FIG. 29E, the names of unselected senders are displayed in regular and not bold font.

A deselect-sender gesture in the application view 504 associated with the email thread 506B includes a tap on a sender name in the thread participant section 2934 provided that the deselect-sender gestures follows the select-sender gesture for that particular sender name. Following the first expand gesture, alone or in combination with a second expand gesture, without any prior select-sender gesture all displayed names in the thread participant section 2934 are selected, and the deselect-sender gesture for these displayed names would have no effect, leaving all displayed names selected. In this case, selecting a displayed name with a select-sender gesture unselects all displayed and selected names that are not selected by the select-sender gesture. The unselected, displayed names as described above appear visually distinguished from the selected sender name. For the example shown in FIG. 29E, "Gregg," "Sam," "Logan," "+Chip T.," "Chip D.," "David R.," "Roger," "Michelle," "Steve," and "Christine" are names of unselected senders and are displayed in regular, not bold font.

FIG. 29E illustrates displaying only email messages of a selected sender in response to a select-sender gesture in the application view 504 associated with the email thread 506B, according to one embodiment. Responsive to the select-sender gesture with contact 2948 detected by the device 100, only email messages 2960A, 2960B, 2960C, and 2960D associated with the selected sender ("Andrew") are displayed in the application view 504. Email messages from other senders in the email thread are not displayed so long as these senders are not selected, as illustrated in FIG. 29E.

Figure 30A:
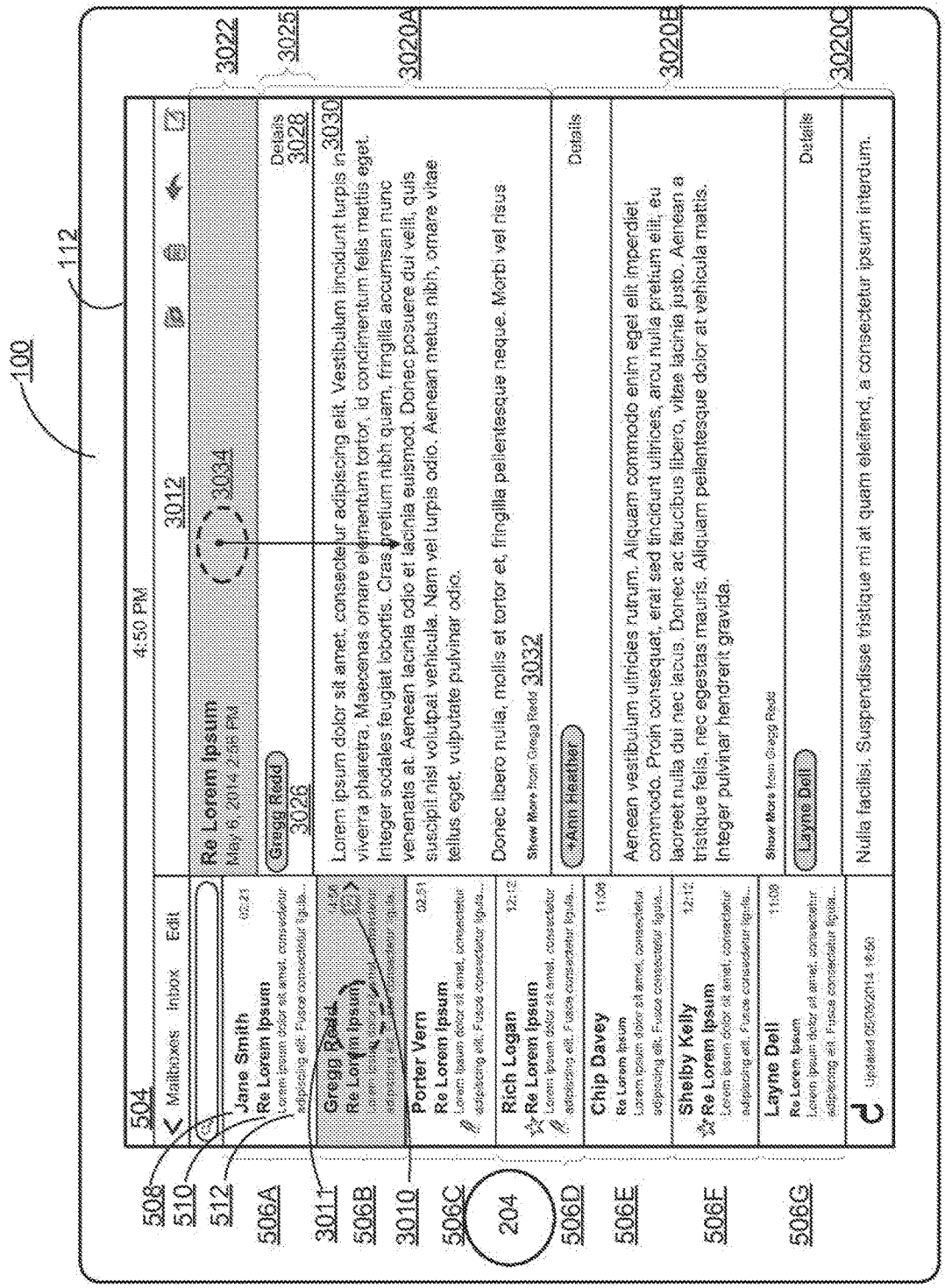

FIG. 30A illustrates an application view 504 of an email application, according to one embodiment. For example, the application view 504 includes email messages 506A, 506C, 506D, 506E, 506F and 506G or email thread 506B from the inbox of the user's email account. Each email message or thread 506 displays sender information 508, subject information 510, and a portion of the body of the email 512. In addition, an email message or thread 506 can include indicators such as an attachment indicator 514 and a VIP sender indicator 516, as described in FIG. 5B, and in case of an email threads 506 a VIP thread indicator 1108 (not shown), as described in FIG. 11. As also described in FIGS. 5B and 23B, additional user interface elements are displayed in the application view 504 and include a back element 518, an edit element 520, a refresh element 522, a new draft element 524, an archive element 2302, a trash icon 2304, and a reply action element 2306. Furthermore, an email thread 506 can include an item indicator 3010 that displays the number of email messages included in the thread.

FIG. 30A also illustrates a thread gesture 3011, as previously described in FIG. 22B, to display the email thread 506B in a thread section 3012 of the application view 504, according to one embodiment. Responsive to the thread gesture 3011 that includes a tap on the email thread 506B and is detected by the device 100, the content of the email thread is displayed in a thread section 3012. The displayed content includes email messages 3020A, 3020B, and 3020C from the email thread 506B in the inbox of the user's email as illustrated in FIG. 30A. As displayed, an additional user interface element that is a thread header element 3022 is displayed in the application view 504 above the displayed email messages 3020A, 3020B, and 3020C. The thread header element 3022 shows the subject line common to the email messages and may also display the date and the time when the last email message was received in the email thread. Optionally, the thread header element 3022 displays the number of email messages (items) in the email thread 506B.

Figure 30B:
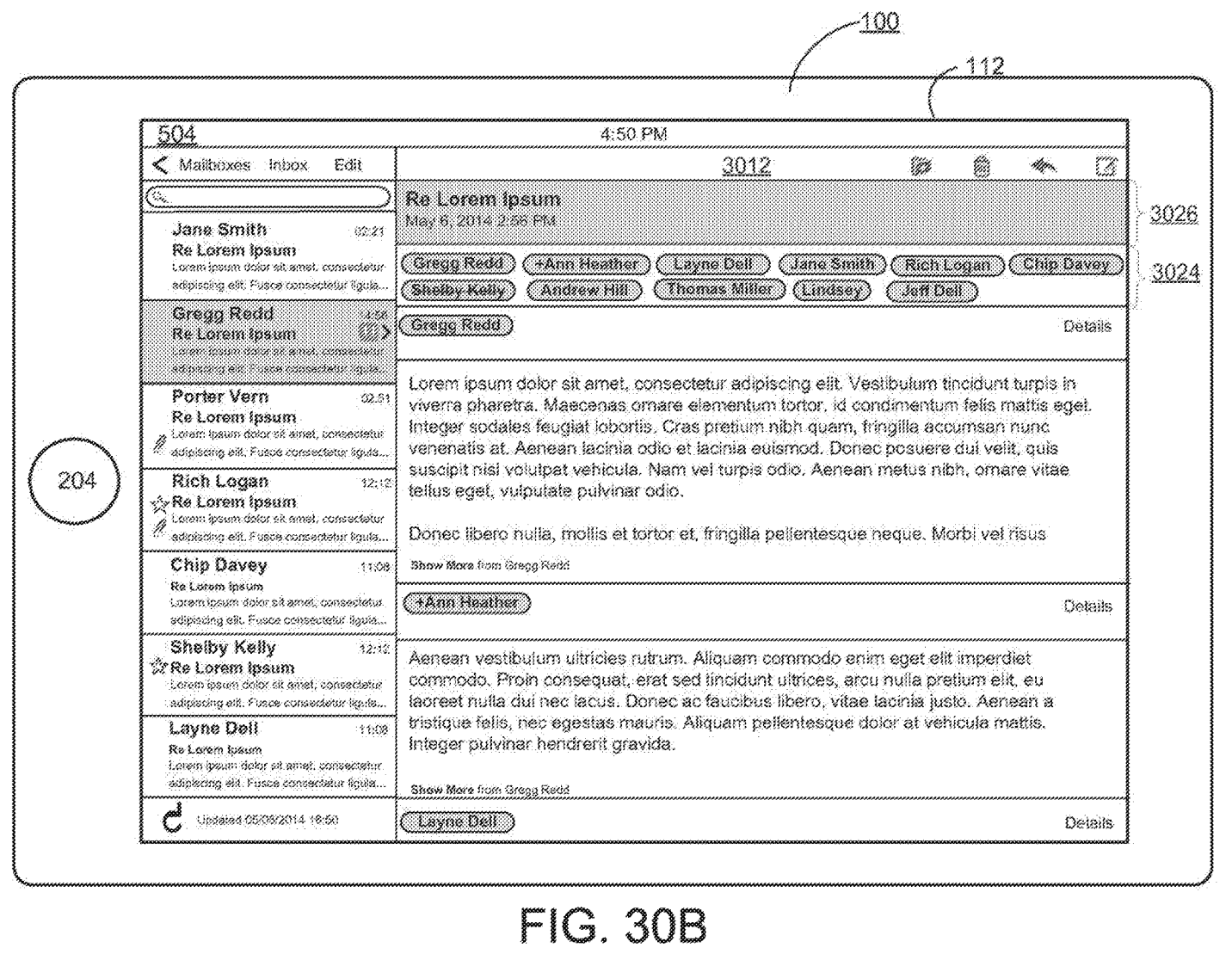

FIG. 30A further illustrates expanding the thread header element 3022 in an email application, according to one embodiment. The expand gesture is indicative of a user request to expand the thread header element 3022 to display a thread participants section 3024 that includes the names of the participants in the email thread 506B below a subject line section 3026 that includes the subject line common to the email messages and the number of items in the email thread 506B, as illustrated in FIG. 30B. Below the thread header element 3022 the email messages 3020A, 3020B, and 3020C are display in the application view 504.

As illustrated in FIG. 30A, the email messages 3020A, 3020B, and 3020C displayed in the thread section 3012 may include header section 3025 including sender information 3026, a details option 3028 to show additional sender information, and a portion of the body of the email 3030 including a more option 3032 to show the remaining portion of the body of the email not already displayed. In response to an option gesture including a tap (not shown), the details option 3028 displays additional sender information about the email, including but not limited, recipients (original and carbon-copied), time and date of the email in the header section 3025. The more option 3032 is similar to the more option 2940 described above with respect to FIG. 29C.

FIG. 30A also illustrates a expand gesture in the application view 504 associated with the email thread 506B, according to one embodiment. The expand gesture with contact 3034 is similar or the same as the expand gesture with contact 926 previously described in FIG. 9A. In one embodiment, the expand gesture includes a tap on the thread header element 3022 to expand the thread header element for including sender names of the email thread. Alternatively, the expand gesture with contact 3034 includes a swipe in a direction substantially perpendicular to the subject line of the thread header element 3022. For example, the contact 3034 is detected by the device at an initial position on the thread header element 3022. The contact 3034 is maintained and dragged a threshold distance from the initial position to a second position on top of an email thread 506 displayed in the thread section 3012 in a continuous movement without breaking contact with the touch screen 112 of the device 100, as shown in FIG. 30A. In another embodiment, instead of a threshold distance, the expand gesture includes dragging the contact at a threshold rate on top of the thread section 3012 displayed in the application view 504. Thus, the contact 3034 is maintained and dragged at a rate in a direction substantially perpendicular to the subject line of the thread header element 3022. In other embodiments, other properties of the maintained contact 3034 are evaluated for the expand gesture besides distance and rate are strength of pressure of the contact or number of contact points.

FIG. 30B illustrates thread header element being expanded to display a list of sender names in the email thread 506B in response to the expand gesture with contact 3034 being detected by the device 100, as shown in FIG. 30A, according to one embodiment. This embodiment is automatically shown in the first instance of the conversation view. In one embodiment, the displayed names in the list include only the first and last sender names in the email thread 506B. Other embodiments of the displayed names of participants are described above with respect to FIGS. 29B and 29C. The order of first and last name as shown may vary and can be selected by the user of the email application as an option. In one embodiment, the order is alphabetically, in another embodiment the order is based on the time and date of the last email message received from the participant with one latest in time and date listed first. In addition, senders added to the email thread by the user are indicated by a "+" sign in front of their displayed names, and senders excluded by the user have their displayed names crossed out as illustrated in FIG. 30B. If the list of sender names in the email thread 506B requires more than two lines to be displayed in thread participants section 3024 of the thread header element 3022, the section 3022 includes a more option that allows for displaying additional lines including participant names of the list not displayed in the first two lines as described with respect to FIG. 29C.

Figure 31:
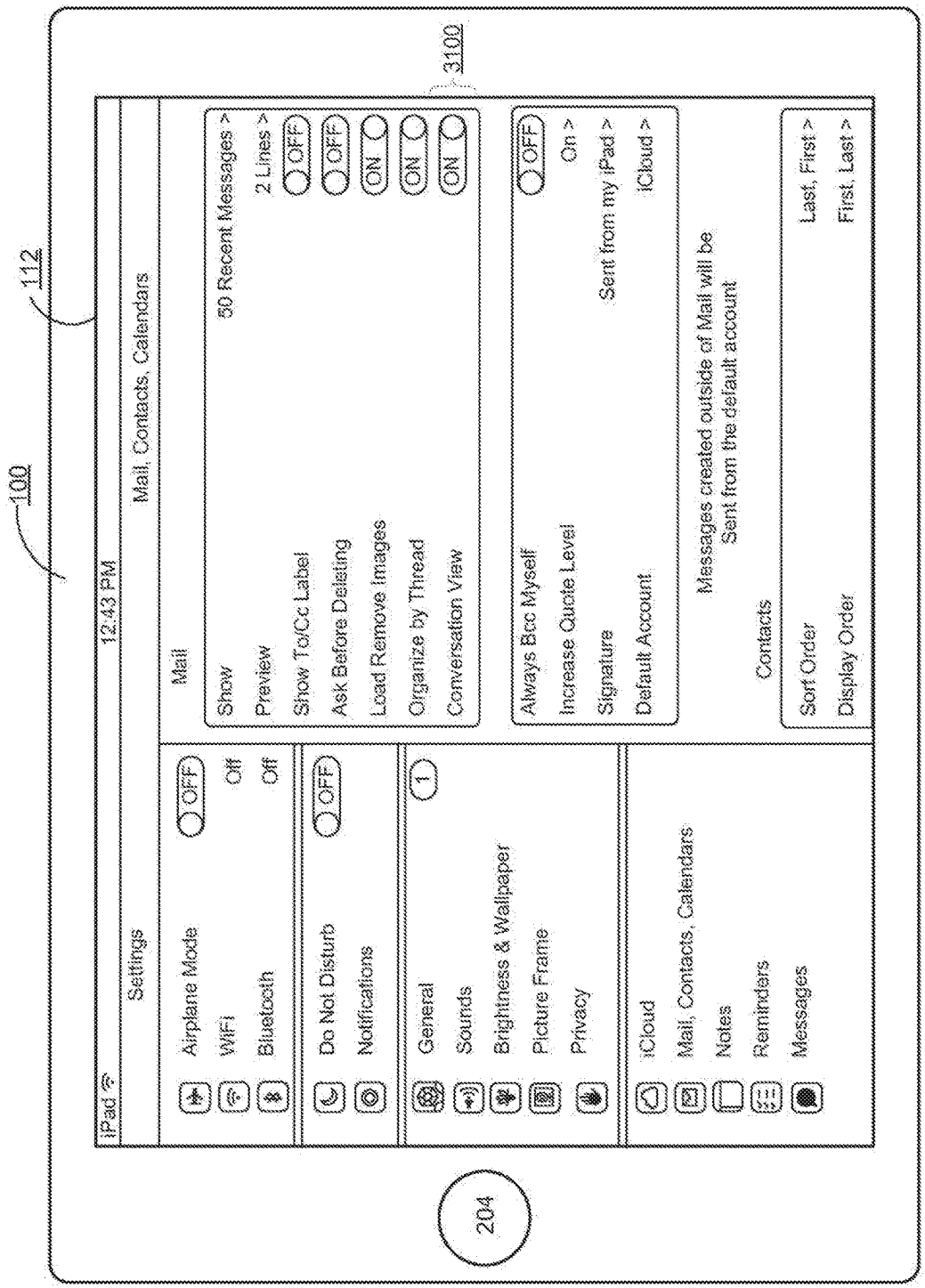
FIG. 31 illustrate a toggle option between conversation and message view of an email thread in an email application, according to one embodiment.

FIG. 31 illustrates a radio button to toggle between conversation view and message view. If the conversation view option 3100 is toggled on, a thread header element 3022 in the thread section 3012 of the application view 504 is displayed as described above with respect to FIGS. 29A-E, 30A, and 30B, whereas otherwise no thread header element is displayed (message view).

Figure 32:
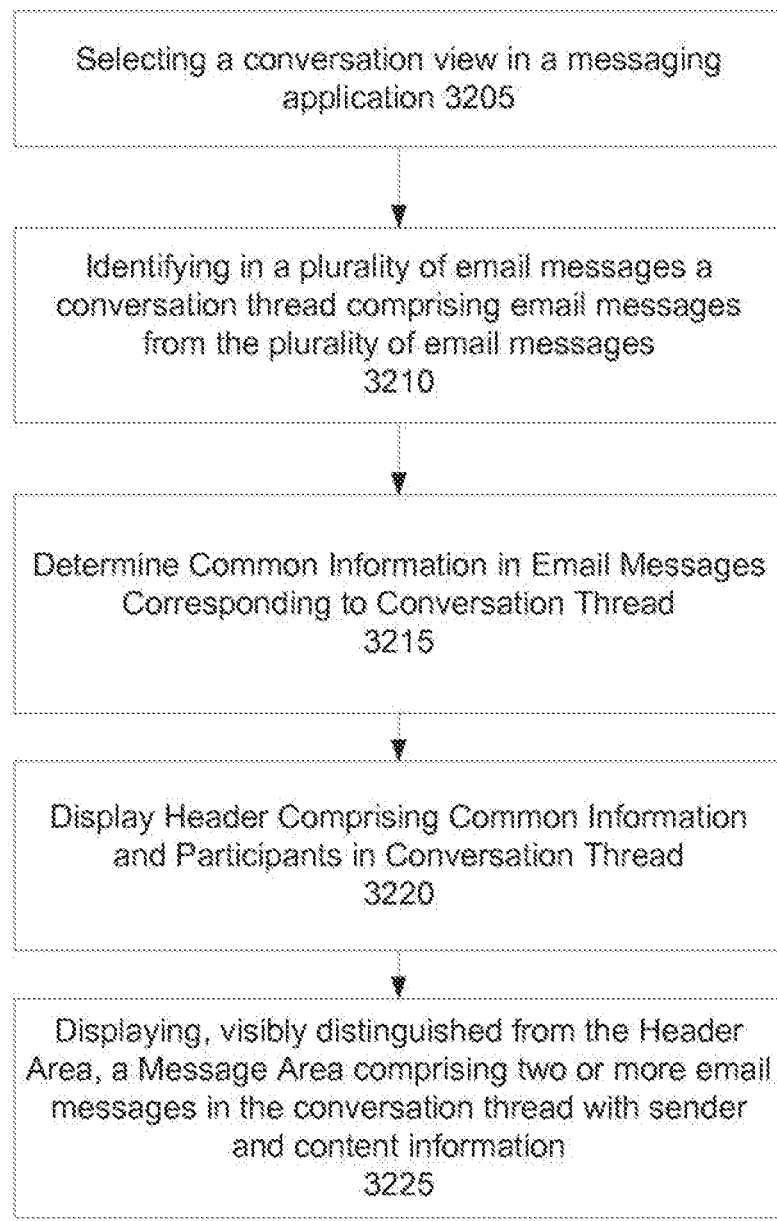
FIG. 32 is a flowchart of a method for viewing an email thread in an email application, according to one embodiment.

FIG. 32 is a flowchart of a method for displaying email messages in an email thread in a conversation view interfaces of an email application, according to one embodiment. The email application first selects 3205 a conversation view in a messaging application that is configured to display a plurality of email messages in the conversation view. The email application then identifies 3210 in the plurality of email messages a conversation thread that comprises email messages from the plurality of email messages. The email application also determines 3215 information common to the email messages in the conversation thread. The common information comprises a conversation title based at least in part on a subject of at least one or more email messages in the conversation thread. Next, the email application displays 3320 a header comprising the common information in a header portion of the conversation view, and displays 3225, visually distinguished from the header area, a message area that comprises two or more of the email messages in the conversation thread. Each of the two or more email messages comprises sender information and content information.

Search Result Groups in an Email UI

Figure 33A:
FIGS. 33A-E illustrates gestures and an exemplary user interfaces for grouping and displaying results from searching email messages in an email application, according to some embodiments.

FIG. 33A illustrates an application view 504 of an email application and a "pull-down" gesture, according to one embodiment. The application view 504 displays email messages or email threads 506A, 506B 506C, 506D, 506E from the inbox or any other mailbox of the user's email account, as described in FIGS. 5B and 11A. The pull-down gesture with contact 3310 includes a swipe in a direction substantially perpendicular to text lines in the email messages or threads. For example, the contact 3310 is detected by the device 100 at an initial position on the email message 506A. The contact 3310 is maintained and dragged a threshold distance from the initial position to a second position on top of an email message or thread 506 displayed in the application view 504 in a continuous movement without breaking contact with the touch screen 112 of the device 100, as shown in FIG. 33A. In another embodiment, instead of a threshold distance, the pull-down gesture includes dragging the contact at a threshold rate on top of the email messages or threads 506 displayed in the application view 504. Thus, the contact 3310 is maintained and dragged at a rate in a direction substantially perpendicular to the text lines in the email messages or threads. In other embodiments, other properties of the maintained contact 3310 are evaluated for the pull-down gesture besides distance and rate are strength of pressure of the contact or number of contact points.

Figure 33B:
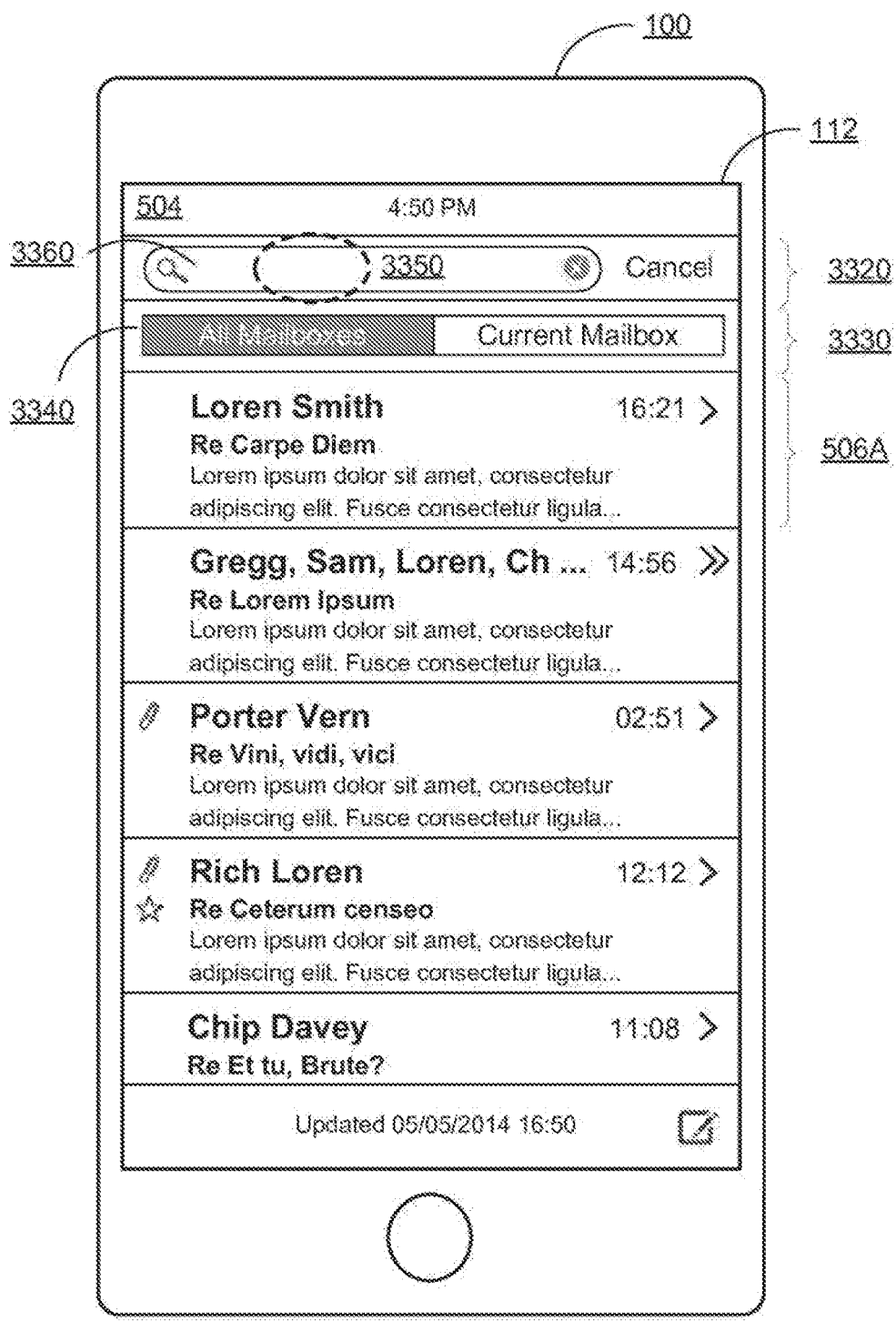

As illustrated in FIG. 33B, responsive to the detected contact 3310 and pull-down gesture, the application view 504 of the email application displays additional user interface elements in the application view 504 above the displayed email message 2920A. These additional user interface elements include a search box 3320 and a select-mailbox option 3330 above email message 506A, according to one embodiment. Alternatively, the additional user interface elements including a search box 3320 are displayed in the first instance of application view 504. The select-mailbox option 3330 allows the user to select between searching all mailboxes of the email application and searching only the current mail box. The current mail box is the mailbox of which email messages or threads are displayed in the application view 504. Contact (not shown), including a tap, detected by the device 100 on the section labelled "All Mailboxes" toggles the selection of all mailboxes on, whereas contact on the "Current Mailbox"-labeled section toggles the selection of only the current mailbox on. The selected (toggled on) mailbox option 3340 is visibly distinguished from the unselected option. For example, selected mailbox option has a darker background color than the unselected one.

Figure 33C:
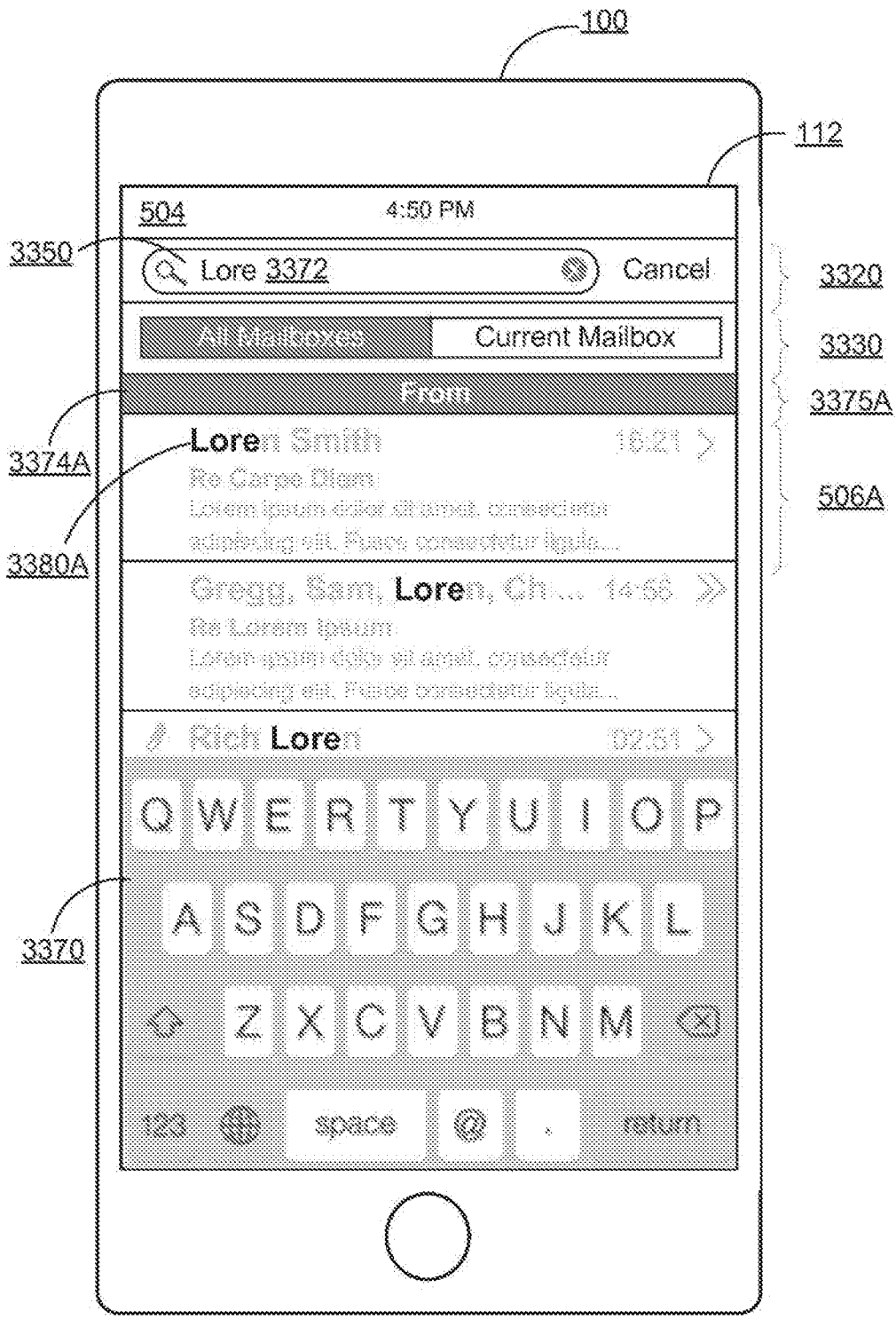

Contact 3350 is detected by the device 100 on a search text input element 3360 in the search box 3320. The contact 3350 includes, but is not limited to, a tap on the input element 3350. Responsive to the detected contact 3350, a search string composition interface or draft UI 3370 is shown as illustrated in FIG. 33C, according to one embodiment. As displayed, the draft UI 3370 is displayed on top of the application view 504. In one embodiment the draft UI 3370 can be displayed at a full width equal to the width of the touchscreen 112. The draft UI is used to input a search text 3372 into the search text input element 3360. In the example shown in FIG. 33C the search text "Lore" is inputted into the search text input element 3360 by the user.

Responsive to inputting a search text, the email application searches for matches within email messages of a selected mailbox. The mailbox is selected based on the select-mailbox option 3330. Email messages in the selected mailbox that contain matches to the search text are automatically separated into different search result groups based on the location of the search term in the email. The search result groups include query result groups based on the sender information, recipient information, subject matter, and message body, labelled "From," "To/Cc," "Subject," and "Message," respectively. Association of an email message containing a match with a search result group is based on whether the matched text is part of the sender information, recipient information, subject matter, or message body, respectively. For example, if the matched text is found within the sender information, the corresponding email message is associated the search result group based on sender information (e.g., "From"). Thus, each query result groups is representative of where the matched text is located in an email message. If the matched text occurs in multiple locations within an email message, e.g. the sender information and the message body, the email message is associated with each corresponding search result group. Other search result groups can be defined by the user, for example, based on date, attachment size, sender location or any other attribute or field available in the email message.

Figure 33D:
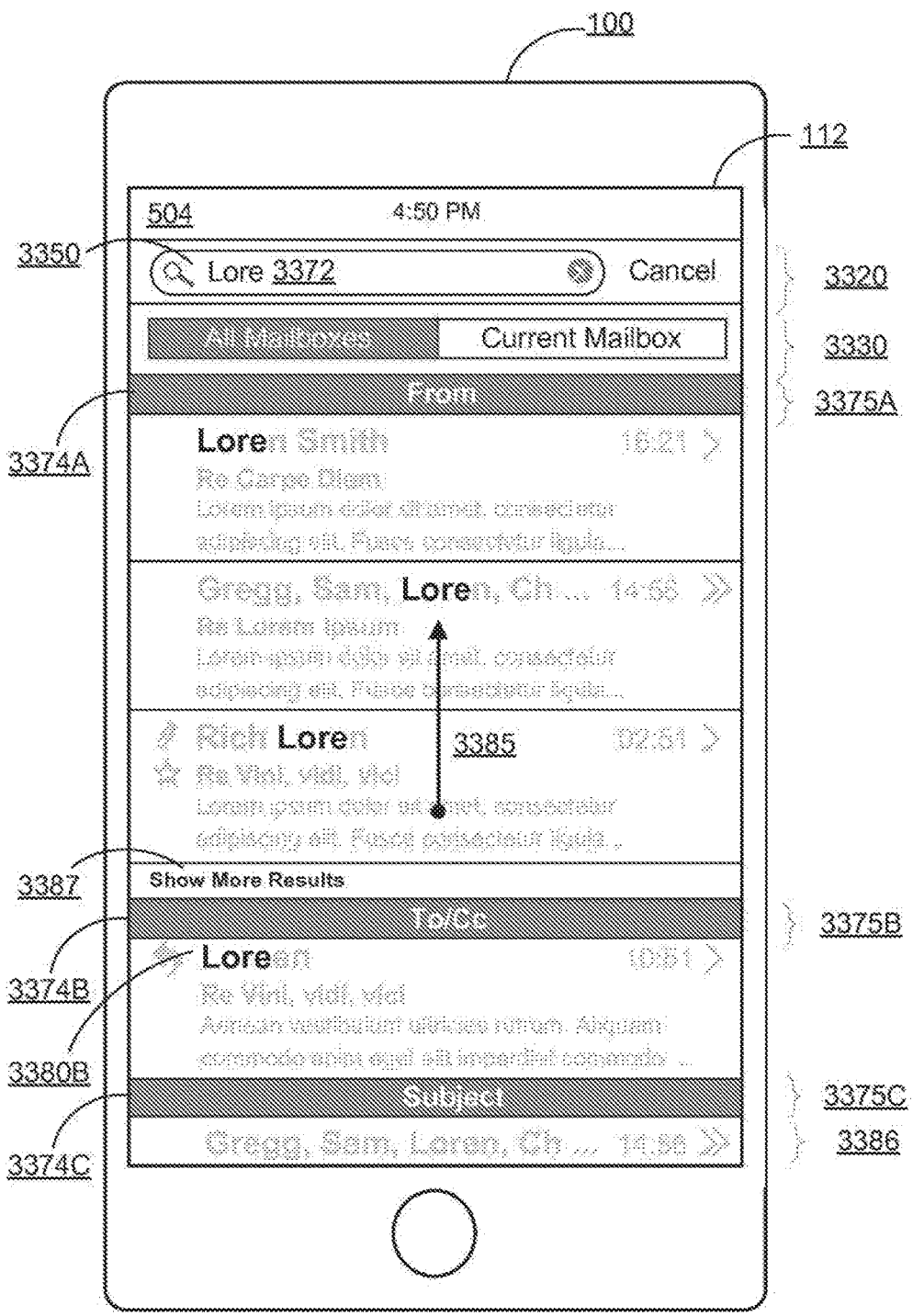
Figure 33E:
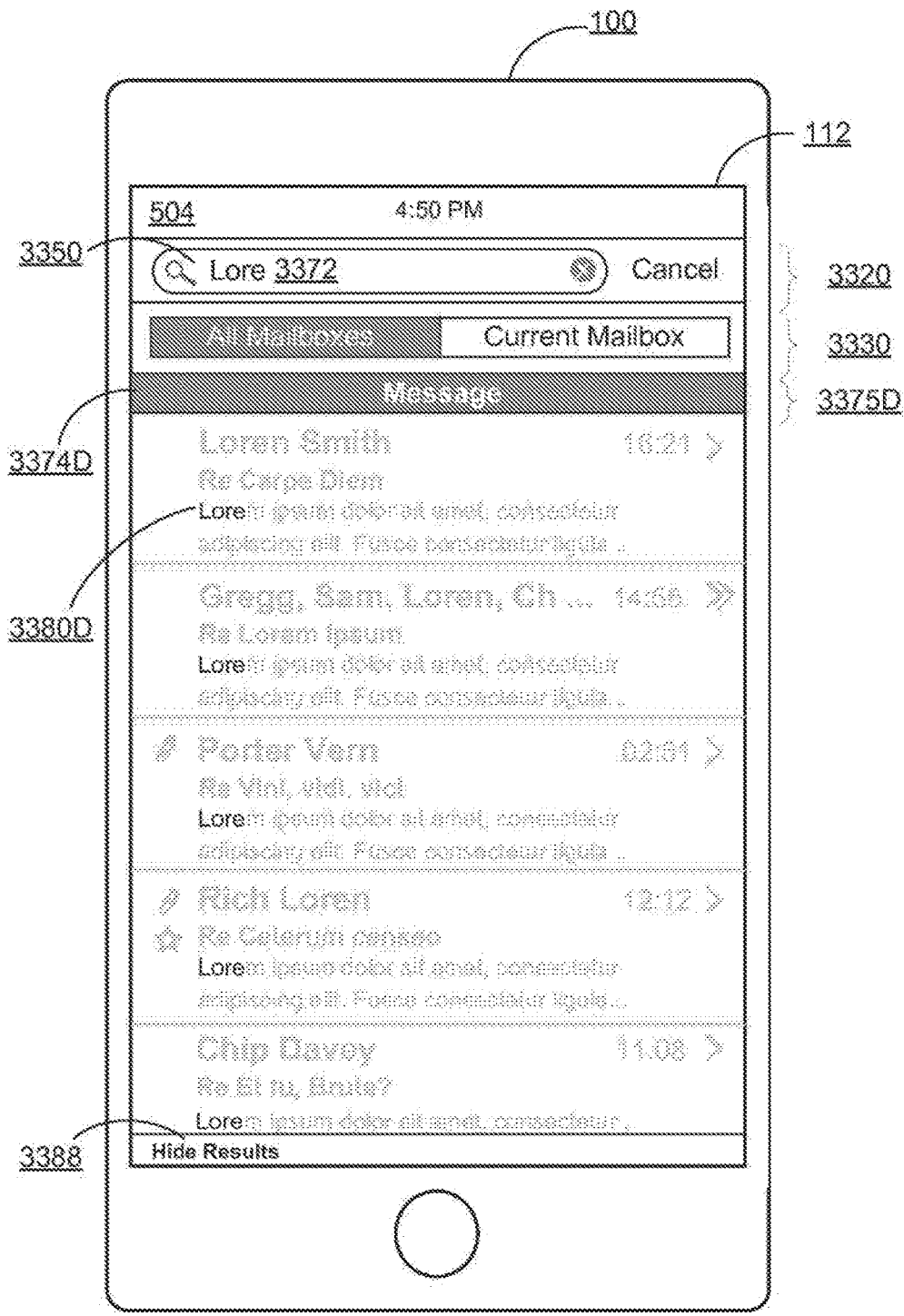

As illustrated in FIGS. 33C-E, responsive to a search for matches within email messages of a selected mailbox, the application view 504 of the email application displays the matched email messages in search result groups 3374A, 3374B, 3374C, and 3374D. Each search result group 3374 has a header element 3375. Each header element 3375A, 3375B, 3375C, and 3375D displays its corresponding label, i.e. "From," "To/Cc," "Subject," and "Message," respectively. Displayed text of the matched email messages in the application view 504 is visibly distinguished from other displayed text of the email messages. For example, the matched text is displayed in bold, black font, whereas the other text is displayed in regular, greyed-out font, as illustrated in FIGS. 33C-E.

FIG. 33D further illustrates a scrolling gesture 3385 for scrolling the search result groups and matched email messages within the application view 504. The scrolling gesture 3385 is applied in a direction substantially perpendicular to the text lines of the displayed email messages, as shown in FIG. 33D. Applying this scrolling gesture displays search result groups and their email messages that follow the email message 3386 that is displayed at the bottom of the application view 504. Once these subsequent search result groups and their email messages are displayed reversing the direction of the scrolling gesture displays search result groups and their email messages that precede the currently displayed search result groups and email messages.

Only up to three email messages that match the search text are initially displayed for each search result group in the application view 504. If more than three email messages are included in a search result group, a more option 3387, labelled for example "Show More Results," is displayed at the bottom of the corresponding search result group in the application view 504. The more option 3387 allows for displaying additional email messages included in the corresponding search result group and not already displayed. In response to an option gesture including a tap (not shown), the more option 3387 displays those additional email messages within its search result group. The more option 3387 is similar to the more option 2940 described above with respect to FIG. 29C. With the display of all the email messages within a search result group the more option 3387 is no longer displayed in the application view 504. Instead of the more option, a hide option 3388 is displayed in the application view 504, as shown in FIG. 33E. The hide option 3388 is similar to the hide option 2944 described above with respect to FIG. 29D, and in response to an option gesture including a tap (not shown), only three email messages are displayed with the remaining email messages of the search result group are hidden from display.

Figure 34:
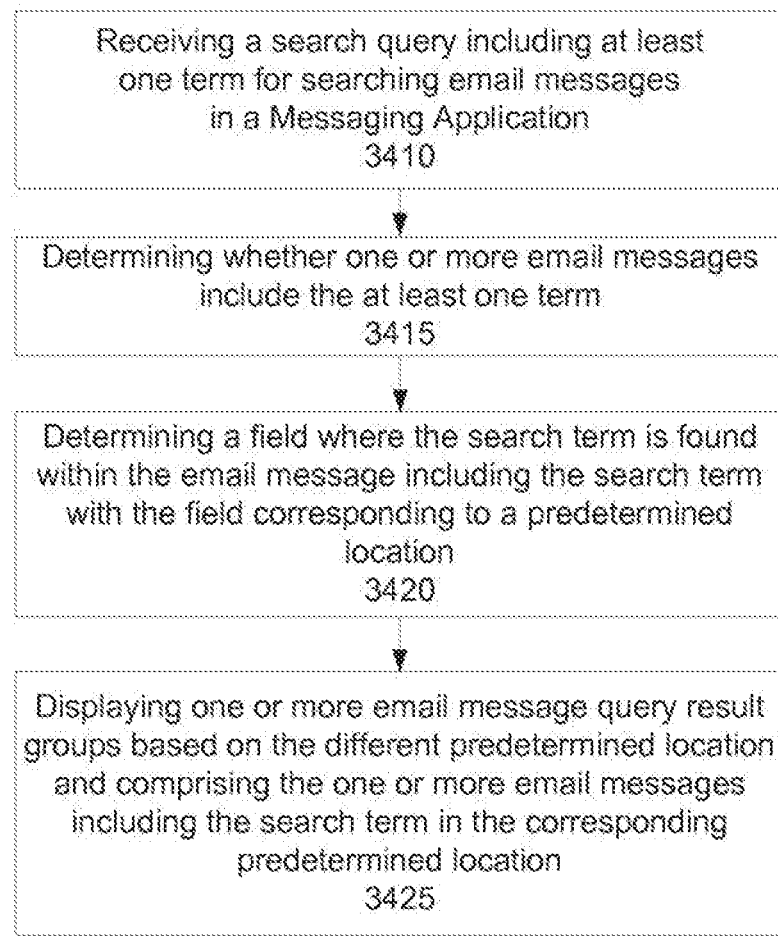
FIG. 34 is a flowchart of a method for grouping and displaying results from searching email messages in an email application, according to one embodiment.

FIG. 34 is a flowchart of a method for searching email messages in messages view interfaces of an email application, according to one embodiment. The email application receives 3410 a search query that comprises at least one term for searching email messages in a messaging application. In response to receiving the search query, the email application determines 3415 whether one or more email messages in the messaging application include the at least one search term. Next, the email application determines 3420, for each of the one or more email messages in the messaging application including the search term, a field where the search term is found within the email message. When the email application determines the field, the search term can appear in one or more of a plurality of different, predetermined locations. The email application then displays 3425 one or more email message query result groups, each of which is based on a different predetermined location and comprises the one or more email messages in the messaging application including the search term in the corresponding predetermined location.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A method, comprising:
   at an electronic device with a touch-sensitive surface and display:
      displaying a plurality of message affordances in a messaging application;
      while displaying the plurality of message affordances, receiving an action to compose a new message;
      in response to receiving the action to compose the new message, displaying a first composition interface in a first position, wherein the first composition interface in the first position at least partially replaces display of the plurality of message affordances;
      while displaying the first composition interface in the first position; detecting; at a location corresponding to the first composition interface, a first gesture that includes movement of a first contact on the touch-sensitive surface in a direction; and
      in response to detecting the first gesture:
         sliding the first composition interface in the direction of movement of the first contact a second position on the display;
      after detecting completion of the first gesture:
         in accordance with a determination that the movement of the first contact meets or exceeds a threshold criterion:
            sliding the first composition interface further in the direction of movement of the first contact to a third position on the display, wherein while at the third position at least a portion of the first composition interface is not displayed on the display; and
         in accordance with a determination that the movement of the first contact does not meet or exceed the threshold criterion:
            sliding the first composition interface in an opposite direction of the movement of the first contact to the first position on the display.

2. The method of claim 1, further comprising:
   in response to detecting the first gesture and in accordance with a determination that the movement of the first contact meets or exceeds the threshold criterion:
      reducing a display size of an area in which the plurality of message affordances are displayed; and
      displaying a header of the first composition interface at a sit ion previously occupied by the plurality of message affordances.

3. The method of claim 1, wherein the direction of movement of the first contact is substantially perpendicular to a width of the list comprising information.

4. The method of claim 1, wherein determining whether the first contact meets or exceeds the threshold criterion includes determining whether the movement of the first contact meets or exceeds a threshold rate.

5. The method of claim 1, wherein determining whether the first contact meets or exceeds the threshold criterion includes determining whether the movement of the first contact meets or exceeds a threshold distance.

6. The method of claim 1, further comprising:
while displaying the first composition interface in the third position, detecting a tap gesture at a location corresponding to the first composition interface; and
in response to detecting the tap gesture at the location corresponding to the first composition interface, sliding the first composition interface in the opposite direction of the movement of the first contact to the first position on the display.

7. The method of claim 1, further comprising:
while displaying the first composition interface in the third position, receiving an action to compose a second message; and
in response to receiving the action to compose the second message, displaying a second composition interface in a fourth position, wherein the second composition interface in the fourth position at least partially replaces display of the plurality of message affordances.

8. The method of claim 7, further comprising:
while displaying the second composition interface in the fourth position, detecting, at a location corresponding to the second composition interface, a second gesture that includes continuous movement of a second contact on the touch-sensitive surface in the direction of movement of the first contact;
in response to detecting the second gesture:
sliding the second composition interface in the direction of movement of the first contact to a fifth position on the display;
in accordance with a determination that the movement of the second contact meets or exceeds a second threshold criterion:
sliding the second composition interface further in the direction of movement of the first contact to a sixth position on the display, wherein while at the sixth position at least a portion of the first composition interface is not displayed on the display, and
snapping an edge of a header of the second composition interface to an edge of the display in the direction of movement of the first contact; and
in accordance with a determination that the movement of the first contact does not meet or exceed the second threshold criterion:
sliding the second composition interface in an opposite direction of the movement of the first contact to the fourth position on the display.

9. An electronic device, comprising:
a touch-sensitive surface;
a display;
one or more processors; and
memory storing one or more programs configured to be executed by the one or more processors, the one or more programs including instructions for:
displaying a plurality of message affordances in a messaging application;
while displaying the plurality of message affordances, receiving an action to compose a new message;
in response to receiving the action to compose the new message, displaying a first composition interface in a first position, wherein the first composition interface in the first position at least partially replaces display of the plurality of message affordances;
while displaying the first composition interface in the first position, detecting, at a location corresponding to the first composition interface, a first gesture that includes movement of a first contact on the touch-sensitive surface in a direction; and
in response to detecting the first gesture:
sliding the first composition interface in the direction of movement of the first contact to a second position on the display;
after detecting completion of the first gesture:
in accordance with a determination that the movement of the first contact meets or exceeds a threshold criterion:
sliding the first composition interface further in the direction of movement of the first contact to a third position on the display, wherein while at the third position at least a portion of the first composition interface is not displayed on the display; and
in accordance with a determination that the movement of the first contact does not meet or exceed the threshold criterion:
sliding the first composition interface in an opposite direction of the movement of the first contact to the first position on the display.

10. The electronic device of claim 9, the instructions further comprising:
in response to detecting the first gesture and in accordance with a determination that the movement of the first contact meets or exceeds the threshold criterion:
reducing a display size of an area in which the plurality of message affordances are displayed; and
displaying a header of the first composition interface at a position previously occupied by the plurality of message affordances.

11. The electronic device of claim 9, wherein the direction of movement of the first contact is substantially perpendicular to a width of the list comprising information.

12. The electronic device of claim 9, wherein determining whether the first contact meets or exceeds the threshold criterion includes determining whether the movement of the first contact meets or exceeds a threshold rate.

13. The electronic device of claim 9, wherein determining whether the first contact meets or exceeds the threshold criterion includes determining whether the movement of the first contact meets or exceeds a threshold distance.

14. The electronic device of claim 9, the instructions further comprising:
while displaying the first composition interface in the third position, detecting a tap gesture at a location corresponding to the first composition interface; and
in response to detecting the tap gesture at the location corresponding to the first composition interface, sliding the first composition interface in the opposite direction of the movement of the first contact to the first position on the display.

15. The electronic device of claim 9, the instructions further comprising:
while displaying the first composition interface in the third position, receiving an action to compose a second message; and
in response to receiving the action to compose the second message, displaying a second composition interface in a fourth position, wherein the second composition interface in the fourth position at least partially replaces display of the plurality of message affordances.

16. The electronic device of claim 15, the instructions further comprising:
while displaying the second composition interface in the fourth position, detecting, at a location corresponding to the second composition interface, a second gesture that includes continuous movement of a second contact on the touch-sensitive surface in the direction of movement of the first contact;

in response to detecting the second gesture:
  sliding the second composition interface in the direction of movement of the first contact to a fifth position on the display;
  in accordance with a determination that the movement of the second contact meets or exceeds a second threshold criterion:
    sliding the second composition interface further in the direction of movement of the first contact to a sixth position on the display, wherein while at the sixth position at least a portion of the first composition interface is not displayed on the display, and
    snapping an edge of a header of the second composition interface to an edge of the display in the direction of movement of the first contact; and
  in accordance with a determination that the movement of the first contact does not meet or exceed the second threshold criterion:
    sliding the second composition interface in an opposite direction of the movement of the first contact to the fourth position on the display.

17. A non-transitory computer-readable storage medium storing one or more programs configured to be executed by one or more processors of an electronic device with a display and a touch-sensitive surface, the one or more programs including instructions for:
  displaying a plurality of message affordances in a messaging application;
  while displaying the plurality of message affordances, receiving an action to compose a new message;
  in response to receiving the action to compose the new message, displaying a first composition interface in a first position, wherein the first composition interface in the first position at least partially replaces display of the plurality of message affordances;
  while displaying the first composition interface in the first position, detecting, at a location corresponding to the first composition interface, a first gesture that includes movement of a first contact on the touch-sensitive surface in a direction; and
  in response to detecting the first gesture:
    sliding the first composition interface in the direction of movement of the first contact to a second position on the display;
  after detecting completion of the first gesture:
    in accordance with a determination that the movement of the first contact meets or exceeds a threshold criterion:
      sliding the first composition interface further in the direction of movement of the first contact to a third position on the display, wherein while at the third position at least a portion of the first composition interface is not displayed on the display; and
    in accordance with a determination that the movement of the first contact does not meet or exceed the threshold criterion:
      sliding the first composition interface in an opposite direction of the movement of the first contact to the first position on the display.

18. The non-transitory computer-readable storage medium of claim 17, the instructions further comprising:
  in response to detecting the first gesture and in accordance with a determination that the movement of the first contact meets or exceeds the threshold criterion:
    reducing a display size of an area in which the plurality of message affordances are displayed; and
    displaying a header of the first composition interface at a position previously occupied by the plurality of message affordances.

19. The non-transitory computer-readable storage medium of claim 17, wherein the direction of movement of the first contact is substantially perpendicular to a width of the list comprising information.

20. The non-transitory computer-readable storage medium of claim 17, wherein determining whether the first contact meets or exceeds the threshold criterion includes determining whether the movement of the first contact meets or exceeds a threshold rate.

* * * * *